US012724481B2

(12) United States Patent
Parshionikar

(10) Patent No.: US 12,724,481 B2
(45) Date of Patent: Sep. 1, 2026

(54) GESTURE BASED USER INTERFACES, APPARATUSES AND SYSTEMS USING EYE TRACKING, HEAD TRACKING, HAND TRACKING, FACIAL EXPRESSIONS AND OTHER USER ACTIONS

(71) Applicant: Perceptive Devices LLC, Mason, OH (US)

(72) Inventor: Uday Parshionikar, Mason, OH (US)

(73) Assignee: Perceptive Devices LLC, Mason, OH (US)

( * ) Notice: Subject to any disclaimer, the term of this patent is extended or adjusted under 35 U.S.C. 154(b) by 0 days.

(21) Appl. No.: 18/966,049

(22) Filed: Dec. 2, 2024

(65) Prior Publication Data

US 2025/0165066 A1 May 22, 2025
US 2026/0178118 A9 Jun. 25, 2026

Related U.S. Application Data

(63) Continuation of application No. 18/656,489, filed on May 6, 2024, now Pat. No. 12,158,987, which is a continuation of application No. 17/879,083, filed on Aug. 2, 2022, now Pat. No. 11,977,677, which is a continuation of application No. 17/141,903, filed on Jan. 5, 2021, now Pat. No. 11,402,902, which is a continuation of application No. 16/726,350, filed on Dec. 24, 2019, now Pat. No. 10,884,493, which is a continuation-in-part of application No. 16/201,776, filed on Nov. 27, 2018, now abandoned, and a continuation-in-part of application No. 15/921,632, filed on Mar. 14, 2018, now Pat. No. 10,558,272, said application No. 16/201,776 is a continuation-in-part of application No. 15/469,456, filed on Mar. 24, 2017, now Pat. No. 10,137,363, said application No. 15/921,632 is a continuation-in-part of application (Continued)

(51) Int. Cl.
*G06F 3/01* (2006.01)

(52) U.S. Cl.
CPC .............. *G06F 3/013* (2013.01); *G06F 3/012* (2013.01)

(58) Field of Classification Search
CPC ........... G06F 3/013; G06F 3/011; G06F 3/017
See application file for complete search history.

(56) References Cited

U.S. PATENT DOCUMENTS 9,171,198 B1 * 10/2015 Raffle .................... G02B 27/01
2013/0300650 A1 * 11/2013 Liu ......................... G06F 3/017 345/156

* cited by examiner

*Primary Examiner* — Christopher E Leiby

(57) ABSTRACT

User interaction concepts, principles and algorithms for gestures involving facial expressions, motion or orientation of body parts, eye gaze, tightening muscles, mental activity, and other user actions are disclosed. User interaction concepts, principles and algorithms for enabling hands-free and voice-free interaction with electronic devices are disclosed. Apparatuses, systems, computer implementable methods, and non-transient computer storage media storing instructions, implementing the disclosed concepts, principles and algorithms are disclosed. Gestures for systems using eye gaze and head tracking that can be used with augmented, mixed or virtual reality, mobile or desktop computing are disclosed. Use of periods of limited activity and consecutive user actions in orthogonal axes is disclosed. Generation of command signals based on start and end triggers is disclosed. Methods for coarse as well as fine modification of objects are disclosed.

37 Claims, 62 Drawing Sheets

Related U.S. Application Data

No. 15/469,456, filed on Mar. 24, 2017, now Pat. No. 10,137,363, which is a continuation-in-part of application No. 14/897,657, filed as application No. PCT/US2014/043529 on Jun. 20, 2014, now Pat. No. 10,254,844, said application No. 15/921,632 is a continuation-in-part of application No. 14/897,657, filed as application No. PCT/US2014/043529 on Jun. 20, 2014, now Pat. No. 10,254,844, said application No. 16/201,776 is a continuation-in-part of application No. 14/897,657, filed as application No. PCT/US2014/043529 on Jun. 20, 2014, now Pat. No. 10,254,844.

(60) Provisional application No. 62/630,253, filed on Feb. 14, 2018, provisional application No. 62/626,253, filed on Feb. 5, 2018, provisional application No. 62/589,228, filed on Nov. 21, 2017, provisional application No. 62/537,482, filed on Jul. 27, 2017, provisional application No. 62/470,872, filed on Mar. 14, 2017, provisional application No. 62/427,006, filed on Nov. 28, 2016, provisional application No. 62/313,042, filed on Mar. 24, 2016, provisional application No. 61/837,215, filed on Jun. 20, 2013.

Fig. 13
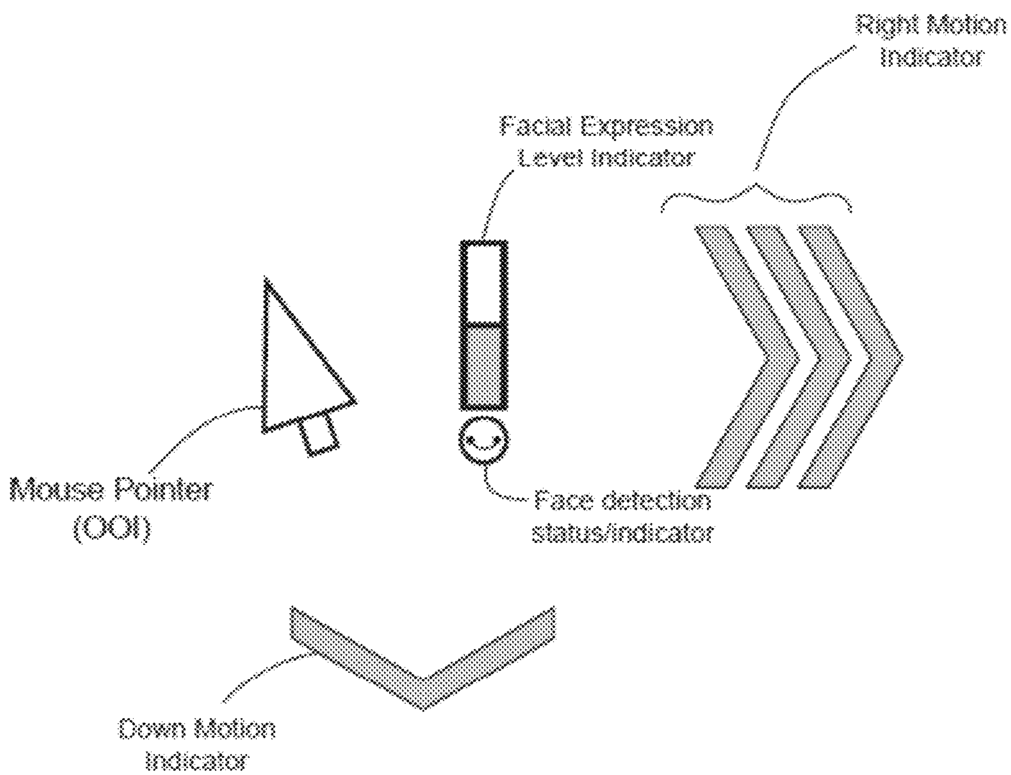
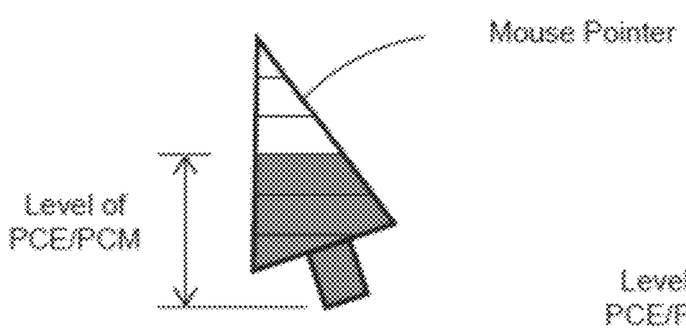
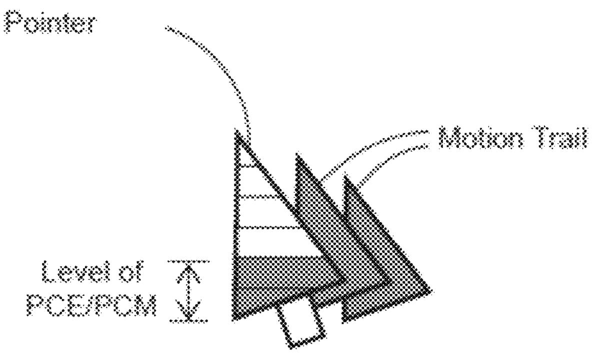
Fig. 14
Fig. 15

OOI
Dwell Park
Progress Meter

OOI d = 0.1 x D d = 0.2 x D d = 0.3 x D d = 0.4 x D d = D

GESTURE BASED USER INTERFACES, APPARATUSES AND SYSTEMS USING EYE TRACKING, HEAD TRACKING, HAND TRACKING, FACIAL EXPRESSIONS AND OTHER USER ACTIONS

CROSS REFERENCE TO RELATED APPLICATIONS

This application is a continuation of U.S. patent application Ser. No. 18/656,489 filed May 6, 2024 entitled "GESTURE BASED USER INTERFACES, APPARATUSES AND SYSTEMS USING EYE TRACKING, HEAD TRACKING, HAND TRACKING, FACIAL EXPRESSIONS AND OTHER USER ACTIONS"; which is a continuation of U.S. patent application Ser. No. 17/879,083 filed Aug. 2, 2022 entitled "GESTURE BASED USER INTERFACES, APPARATUSES AND SYSTEMS USING EYE TRACKING, HEAD TRACKING, HAND TRACKING, FACIAL EXPRESSIONS AND OTHER USER ACTIONS"; which is a continuation of U.S. patent application Ser. No. 17/141,903 filed Jan. 5, 2021 entitled "GESTURE BASED USER INTERFACES, APPARATUSES AND SYSTEMS USING EYE TRACKING, HEAD TRACKING, HAND TRACKING, FACIAL EXPRESSIONS AND OTHER USER ACTIONS"; which is a continuation of U.S. patent application Ser. No. 16/726,350 filed Dec. 24, 2019 entitled "GESTURE BASED USER INTERFACES, APPARATUSES AND SYSTEMS USING EYE TRACKING, HEAD TRACKING, HAND TRACKING, FACIAL EXPRESSIONS AND OTHER USER ACTIONS"; which is a continuation-in-part of U.S. patent application Ser. No. 15/921,632 filed Mar. 14, 2018 entitled "GESTURE CONTROL VIA EYE TRACKING, HEAD TRACKING, FACIAL EXPRESSIONS AND OTHER USER ACTIONS"; which is a continuation-in-part of U.S. patent application Ser. No. 14/897,657 filed Dec. 11, 2015 entitled "SYSTEMS, METHODS, APPARATUSES, COMPUTER READABLE MEDIUM FOR CONTROLLING ELECTRONIC DEVICES", which claims priority to PCT Application Serial No. PCT/US14/43529, filed Jun. 20, 2014 entitled "SYSTEMS, METHODS, APPARATUSES, COMPUTER READABLE MEDIUM FOR CONTROLLING ELECTRONIC DEVICES", which claims priority to U.S. Provisional Patent Application Ser. No. 61/837,215, filed Jun. 20, 2013 entitled "Multipurpose Controllers using Sensors, Heuristics for User Intent, Computer Vision, Multiple OMDs, ODEs and POLAs", the disclosures of which are all expressly incorporated herein by reference for all they contain.

U.S. patent application Ser. No. 15/921,632 is also a continuation-in-part of U.S. patent application Ser. No. 15/469,456 filed Mar. 24, 2017 entitled "GESTURE BASED USER INTERFACES, APPARATUSES AND CONTROL SYSTEMS", which is a continuation-in-part of U.S. patent application Ser. No. 14/897,657 filed Dec. 11, 2015 entitled "SYSTEMS, METHODS, APPARATUSES, COMPUTER READABLE MEDIUM FOR CONTROLLING ELECTRONIC DEVICES", which claims priority to PCT Application Serial No. PCT/US14/43529, filed Jun. 20, 2014 entitled "SYSTEMS, METHODS, APPARATUSES, COMPUTER READABLE MEDIUM FOR CONTROLLING ELECTRONIC DEVICES", which claims priority to U.S. Provisional Patent Application Ser. No. 61/837,215, filed Jun. 20, 2013 entitled "Multipurpose Controllers using Sensors, Heuristics for User Intent, Computer Vision, Multiple OMDs, ODEs and POLAs", the disclosures of which are all expressly incorporated herein by reference for all they contain. U.S. patent application Ser. No. 15/469,456 also claims priority to U.S. Provisional Patent Application Ser. No. 62/313,042 filed on Mar. 24, 2016 entitled "Gestures Based User Interfaces, Apparatuses and Control Systems" and U.S. Provisional Patent Application Ser. No. 62/427,006 filed on Nov. 28, 2016 entitled "Gestures Based User Interfaces, Apparatuses and Control Systems", the disclosures of which are all also expressly incorporated herein by reference for all they contain.

U.S. patent application Ser. No. 15/921,632 also claims priority to U.S. Provisional Patent Application Ser. No. 62/470,872 filed on Mar. 14, 2017 entitled "Gestures Based User Interfaces, Apparatuses and Control Systems", U.S. Provisional Patent Application Ser. No. 62/537,482 filed on Jul. 27, 2017 entitled "Gestures Based User Interfaces, Apparatuses and Control Systems", U.S. Provisional Patent Application Ser. No. 62/589,228 filed on Nov. 21, 2017 entitled "Gestures Based User Interfaces, Apparatuses and Control Systems", U.S. Provisional Patent Application Ser. No. 62/626,253 filed on Feb. 5, 2018 entitled "Gestures Based User Interfaces, Apparatuses and Control Systems", and U.S. Provisional Patent Application Ser. No. 62/630,253 filed on Feb. 14, 2018 entitled "Gestures Based User Interfaces, Apparatuses and Control Systems", the disclosures of which are all also expressly incorporated herein by reference for all they contain.

U.S. patent application Ser. No. 16/726,350 is also a continuation-in-part of U.S. patent application Ser. No. 16/201,776 filed Nov. 27, 2018 entitled "GESTURE BASED USER INTERFACES, APPARATUSES AND CONTROL SYSTEMS", which is a continuation-in-part of U.S. patent application Ser. No. 14/897,657 filed Dec. 11, 2015 entitled "SYSTEMS, METHODS, APPARATUSES, COMPUTER READABLE MEDIUM FOR CONTROLLING ELECTRONIC DEVICES", which claims priority to PCT Application Serial No. PCT/US14/43529, filed Jun. 20, 2014 entitled "SYSTEMS, METHODS, APPARATUSES, COMPUTER READABLE MEDIUM FOR CONTROLLING ELECTRONIC DEVICES", which claims priority to U.S. Provisional Patent Application Ser. No. 61/837,215, filed Jun. 20, 2013 entitled "Multipurpose Controllers using Sensors, Heuristics for User Intent, Computer Vision, Multiple OMDs, ODEs and POLAs", the disclosures of which are all expressly incorporated herein by reference for all that they contain.

U.S. patent application Ser. No. 16/201,776 is also a continuation-in-part of U.S. patent application Ser. No. 15/469,456 filed Mar. 24, 2017 entitled "GESTURE BASED USER INTERFACES, APPARATUSES AND CONTROL SYSTEMS", which is a continuation-in-part of U.S. patent application Ser. No. 14/897,657 filed Dec. 11, 2015 entitled "SYSTEMS, METHODS, APPARATUSES, COMPUTER READABLE MEDIUM FOR CONTROLLING ELECTRONIC DEVICES", which claims priority to PCT Application Serial No. PCT/US14/43529, filed Jun. 20, 2014 entitled "SYSTEMS, METHODS, APPARATUSES, COMPUTER READABLE MEDIUM FOR CONTROLLING ELECTRONIC DEVICES", which claims priority to U.S. Provisional Patent Application Ser. No. 61/837,215, filed Jun. 20, 2013 entitled "Multipurpose Controllers using Sensors, Heuristics for User Intent, Computer Vision, Multiple OMDs, ODEs and POLAs". U.S. patent application Ser. No. 15/469,456 also claims priority to U.S. Provisional Patent Application Ser. No. 62/313,042 filed on Mar. 24, 2016 entitled "Gestures Based User Interfaces, Apparatuses and Control Systems" and U.S. Provisional Patent Application Ser. No. 62/427,006 filed on Nov. 28, 2016 entitled "Gestures Based User Interfaces, Apparatuses and Control Systems", the disclosures of which are all also expressly incorporated herein by reference for all that they contain.

U.S. patent application Ser. No. 16/201,776 also claims priority to U.S. Provisional Patent Application Ser. No. 62/626,253 filed on Feb. 5, 2018 entitled "Gestures Based User Interfaces, Apparatuses and Control Systems", and U.S. Provisional Patent Application Ser. No. 62/630,253 filed on Feb. 14, 2018 entitled "Gestures Based User Interfaces, Apparatuses and Control Systems", the disclosures of which are all also expressly incorporated herein by reference for all that they contain.

This disclosure is related to U.S. patent application Ser. No. 13/418,331 filed Mar. 12, 2012 entitled "Multipurpose Controller for Electronic Devices, Facial Expressions Management and Drowsiness Detection", U.S. patent application Ser. No. 14/054,789 filed Oct. 15, 2013 entitled "Multipurpose Controllers and Methods", and U.S. patent application Ser. No. 15/695,283 filed Sep. 5, 2017 entitled "Multipurpose controllers and methods", the disclosures of which are all hereby expressly incorporated by reference for all that they contain.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

BACKGROUND

Efforts have been made for many years to provide diverse means of controlling/communicating with electronic devices. Some of the means of control involve use of controllers to control/communicate with electronic devices. Other means/methods seek to eliminate the need to hold and/or touch controllers to control electronic devices. They involve communicating intent by means of gestures performed using hands, arms, legs, face and other body parts. Voice commands can also be used to communicate with electronic devices. Communication via brain waves is also possible. Each of these methods have limitations, however, one of the common concerns can be detecting and/or confirming user intention behind actions performed by the user of the electronic device(s).

SUMMARY

This application includes disclosure of methods, systems, apparatuses as well as principles/algorithms that can be implemented using computer executable instructions stored on computer readable mediums, for defining user gestures, performing user gestures, interpreting user actions, detecting user intent, confirming user intent and communicating user intent when communicating with electronic devices. A method of representation of user gestures via a symbolic language is also disclosed. Disclosed user gestures include user actions that can involve actions using eyes, head, facial expression, fingers, hands, arms, and other parts of body, verbal actions and mental actions that can be detected by monitoring brain waves. Many of the disclosed principles can enable hands-free and/or voice-free control of devices including those used in the fields of accessibility, Augmented/Mixed/Virtual Reality, gaming, desktop and mobile computing, and others. However, the disclosures are not limited to hands-free or voice-free principles of control over electronic devices. Multiple principles, concepts and user gestures are disclosed that allow for quick and large motions of OOI via eye gaze, as well as precise motions and accurate placement of OOI using other user actions including head motion and hand gestures are disclosed.

Concept of TMB (Time and Magnitude Bounded) user actions including motions, positions, expressions and other actions is disclosed. Use of TMB user actions for conveying and detecting user intent is disclosed.

Concept of Modifier Action is disclosed. A designated modifier action performed just prior to a user gesture can change the interpretation of that user gesture. For example, a user gesture for Left Click command when preceded by a specified "R" action, generates a Right Click instead. The designated Body motion or position in substantially one particular axis before a user gesture for one type of click causes a different type of click. Click gesture can comprise a TMB facial expression. Body motion can be head motion, possibly with time and magnitude bounds and possibly preceded by a POLA. The modifier action can be a body motion that is unidirectional or in form of a shape that can be open or closed or in shape of letter of alphabet and can be performed clockwise or anticlockwise.

A user gesture for a swipe command is disclosed. A user gesture for a swipe command can comprise a TMB motion or position of a body part, possibly followed by a period of No Motion (possibly of minimum duration) occurring within designated time period. The body part can be head. The direction of swipe can be in accordance to the direction of the motion or position of the body part.

Use of sequential TMB user actions (such as motions or positions) in orthogonal direction in user gestures is disclosed. Combination of TMB motion or position actions in orthogonal axes, performed sequentially, can lead to generation of command signals. These combinations can be followed by POLA. There can be a POLA between some of the consecutive TMB actions (that are performed along orthogonal axes). There can be VLWPs between some of the consecutive TMB actions (that are performed along orthogonal axes).

Moving back or forth in the X axis can cause a Zoom in or out command signals to be generated, if a designated user action is detected to be active during the translational motion. The designated user action can be a facial expression. Rotating the head can also generate Zoom in/out command signals, if a designated user action is detection to be active during the head rotations.

A generic user gesture for manipulations of an Object of Interest (OOI) is disclosed. A head rotation or translation performed by the user can cause rotation or translation of the OOI on a display screen, possibly when performed upon detection of a designated trigger user action. The designated trigger user action can be a facial expression, and can be followed by a FLBP and that can be further followed by a period of No Motion. The designated trigger user action can also be tensing of designated muscles.

Note: In this document, the term "display screen" can refer to a physical display screen as well as any mechanism (such as a retinal projection mechanism) used to display virtual objects in a virtual 2D, 3D or multi-dimensional space that can be seen by the user.

Concept of Gesture Wake up Sequences (GWS) is disclosed. GWS can be used to activate the processing of certain designated target user gestures in a control system. These GWS's can be as simple as a period of No Motion, or a POLA, possibly combined with a VLWP (possibly with designated time bounds), or can be any suitable sequence of user actions. This VLWP can possibly wait for the first action of a previously defined target user gesture that needs to be processed by the system. GWS can be performed before a defined target user gesture that needs processing. After a target user gesture's processing is complete, the control system can stop processing other gestures that need a GWS, until another GWS is encountered. Some GWS can be composed of a TMB user action, optionally by a GWS and a POLA. Requirement to perform GWS before certain user gestures can be automatically imposed by the system based on ambient conditions, such as nature and pattern of motions experienced by the user or controller in conditions.

Concept of Session Wake up Sequences is disclosed. Certain user gestures can be used as Session Wake up Sequences (SWS) wherein there are used to start processing of other user gestures used to generate command signals. Once a SWS is performed, the control system can process user gestures for a designated amount of time from the time when the SWS was performed, and/or for at least designated amount of time from start/end of the SWS or start/end of the last user gesture processed once this SWS was performed.

Concept of Modes is disclosed. The command signals generated by the control system in response to performance of a particular user gesture can change based the active mode. Different sequences of user actions can be used to activate (start) or deactivate (end) a control system mode.

Use of a TMB motions performed with the head in Yaw, Pitch or Roll axis is disclosed for use of start of generating signals for modification of an object of interest. User gestures using Roll action in start triggers disclosed. User gestures without Roll as part of start triggers also disclosed.

Use of POLAs in ascertaining user intent behind user actions is disclosed.

Use of "L" shaped gestures disclosed. Use of insertion of an orthogonal action to an existing user gesture or sequence of user actions is disclosed. Use of orthogonal actions to start definition of user gestures disclosed. Starting and ending user gestures with two or more actions that are in orthogonal axes is disclosed, possibly preceded or followed by a POLA. Embodiments that insert a POLA, FLBP, VLWP between the orthogonal actions are disclosed.

Use of user gestures comprising head position or motion along with eye gaze based control is disclosed. Use of facial expressions along with eye gaze based control system is disclosed. Activation of OOI Motion based on eye blink or wink in an eye gaze based control system is also disclosed.

Concept of PCE/PCM Stickiness, Dwell Park and OOI Stickiness is disclosed. User feedback on Dwell Park and OOI Stickiness is disclosed. OOI Motion/Modification Disabling Events (ODE) to stop generation of command signals for modification of an OOI is disclosed.

Use of POLAs as start as well as end triggers is disclosed. Method for provision of user feedback related to performance of various user actions in a user gesture, including level of detected user action, status of POLA, detection status of various body parts being tracker, and level of PCE/PCM, is disclosed. This includes visual feedback around the OOI.

Principles in definition and use of steady eye gaze before and during performance of other user actions, as a confirmation of user intent of those user actions, are disclosed. Eye gaze steadiness can be measured using a combination of displacement of the point of interest on the display screen, displacement of the eye gaze vector, magnitude of velocity of the point of interest on the display screen and magnitude of velocity of the eye gaze vector.

Concept of warping an Object of Interest (OOI) is disclosed. The warping can be based on combination of head motion, facial expressions, hand gestures, and any other user actions.

Concept of Post Warp Period (PWP) is disclosed. Use of additional OOI Modification Driver (OMD) actions in PWP is disclosed. Conditional use of OMD based on factors such as change in eye gaze, presence/absence of active facial expressions, programmatic states, input mechanisms' state, and other user actions is disclosed.

Variations related to measurement of change in eye gaze are disclosed. Iteration based calculations for change in eye gaze is disclosed. Calculation of change in eye gaze based on a designated event, wherein designated event can include OOI warp, motion of OOI and other suitable actions, is disclosed.

Combination of multiple user actions in formation of OOI Warp start triggers is disclosed, including combination of head motion and eye gaze displacement.

OOI Warping without PWP phase is disclosed.

Concept of chained OOI warping wherein an end trigger of one warp serves as the start trigger of a subsequent warp, is disclosed.

OOI Warping based on Hand Gestures and OOI Modification Signals based on Hand Gestures is disclosed. Changing hand gestures during PWP is disclosed. Influence of changes in hand gesture on OOI Modification Signals during the Post Warp Period is disclosed.

Generation of Helper Signals (including Zoom signals) during Post Warp Period is disclosed.

Gestures made using eyes are disclosed.

Enabling dwell clicking, wink/blink clicking based on facial expressions is disclosed.

Detection of accidental selections is disclosed.

POLA based user gestures providing option to select from multiple commands is disclosed.

BRIEF DESCRIPTION OF THE DRAWINGS

FIG. 13 illustrates an exemplary embodiment of Visual Feedback Provided to User including Body Part Detection Status Indicator, PCE/PCM Level Indicator and User Action Indicators when Monitored Body Part is in Motion;

FIG. 14 illustrates an exemplary embodiment of Visual Feedback Provided to User by Changing the OOI (for Indicating Level of PCE/PCM);

FIG. 15 illustrates an exemplary embodiment of Visual Feedback Provided to User by Changing the OOI (for Indicating Level of PCE/PCM and Body Motion);

LIST OF TABLES

Figure 1:
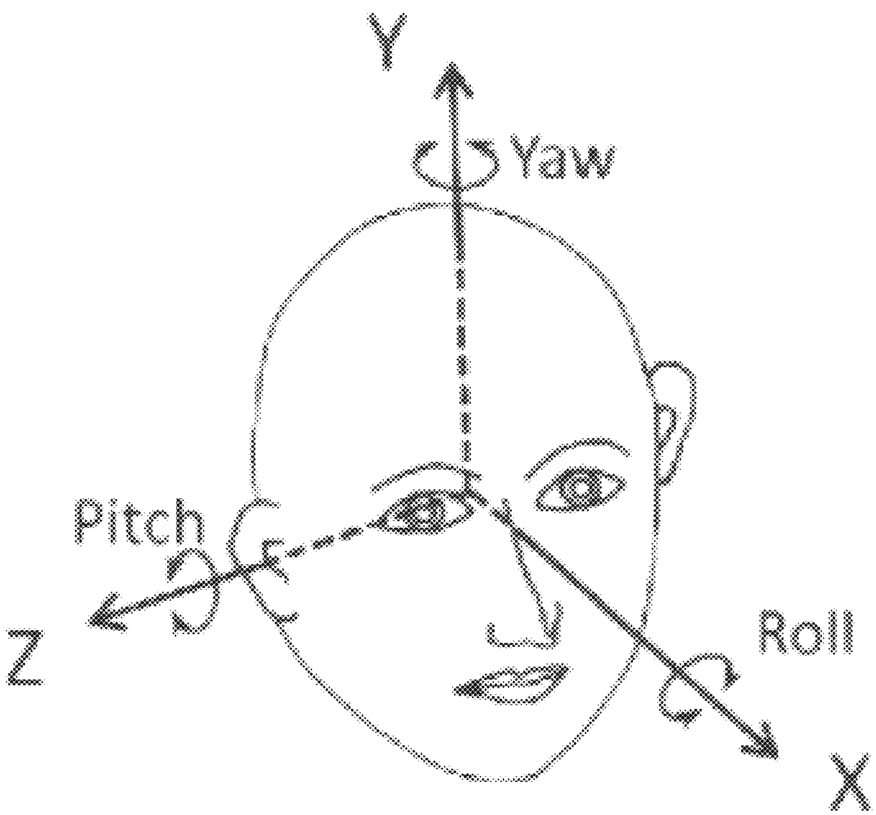
FIG. 1 illustrates a Head Coordinate System.

Table 1—An illustrative Embodiment of Gesture based User Interface (that can be used as part of a Control System).

Table 2—Illustration of Easy Motion Mode—First Embodiment.

Table 3—Illustration of Easy Motion Mode—Second Embodiment.

Table 4—Exemplary Embodiments of Start Trigger (that can be used to start generation of OOI Attribute Modification signals).

Table 5—An illustrative embodiment of gestures based User Interface that can be implemented without the use of a PCE or PCM.

Table 6—Embodiment of a User Interface using User Gestures with Prominence of Roll Motion/Position Actions.

Table 7—Embodiment of a User Interface using User Gestures that can be used with Smart Glasses and other Head Worn Devices (including but not limited to Head/Ear Phones, Ear Buds, Eye Wear, Augmented Reality or Virtual Reality Devices), as well as other Wearables (such as wrist bands) as well as Hand Held controllers.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

While exemplary embodiments incorporating the principles of the present invention have been disclosed herein above, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains.

The term "electronic device" is used to designate any devices that can have a microprocessor and that can be communicated with. A microprocessor can include one or more processors, memory and programmable input/output peripherals. A controller can include one or more microprocessors and/or memory with instructions that can help control or communicate with electronic devices.

This document discloses user interface concepts, principles and techniques that can be translated into software algorithms to provide a rich functionality, convenience, flexibility and case-of-use to users. Further, the disclosed concepts/principles/techniques can lead to easier implementation of the gesture recognition algorithms. Note that these concepts, techniques and principles can be used with controllers described in the above referenced patent applications as well as any other devices or systems that can track user's head/face/body motions, facial expressions, and other actions to control or communicate with any electronic devices. Note that this document uses the term "Electronic Device" as defined in the above-mentioned patent applications. Further, the UI concepts and principles described herein can be used to not only control an electronic device distinct from the controller, but also the controller and/or the controlling system itself. For the purpose of simplicity, the rest of the document will use the term "controller" to include "controlling systems" as well. Further, it is also understood that controllers themselves can be electronic devices; therefore, any mention of a controller "controlling/communicating with an electronic device" can also include the controller generating signals for its own consumption.

The principles disclosed can be used with hand held and body worn controllers, traditional computing devices such as desktop and laptop computers, smart TVs, mobile computing devices such as tablets and smart phones, Augmented/Virtual/Mixed Reality devices, industrial machinery, medical systems, home appliances, electrical lighting systems, as well as with systems where the user's body or body part can be used for providing input. Body parts used for user actions prescribed to perform user gestures can include, but are not limited to, head, facial muscles, part of the face, jaws, tongue, eyes, cars, throat, neck, fingers, hands, arms, torso, chest, abdomen, shoulders, legs, feet, toes, and any muscles or tissues a user can have control or influence over.

A user gesture can be defined as a combination of user actions. User actions can be any actions that are performed by the user for the purpose of communicating with or controlling an electronic device. These user actions can be body actions that can include motions of various body parts, facial expressions, actions to orient and hold various body parts in certain poses/positions/orientations, as well as other bodily actions. Holding the eye gaze steady or moving the eye gaze can also be considered a body action. Some embodiments can also use actions performed by the user such as speech/speaking, holding breath/inhaling/exhaling, tensing of muscles/body parts (that may or may not be detected externally, such as jaw muscles, abdominal muscles, arm and leg muscles, anal sphincter, etc.), and so on as body actions. User actions such as entering meditative or attentive state, consciously relaxing the body with or without meditation, (mentally) imagining, visualizing, remembering or intending particular actions (e.g. pushing or pulling, lifting or sinking imaginary, virtual or real objects), experiences or scenarios (which can be detected by analyzing brainwaves or other biometric information), deep breathing, inhaling, exhaling, holding breath, etc. can also be used as user actions in defining user gestures. A user gesture can require certain user actions to be performed in a specified sequence, and can require other user actions to be performed concurrently/simultaneously with each other. User gestures can be recognized and translated by the controller or control system into signals to communicate with and/or control an electronic device. Some user gestures can be recognized and translated into signals to control the controller/control system itself. Signals generated in response to some user gestures may be stored in the control system or controlled device for indefinite amount of time and that stored signal information can be retrieved when required. User actions performed as part of a user gesture can serve various purposes in a specified user gesture. Following are some types of user actions based on the purpose they can fulfill in a user gesture.

a. Actions Enabling/Disabling Generation of Signals (AEGS)
b. Actions Influencing Attributes of Generated Signals being or to be generated (AIAGS)
c. Actions that Confirm User Intent (ACUI)
d. Actions that are Demarcators (i.e. help demarcate one part of user gesture from another, or even help demarcate one user gesture from another)
e. Actions with Multiple Purposes (AMP) (i.e. they can fulfill a combination of multiple purposes simultaneously)

Note: A particular user action can serve different purposes (and thereby can be viewed as having different types) when it is used in different types of user gestures. Further, a particular user action can occur multiple times within a user gesture and can be specified to have different purpose(s) (type/types) during different occurrences.

The use of Primary Control Expressions (PCEs) (possibly along with other user actions) to achieve control of electronic devices is disclosed. PCEs are designated facial expressions that can be used in definition of user gestures that are designed to communicate with or control electronic devices. PCEs can be used as AEGS in various user gestures. For example, PCEs are AEGS in Object of Interest (OOI) Motion and Click-and-Drag Heuristics. However, the role of PCE can be viewed as AMP in the Selection Heuristic as the PCE alone enables the generation of signals as well as cause that generation. Various facial expressions include, but are not limited to, smile, frown (with eyebrow or mouth), eyebrow motion, jaw drops, teeth clenches, closing/opening mouth, puffing checks, pouting, nose wiggles, ear wiggles, opening/closing eyes, blinking, winking and other motions of the facial muscles. Note that in some cultures, "frown" means contracting the brow where eyebrows can come closer together and the forehead can appear wrinkled. Whereas in other cultures, "frown" can be an expression of mouth where corners of the mouth can be pulled or curled downwards. Therefore, for clarity, we will distinguish between the two kinds of frowns as "eyebrow frown" or "mouth frown" as and when needed; otherwise the term frown will be used to refer to either of them or both.

The concept of Primary Control Motion (PCM) is similar to the concept of PCE. While PCEs can be facial expressions, PCMs can be designated body motions or pose/position/orientations of a designated set of one or more body parts. PCMs can include designated combination(s) or sequence(s) of body motions that can include motions of the entire head, eyeballs, hands, fingers, arms, shoulders, torso, legs, feet, toes, etc. Note that motions of the entire head such as head nods, head tilts, side to side head motions or head rolls, etc. are considered to be head/body motions and not facial expressions. Motion of the eyeballs is also considered to be body motion and not a facial expression. However, motion of eyelids such as opening/closing of eyes, blinking and winking are considered facial expressions.

Similarly, motion of eyebrows such as eyebrow raises, furrowing of eyebrows and other eyebrow motions are considered facial expressions. Just as PCEs, PCMs are accorded special significance when communicating with electronic devices. A PCM or a PCE can be used as an enabler, trigger, modifier, or even as a specific command, while communicating with an electronic device. PCE and PCM can also comprise actions such as entering meditative/attentive states, tensing specified muscles (such as periauricular muscles, jaw muscles, arm muscles, chest muscles, abdominal muscles, perianal muscles, pelvis floor muscles, leg muscles, etc.), relaxing, deep breathing, holding breath, etc. as these actions can be used to signify user intention and thereby can be used in heuristics explained (as PCEs or PCMs). PCEs and PCMs can be used as AEGS as well as ACUI.

A general rule of thumb for distinguishing PCM from PCE can be to consider if the designated user action involves rigid body motion of body parts versus non-rigid body motion. If the user action involves rigid body motion (that is where the shape of the individual designated parts do not change during the motion) then that can be considered to be PCM; e.g. motion of head/eye balls/fingers/forearm/arm, opening or closing of hand into a fist, making gestures with hands (such as pointing with index finger, pinching gesture with index finger and thumb, wiggling a finger, shooting gesture with a hand, stop gesture with the hand, making a Vulcan salute, etc.) and so on. As an example, when the user makes a "pointing with the index finger gesture", the individual parts of the hand and finger (such as phalanges, metacarpals, etc.) can be considered to be each going through a rigid body motion to change the overall configuration of the hand. On the other hand, if the user action involves non-rigid body motion, such as changing shape of the mouth (by smiling, frowning, pouting, opening/closing the mouth, etc.), changing shape of the check muscles, changing opening of the eye/squinting/winking/blinking, raising eye brows, furrowing of the eye brows, etc., those actions can be considered to be facial expressions and be designated as PCE. Having said the above, PCEs and PCMs can be considered completely equivalent to each other when it comes to performing designated functions in user gestures and can be used interchangeably in various heuristics and user gestures.

A designated sequence of multiple user actions can also be used as a PCE or a PCM, a Start Trigger, an End Trigger, an ODE, a Gesture Wakeup Sequence, a Session Wakeup Sequence, etc. For example, a pair of smiles or blinks or eyebrow twitches performed within a maximum specified time duration can be considered to be a PCE. Similarly, a smile followed by a blink when performed within a maximum specified time duration can be also considered together to be a PCE. Any number of facial expressions or other body actions can be combined to create a variety of PCEs or PCMs, various triggers, wake up sequences, ODEs, STHS, ETHS, etc. Then each of these could be used in any of the heuristics disclosed in this as well as referenced documents (e.g. OOI Modification, Selection, Click and Drag, OOI Warping, and so on).

Any heuristics (explained in this as well as the referenced patent applications) can be implemented in a controller/control system by means of multiple user gestures. For example, the selection heuristics can be implemented in one embodiment using a first user gesture that uses a smile facial expression as the Primary Control Expression (PCE) as well as another user gesture that uses an eyebrow raise facial expression as the PCE, and so on. Note that PCEs and PCMs can be considered as AEGS. Further, the Selection and the Click-and-Drag Heuristics could be modified to generate different signals in place of the selection signals. For example, when playing a game on an electronic device, performance of the user gesture corresponding to the selection heuristic can be modified to generate a "fire a weapon" command signal instead of the selection signal, and performance of a click-and-drag user gesture can generate continuous generation of "fire a weapon" signals instead of continuous generation of selection signals, and so on.

As disclosed in referenced patent applications, magnitude of a PCE or a PCM (performed by a user) can be measured as a number. For example, the magnitude of user's smile (a PCE) can be assigned a number, say in the range of 1 to 100, based on the ratio of the width of their mouth to the width of their face. When detecting facial expressions by image processing (computer vision) algorithms, one or many key features on the face of the user can be tracked going from one frame of video image to another. For example, to detect the facial expression of a smile, the mouth can be considered to be a key feature and various points of interest on the mouth can be tracked in relation to each other as well as to the positions they were in during the calibration/initialization process. The change in position of corners of mouth relative to each other and/or center of the mouth can provide an indication of level of smile being expressed by the user. Typically, the mouth corners move away from each other when a user smiles. Such changes in position of the corners can be used to determine the level of smile or other facial expressions involving the mouth. As an example, if the distance between two corners of mouth during calibration/initialization was d1, whereas the distance between the two corner changes to d2 during a facial expression involving the mouth, then magnitude (level) of that expression can be calculated as following.

$$\text{Magnitude}=(d2-d1)*100/d1$$

Many other such formulae based on combination of location of points of interest on the user's face (such corners of mouth, corners of eyes, mid points of eye lids, center of pupil of the eye, center of the chin, center of upper/lower lip, tip of the nose, nostril, start/mid/end of eye brows, etc.) can be utilized. The relative locations (distance) between various points of interest and the change in those distances when going from one point in time to another can be utilized to derive a numerical value of the magnitude of a facial expression.

Figure 18:
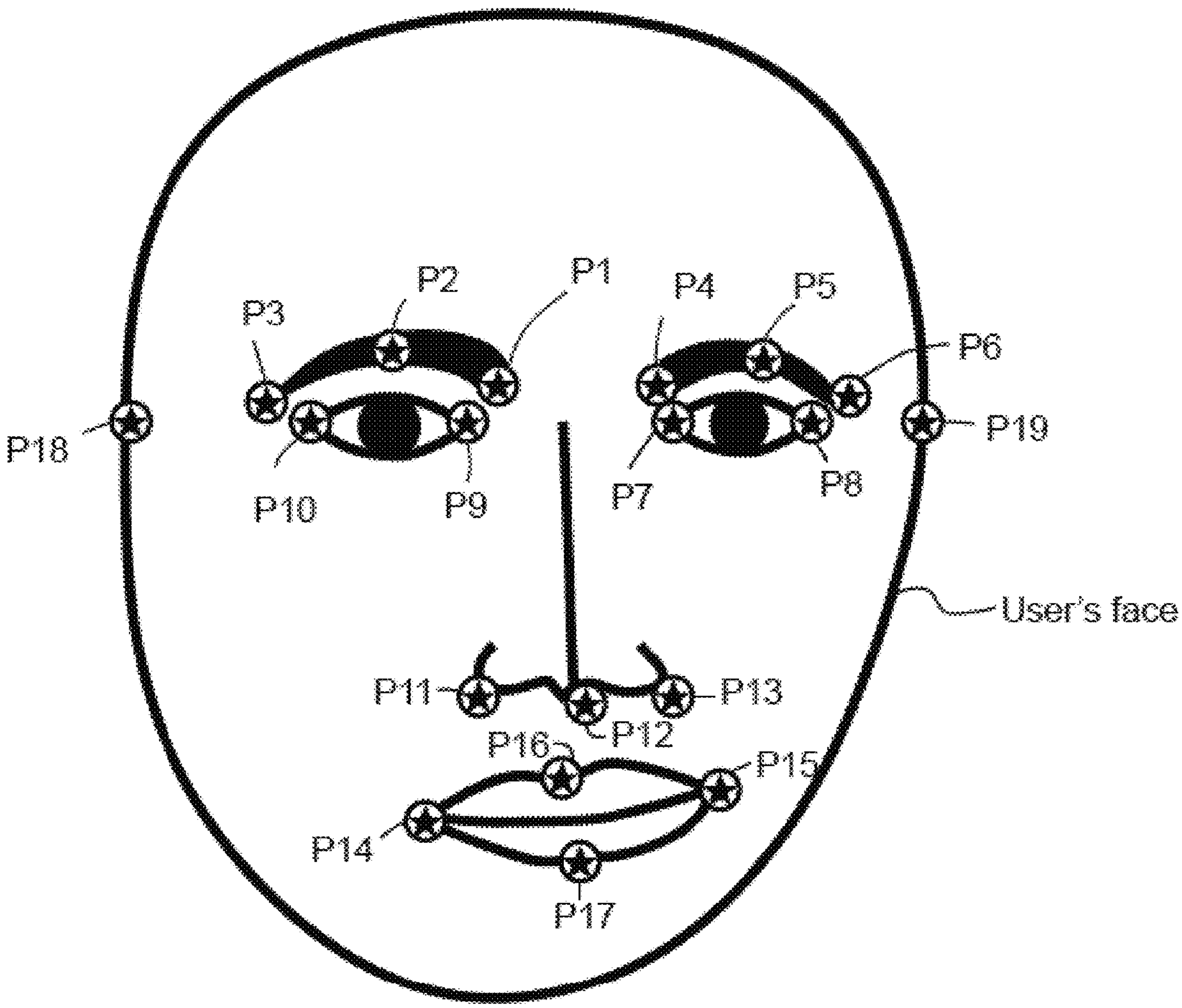
FIG. 18 illustrates an exemplary embodiment showing Points of Interest on a User's Face.

See FIG. 18 for an embodiment showing a few points of interest on a user's face labelled as P1 through P19. Points P1, P3, P4, and P6 are the corners of the user's eye brows. Points P2 and P5 are mid points of user's eye brows. Points P7 through P10 are shown to track corners of the user's eye. Points P11 and P13 are shown to track the side corners at the base of the nose and P12 the mid-point at the base of the nose. Points P14 and P15 are shown to track corners of the mouth and points P16 and P17 are shown to track the mid-points of the outer edge of the upper and lower lip. The sides of user's head are shown by points P18 and P19. In this embodiment, the distance between points P14 and P15 can be computed in any given frame of the video feed obtained from a camera sensor. This distance can used in the equation above to compute the magnitude of a smile facial expression.

Figure 19:
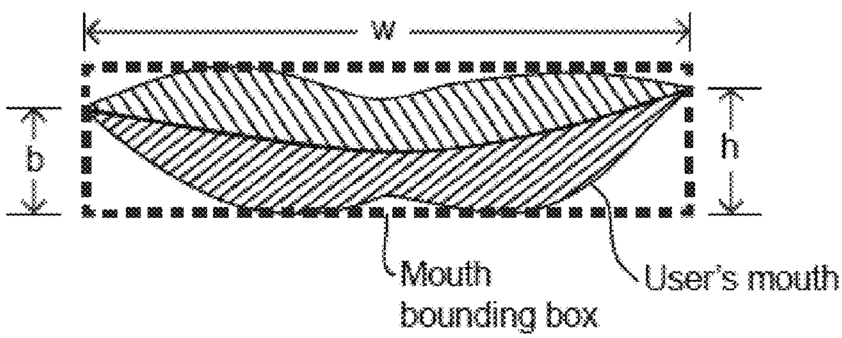
FIG. 19 illustrates an exemplary embodiment showing Bounding Box of the Mouth of the User.
Figure 20:
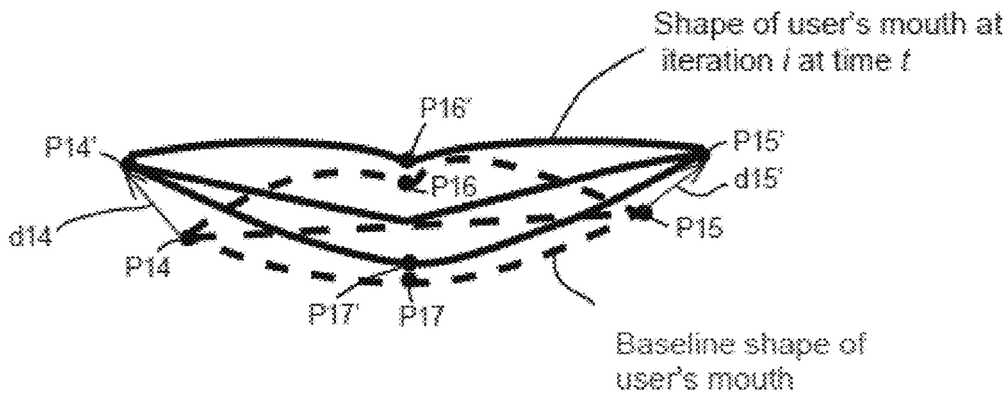
FIG. 20 illustrates an exemplary embodiment Schematic Representation of Shape of the User's Mouth.

In another example, the ratio of distance between two mouth/lip corners (or generally speaking, the width of the mouth) to the width of the face can be considered to be an indicator of level of smile on a user's face. Therefore, as shown in FIG. 18, distance between P14 and P15 can be compared to distance between P18 and P19, to derive level of smile. Further, the curvature of the lips around the mouth can also change with respect to the curve of the inside of the lip(s), which is again detectable by change of position (deviation) of the mouth corner away from the natural curvature of the lips as captured in the baseline (from the calibration/initialization process); this can also be included in the above formula or can be used to derive a different formula. The bounding box encompassing each half of the lip (left/right side of lips and/or top/bottom lip) can change in size and in position compared to baseline and/or position of other features of the face (such as parts of nose, eyes, chin, cars, etc.). See FIG. 19 showing the bounding box of entire mouth (both the lips) of the user. As another example, the position of the corners of mouth can be measured with respect to the top/bottom side of the bounding box of whole of the mouth or part of the mouth (such as right part of the upper lip, etc.) can be used to derive another indicator of level of expression that involves the mouth. For example, see 'b', the distance of the left corner of the mouth from the bottom side of the mouth bounding box, as shown in FIG. 19. Therefore, if b1 was the distance of the left corner of the mouth from the bottom side of the bounding box of the mouth during initialization/calibration, and if that changes to b2 during a facial expression, then the level of that facial expression can be indicated by the formula "(b2–b1)*100/h1" where h1 was the height of the bounding box during initialization or calibration phase. (Initialization or calibration phase can be a designated time period when baseline positions and/or size of various features or points of interest can be measured and stored in memory for computation of magnitude of various facial expressions in the future. As indicated above, magnitude of a facial expression can be based on change in size and/or relative positions of various features of the face or points of interest with respect to the baseline size and/or positions.) Position or position change of any of the points of interest (individually or as groups) or their bounding boxes or center of gravities or any other such indicators representative of their position or positional change with respect to the baseline positions and/or positional indicators of other points of interest, can be monitored and can be used as PCE sensor readings. In some embodiments, a combination of these position change indicators, size change indicators, as well as indicators of change in shape/curvature of parts of the mouth, etc. can be rolled up into one number that can serve as an indicator of the level of the expression being performed. For example, a simple summation of the absolute values of changes in position of some (or all) points of interest (with respect to a baseline) can be used as an "indicator of the expression level" (or change in the expression level). 20 shows schematic representation of shape of user's mouth in a baseline/neutral position (indicated by dashed lines) and at a particular point in time t (or current iteration i), indicated by solid lines. Points P14, P15, P16 and P17 indicate the location of points of interest in the baseline (or neutral expression) shape of the user's mouth. Points P14', P15', P16' and P17' indicate the location of points of interest at the current time based on the current shape of the user's mouth. In one embodiment, the magnitude of user's facial expression could simply be defined as follows—

$$\text{Magnitude of facial expression} = d14 + d15$$

where $d14$ is the distance between point $P14$ and $P14'$ $d15$ is the distance between point $P15$ and $P15'$ (Note that some embodiments can normalize for the effects of the user moving closer or farther away from the camera as well as change in head pose, before computing change in positions of the points of interest.) Other embodiments can use summation of squares of changes in position (with respect to a baseline position) of points of interest, or even the square root of the summation of the squares of changes in position, etc.

Some embodiments can also use sensors that do not rely entirely on camera sensors or computer vision techniques. In such embodiments, the distance between a user's body part from a position sensor (possibly mounted on user's body) can be used as an indicator of the level of facial expression. For example, if proximity/distance sensors were mounted on a head worn device (e.g. eye wear apparatus) the distance (or change in distance) between the sensor and part of user's body (such as check muscle, eye brow, etc.) that the sensor is sensing, can be used as an indicator of level of facial expression of the user.

Just as with PCEs, the level of PCMs can be an important aspect in the heuristics and user gestures. Multitude of methods can be used to measure the level of a PCM, based on suitability for the embodiment of the controller, user preferences, settings, aspects of the controlled device itself, etc. As an example, in one embodiment, one PCM can be the body motion of raising the left hand. In this case, the PCM is considered to be initiated when the left hand is raised beyond a specified level (threshold) and terminated when the level of hand raised-ness falls below a second threshold. This level of hand raised-ness can be measured by measuring the relative vertical position of the hand/feature of the hand compared to the position of the elbow, possibly also taking into account of the size of the forearm or upper arm. In another embodiment, PCM can be raising the left hand and closing it in a fist. In this case, the PCM can be considered to not have initiated unless both conditions (raising the left hand and closing it in a first) are met. Further, the level of this PCM can be defined as a combination of at least one of those constituent actions; for example, the level of this PCM could be defined to be totally based on the level of closed-ness of the left hand, or level of raising of the left hand or a combination of both. Yet another example of PCM can be raising left hand and rotating the left forearm from the elbow to tilt it at an angle towards left or right side. In this case, the angle of tilt can be used in determining the level of the PCM. These were just some illustrative examples of PCMs, and it is to be noted that PCMs can be made up of any number and types of body motions and can be used just as PCEs. PCEs as well as PCMs can act as AEGS, ACUI as well as AMPs in user gestures.

In one embodiment, the level/magnitude of pointing action performed with an index finger (a PCM), can be determined based on a combination of the angles subtended by various phalanges and metacarpal of the index finger with each other and even possibly the forearm and/or upper arm of the user. For example, in one embodiment based on schematic illustration in FIG. 21, the magnitude of index finger pointing action (PCM) can be determined by the following formula $$\text{Magnitude of Index Finger Pointing Action} = (270 - \text{Angle } a1 + \text{Angle } a2 + \text{Angle } a3)) * 100/270$$

Figure 21:
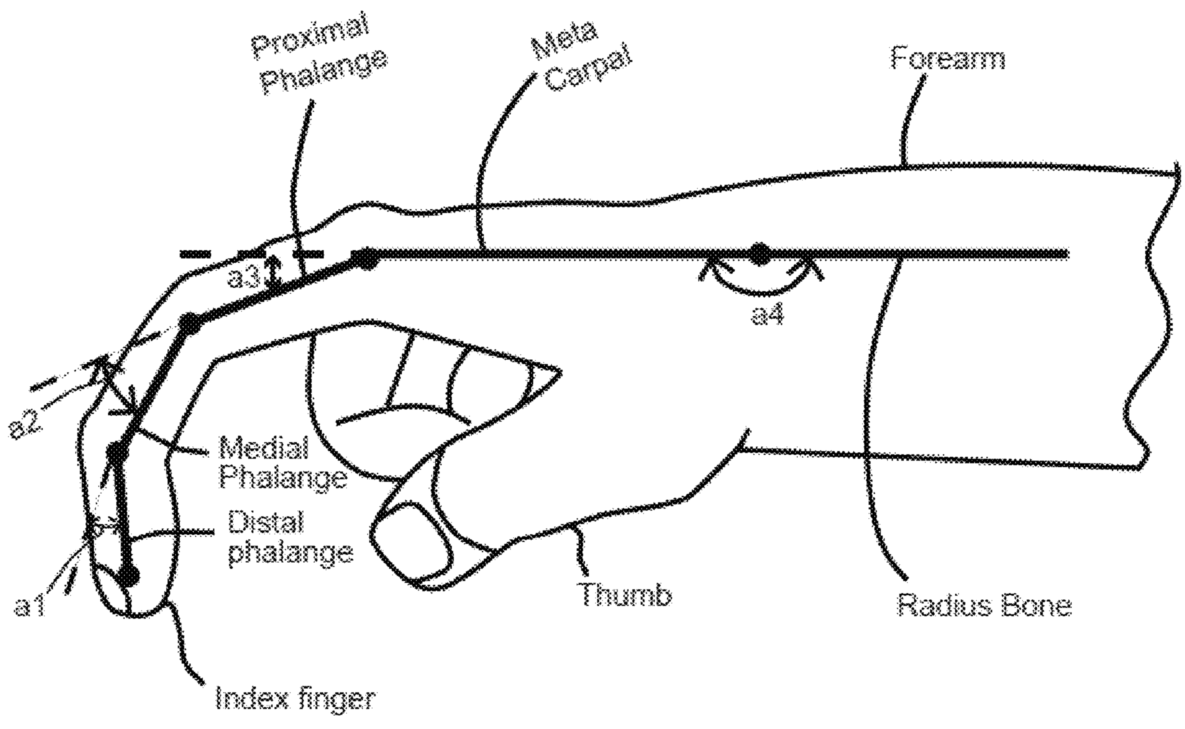
FIG. 21 illustrates an exemplary embodiment showing Schematic Representation of the User's Hand Attempting to Make a Pointing Gesture.

FIG. 21 shows user's hand with their index finger partially extended in an attempt to make a pointing gesture, and a schematic representation of the parts of the hand. As shown in the figure, 'a1' is the angle between the distal phalange of the index finger and the medial phalange, 'a2' is angle between the medial phalange and proximal phalange, and 'a3' is the angle between the proximal phalange and the metacarpal. (Note that angle 'a4' measured between the metacarpal and the radius bone is not used in this embodiment.) In this embodiment, when at least some of the parts of the user's hand are detected so that the above-mentioned angles can be measured, then the index finger pointing PCM can be said to have a magnitude defined by the above formula. Further, a threshold on the magnitude can also be designated above which the PCM can be considered to be active. For example, if the designated threshold was 70, then the PCM can be said to be active when the above formula provides a magnitude of 70 or more. On the flip side, PCM can be said to be not active when the above formula provides a magnitude value of less than 70. It will be obvious that different formulations can be used to determine the level or magnitude of this PCM, and that different approaches can be taken to determine the level/magnitude of other PCMs or user actions, possibly based on the relative position or orientation of the different body parts with respect to each other, and well as possibly based on pressure exerted by or stress and/or electrical activity experienced in various body parts.

As illustrated above, especially given that PCEs as well as PCMs can have their magnitudes to be evaluated to a number, user gesture definitions can not only substitute one PCE by another PCE, but also substitute a PCE by another PCM and vice versa. Further, any combination of PCEs and PCMs can be substituted by another combination of PCEs and PCMs. It will be obvious that any user gesture definitions discussed in this and referenced applications can have combinations of PCEs and PCMs substituted by other combinations of PCEs and PCMs.

An Object of Interest (OOI) can be any physical or virtual object/entity that can be affected by an electronic device. For example, an OOI can be a cursor, pointer, graphical icon, selected text, selected area of a graphical display, scroll bar or any other virtual/graphical entity on the display of an electronic device. OOI can also be an entity that may not represented on a display screen, but the results of changing that OOI can be displayed on a display screen. E.g. view/camera angle, direction of eye gaze of the user, etc. may not be directly shown on a display screen, however, what is displayed on the display screen may be affected by a change in those OOIs. An OOI can also be the currently selected physical button/slider/knob or any other input mechanism on the controlled electronic device. Typically, when an OOI is chosen to be influenced by means of a user gesture, there is an Attribute of Interest (AOI) that belongs to that OOI that is implicitly being considered. For example, if a designated OOI is a (mouse) pointer on the display screen of a computer, when performing the user gesture for moving the pointer, it is the attribute "location" (the AOI) of the pointer (OOI) that is being modified as part of the OOI Motion heuristics or Click-and-Drag heuristics. If the designated OOI was the scroll bar belonging to a window on a computer screen, then the AOI can be the location of the "scroll box" (a.k.a. "thumb") on the scroll bar. Then "motion" of the scroll bar/box really refers to changing the attribute location (the AOI) of the scroll box (the OOI). People skilled in the art will realize that "motion" of OOI is really a special case of "modification" of the chosen attribute of interest (AOI) of the OOI. Therefore, any reference to "moving" the OOI or "motion" of the OOI in any of the heuristics explained in this document can be interpreted to include "modifying" or "modification" of the attribute of interest (AOI) of the OOI. Following are few illustrative examples of OOI and AOI.

| # | Object of Interest (OOI) | Attribute of Interest (AOI) belonging to OOI | Result of Modification of AOI (via user gestures) |
|---|---|---|---|
| 1. | Cursor/Pointer | Location | Cursor/Pointer moves on the Display Screen |
| 2. | Window being displayed on Screen | Zoom factor | The size of the content being displayed in the window changes |

-continued

| # | Object of Interest (OOI) | Attribute of Interest (AOI) belonging to OOI | Result of Modification of AOI (via user gestures) |
|---|---|---|---|
| 3. | Button/Input mechanism on a Home Entertainment System that is of current interest | Identifier of the Button/Input Mechanism (that is currently selected) | A different button gets selected (which can be observable as a change in highlighting of the button/input mechanism) |
| 4. | Wheel Chair | Location | Wheel chair moves |
| 5. | Sounds generated by a Stereo system | Volume | Sound Volume changes |
| 6. | Song on a Music Player | Song Identifier | Selection of Song changes |
| 7. | Current Location Indicator (within a Song/Media file which is being played on a Media Player) | Location within a Song/Media file | The current location from which the song/media file can start playing changes. |

Different AOIs can be affected as part of the same user gesture. For example, when using the OOI Motion or Click-And-Drag Heuristics/user gestures to control a Home Entertainment System, based on the duration for which body motion is being held steady (i.e. within specified threshold) after the initiation of the PCE/PCM, the AOI can change from the identifier of the currently selected button to the level setting of the currently selected button.

User actions such as motion of one or more body parts and/or placing/posing/orienting one or more body parts in certain positions (including motions and poses/positions of the entire head, eyeballs, arms, hands, fingers, legs, torso, and other body parts) or other user actions that have not been already designated as a Primary Control Motion (PCM) or PCE can be designated to be used for purpose of modifying/influencing designated attributes of an Object Of Interest (OOI). User actions that may not lead to motion or position change of a body part, such as applying pressure on touch or pressure sensitive surface, or tensing of muscles, can also be detected and measured. The level of applied pressure can be measured and used to modify an attribute of an OOI. Any user actions intended to modify attributes of an OOI can be referred to as OOI Modification Drivers (OMD). An electronic device can then be controlled via use of combination of PCMs and/or PCEs and/or OMDs. A User Gesture then can be a specified combination of PCMs, PCEs and OMDs performed or held in succession and/or simultaneously with each other. Some embodiments can also use user actions such as speech/speaking, holding breath/inhaling/exhaling, tensing of muscles/body parts (that may or may not be visible to naked human eye), entering meditative or attentive state, mental imagination of specified activity, raising or lowering certain types of brain waves (alpha, beta, theta, delta, etc.) or combinations thereof, etc., which can be detected and measured, and therefore be used in user gestures. Such user actions can also be treated as body actions and treated as such in user gestures. For example, they can be designated as PCE/PCM or OMD. User gestures can be used to generate signals for a variety of purposes including for communication with electronic devices, user gestures can also signify user intent and thereby used to decide if/when certain other user gestures can cause signals to be generated to communicate with the controlled device. Note that the term "positions" can include linear/translational positions as well as angular positions. Thereby the term positions can include angular orientations.

As explained in the referenced patent applications, facial expressions can be detected via a variety of sensors and techniques. For example, a distance reading from a proximity sensor measuring the distance of a facial muscle from the sensor, can be used as indicative of the magnitude of a facial expression. Therefore, such readings can have a wide range of integer or decimals values, beyond just a binary (on or off) value. Further, given that sensors (such as a distance sensors) can often provide non-zero readings even in the absence human discernible activity, a non-zero reading from a facial expression sensor may not be considered to be indicative of the presence of a facial expression. Furthermore, human beings can unintentionally have facial expressions on their faces, which they may not want to translate into commands to control a device. Therefore, we distinguish between a detection of a facial expression versus detection of an "active" facial expression. This distinction can be done based on a facial expression threshold beyond which a reading from a detected facial expression can be considered as an indication of an "active" facial expression. Given that setting of the threshold can be done based on user involvement (implicit or explicit), detection of an "active" facial expression can be considered to be a user intended action and therefore can be used in various heuristics/principles/user gestures disclosed.

Note: Magnitude (intensity) of a facial expression can also be determined based on ratios of facial features in relation to one another. For example, the distance between the two corners of the mouth in relation to the width of the user's face could be used as a measure of magnitude of the smile facial expression. It will be obvious that such a ratio can be a fractional number (decimal number) that can be normalized based on the face width (or some other suitable dimension of the face that does not change upon a smile) and converted to a number between 1-100 or some other convenient numerical range. For another example of technique for calculation of intensity of a facial expression, see the following reference.

"Toward Practical Smile Detection" by Jacob Whitehill, Gwen Littlewort, Ian Fasel, Marian Bartlett and Javier Movellan, published in IEEE Transactions On Pattern Analysis and Machine Intelligence on November 2009 (vol. 31 no. 11), pp. 2106-2111.

A facial expression (FE) can be considered to be active when the magnitude/level of a facial expression (indicated by a reading from an appropriate FE sensor) equals or crosses a specified FE magnitude/level threshold. A detected facial expression is not considered to be active by default. A facial expression (just as a physical quantity such as displacement, speed, etc.) can be detected by a sensor when it surpasses the minimum detection threshold of the sensor. However, it may not be convenient for the user if various heuristics defined in this as well as referenced documents used that minimum detection threshold of the sensor as the "active" threshold. Embodiments can set the active threshold to be much higher than the minimum detection threshold so that users have a wiggle room before triggering various actions based on the disclosed heuristics. Further, the "active" threshold can be a user settable quantity. The user can explicitly set a numerical value for the active threshold, or have the system calculate a suitable value based on a calibration process. A system can prompt the user to take certain steps such as smiling, making a facial muscle motion, opening/closing mouth, looking at interesting locations on a display screen, hold head steady, nod/move head, tense a body muscle at a comfortable level, focus attention, relax the body, breathe deeply, or any other suitable action based on what body part is of interest. Some embodiments can just monitor the user (via sensors) to gather statistical data on the user to figure out variation of sensors readings over usage of the system or the electronic device, and there by determine the active threshold level automatically. For example, an active threshold level could be based on the average or median sensor reading from a sensor obtained over a sampling period (which can be part of a calibration process or a silent observation process where the user may not be aware that the system is collecting sensor data for purposes of setting active thresholds and other parameters that can be used by the control system for user gesture detection). Some embodiments can define additional criteria to define when a measured quantity (such as a facial expression) can be considered to be "active" (and not just detected). For example, sensors such as capacitive touch and proximity sensors can be used to sense facial expression, where the sensors can provide a variable proximity reading and also provide a touch status reading. The amount of facial muscle motion (which can be used as an indication of level of facial expression) can be combined with the touch status of a facial muscle with a sensor to determine when a facial expression can be considered active. Some embodiments can take head pose into account before a FE sensor reading (beyond active FE Threshold) can be taken to indicate an active facial expression. For example, only if the user's head is turned in a certain direction (say towards the display screen on an electronic device, etc.) that a FE sensor reading beyond the specified FE Threshold can be interpreted as an "active" facial expression. Other criteria such as blink rate, pupil dilation of the user's eye (to be within specified range), steadiness of the user's head, presence/absence of other facial expression, EEG brain wave levels to be within specified range, as well as any other suitable criteria can be defined as requirement (along with the active FE threshold criteria) before a facial expression can be considered to be active.

Note: For purposes of simplicity, we will use "detected facial expression" phrase to indicate "detected and active facial expression" throughout this application (including drawings), unless a specific explicit reference is made to "detected but not-active" facial expression.

An OOI can be a variety of things (real and virtual) that can be affected by the controlled electronic device. For example, an OOI can be a graphical object on the display screen of the controlled electronic device, such as a mouse pointer or an icon. As another example, an OOI can be the sound that is being output from a smart phone (if the smart phone is the controlled electronic device), and the OOI can have one or more attributes of interest, such as the volume of that sound (the OOI). If the controlled electronic device is a wheelchair, the OOI can be the entire wheel chair and the attribute of interest can be the location (coordinates) of the wheel chair. If the electronic device is a computer, then the OOI can an application running on the computer and the attribute of interest could be the state of that application (the OOI). As can be seen, the OOI can be independent of the display screen of the controlled electronic device. Further, the command signals generated (by the control system) to change an attribute of interest on an OOI can take different forms based on what that attribute of interest is and what type of OOI it belongs to. For example, generated OOI modification signals could move a mouse pointer, or change sound output of a smart phone, move a wheel chair, or change the state of an electronic device or a component of the computing device or a program or an object on the program running on an electronic device (e.g. user logged-in or logged-out on a computer, mic on a smart phone enabled or disabled, program running on a AR/VR/AR headset in a paused mode versus active mode, etc.), a mouse selection signal to select something on a display screen of the electronic device or a switch signal to start/end row/column scanning on AAC (Augmentative and Alternative Communication) accessibility device or software application, etc.

OMDs can also include motions and positions of objects that are not part of the body but that can be directly or indirectly moved by the user. For example, motion of a pencil can be used as an OMD, provided that the user is directly or indirectly causing the motion of the pencil and the controller/control system is able to sense the motion of the pencil. Though OMDs can be used as AIAGS such as for modifying signals for motion of OOI, some OMDs can be used as Demarcators, ACUIs as well as AMPs. For example, certain patterns of OMDs may be used as pre-requisites for recognition and processing of other user gestures. The presence of a PCE/PCM, magnitude/level of the PCE/PCM as well as the time variance of magnitude/level of the PCE/PCM can be considered along with the magnitude/direction as well as the variance of magnitude/direction of OMD, in order to translate user actions into commands/control signals for the electronic device being controlled. The presence of a PCE/PCM can also be defined in terms of a threshold on the value of the magnitude/level of the PCE/PCM. Time variance of PCE/PCM or OMD can include rate of change of magnitude/level of PCE/PCM or OMD with respect to time at any given instant. Alternatively, time variance can also be measured as change over a specified time interval or between two designated events, such as start or end of two different iterations when running the Control Software. (This assumes that Control Software processes sensor data and other information in an iterative fashion. Please refer to other sections as well as referenced applications for more about Control Software.) Time variance can also include change in the presence/bounded-ness of (the magnitude/level of) PCE/PCM or OMD over a specified time period. Time variance can also include presence of (the magnitude/level of) PCE/PCM or OMD above or below a specified threshold, as well as other indicators of measuring time variance. Further, time variance can be expressed as amount of change over a standard unit of time or as amount of change over a designated number of (contiguous) iterations/measurements. Magnitude/levels as well as time variance of PCEs/PCMs/OMDs can be considered in relation to each other for the purpose of interpreting user actions and translating them into commands for the electronic device. The time concurrency of PCE/PCMs with the OMD can be an important consideration as well. Examples of this approach of interpretation and translation of user actions into commands/control signals/communications with the controlled electronic device are presented herein.

When an OOI is such that it cannot be physically or virtually moved by the user (for example a physical button/dial/slider/etc. on an electronic device or an immovable graphical icon on a display screen of an electronic device), "motion" of the OOI can mean a change in status of which object (such as button/dial/slider/graphical icon/etc.) is currently of interest. In such cases, when the user attempts to "move" the OOI, the system merely selects a new object as the new OOI. (As explained earlier in this document, the AOI in this case is the identifier of the object/input mechanism/button that is currently selected.) This change in designation of currently selected input mechanism can be done in accordance to the OMD. This process is further explained in the above-mentioned patent application(s). As an illustrative example, if a controlled electronic device had five physical buttons, B1 through B5 (arranged in a sequence from left to right) and if B3 was the current OOI, then "motion" of OOI in response to a rightward head motion OMD can cause change in the status of B3 to be no longer of interest and changing the status/designation of button B4 or B5 to be the new OOI.

As explained in the referenced patent applications, controllers can be worn on the face and can allow hands-free control of various device. They can be made to look like eye glasses or phone headsets. In some embodiments, the control system may not require the user to wear any apparatus, but can sense the user gestures via image sensors or image processing systems. The above application also lists various parameters that can be used to define user gestures and/or influence the behavior of the control system/controller. The above application also describes various components that can be considered to be part of a controller or control system for controlling an electronic device. Note that the term "electronic device" is used to designate any devices that have a microprocessor (or integrated circuits) and which can be controlled or whose operation(s) can be influenced, or simply can be communicated with. This includes but is not limited to computers (desktop, laptop, tablet and others), mobile phones, heads-up display (HUD) and head mounted display (HMD) devices, augmented reality devices, video game systems, home-theater systems, industrial machinery, medical equipment, household appliances as well as light fixtures. Note that a microprocessor can include one or more processors, memory, and programmable input/output peripherals. A controller/control system can include one or more microprocessors and/or memory with instructions that can help control or communicate with electronic devices. These instructions can be included in the Control Software (as explained in the referenced applications) and can receive signals from various sensors regarding information indicative of motion or position of various body parts of the user, facial expressions of the user, EMG/muscle activity, brainwaves, speech, as well as results of any other actions performed by the user. The Communication Link described in the referenced patent applications can communicate various command signals to the electronic device to be controlled. Note that the Communication Link can be a combination of hardware and software. Please refer to the referenced patent applications for more details of the above mentioned embodiments as well as other embodiments mentioned therein. This application discloses concepts and principles that can be used with the embodiments in the referenced applications as well as other embodiments that may or may not be disclosed in this application.

Head motion tracking can be replaced by eye tracking or gaze tracking or any other suitable user actions in the various heuristics described. The body part motions (head, eye balls, etc.) can be extracted by using an image processing system using image processing and computer vision algorithms. Further, specialized eye or eye gaze tracking hardware can also be used (instead of regular image sensors such as webcams) to extract the eye gaze and/or motion information; this includes, but is not limited to Electrooculography (EOG) sensors and other equipment that shine light beams on the eyeballs and measure how they get reflected by the eyeballs. Note that eye gaze information can be used to determine eyeball motion information such as angular velocity, etc. at any given instant of time. This eye gaze and motion information can then be used to drive OOI motion/modification.

This application and referenced applications disclose principles that can be used with devices that can act as controllers or that are part of control systems. Disclosed principles can also be utilized as computer implemented methods or can be encapsulated in software that stored on computer readable media. The word "controller" may be used interchangeably with "control system" in this application unless specifically stated otherwise.

In some embodiments, controllers can comprise body worn devices. They can be head worn devices that can look like phone head-sets (e.g. see FIGS. 22 and 23), or music headphones. They can also be in form of eye glasses or head-up display (e.g. see FIG. 24). Body worn controllers can also comprise arm bands, rings worn on finger(s) of the user, ring or a physical structure worn on ear, nose, eye brow, cheek, tongue, belly buttons, chest, or other body parts, hand-held controllers, as well as devices that can be strapped, worn on, attached to, or embedded in legs as well as other body parts of the user. In some embodiments, a part of the controller (such as a sensor) could be implanted (surgically or otherwise) inside the body of the user. For example, it could be implanted inside the mouth, ear canal, abdominal cavity, beneath the user's skin, inside bodily tissues, or inside any other natural or artificially created body cavity.

Figure 22:
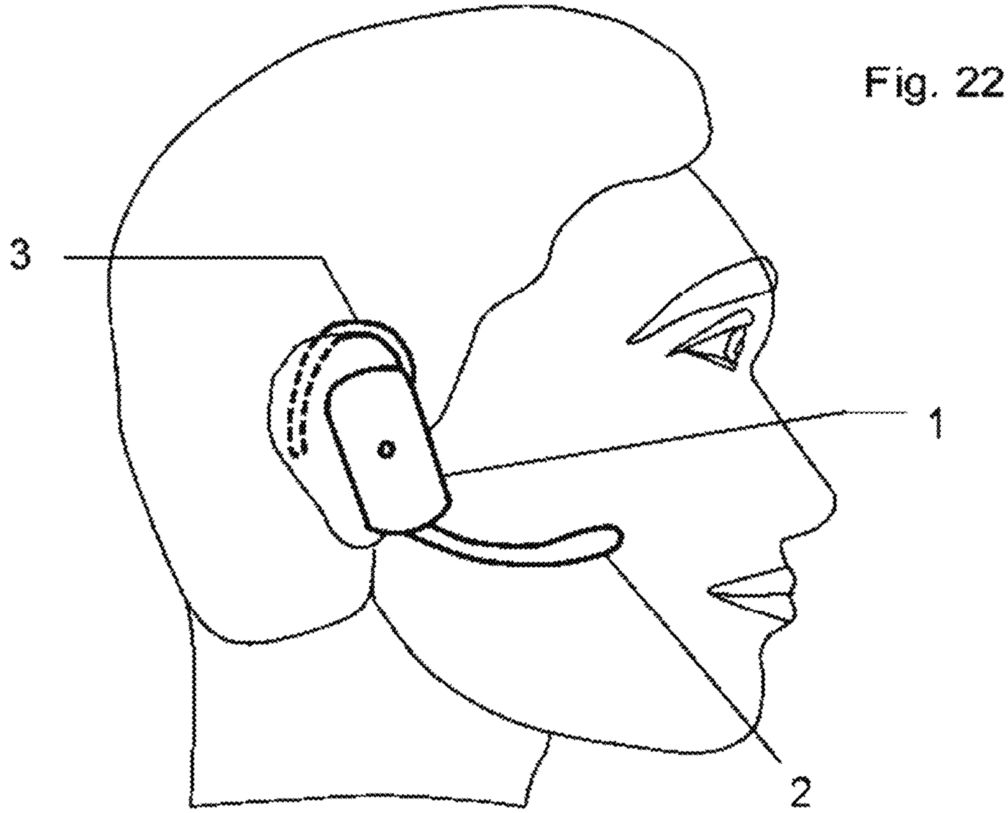
FIG. 22 illustrates an exemplary embodiment of a Controller Worn by the User.

FIG. 22 illustrates an exemplary controller 100 that looks similar to a wireless headset for a phone or a multimedia player, wherein the controller 100 is mounted on a user's head and therefore hands-free. The controller 100, when being used to control a pointer/cursor/graphical object on an electronic device, can provide case of use and flexibility in communication with the electronic device, such as a computer, a video game console, etc. This is due in part because controlling of the pointer/cursor can require no use of hands to move the controller 100 or to perform a click/select action using the controller 100. The controller 100 can provide a more efficient, less distracting, way of working because the gaze of the user does not have to be broken to locate a computer mouse for object selection, cursor movement or other purpose. The user's gaze also does not have to be broken to again locate the keyboard/keys on the keyboard after use of the computer mouse. The controller 100 can enable clicking on a button or selection of a user interface element on an electronic device's display screen in a hands-free as well as feet/legs-free mode, thereby causing further case of use. Usage of facial expressions such as smiles in operation of the controller 100 can also potentially impart beneficial effects on the mental state of the user.

The controller 100, when used to control household, industrial and medical electronic devices can enable hands-free, remote control of the devices. At home, the controller 100 could control various devices, for example a washing machine, home-theater equipment or a light fixture to name but a few. The controller 100 can be useful in medical situations where a surgeon or dentist can personally control ultra-sound machines, dental equipment, and other devices during a medical procedure without having to touch anything that may not be sterile or having to explain to someone else what needs to be done with the equipment. When being used as a controller to monitor/capture facial expressions, the controller 100 can provide case of use and flexibility due to easy head-mounted use without any video cameras to capture facial expressions. Users can move freely and are not required to be in front of cameras or their computer. The controller 100 can also be easy to use in marketing applications to gauge the response of users to an advertisement, or to measure/monitor facial expressions of an audience during a movie, play or even at a sports event, where the users can freely move around.

When used in Augmented Reality applications, the controller 100 can also provide the case of use of hands-free operation. The controller 100 can be worn on the head and be ready for immediate use since it will already be pointing in the direction where the user's head is pointing. In contrast, in order to use a GPS based controller (including a GPS based mobile phone), the GPS-based controller has to first be retrieved from a purse or a pocket or from wherever it is stored, and then it has to be pointed in the direction of interest to receive the augmented reality information. The inclusion of sensors such as a compass and GPS sensors in the controller 100 can create an opportunity to correlate heading, location and head orientation information with facial expressions that can be tied to emotional measurement (which can be useful for a variety of individual and corporate applications). In some embodiments, the controller can be in the form of eye wear, which can further comprise a display mechanism (such as a near-eye display, head-up display, retinal projector, holographic display, etc.). Further, not only can such controllers be used to control other electronic devices but they can also provide method of controlling their own functioning, including modifying objects of interest displayed on its display mechanism, in a hands-free fashion.

The controller 100 can also be used as a drowsiness detection device. In an embodiment, controller 100 can provide cost reductions by replacing components such as image sensors with infrared detectors or proximity sensors which are less expensive and much simpler to operate/monitor. Image processing of videos in real time also needs a lot more computational power. Not having to do video processing thereby also alleviates the need for bigger, more expensive and more power demanding microprocessors. The ability to embed the controller 100 into an existing device such as a phone headset, can also provide further cost savings as well as convenience.

The components of an embodiment of the controller depend on the application/purpose of the controller embodiment as well as the preference of the manufacturer or the user. Note that the controller does not need to exist independently, that is, it can also be embedded into another device, thereby not needing its own separate housing or a separate communication link to the controlled electronic devices or a separate power source. The following components provide examples of some of the components that can be included in various combinations in different embodiments of a controller.

A controller can include one or more microprocessor which is an integrated circuit containing a processor core, memory, and programmable input/output peripherals. The microprocessor can be the brain of the controller that connects with the sensors, adjustment controls, audio/video input/output devices, processes the sensor readings, and communicates information and commands to the controlled electronic devices as well as other output devices. The microprocessor memory can store control software and other software and information necessary for functioning of the controller. The control software can run on the microprocessor and provide the logic/intelligence to process the sensor inputs, process information from various controls, communicate with the controlled electronic devices, communicate with output components, etc.

Some of the functionality of the control software running on the microprocessor(s), especially related to processing of sensor outputs, can also be embedded inside the sensors themselves. Some controller embodiments may also have logic related to translating the motion signals into actual motion commands as well as other logic moved to the hardware used for the communication link (described below) or even the controlled electronic device itself.

The controller can include power source(s) to provide power for running the microprocessor(s) as well as various sensors and audio/video input/output devices and other elements of the controller. Multiple power sources could be used by the controller.

The controller can include different kinds of sensors depending on the application or purpose intended for the controller. Some exemplary sensors that could be used in different embodiments of a controller are inertial sensors, heading sensors, location sensors, facial expression (FE) sensors, and other types of sensors. Inertial sensors can include accelerometers, gyroscopes, tilt sensors as well as any other inertial sensors and/or their combinations. Inertial sensors provide information about the motion experienced to the microprocessor. Any or all of the inertial sensors can be MEMS (micro electro-mechanical system) or iMEMS (integrated micro electro-mechanical system) based. The gyroscopes can be based on Coriolis-effect (using MEMS/iMEMS technology or otherwise). The accelerometers can be one-axis, two-axis or three-axis accelerometers. Similarly, the gyroscopes can be one-axis, two-axis or three-axis gyroscopes. The accelerometers and gyroscopes can be combined together in one or multiple components. Heading sensors can include compass based sensors, for example magnetometers, and are preferably compensated for tilt. Heading sensors provide heading information to the microprocessor. Location sensors can include GPS components. Location sensors provide information about the location of the user to the microprocessor.

Facial expression sensors provide information on expressions on the face of the user via different kinds of sensors. Facial expression (FE) sensors can be mounted on sensor arms, eye wear, head wear or various other support structures that can be used to monitor changes in different parts of the face or mounted (stuck) directly to the user's face itself. FE sensors can sense changes in the position of various parts of the user's face to determine the magnitude/level of facial expression on the user's face. Some examples of facial expression sensors are proximity sensors (including but not limited to capacitive, resistive, electric field, inductive, hall effect, reed, eddy current, magneto resistive, photo-reflective, optical shadow, optical IR, optical color recognition, etc.), ultrasonic sensors, acoustic emission sensors, radar sensors, sonar sensors, conductive or resistive sensors, touch sensors, flex sensors, strain gages/sensors, etc. Image sensors can also be used to monitor motion and position of facial muscles, so as to derive magnitude/level of facial expressions. Image sensors can be mounted on the user's body, possibly as part of head or eye wear, and can be pointed towards different part of the user's face. Some facial expression sensors can be opto-electronic sensors that can monitor the position and/or motion of facial muscles/skin of the user. The facial expression sensors can be connected to the microprocessor via wires or wirelessly. EMG sensors, strain sensors, and the like can also be used to detect the strain, electrical or inertial activity of the facial muscles and use that as an indicator of level/magnitude of a particular facial expression of the user. The facial expression sensors can be connected to a separate power source than the one powering the microprocessor. If the facial expression sensors are RFID based, they may not even need a power source. Mechanical switches and levers with spring action can also be used as facial expression sensors to measure motion/position of facial muscles.

The controller can include sensor arms to provide a location to mount sensors, audio mikes and other controller components. Sensor arms can be connected to the main housing of the controller. Sensor arms can be made flexible, twistable and/or bendable so that the sensors (mounted on the arm) can be placed over the desired location on the face, as well as in the desired orientation. Sensor arms can also be connected to each other. Sensor arms are optional, as some controller embodiments may not require them to mount the sensors. For example, sensors could be directly mounted on head gear or eye wear or any other device or structure the user may be wearing.

The controller can include sensor mounts to provide spaces to mount sensors. Sensor mounts can be mounted on sensors arms or independently on any head gear or other structures being worn by the user. For example, a sensor mount can be clipped onto the eye glasses or a cap being worn by the user. Sensor mounts are optional as sensors can be directly attached to sensor arms or any other support structures or even be embedded inside them. As an example, the sensing electrode of a capacitive touch sensor could be painted in the form of a conductive paint on part of the sensor arm or be embedded inside eyewear to sense touch and proximity of facial muscles to the area that contains the electrode.

The controller can include a housing that provides a physical enclosure that can contain one or more components of the controller. For example, a controller embodiment can include a housing that holds the microprocessor, power source (battery-regular or rechargeable), part of a communication link, certain sensors (such as inertial, location and heading sensors, etc.), and the housing can also provide a structure to attach various extensions such as sensor arms, etc. The housing can also provide a structure for mounting various controls and displays. Some controller embodiments may not need their own housing; the controller components can be part of a different device (e.g. headphone, eye wear, arm band, head band, head-up device, head-set, etc.).

The controller can include housing mounts that help the user to wear the controller on his/her head or face. A housing mount can be in the form of a mounting post in combination with an ear clip and/or an ear plug, all connected together. The ear clip can hang the housing by the user's ear and the ear plug can provide further securing of the housing in relation to the head. It may not be necessary to have both an ear plug and an ear clip; as one of them may be sufficient to secure the controller against the user's head. Alternatively, the housing mount can be a head band/head gear that holds the housing securely against the user's head. The housing mount is also optional given that different embodiments of a controller can leverage parts of another device. The controller can also perform if not mounted on the head. For example, the controller can be moved around using any part of the body, or the controller can be left in the user's pocket and be configured to provide some functions as the user moves his/her entire body.

The controller can include controls which include, for example, power switches, audio volume controls, sensor sensitivity controls, initialization/calibration switches, selection switches, touch based controls, etc. The controller can include output components that can range from display screens (possibly including touch abilities) to multi-colored LED light(s), infrared LEDs to transmit signals to audio speaker(s), audio output components (possibly contained in the ear plug), haptic feedback components, olfactory generators, etc. The controls and output components are also optional. Some controller embodiments can also leverage controls and output components of the controlled electronic device and/or the device that the controller is embedded in.

The controller can include additional input components which can include, for example, audio mikes (possibly used in conjunction with voice recognition software), sip-and-puff controls, a joystick controllable by mouth or tongue, pressure sensors to detect bite by the user, etc. These additional input components can also be optional components that can be included based on the functionality desired.

The controller can include interface ports which can include, for example, power ports, USB ports, and any other ports for connecting input or output components, audio/video components/devices as well as sensor inputs and inputs from other input components. For example, an interface port can be used to connect to sensors which are not provided as part of the controller, but whose input can still be used by the controller. Interface ports are also optional components.

The controller can include communication links that provide wired or wireless connection from the microprocessor to the controlled electronic device(s) (such as a computer, video game console, entertainment system, mobile phone, home appliance, medical equipment, etc). The communication link can include a wireless transmitter and/or receiver that uses Bluetooth, radio, infrared connections, Wi-Fi, Wi-Max, or any other wireless protocol. If the controller is embedded in another electronic device then the controller can leverage communication link(s) already present in that device.

As stated above, the list of components in a specific controller embodiment depend on the functionality desired in that embodiment of the controller, and if that embodiment embeds the controller components and functionality into another device. In the latter case, the components that are common between the controller and the other device are shared. For example, if the controller is incorporated in a wireless phone head set, then the controller can use the audio mike, audio speaker, power source, power control, volume control, housing as well as possibly the communication link already present in the phone head set.

Some exemplary controller embodiments are described below which include a certain suite of controller components. Given the multitude of component options available, there can easily be dozens if not hundreds of unique combination of components to form a desired controller embodiment and therefore it is not practical to list and describe all possible embodiments.

Figure 23:
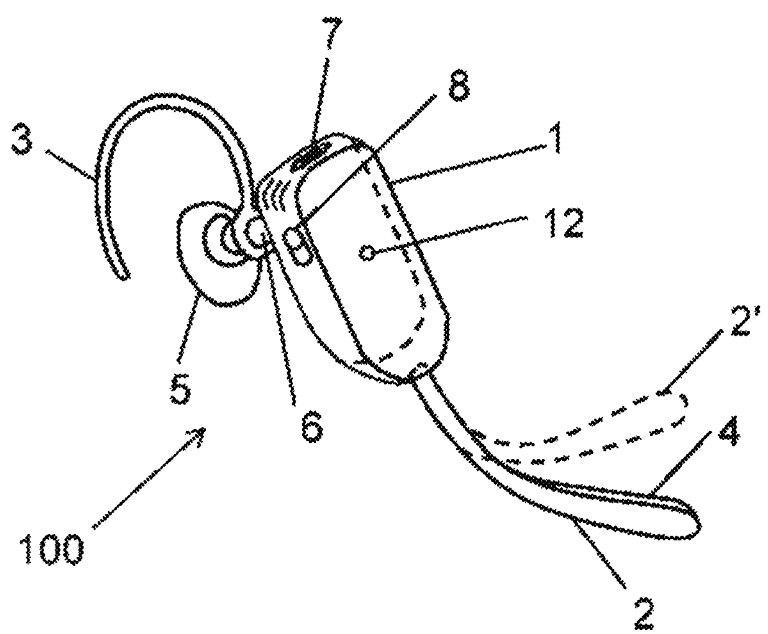
FIG. 23 illustrates an exemplary embodiment of a Controller that can be Worn by the User.

FIGS. 22 and 23 illustrate an exemplary embodiment of a controller 100 that exists independently, can be used as a hands-free computer mouse, and can be used for storing, accessing and manipulating facial expression information of the user. FIG. 22 depicts a user wearing the controller 100 and FIG. 23 shows a perspective view of the controller 100. The controller 100 includes a housing 1, a sensor arm 2, an ear clip 3, an ear plug 5, mounting post 6, a USB port 7, a power switch 8 and a status indicator 12. The housing 1 holds a microprocessor, power source, inertial sensors (including at least a two axis gyroscope or equivalent, and up to a 3-axis gyroscope and an optional 3-axis accelerometer), an optional orientation sensor (a tilt-compensated compass unit) as well as a radio frequency (RF) transmitter that connects the controller 100 to an electronic device (a computer in this case). The gyroscopes and accelerometers can be positioned so that at least one of their axes is reasonably aligned with the direction of the line segment that joins the midpoint of the two cars of the user, and at least one other axis, perpendicular to the first axis, is aligned substantially along the direction of the user's neck/backbone (when the user is sitting, standing or lying down normally). The first axis can be used to measure angular motions in the pitch direction and the second axis can be used to measure angular motions in the yaw direction. (See FIG. 1 for a pictorial depiction of an exemplary head coordinate system comprising a pitch axis, a yaw axis and a roll axis.) Optionally, a third gyroscope can be provided to measure the angular motions in the roll direction.

The USB Port 7 can be coupled to the rechargeable battery inside the housing 1 and thereby be used for recharging the battery. The USB port 7 can also be coupled to the microprocessor and be used as an alternate communication link. Alternatively, the USB wired connection could be the main communication link and a RF connection could be an alternative link. Although FIG. 23 shows the USB port 7 at the top of the housing 1, it can be located at the bottom or sides of the housing 1 to make it more convenient to plug in a USB cable to connect it to the controlled electronic device while being worn.

The flexible/bendable sensor arm 2 is connected to the housing 1 of the controller 100. The underside 4 of the sensor arm 2 is shown with a reflective proximity sensor mounted near the tip of the arm 2. The sensor arm 2' (FIG. 23) is just another configuration of the sensor arm 2 shown in an adjusted state to suit the user's face. In an alternate embodiment, the reflective proximity sensor on the underside 4 of the arm 2 could be substituted by or complemented by a touch sensor such as a capacitive touch sensor which can also provide proximity information along with the touch status. In a controller embodiment where a capacitive touch sensor is used, the tip of the sensor arm 2 can be provided with a conductive area or surface that is electrically connected to the controller of the capacitive touch sensor (which resides in the housing 1). This conductive area could be simply a small piece of copper plate or copper wire. In another embodiment, a mechanical action button/switch can be used instead of a touch sensor to detect motion of the facial muscles; and the mechanical action switch could also detect the amount of muscle movement. Alternatively, the sensor arm 2 could be pressing against the facial muscles through spring action and then as the facial muscles move, the sensor arm 2 could measure the deflection in the arm 2 that results from the facial muscle movement.

From the back side of the housing 1 of controller 100 protrudes the mounting post 6 which is coupled to the ear plug 5 which helps hold the controller 100 in place when the user is wearing it by means of the ear clip 3. While the ear clip 3 provides additional means of securing the controller 100 around the user's ear, the ear clip 3 can be removable and optional. An optional audio output component or haptic feedback component could be embedded inside the ear plug 5 or the housing 1 of the controller 100.

Figure 26:
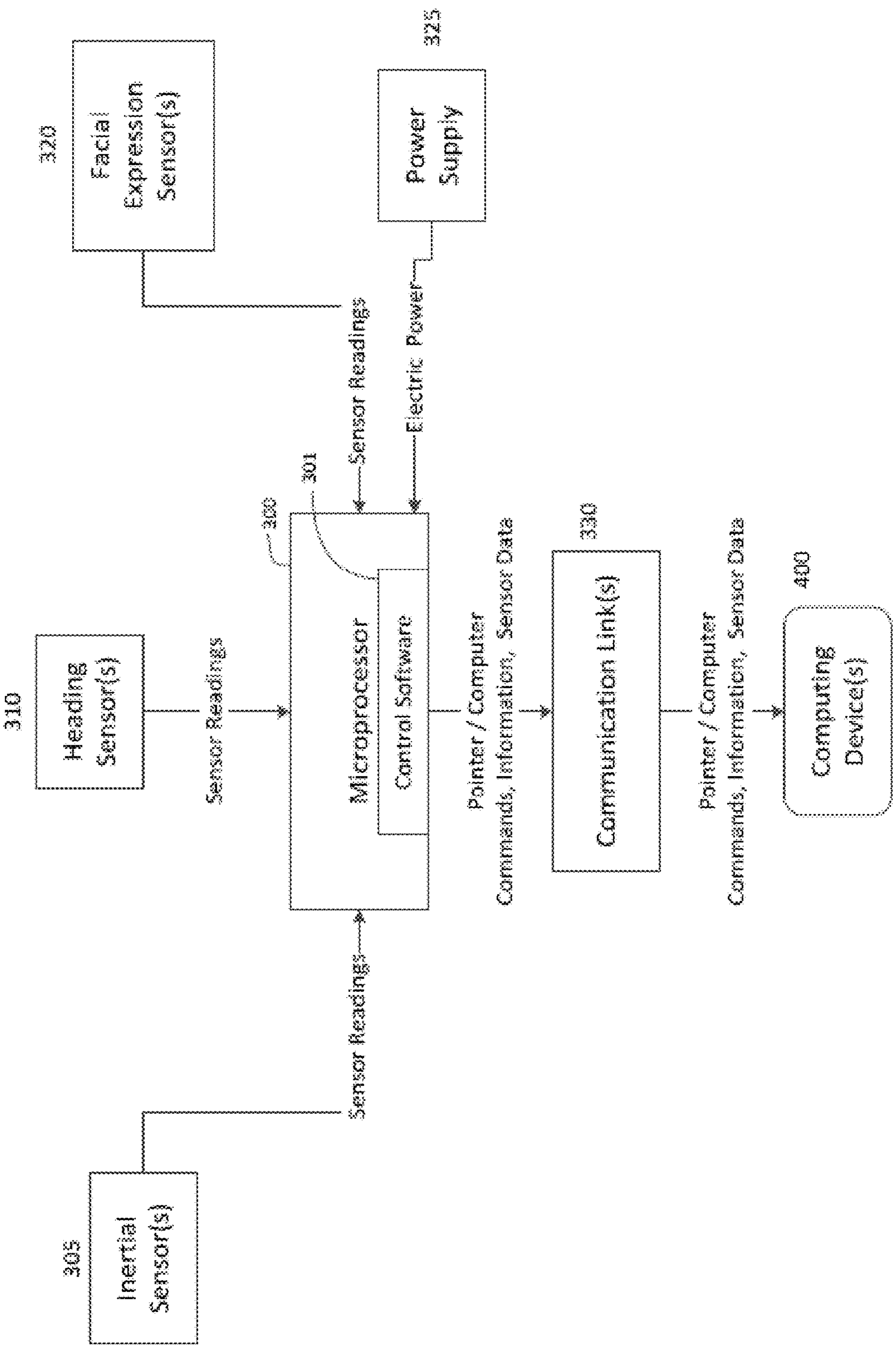
FIG. 26 illustrates a Schematic Layout of Functional Components of an exemplary Controller embodiment.

FIG. 26 shows a schematic layout of functional components of an exemplary controller embodiment. The following description refers to the controllers 100 and 120 of FIGS. 22 and 23 but can be readily applied to other controller embodiments. The motions of the user's head are captured by inertial sensor 305 and converted to OOI motion commands by control software 301 running on a microprocessor 300. The direction and/or position of the user can be captured by heading sensors 310, and the facial expression of the user can be captured by facial expression sensors 320, and all of these sensor readings are transmitted to the control software 301 running on the microprocessor 300. The commands generated by the control software 301 are communicated via communication link 330 to the electronic device 400 which is being controlled.

Figure 24:
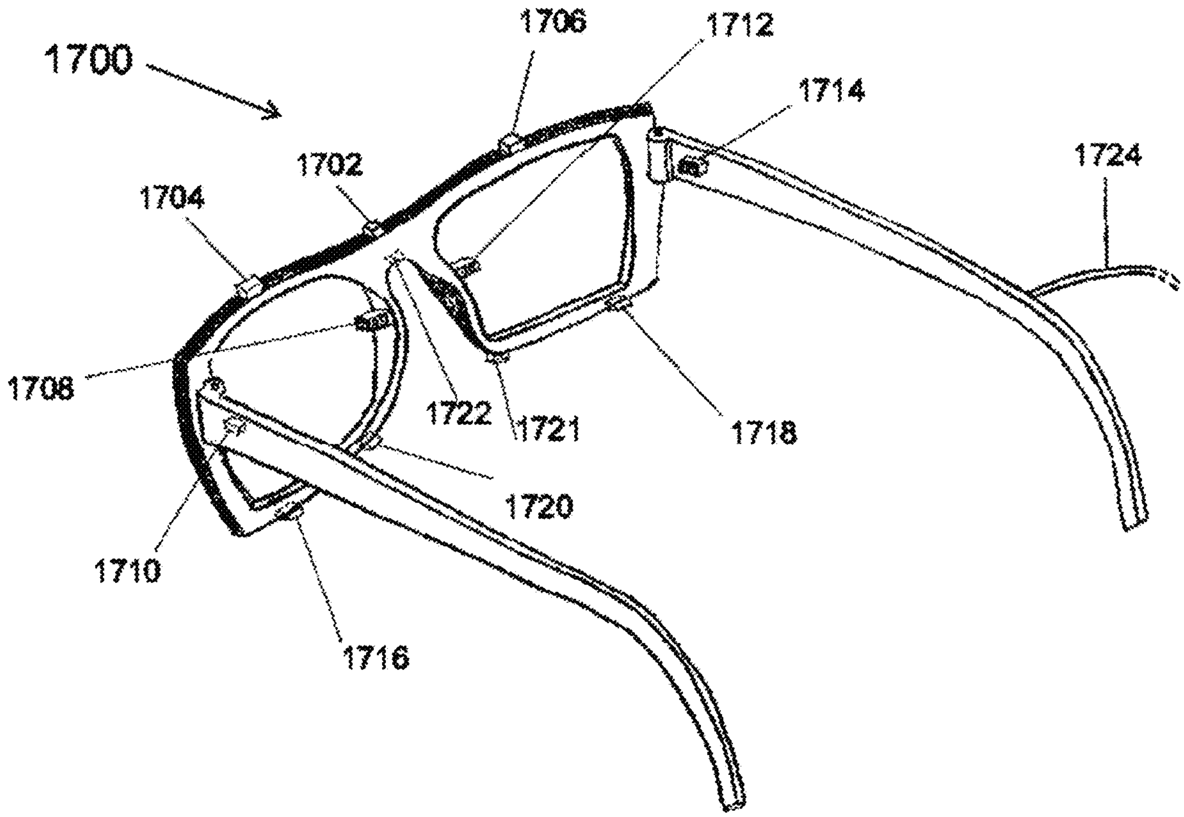
FIG. 24 illustrates an exemplary embodiment of a Controller wherein the Controller is comprised in a Head-Worn Device.

FIG. 24 illustrates an embodiment where the controller is embedded in a head-worn device that looks like an eye wear. This eye wear can be an Augmented/Mixed/Virtual Reality (AR/VR/MR) device, and it can also be controlled by various user gestures that may or may not require the user to use hands. For example, the user could perform selection on their AR/VR/MR device by smiling as explained in the Selection heuristics, modify various OOIs on the device by OOI Motion/Modification heuristics and possibly using various start and end triggers for starting and stopping of generation of command signals, etc. In other variations, if the eye wear was configured to (possibly also) act as a controller of other devices (e.g. devices such as computers, tablets, smart phones, industrial machinery, automotive systems, home appliances, electrical fixtures, medical systems, or any other electronic devices), then some of the user gestures performed by the user could be translated to command signals and transmitted to other devices to affect their operation.

FIG. 24 shows the controller 1700 where instead of sensor arms to hold various sensors, the controller 1700 mounts sensors on eyewear. The sensors can be connected to a main housing (not shown) either by a wired connection 1724 or wirelessly. The housing could house a power source (such as batteries) as well as processor, memory and communication link (transceiver for communication with other devices). The housing could be strapped to the user's body or worn on the body or simply carried around in the user's pocket. Note that the eyewear controller 1700 can also house inertial sensors as well as its own power source. FIG. 24 shows various touch/proximity/FE sensors mounted on the Controller 1700. Sensor 1702 can detect frowns or eye brow raises by sensing the displacement of the eye brows or surrounding areas, possibly by proximity sensing, touch sensing, image sensing, or other methods. Sensors 1704 and 1706 can also detect eye brows raises and frowns on an individual eye basis. Sensors 1720 and 1721 can detect nose twitching or side-to-side nose wiggles (possibly by proximity sensing, image sensing, touch sensing, or even by inertial sensing). The comparison of readings from the left and right side sensors 1720 and 1721 can help determine level of symmetry of the motion of the face around the nose area and thereby distinguish nose twitches from side to side wiggles of nose and mouth. Further, nose twitches may also cause the entire eyewear to move at the same time, which can be detected by inertial sensors embedded in the eyewear, which can lead to further corroboration of the expression detection. Note that the main housing could also have inertial sensors, thereby allowing comparison of motion pattern obtained from eyewear inertial sensor with those obtained from the housing. This comparison can further enhance the confidence of detection of expressions such as nose twitches. Sensors 1716 and 1718 monitor motion in the upper check area, thereby can be used to detect smiles as well as jaw drops. When the user smiles, the distance between sensors 1716, 1718 and the cheek reduces whereas when the jaw drops, the distance increases. The distance changes can be detected by proximity sensing, image sensing, touch sensing, radar sensing, etc. Touch detection can be used to further corroborate the findings. Further, comparisons of the trends in readings coming from different sensors can be done to distinguish one expression from another. For example, if the expression is getting stronger on the right side as sensed by sensors 1721 and 1718, but not much is changing on the left side as sensed by sensors 1716 and 1720, then it can be interpreted as a one-sided smile using the right check. On the other hand, if the expression is getting stronger on the right side but weaker on the left side, which can indicate a nose wiggle to the right with some pouting action of the mouth.

Sensor 1722 on the underside of the nose bridge can be used to detect if the eyewear is being worn properly. This information can be advantageous for proper functioning of the controller, as a proper wear may be required for accurate PCE or FE detection. Just like any other sensor, a baseline reading for sensor 1722 from initialization/calibration phase can be used to compare future readings to continually assure that the controller is being worn properly. If it is detected that the controller is not being worn properly, a warning can be provided to the user through one of the feedback mechanisms on the controller 1700, or even via the controlled electronic device. Additional sensors could be provided around the body of the eyewear for detection of proper wear, such as on the inner rim of the frame facing the face, for example proximate to sensors 1702, 1704, 1706, 1716, 1718, 1720, 1721, as well as at other locations such on inner sides of the temples of the eyewear.

The controller 1700 can also be used for drowsiness detection. Sensor pairs 1708-1710 and 1712-1714 can be used to determine individual eye closure/blinking status. In one embodiment, sensors 1708 and 1712 have two distinct parts a first photo-reflective or proximity sensor part directed to the area of the eye closest to the sensor that can detect eye closure based on reading changes, and a second photo emitter part directed towards the sensors 1710 and 1714, respectively. The photo emitter parts of sensors 1708 and 1712 can emit radiation that can be received by the receiver parts in sensors 1710 and 1714 respectively. As the eye lids close partially or fully, the eye lids and the eye lashes interfere with the reception of the radiation by the receiver parts. This variance in the reception of the radiation can be correlated with the amount of eye opening and thereby to determine the eye closure status. In another variation, a photo-reflective sensor could shine a light towards a part of the eye ball and measure how much light is reflected back. The sensor reading would change as the eye opens or closes, thereby giving indication of opening/closing of the eye as well as the amount of opening (especially when multiple of these sensors would be pointed towards multiple different locations). Other types of proximity sensors can also be used instead of or in conjunction with photo-reflective sensors. For example, a capacitive proximity sensor could be used instead of or along with the photo-reflective sensor to sense capacitance change when the eyes go from open to closed state, thereby giving an indication of eye blink or closure. Note that in a variation, the separate housing can be eliminated by including a power source, processor, memory, audio output component, communication link and inertial sensors in the eyewear itself. Additionally, various audio, video, haptic and other feedback mechanisms can also be included in the eye wear. Further, the eye wear can also include a display screen and a projector to project images on the display screen. In some variations, the projector could project images directly onto the user's retina.

Figure 25:
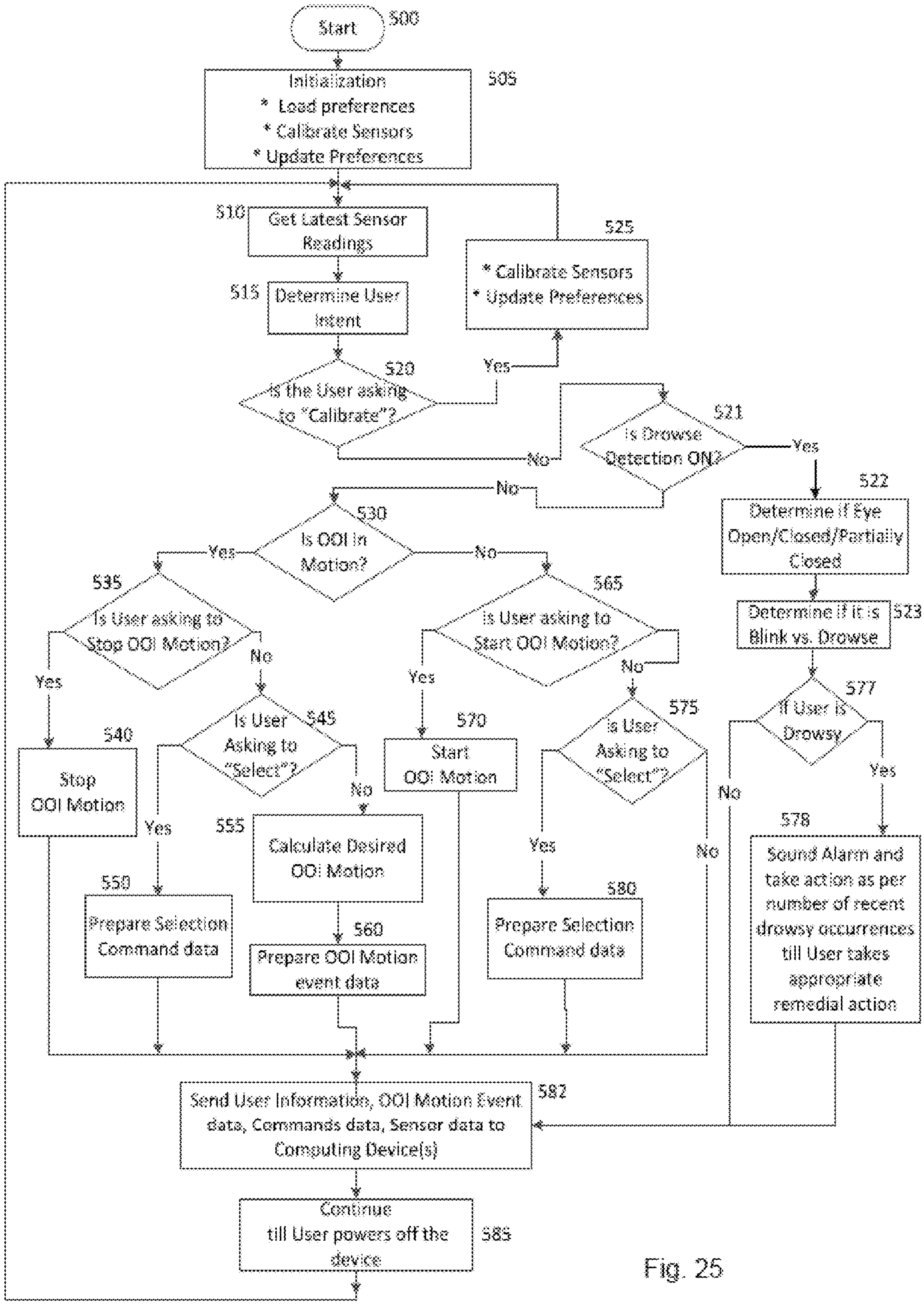
FIG. 25 illustrates an exemplary Flow Diagram of Operation for an embodiment of a Controller.

Though the operation of each controller embodiment may be somewhat different from other controller embodiments, the typical underlying behavior is similar. FIG. 25 shows an exemplary flow diagram of operation for a controller. Operation will be described for one embodiment of the controller that controls a computer pointer/cursor/selected graphical object according to the motions of the users' head and facial expressions. The controller can also perform facial expressions management and drowsiness detection.

FIG. 25 illustrates an exemplary flow chart for high level controller operation. The illustrated steps can be implemented as part of the Control Software of the system. Although not explicitly mentioned in the flowcharts or following discussions, the sensor readings can be cleaned using noise removal techniques (hardware and software). One embodiment uses a software low-pass filter algorithm. Some heuristics described herein and used in other embodiments are not illustrated in FIG. 25, and instead are explained in separate figures and verbal explanations. While FIG. 25 illustrates an embodiment that either performs drowsiness detection or controls an electronic device, other embodiments can simultaneously allow multiple functionalities of the controller, such as OOI motion, selection commands, drowsiness detection, facial expression management, etc.

At block 505, the controller can into initialization/calibration mode upon start up giving the user a chance to specify and/or update preferences, calibrate sensors and adjust sensor sensitivity settings. If the user does not change these settings, the controller can use the initialization/calibration settings stored in the memory of the microprocessor. The controller can include factory default settings in case the settings have never been set by the user. User instructions and audio feedback can be given to the user via an audio speaker while the calibration is in progress and when complete. Note that the initialization/calibration period can last for a fixed time period right after the power is turned on, or it can be started based on a specific trigger such as pressing the power button briefly or some other action. Alternatively, an additional touch sensor can be embedded on a controller housing or on an ear plug to trigger initialization/calibration when the controller is worn by the user, or only the first time it is worn after being powered on.

At start up time, the sensor arms can be adjusted by the user as per his/her preference so that the sensor can detect facial expressions as per the user's preference. For example, to detect a smile, the sensor arm can be adjusted so that the FE sensor is over the facial muscles that move the most in during the expression of a smile. In this way the FE sensor can have the most sensitivity for that expression. After this adjustment, the user can press a power button or other designated button down briefly (or some other command sequence) to trigger the calibration process whereby the control software records the sensor reading as a baseline to compare future readings with in order to determine if the user is smiling or making some other detectable facial expression. In some embodiments, the facial expression is considered to be started only when the facial muscles actually touch the sensor. Touch sensors such as capacitive touch sensors indicate if a touch is achieved, while proximity sensors can indicate a change in proximity. Certain proximity and touch sensors continue to provide readings indicative of proximity even after a touch is attained. In other embodiments, the expression is considered to be started if the reading of the sensor changes by a preset or configured amount. This amount can be measured in terms of the raw reading or a percentage difference between the raw readings and the baseline. In yet other embodiments, the FE sensor can be a strain sensor that senses mechanical strain. When the strain sensor is temporarily stuck to the part of the face, it will detect strain caused by movement, stretching or shrinking of muscles, and then the strain readings can be used to detect the facial expression in a fashion similar to touch and proximity readings.

After initialization step, block 510 can be performed. At block 510 the system can get the latest sensor readings (e.g. readings from motion sensor, facial expression sensor, image sensor, etc.) as well as user input (such as button presses to request calibration, change sensitivity, cause selection, etc.). At block 515 the system can determine the user's intent by processing the sensor readings and user input. (Block 515 can also utilize pattern matching algorithms on the sensor data received so far to determine if the sensor data matches the pattern of one of the heuristics/predefined user gestures that can be used by the user to communicate with or control the controlled electronic device.) Blocks 510 and 515 provide an opportunity for the system to re-perform calibration, adjust sensitivity, adjust user preferences/settings, etc. At block 520, the system determines if the user is triggering a sensor calibration. If a sensor calibration is triggered, then at block 525 the sensors are calibrated and the user preferences are updated. After calibration, control passes back to block 510. If a sensor calibration is not triggered, then control passes to block 521.

At block 521, the system checks if drowsiness detection is activated. If drowsiness detection is activated control passes to block 522, otherwise control passes to block 530. At block 522, the system determines if the user's eyes are open, closed or partially closed, and at block 523 the system determines if the detected condition is a normal blink or an indication of drowsing. This determination can be made on the length of the blink duration, pattern of blinking experienced over the last specified duration of time, pattern of head motion of the user, body posture variation of the user, and/or other suitable criteria. At block 577, if the system determines that the user is drowsy, then at block 578 can sound an alarm and take action which may depend on the number of drowsiness events detected in a period of time, and may wait for user remedial action before the control passes to block 582. At block 577, if the system determines that the user is not drowsy then control passes to block 582.

At block 530, the system determines if the OOI is in motion. If the OOI is in motion, then control passes to block 535, and if the OOI is not in motion control passes to block 565.

At block 535, when the OOI is in motion, the system checks if the user is trying to stop the OOI. If the user is trying to stop the OOI, then at block 540 the system stops the OOI motion and control passes to block 582. If the user is not trying to stop the OOI, then at block 545 the system checks if the user is trying to perform a selection command (such as a click, click-and-drag, etc.). If the user is trying to perform a click command, then at block 550 the system generates command data for communication or performing the click command and control passes to block 582 (along with the command data). If the user is not trying to perform a click command, then at block 555 the system calculates the desired OOI motion, at step 560 generates OOI motion event information/data and control passes to block 582 (along with the OOI motion event information).

At block 565, when the OOI is not in motion, the system checks if the user is trying to start OOI motion. If the user is trying to start OOI motion, then at block 570 the system can start OOI motion and control can pass to block 582. If the user is not trying to start the OOI, then at block 575 the system checks if the user is trying to perform a selection command. If the user is trying to perform a selection command, then at block 580 the system can prepare command data for performing the selection command and control can pass to block 582. If the user is not trying to perform a selection command, then control passes to block 582.

At block 582, the system sends appropriate data (including any/all data/information acquired from previous steps) to the electronic device, for example user information, motion event and selection and other command (signal) data, sensor data (including readings from inertial sensor, facial expression sensor, etc) facial expressions management information, drowsiness detection information, etc. Then at block 585 if the user powers off the controller, the system shuts down, otherwise control passes back to block 510 to start processing for the next iteration, and this process can continue indefinitely until the user requests to stop or powers down the device.

The above referenced US patent applications illustrate an exemplary Head Coordinate System (HCS), which is reproduced here in FIG. 1. It will be used in this document to describe various motions that can be performed by the user. Note that other coordinate systems can also be used to track motion of head or other body parts, as well as the motion of the controller itself. This document elaborates on use of these motions, the expressions on the user's face and other user actions that could be used as a set of commands (User Interface) to control electronic devices. In some embodiments, a body worn or hand-held controller can be used to sense user's body motions and/or expressions. It is possible to have systems that employ cameras, ultrasound, magnetic fields, electrical fields, electromagnetic fields, radar, sonar, Electromyography (EMG), Electroencephalography (EEG), and other sensing techniques to sense body motions and/or expressions and/or user actions. The user interface principles and embodiments described in this document do not depend on what methods were used to sense the motions, positions, expressions or other user actions; they can be used regardless of the sensing methods and type of the controller or controlling system. For example, these principles/techniques can be used with head/body mounted hands-free controllers, handheld controllers, or even in systems where no one particular device in the system can be identified as the controller. Further, in the definition/heuristics of a user gesture, one user action can be substituted by another user action.

Following sections provide definitions, concepts, techniques, symbolic representations (for body/head motions, facial expressions and other body actions), as well as principles that can be used for creating/designing user interfaces for using/operating such controllers/controlling systems. Embodiments of various user gestures and user gesture based User Interfaces are also described with the aid of symbolic representations.

A methodology of symbolic representation of type, direction and other properties of motions and expressions (as performed by the user or experienced by the controller or detected by the control system) is described below. These symbolic representations can be used for describing user gestures. These user gestures can be detected and recognized by the controller/control system to generate signals to communicate with an electronic device and/or to perform certain functions.

Types of Motion—

Roll—This is rotational motion about the X-axis of a coordinate system, such as the HCS. It will be represented symbolically by the letter "R". For example, when the user rolls his/her head so that his/her left ear gets closer to the left shoulder, then that will be called the "Left Roll" and represented symbolically as "<R" or "R<". Then, "Right Roll" is the opposite of the "Left Roll" and will be symbolically represented as "R>" or ">R". The symbols "<" and ">" are called the direction specifiers and are used to denote left/up and right/down motion respectively (from the viewpoint of the user).

Yaw—This is rotational motion about the Y-axis of a coordinate system, such as the HCS. It will be represented symbolically by the letter "Y". For example, when the user rotates his/her head/body/part of body to his/her left, then that will be called the "Left Yaw" and represented symbolically as "<Y" or "Y<". Then, "Right Yaw" is the opposite of the "Left Yaw" and will be symbolically represented as "Y>" or ">Y".

Pitch—This is rotational motion about the Z-axis of a coordinate system, such as HCS. It will be represented symbolically by the letter "P". For example, when the user pitches his/her head/body/part of body upwards, then that will be called the "Up Pitch" and represented symbolically as "<P" or "P<". Then, "Down Pitch" is the opposite of the "Up Pitch" and will be symbolically represented as "P>" or ">P".

X Translation—This is translational motion along the X-axis, represented by "Tx". The front and back translation motions (i.e. along +X axis and −X axis) can be then represented by "Tx>" or ">Tx" and "<Tx" or "Tx<" respectively.

Y Translation—This is translational motion along the Y-axis, represented by "Ty". The up and down translation motions (i.e. along +Y axis and −Y axis) can be then represented by ">Ty" or "Ty>" and "<Ty" or "Ty<" respectively.

Z Translation—This is translational motion along the Z-axis, represented by "Tz". The translation motions along +Z axis and −Z axis can be then represented by ">Tz" or "Tz>" and "<Tz" or "Tz<" respectively.

In some embodiments, translational or rotational motions at any particular moment in time can be measured in terms of translational or rotational/angular velocity/speed. However, other embodiments can also use other measures of motion such as instantaneous position or positional change or acceleration, etc. Note that if no direction specifiers are specified, it is understood that the direction of the motion does not matter. Therefore, for example, "Y" can represent either "<Y" or "Y>" or both.

In some embodiments, instantaneous positions can be detected and monitored instead of motions. As an example, devices using the concept of joystick can generate command signals based on the position of the joystick (in relation to a neutral position) at a particular instant in time to affect an OOI, rather than relying on the speed of the joystick at that particular instant in time. Therefore, all of the above mentioned motion symbols can be used to represent position instead of motion, or some combination thereof. The heuristics/principles disclosed can be used for embodiments that detect/monitor either motions or positions or both. However, for reasons of simplicity, the illustrative embodiments discussed herein will primarily use the term "motion" rather than "motion and/or position" or "a combination of motion and position". Further, "motion" can include translational as well as rotational motion or position.

For reasons of brevity, two consecutive but opposite motions along the same axis may be represented by using only one letter. E.g. "<Y Y>" which stands for a Left Yaw followed by a right Yaw, may also be represented as "<Y>". Similarly, ">R<" is same as "R><R", which represents a Right Roll followed by a Left Roll. In addition, same rule will apply to expressions (described later in the document.)

Periods of "No Motion"-User gestures can also have periods of time when there is limited or no motion. Note that a particular motion is termed as "limited" if its absolute magnitude is within a specified range or threshold during a time period. MOTION_NOISE_TH (Motion Noise Threshold, Parameter P #6, also referred to as MNT) as explained in the above-referenced patent applications is an example of a motion threshold. Every type of motion (R/P/Y/etc.) can have its own MNT. Further, even for the same motion type, MNT values can be different for different user gestures. Time periods of motion where the (absolute) magnitudes of specified motion types are continuously within corresponding specified motion thresholds/range for at least specified time thresholds, can be called periods of "No Motion". Such time periods and are represented by the symbol "#" when there is only limited motion observed for at least a specified amount of time in a continuous fashion. Note: The symbol "." is used to represent a period of No Motion (instead of "#"), in some of the referenced applications.

Note that in embodiments that work based on position (versus velocity or acceleration), a period of "No Motion" can be defined as the time period where the detected/monitored position is within the specified MNT value for position. (The position being monitored can be translational position or angular position.) The readings from position sensors (just like readings from motion sensors) can be measured with respect to certain baseline(s), which may have been set or established during the initialization/calibration process (as per the referenced patent applications). The MNT can also be measured from the baseline position that corresponds to the position of the body part being monitored.

Note that the terms "velocity" and "speed" are used interchangeably in this document, unless a specific reference to the direction of motion of the object whose motion is being measured. The term "motion" of an object can be considered to encompass speed, velocity, acceleration, etc. of the object, as well as displacement or change in position of the object over time. Further, displacement of an object can be measured between a pair of consecutive iterations in the main loop of the control software or between some other convenient pair of events as required by the concept/principle/heuristic being disclosed.

Note that the term "motion" can include angular as well as translational motions unless specifically called out to be otherwise.

Some embodiments can use eye gaze as an OMD. That is, eye gaze of the user can be used to modify an OOI on an electronic device. For example, if a mouse pointer on the display screen of a device is the OOI, then it can be moved around on the screen based on where on the screen the user is looking (Point of Interest or POI). The determination of where the user is looking can be done based on eye tracking sensors (aka eye gaze sensors) that can monitor the location and orientation of the user's head (in relation to the eye tracking sensor and/or the display screen) and the orientation of user's eye ball(s). Readings from eye gaze sensor can include all the above quantities as well as the eye gaze vector (the vector between center of an eye or midpoint between two eyes to the calculated POI) as well as the coordinates of the POI (in display screen or some other convenient coordinate system). Based on the readings of the eye gaze, the change in eye gaze (either based on change in POI or the eye gaze vector or some other suitable quantity) can be computed.

As seen above, eye gaze can be defined as a combination of Head Pose (based on angular position of the user's head) and Eye ball angular position (based on angular position of eye ball/eye balls of the user with respect to the user's head). In such cases even if the head angular position and eye ball angular position (when measured individually) are changing more than a specified threshold/range, the combined effect on the eye gaze as a whole may still be within the specified range/threshold, and therefore the user can be said to be in a period of "No Motion". Further note that eye gaze can also be defined in terms of a specific point or location the user may be looking at any particular instance of time. (The specified point/location can be in the plane of the display screen of the electronic device being controlled, or a 3D point in real or virtual space.) In this case, the change in location or the point (the user is looking at) can be monitored against a specified threshold of position change, to determine if a period of No Motion is being encountered with user's eye gaze.

Note that some embodiments can use a more generalized concept called the Periods of Limited Activity (POLA) instead of period of "No Motion". A POLA is a period of time within a user gesture when a particular motion, position or user action (that is being monitored) is within a specified range. This range may or may not be same as +/−MNT. The specified ranges for a POLA may not be even symmetrically defined. For example, a POLA may be defined as the time period when user's head is rotating between 30 degrees/see to 40 degrees/see in Yaw whereas a period of No Motion may be defined as when the user's head is rotating at less than +/−5 degrees/second. Therefore, it can be seen that periods of No Motion can be POLAs but not all POLAs are periods of No Motion.

Note that sensors may not be always be able provide readings based on user or environmental conditions. For example, an eye gaze sensor may not be able to provide readings if the user has closed their eyes, or there is a bright light next to the user, or the view of the user's eye is occluded, etc. If the sensor is not able to detect the eyes of the user then it cannot compute the eye gaze vector or POI. In such a situation, the eye gaze vector/POI calculation can be considered indeterminate but not necessarily zero in value. Some embodiments can treat this situation as if there was no change in the eye gaze or POI value and continue monitoring till the time a valid reading is available from the sensor. Indeterminate readings from any other sensors (e.g. facial expression sensors, motion sensors, image sensors, etc.) can also be treated in a similar fashion.

Figure 2:
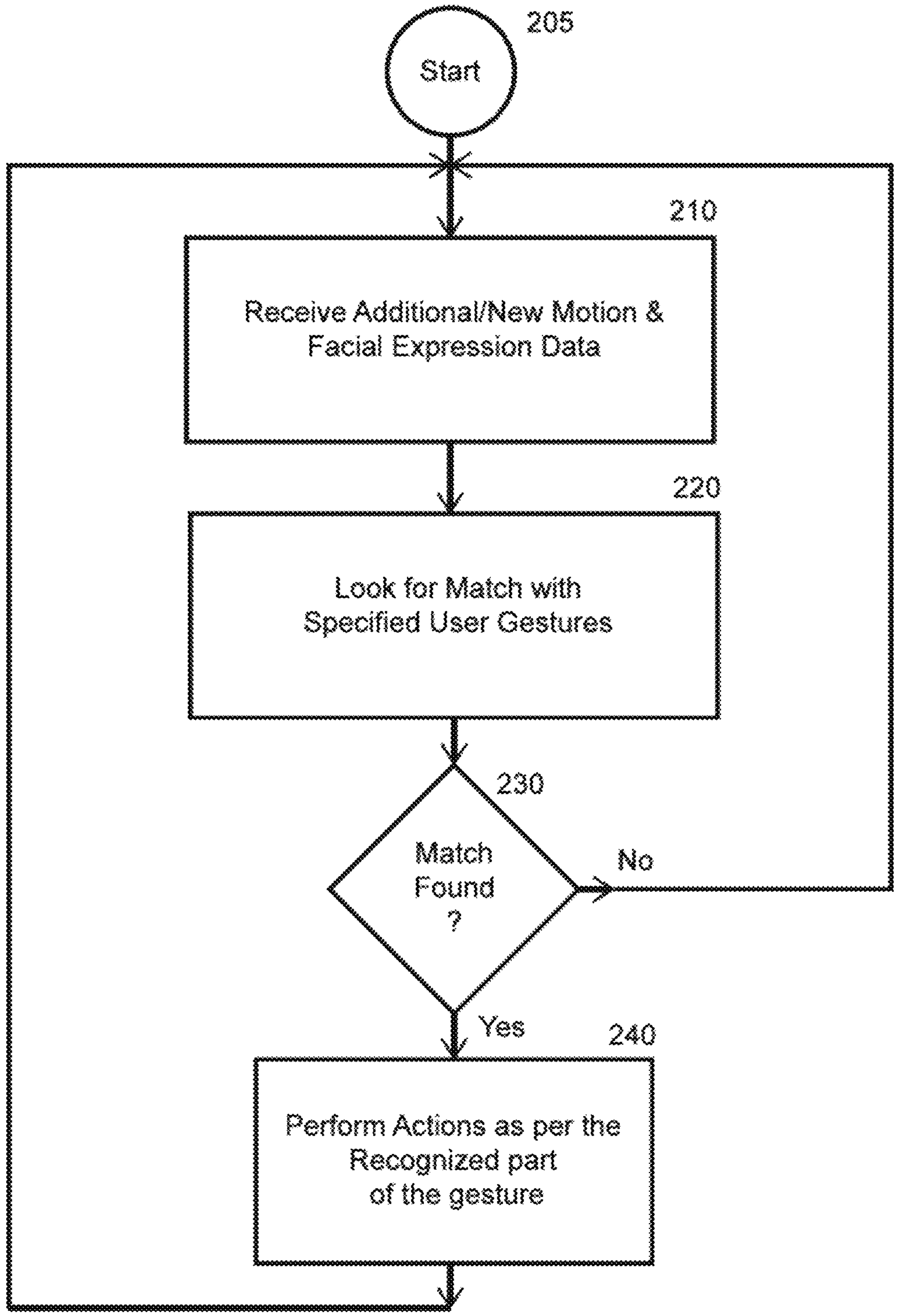
FIG. 2 illustrates an exemplary User Gesture Recognition Process Flowchart in one Embodiment.

Using the above defined convention, user gestures can be represented by strings of symbolic representation of various motions. For example, the symbolic representation "Y>P>" can represent a user gesture where the user performs a "Y>" motion (that is, a Right Yaw motion) followed by a "P>" motion (that is, a Down Pitch motion), in that order. Note that other motions that are not present in the symbolic representation of the user gesture can be ignored by the Control Software if it is looking for this particular user gesture. (See above referenced patent applications for description of "Control Software".) Amongst other things, control software can also provide the algorithm for processing various sensor inputs, mapping various inputs to specified user gestures and generating various control signals/events/commands corresponding to the detected user gestures. Given this, the behavior of the controller/controller system can be influenced by the control software. See FIG. 2 for an overview of the process that the Control Software uses in one embodiment to detect if the user is performing one of the specified user gestures. Note that the user gesture's user action pattern information can be stored in a file (or a database or an equivalent object) or can be embedded in the logic of the control software itself. (The illustrative flowchart in FIG. 2 assumes the logic of the control software has the predefined user gesture user action pattern information embedded in it.) The flow starts at step 205. At this point, the control software can start with a clean slate, meaning there is no information on motion or position of any body parts of the user or any facial expressions of the user. At step 210, the control software receives body motion/position and facial expression information sensed by various sensors at this point in time (or over a specified interval of time up to this point in time). This information can be stored in an information stack or list. At step 220, the system tries to match the received information so far (that is possibly stored in the information stack or list) with any of the predefined user gestures motion patterns (or parts thereof) that may be valid to be found as per the rules of the user interface. At step 230, the control software checks if a match is found (between received body motion/position and facial expression information and a (part of) predefined user gesture motion pattern). If no match was found, the control flow takes the "No" branch from step 230 and returns back to the top of the flow (step 210) and continues the process from step 210. If however a match was found at step 230, the control flow takes the "Yes" branch to Step 240 to start performing actions as per the matched (recognized) user gesture (or part thereof). These actions can include generating signals meant for communication with or for controlling the electronic device and/or any other appropriate action. If there are multiple matches found at step 230, the control software can take the most appropriate match. In some embodiments "most appropriate" match can be defined as the most elaborate user gesture (that is the user gesture with most complex representation) that is valid (as per the rules of the user interface) at that moment in time. Other embodiments can choose the least elaborate user gesture (that is the one with the simplest representation) that is valid at that moment in time. If at Step 240, it is determined that the matched user gesture is complete, the system can initialize the information stack or list, and can start looking for a new user gesture. Note that this embodiment shows Control Software that processes information in iterations, wherein the iteration starts at the top (at Step 210) and finishes at Step 230 or 240, after which the next iteration is started at Step 210. While this embodiment shows no wait time between the end of one iteration and the start of the next iteration, other embodiments can have the processor wait for a suitable amount of time so that there is an approximately constant time interval between start of any two consecutive iterations.

Figure 3A:
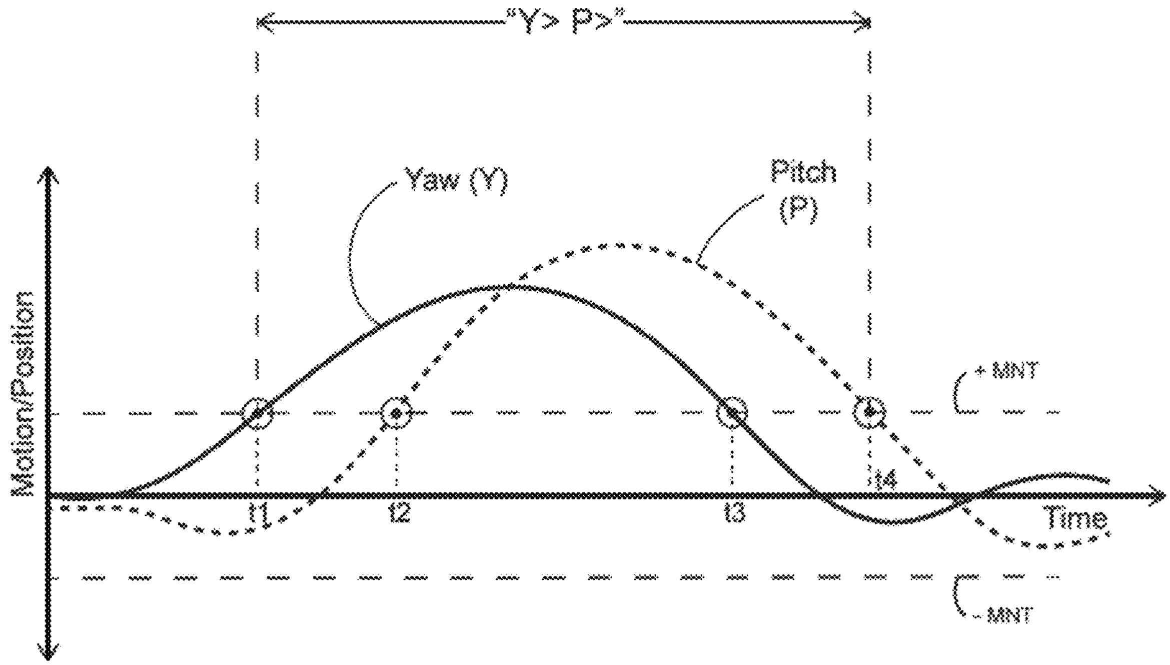
FIG. 3A illustrates exemplary Body Actions Represented by Symbols including "Y>" (Right Yaw), "P>" (Down Pitch) and in particular shows an example of motion/position of a part of the user's body as experienced/detected by the sensors that can map to the "Y>P>" representation.
Figure 3B:
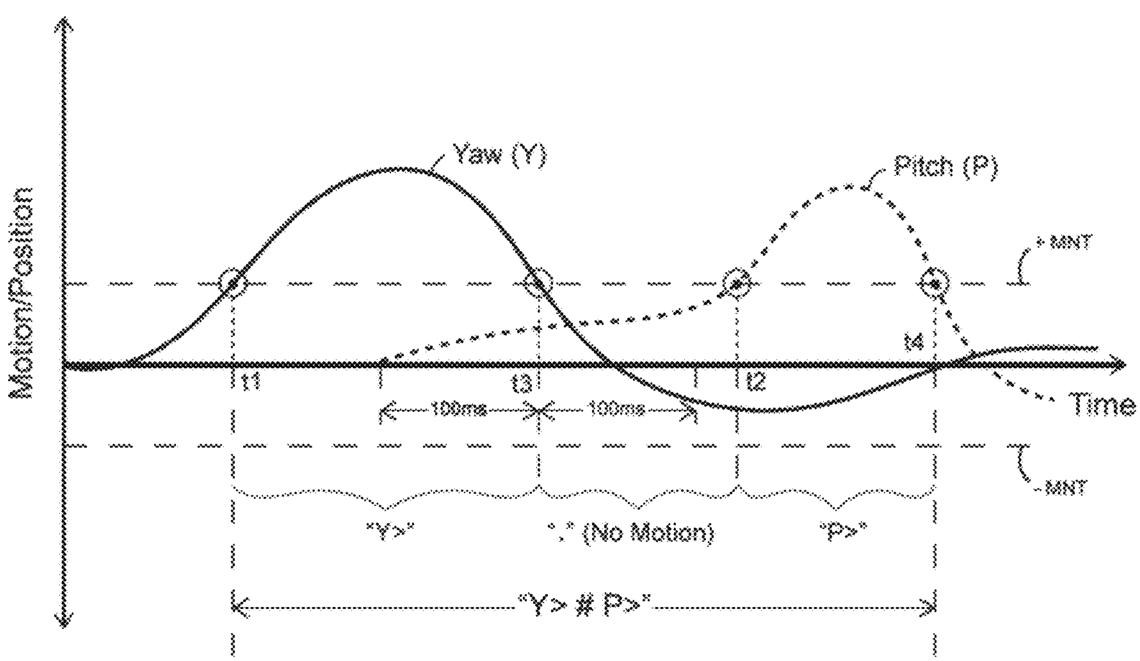
FIG. 3B illustrates exemplary Body Actions Represented by Symbols including "Y>", "P>" and "#" (time periods of motion where the (absolute) magnitudes of specified motion types are continuously within corresponding specified motion thresholds/ranges) and in particular shows an observed motion pattern for a user gesture that can map to the "Y> #P>" representation.

See FIGS. 3A and 3B for further explanation and description of symbolic representation of motions (that are performed as part of a user gesture). The X-axis represents time and Y-axis represents Motion or Position. For example, the Y-axis could represent translational velocity or angular velocity or angular position or translational position as detected by the sensors. In FIGS. 3A and 3B, all motions are shown to use the same MNT value (for purposes of simplicity of explanation). FIG. 3A shows an example of motion/position of a part of the user's body as experienced/detected by the sensors that can map to the "Y>P>" representation. The representation "Y>P>" represents a user gesture where first a Right Yaw motion is performed, followed by a Down Pitch motion. Note that while some embodiments can require Pitch motion to start immediately after the end of the Yaw motion, this embodiment allows the Pitch motion to start even before the Yaw motion has ended. (Recall that a motion can be said to be started when its absolute magnitude is more than the MNT value for that type of motion for that user gesture, and motion can be considered to be ended when its absolute magnitude is less than the MNT.) The Y curve is shown to surpass the threshold value at time t1 and therefore can be considered to be started at that time. The Y value falls back to be within the threshold at time t3 and therefore can be considered to be ended at time t3. The P curve on the other hand can be considered to be started at time t2 and end at time t4. During time period t1-t4, it can be observed that Y motion is first initiated at time t1 and then before it is completed, P motion is started and later ended by time t4. In this embodiment, despite the overlap between P and Y motion (during period t2-t3), the control software can consider this motion pattern to be a match with the symbolic representation "Y>P>".

FIG. 3B shows observed motion pattern for the user gesture represented by the representation "Y> #P>". This representation translates to a motion pattern where Y motion is started and completed, followed by a period of No Motion, which then is followed by a P motion. This user gesture thereby ensures that the user cleanly completes the Y motion before initiating the P motion. Note that the length of "#" period can be specified on a per user gesture basis and can be set to be as low as zero, as per the preference of the designer of the control system or the user interface of the control system. Note that the length of the time threshold for "#" period is set to be 100 ms in this example, whereas the time gap between end of Y and start of P (t3:t2) is more than 100 ms. Therefore, this embodiment can recognize the motion pattern shown in FIG. 3B as a match to the symbolic representation "Y> #P>".

Indefinite periods of "motion"—Motion symbols enclosed in "{ }" represent a combination of (possibly overlapping) motions listed within the braces, for an indefinite amount of time, where at least one of the motions listed within the "{ }" is present at any given time during the period. Periods of No Motion ("#") can also be included in such combinations. As an illustrative example, the symbolic pattern "{YP}" stands for combination of motions where Yaw and Pitch motions can happen simultaneously or individually and possibly in a random order, for an indefinite amount of time. Note that for a user gesture to map to this pattern, at least one of the motions Yaw or Pitch should be present at all times during that period and it is not required that both must be present to map to this pattern. To represent a motion pattern where a particular motion type guaranteed to be present in the combination, that motion type is highlighted in the representation by an underscore. Therefore, the pattern {YPR} represents a combination of motions where Yaw and Pitch are potentially present, but Roll motion is required to be present for at least some finite amount of time during the {YPR} period. Similarly, {YPR} represents a combination where Pitch motion is potentially present, but Yaw and Roll are required to be present for at least some time for that motion sequence to match the symbolic pattern representation. As another illustration, the pattern {YP #} represents a combination of motions where Yaw, Pitch and "No Motion" occurring for an indefinite amount of time. Therefore, the symbolic representations "Y> #P>", "Y #P", "Y #Y #P", "Y", "#Y #", "P #P", etc. can all be simply be represented by "{YP #}" instead.

Note: User gestures that include indefinite periods that include "#" can have some other motion or expression specified (within the user gesture) following the indefinite period so that the control software can determine the termination point of the indefinite period. This will be evident from the examples of user gestures containing "{ }", given later in this document. Note: As per above discussion, "{#}" represents indefinite period of No Motion, which is also the same as back-to-back occurrences of individual "#" periods repeated indefinitely. On the other hand, "{Y}" represents indefinite period of Yaw motion, which can also be simply be represented as "Y".

Various facial/body expressions can also be symbolically represented. For example, expression of Smile can be represented as "S", Eyebrow Raise as "E", Wink as "W", Raising a Hand as "H", Closing of hand into a first as "F", Manipulating opening of mouth as "M", and so on. Further, if the expression can be asymmetric, then a "l" or "r" could be attached as a prefix to the expression symbol to differentiate left versus right. Therefore, "lE" would represent Left Eyebrow raise and "rW" would represent right eye Wink. Further, "<" and ">" may also be used with facial expressions, where "<" would represent the initiation of an expression and ">" representing the ending of an expression. Therefore, "<S" can represent initiation of a Smile and "S>" represents ending of a Smile. Similarly, "<M" can represent opening the mouth and "M>" can represent closing the mouth. When an expression is initiated in a user gesture, it is assumed to be held until it is explicitly shown as terminated at a later point in the user gesture.

Figure 4:
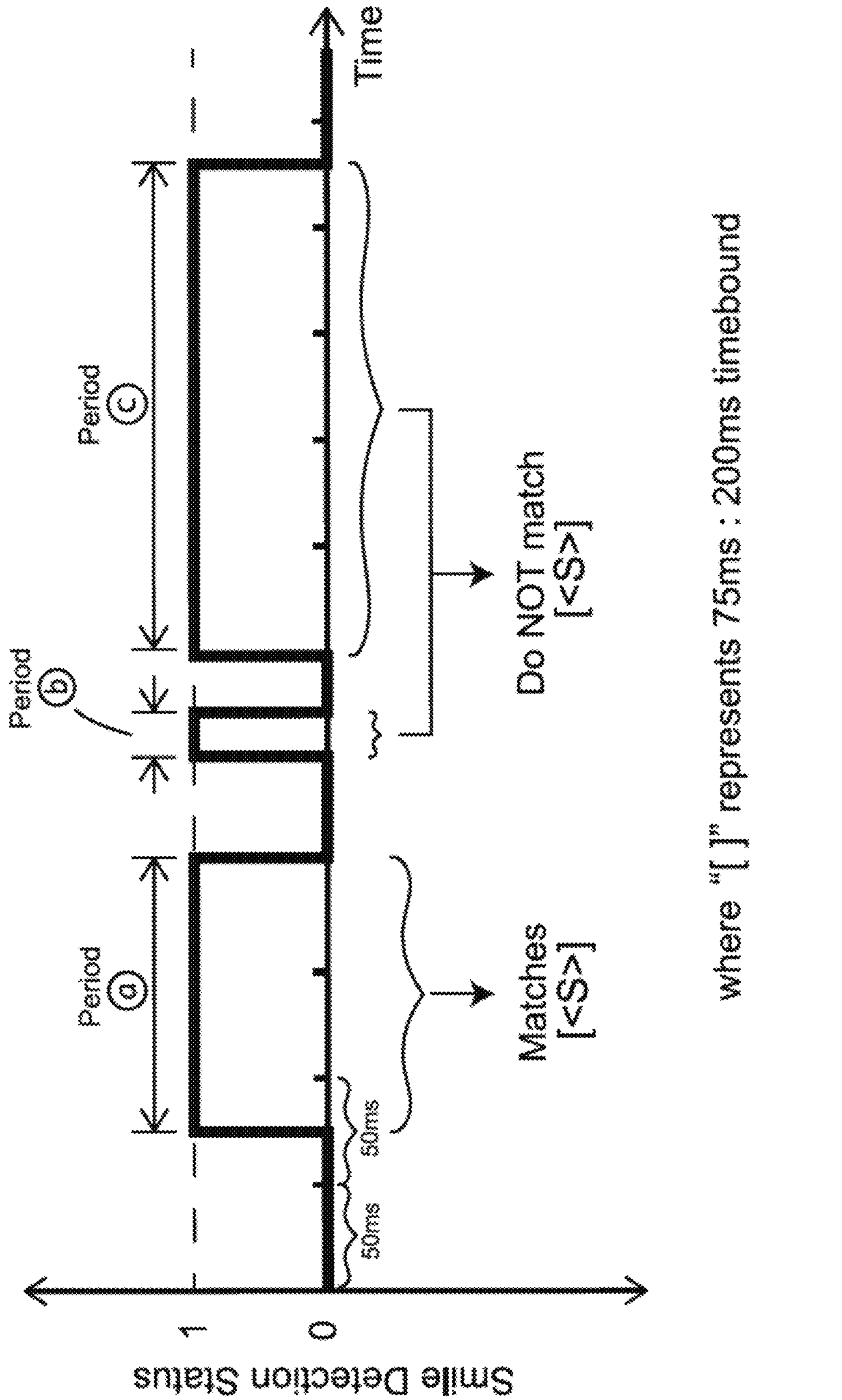
FIG. 4 illustrates exemplary Time Bound User Actions Represented by Symbols Including "[<S>]"

Time Bounds—A motion or expression that is started, maintained and finished so that the total time duration (i.e. from start to finish) of that motion/expression is within a specified lower and upper bound of time, is symbolically represented by enclosing it within "[" and "]". For example, "[<R]" represents a Left Roll motion started, maintained and ended so that the total time duration of the Left Roll motion falls within a specified range of time duration. (Note that a motion can be said to be started when its absolute magnitude exceeds a specified Motion Noise Threshold (MNT); and a motion can be considered to be ended when its absolute magnitude falls below the same or another specified MNT. The act of holding a body part in a specified position can also be bounded in a similar fashion.) Similarly "[<S S>]" (also represented as "[<S>]" for short), indicates a Smile expression that was started, maintained/held and completed so that the total duration (from start to end) was within a specified range of time. See FIG. 4 for an illustration that shows variation of smile detection status over time. If the time bounds for the representation "[<S>]" were 75 ms-200 ms for a particular user gesture, then period (a) wherein smile is detected continuously for 150 ms matches the representation "[<S>]". However, periods (b) or (c) do not since they are either too short or too long to be within the bounds specified for this representation.

Magnitude Bounds—A motion, position, expression (or any user action) that is performed so that the absolute maximum speed or magnitude or value attained during that user action (motion, position, expression, etc.) is within a specified lower and upper bound of magnitude, then that user action can be symbolically represented by specifying a numeral (or a numerical superscript) following the letter(s) that represent the user action. (As a convention, we can start the numerals from the number 2.) Therefore, for example, if the user performs a Left Roll motion so that the maximum absolute speed attained during the motion is within certain specified set of bounds, then it can be represented as “$<R^2$”. Similarly, for example, “$<R^3$” can indicate a magnitude bounded Roll motion, albeit one with upper or lower speed bound that is different or greater than that of a Left Roll motion indicated by “$<R^2$”. Similarly, “$<R^4$” can represents a motion that can be of higher magnitude than “$<R^3$” and so on. Note that the concept of magnitude can be applied to other user actions such as facial expressions such as smile where a user could be said to be smiling mildly versus strongly, opening of the mouth (where the size of opening of the user’s mouth can represent the magnitude/level of that expression), eye brow motion (where the amount of displacement of an eye brow can represent the level/magnitude of that expression), partially or fully opening an eye (where the size of the opening of the eye can represent the level/magnitude of that expression), and other expressions where the speed and/or level of expression can be measured. Note that some embodiments can have the specified lower magnitude bound to be the same as the Motion Noise Threshold (MNT).

Time and Magnitude Bounded (TMB) User Actions (including Motions, Positions, Expressions, and Other Actions) —A user action is called a TMB action if it is completed (from start to finish) within a specified range of time duration, and it reaches the maximum level/magnitude (such as speed, position/orientation, level of facial expression, displacement, strain, brain wave levels, or a suitable measured value of a quantity that can represent the level/magnitude of the user action) that is within the specified bounds for that TMB action. The specified bounds for a TMB user action can be specific to a particular user gesture that contains that user action. Therefore, for example, “[$<R^2$]” can represent a TMB Left Roll that achieves a maximum speed that falls within a specified range as well as the complete motion (start to finish) is completed so that the total duration falls within the specified time bound. This concept of “TMBness” of action is usable with motion and/or position/orientation of body parts, facial expressions as well as other measurable user actions. For the purpose of simplicity, we will not include magnitude bounds of a facial expression for the illustrative embodiments described in this document (unless explicitly stated to be included), although many embodiments can easily incorporate the magnitude criterion in the criteria for “TMBness” of a facial expression. Therefore, for example, while we will use “[<S>]” (which only has a time bound) to represent a TMB smile, other embodiments can use “[$<S^2>$]” (which indicates a time as well as a magnitude bound) instead. Specification of time bounds on completion of expressions allows distinction of those expressions from regular expressions, thereby allowing differing interpretation. Again, the specific values of the time or magnitude bounds (for any user action) can be different based on user preferences, which user gesture the user action is being used in, the location of occurrence in the user gesture where it is used and any other criteria. Further, some embodiments can provide user interface to allow the user to change these bounds based on their preference. The use of bounds on magnitude and/or total time duration of a user action pattern can not only allow definition of richer set of user gestures, but can also help in distinguishing intentional/purposeful motions of the user from unintentional/purposeless actions. When the user is educated in these concepts, they are able to perform them in a fashion that the number of false negatives as well as false positives encountered by the control system are greatly reduced. This ultimately can enhance the utility and usability of the controller/control system.

Note: Some of the referenced documents refer to TMB actions as “Quick” actions. Although the terms TMB or “Quick” are meant to represent time and magnitude bounds on the action, and they are not meant to impose any limitations as to what the actual values of the time bounds should be. Therefore, for example, in one embodiment, a TMB or Quick action may be prescribed to have an upper time bound of 0.5 seconds, whereas another TMB or Quick action may be prescribed to have an upper time bound of 50 seconds.

Figure 5:
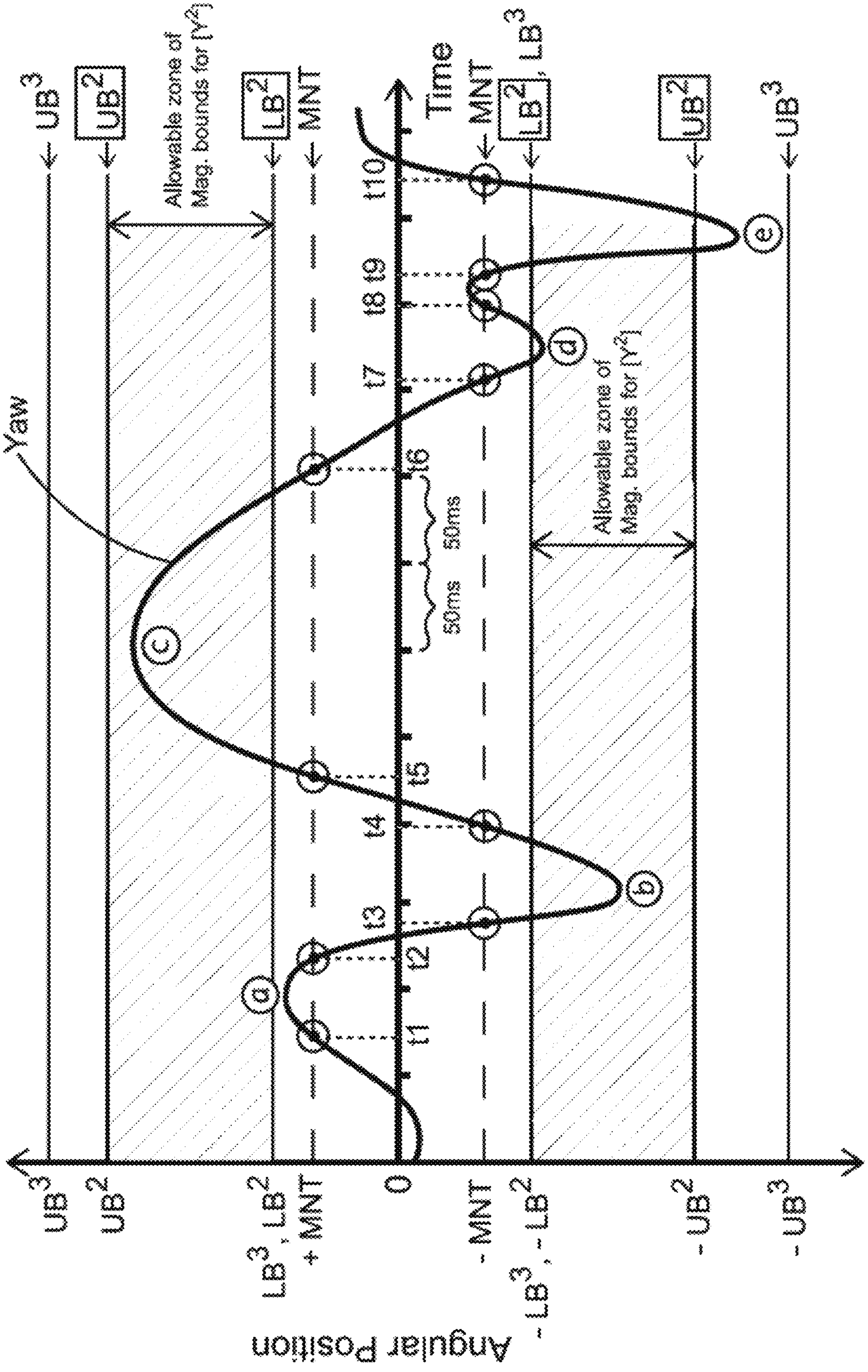
FIG. 5 illustrates exemplary Time and Magnitude Bounded User Actions.

FIG. 5 depicts an illustrative example of variation of monitored Yaw Angular Position “Y” (measured with respect to a baseline reading) plotted against time axis. The +/−MNT lines indicate the Motion Noise Threshold for Y angular position. The +/−$LB^2$ lines indicate lower magnitude bounds and the +/−$UB^2$ lines indicate the upper bounds of an illustrative “[$Y^2$]” representation (that represents a TMB Y angular position pattern). The regions +$LB^2$ to +$UB^2$ and −$LB^2$ to −$UB^2$ represent allowable zones within which the peak magnitude of a particular position pattern needs to fall within to be recognized as a potentially matching position pattern with the above representation. Let us assume that for this example, the time bounds are 50 ms and 150 ms. (That is, the duration of the Y should be at least 50 ms and be no more than 150 ms to satisfy the time bound requirements.) Then the position pattern (a) that starts at time t1 and ends at time t2 falls within the time bounds of the “[$Y^2$]” representation but fails to fall within the magnitude bounds (since the max absolute magnitude between time t1:t2 is less than $LB^2$). Pattern (b), on the other hand, starts at time t3 and lasts till time t4, has duration >=50 ms but <=150 ms and has the peak magnitude that falls in the allowable zone. Therefore, pattern (b) can be recognized as a match with the “[$Y^2$]” representation. Pattern (c) from t5:t6 satisfies the magnitude bound but fails to satisfy the time bound since it lasts for longer than 150 ms. Pattern (d) satisfies the magnitude bound as well but fails to satisfy the time bound by being too short in duration. Pattern (e) satisfies the time bound but has peak magnitude that does not lie within the magnitude bounds and therefore does not match the “[$Y^2$]” representation either. However, Pattern (e) does match with “[$Y^3$]” representation assuming that that representation has the same time bounds as the “[$Y^2$]” representation and $LB^3$ is same as $LB^2$ in value and $UB^3$ is greater than $UB^2$ (as shown in FIG. 5).

Note: In FIG. 5, pattern (b) also qualifies to be a match with “[$Y^3$]” representation as the absolute peak value of (b) is within the magnitude bounds $LB^2$:$UB^2$ as well as $LB^3$:$UB^3$. Some embodiments can remove overlap between two magnitude bounds. In this example, overlap between “[$Y^2$]” and “[$Y^3$]” can be removed by setting lower bound $LB^3$ to be equal to or greater than upper magnitude $UB^2$.

Note: While the illustration in FIG. 5 uses Yaw Angular Position, the same principle can be used with any other body positions or motions, including rotational and translational positions of any body part. Furthermore, the same illustration can be used to demonstrate the TMB concept with other user actions by substituting “Angular Position” by other measures of user action such as level of a facial expression, amount of pressure applied to an input mechanism, level of brain waves, meditative or attentive levels (as measure by measuring brain waves), level of stress/tension or electrical activity detected in a particular set of muscles, or any other suitable measure.

Figure 6:
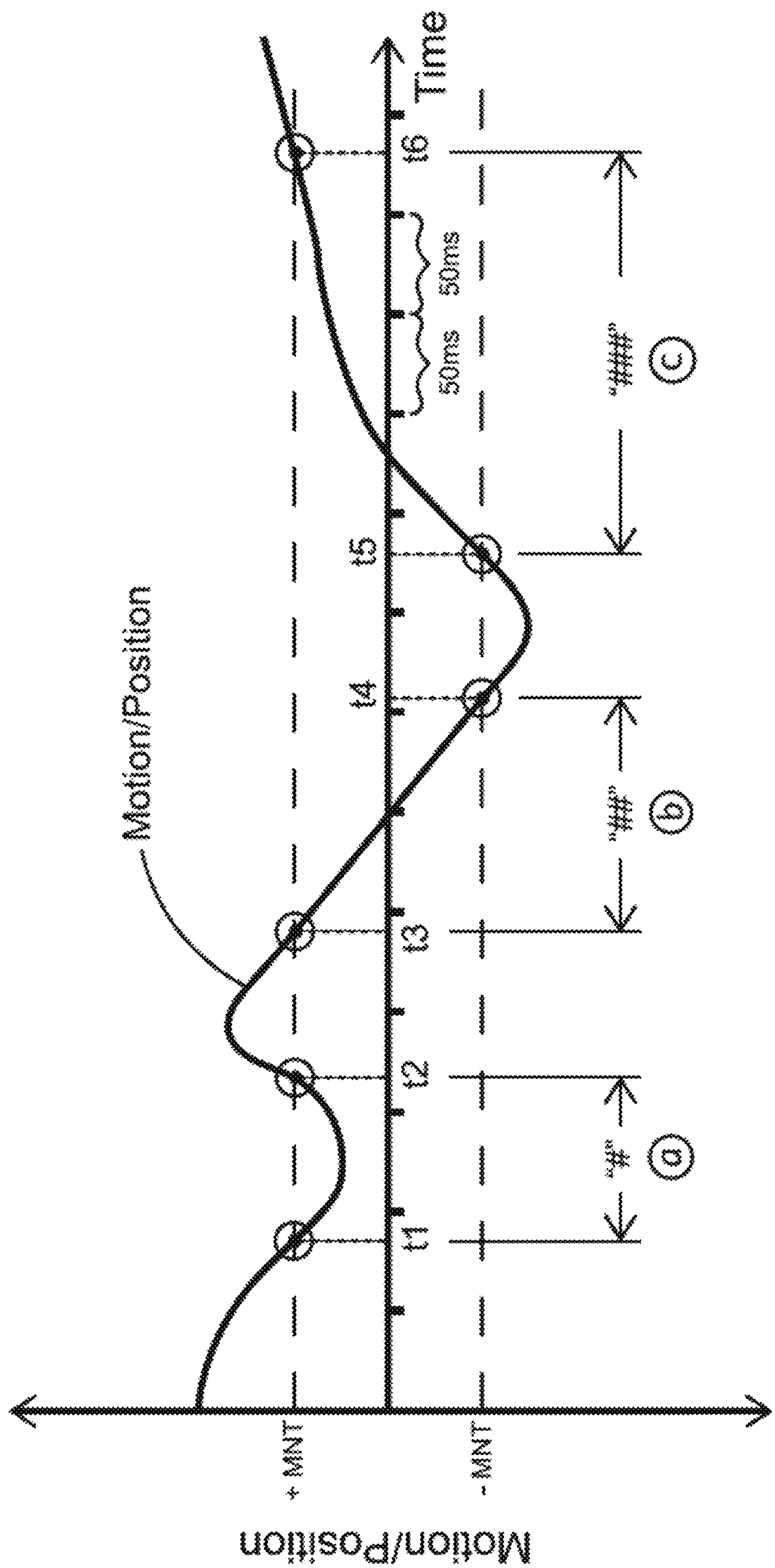
FIG. 6 illustrates exemplary Periods of No Motion.

As mentioned before, the symbol "#" represents a time period of No Motion for at least a first threshold amount of time within a specific user gesture. Further, the symbolic representation "##" indicates a period of No Motion where no significant motion is detected for at least a second threshold amount of time, wherein this second threshold can be larger than the first threshold amount. Similarly, time periods with No Motion for even higher amounts of time can be represented by "###", "####" and so on. Note that every user gesture may define its own values for these time thresholds; that means the time duration for "#" in one user gesture may not be the same as "#" in another user gesture and so on. See FIG. 6 for an illustrative example of various periods of No Motion, where "#" represents a period of No Motion with a (minimum) threshold time duration requirement of 45 ms, "##" with a threshold of 100 ms and "###" with a threshold of 125 ms. The Y-axis can represent either motion or position readings (measured relative to baseline) and the X-axis represents time. Period (a) going between t1:t2 shows insignificant motion/position readings (i.e. below the MNT), and since t1:t2 is longer than 45 ms but less than 100 ms and 125 ms, it can map to only "#" period of No Motion. Similarly, period (b) (going from t3 to t4) can map to "##" and period (c) (going from t5 to t6) can map to "###". Some embodiments can match period (b) to "##" as well as "#", and period (c) to "#" as well as "#" and "#". Further, some embodiments may make the above mapping decisions based on user gesture by user gesture basis, user/system preferences, controlled device type or any other criteria.

Note: The value of MNTs can vary between various user gestures. Further, even within the same user gesture, MNTs can have different values for motions along different axes. Further, these MNTs can be different for motions of different parts of the body. Therefore, for example, the MNT for motion of a user's hand along the X-axis may be different from MNT for motion of the user's hand along the Y-axis even within the same user gesture. Similarly, the MNT for motion of hand along an axis may be different from MNT for motion of head along the same axis, even within the same user gesture.

Figure 7:
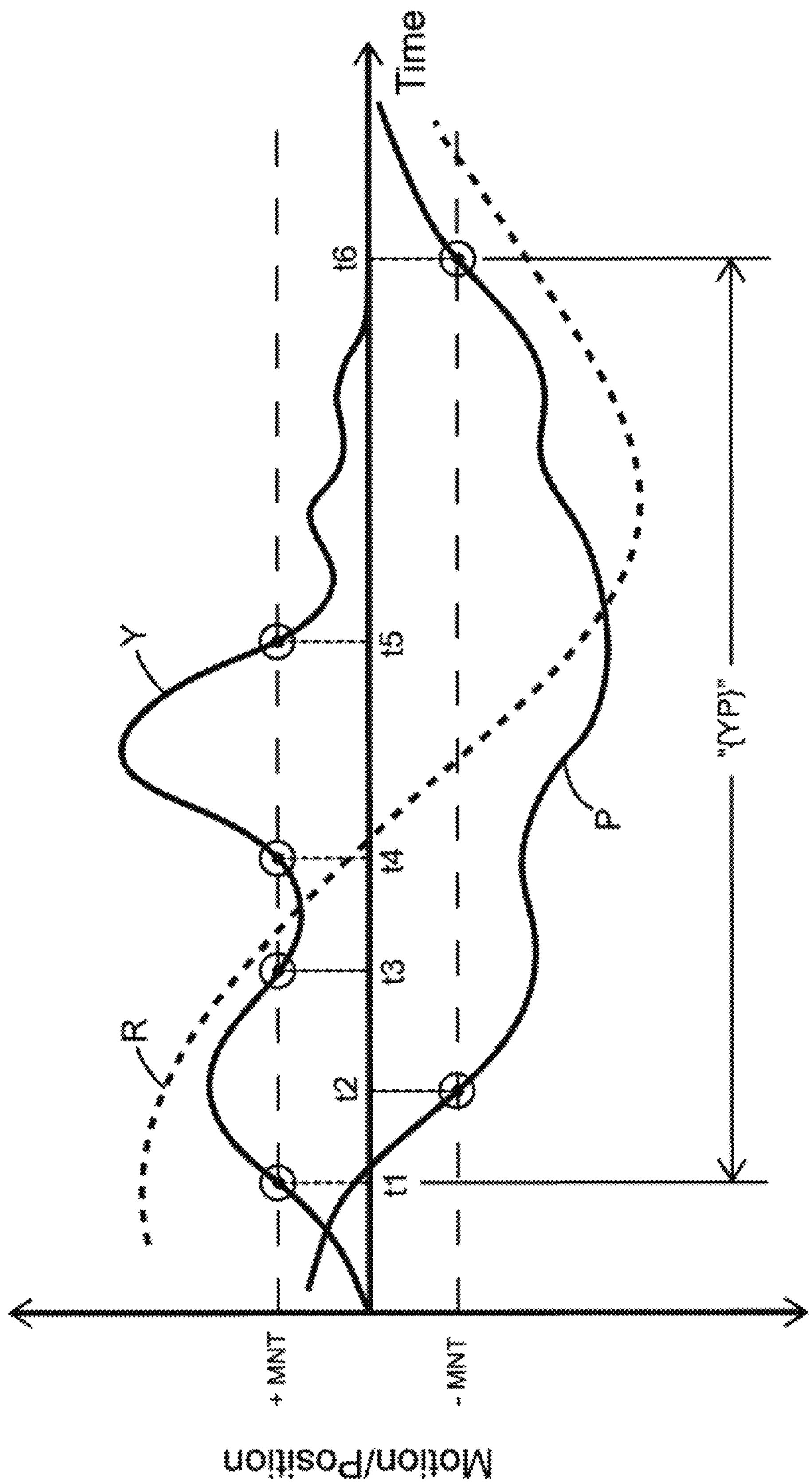
FIG. 7 illustrates an exemplary User Action Pattern Matching "{YP}"

Some embodiments of the control software/control system can generally look for presence of constituents of motions and/or expressions that define a user gesture, and can ignore anything that is not explicitly present in the symbolic representation of that user gesture. Therefore, for example, if a control system is only looking for a user gesture represented by the representation "{YP}", then even when a combination of Y, P and R motions is detected (where Y and/or P are continuously detected but R is detected at least for some time during the period of Y/P), the system can still tag that time period as matching "{YP}" pattern; the system can thereby effectively ignore the R motion as superfluous or irrelevant for the purposes of detecting user gesture {YP}. (Needless to say that if the system was also looking for {YPR} user gesture at the same time then the above experienced motion/position pattern would be mapped to the {YPR} user gesture.) See FIG. 7 for an illustration of this behavior. The Y pattern (Yaw) is detected only in the time periods of t1:t3 and t4:t5. The P pattern (Pitch) has significant values only during time period t2:t6. However, together, Y and/or P are beyond the MNT thresholds (i.e. detected to be active) continuously from t1:t6, and hence that becomes the time period when the Y and P patterns considered together match the motion representation "{YP}". Note that R is present for significant portion of the time duration of the "{YP}" motion, but is effectively ignored in this embodiment for the purposes of monitoring for motion/position patterns that can match with the representation "{YP}". In a variation, some embodiments can require that no other superfluous motions or positions be present other than those explicitly stated in the representation of the user gestures. For example, in such embodiments, if the system is looking for a {YP}, then any presence of R during the Y or P motion can disqualify those segments of time when R is also active. The required absence of a particular motion/position/expression/action can be represented by a superscript of 0. Therefore a {YPR$^{0}$} represents a duration of time when at least a Y or P is detected, but no R.

The types of motions/expressions that are monitored for matching the "#" pattern of motion within a user gesture can be based on what kind of motion types are specified in the complete representation of the user gesture. For example, if a user gesture is (completely) represented by the pattern "<S #{YP} S>", then the No Motion time period (that is one represented by "#") within that user gesture represents a period wherein there is no active Y or P motion is detected for at least a specified time threshold. Then, even if some amount of R motion is detected during the period of No Motion, since R motion is not part of this user gesture, it can be ignored by the system when matching this period of time to the "#" part of this user gesture.

Fixed Length Blackout Period—The symbol "*" indicates a time period of a specified fixed duration during which any motions/positions/expressions are ignored for purposes of gesture recognition. The duration of this time period can be set to a different amount based on the user gesture this time period occurs in and the location where it occurs within the definition of user gesture. This time period is called the Fixed Length Blackout Period (FLBP). FLBPs can provide convenience to user in performing the user gestures, and they can be optional based on skill level of the user. Their lengths (durations) can be changed based on user preference or even be set to zero.

Variable Length Waiting Period—The symbol "~" indicates an indefinite period of time where all motions/positions and/or expressions are ignored by the system with the exception of the one specified to terminate this period. This period could be interpreted as a waiting period where the system is looking for a specific motion/position/expression to be detected and can ignore everything else until that motion/position/expression is performed. This "~" will be called Variable Length Waiting Period (VLWP). The motion/position/expression that a VLWP waits to detect is specified right after the VLWP in the representation/definition of the user gesture. For example, the representation "~R" indicates a time period of indefinite duration where all motions/expressions are ignored until up to a point in time when a "R" motion (Roll) is encountered. In this example, "R" is the "terminating" action for the VLWP.

Figure 8A:
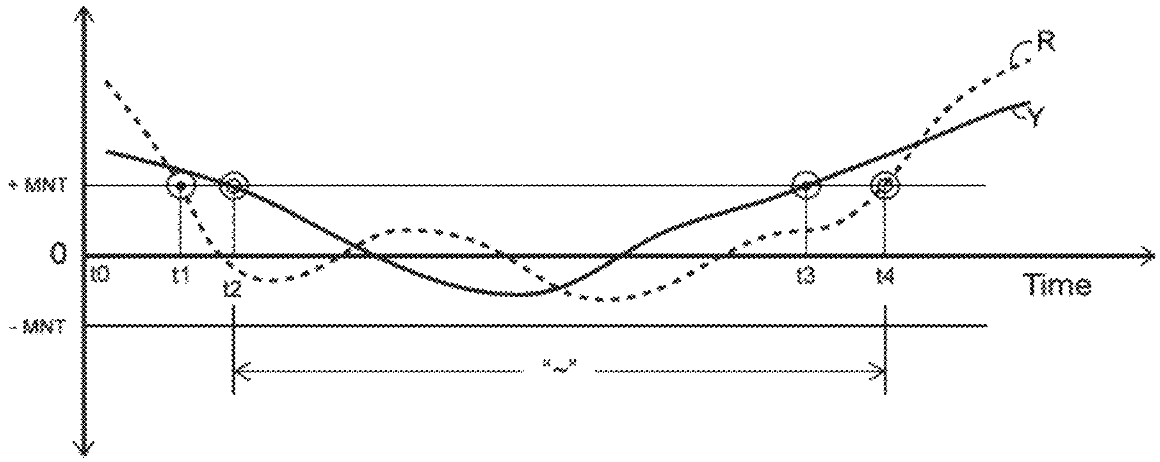
FIG. 8A illustrates exemplary Y (yaw) and R (roll) Body Action Patterns over time to illustrate how VLWP (represented by the symbol "~") works, and in particular shows a pictorial representation of a portion of "Y~R" user gesture.
Figure 8B:
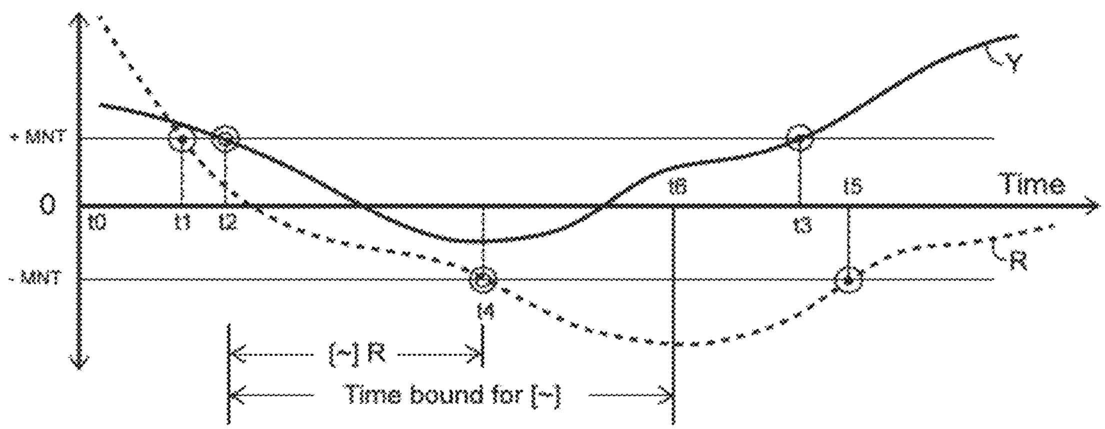
FIG. 8B illustrates exemplary Y and R Body Action Patterns over time to illustrate how VLWP works, and in particular shows a pictorial representation where the R value falls outside the MNT range within the time bounds for VLWP, "[~]"
Figure 8C:
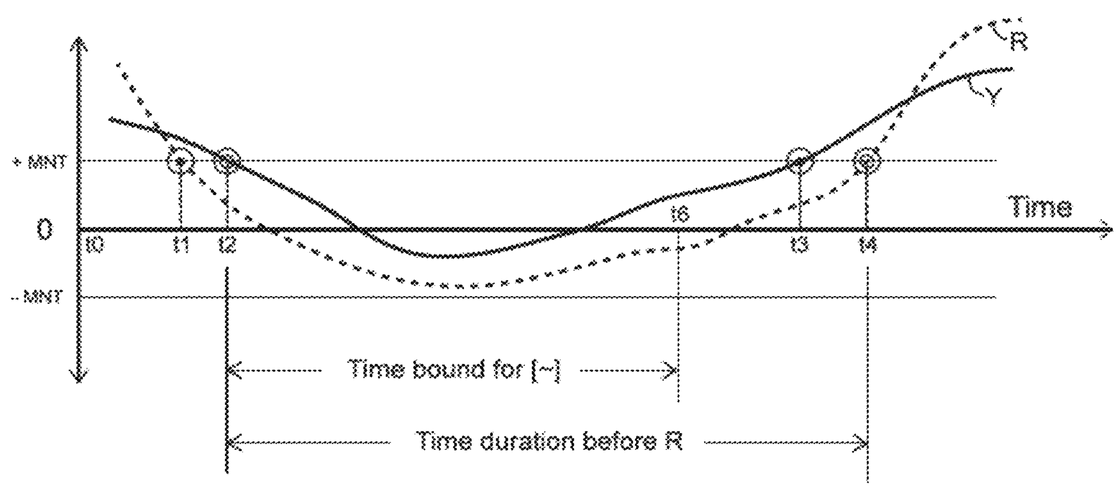
FIG. 8C illustrates exemplary Y and R Body Action Patterns over time to illustrate how VLWP works, and in particular shows a pictorial representation where the R value does not fall outside the MNT range within the time bounds for VLWP, "[~]"

Refer to FIGS. 8A, 8B and 8C. These three figures show an illustrative example showing variation of Y and R motion/position with respect to time for purpose of illustrating how VLWP can work. For purpose of simplicity, both Y and P are shown to have the same MNT values. FIGS. 8A, 8B and 8C, all depict a pictorial representation of a portion of "Y ~R" user gesture. At time t0, the system is assumed to be in a state where it has already recognized "Y" part of the user gesture and is actively monitoring Y motion/position and ignoring other motion/position variations such as R.

(Therefore when R drops to below MNT at time t1, the system ignores that event.) The Y motion/position falls to below the MNT at time t2 (that is, Y comes to an end at t2) and the system recognizes that and starts monitoring for the next part of the user gesture, which is a VLWP represented by the "~R" in the user gesture. Starting time t2, the control software/system can start ignoring all other motions/positions until it encounters R motion/position that is greater than the MNT (that is, to become active). Therefore, even if the Y restarts at time t3, that is ignored by the system, and the system continues to wait for R motion to be become active (i.e. to attain absolute value greater than the MNT). Finally, when R is started at time 14, that is when the time period between t2 to t4 is matched by the system with the "~" part of the "Y ~R" user gesture. After time t4, the system starts monitoring for the end of R motion (not shown in the figure) to determine the end of the user gesture "Y ~R". FIGS. 8B and 8C show how the system can behave when time bounds are used with VLWP, and are explained below.

Time Bound VLWP—The symbolic representation "[~]" represents a VLWP that cannot exceed specified maximum time duration and cannot be less than the specified minimum time duration. Note that the lower bound can be set to zero for a particular or even all user gestures. The representation "[~] R" can indicate a time period where all motions/expressions are ignored until up to the point in time when a "R" motion is encountered before or immediately after the specified maximum time limit is reached. Therefore, for example, if the upper bound on "[~] R" in a particular embodiment was 500 milliseconds (ms), then this VLWP will be said to be terminated if an R motion was encountered at 200 ms (from the beginning of the VLWP). However, if no R motion was detected for the entire duration of 500 ms or immediately after the end of 500 ms, the system can stop looking for the VLWP and determine that the specified VLWP (I.e. the "[~] R") was not encountered. Therefore, even if an "R" motion is detected after more than 500 ms, that pattern of motion may not be recognized as one matching with the representation "[~] R". Refer to FIGS. 8B and 8C for illustration of how one embodiment system can match a motion/position pattern with a "Y [~] R" gesture. Monitoring for a VLWP is kicked off at t2 (as explained in previous section) however with a difference that in FIGS. 8B and 8C, the system is looking for R within a time limit of "Time bound for [~]" as illustrated in the figures. In FIG. 8B, the R value does fall outside the MNT range (meaning that R is started/detected to be active) at time t4, which is within the time bounds of the "[~]" part of the user gesture (indicated by time period t2:t6). The system therefore can match the time period t2:t4 as a successful match with the time bound VLWP in the user gesture. In contrast, in FIG. 8C, R is started at t4, which does not fall in the expected time bound range (that is during the period t2:t6). Therefore, the motion/position pattern of FIG. 8C does not match with the user gesture "Y [~] R". In this case, the system can restart looking for the user gesture, all over again from the beginning of the user gesture (i.e. the "Y" part of the user gesture). This can include clearing the motion/position/expression information stack or list.

Figure 47:
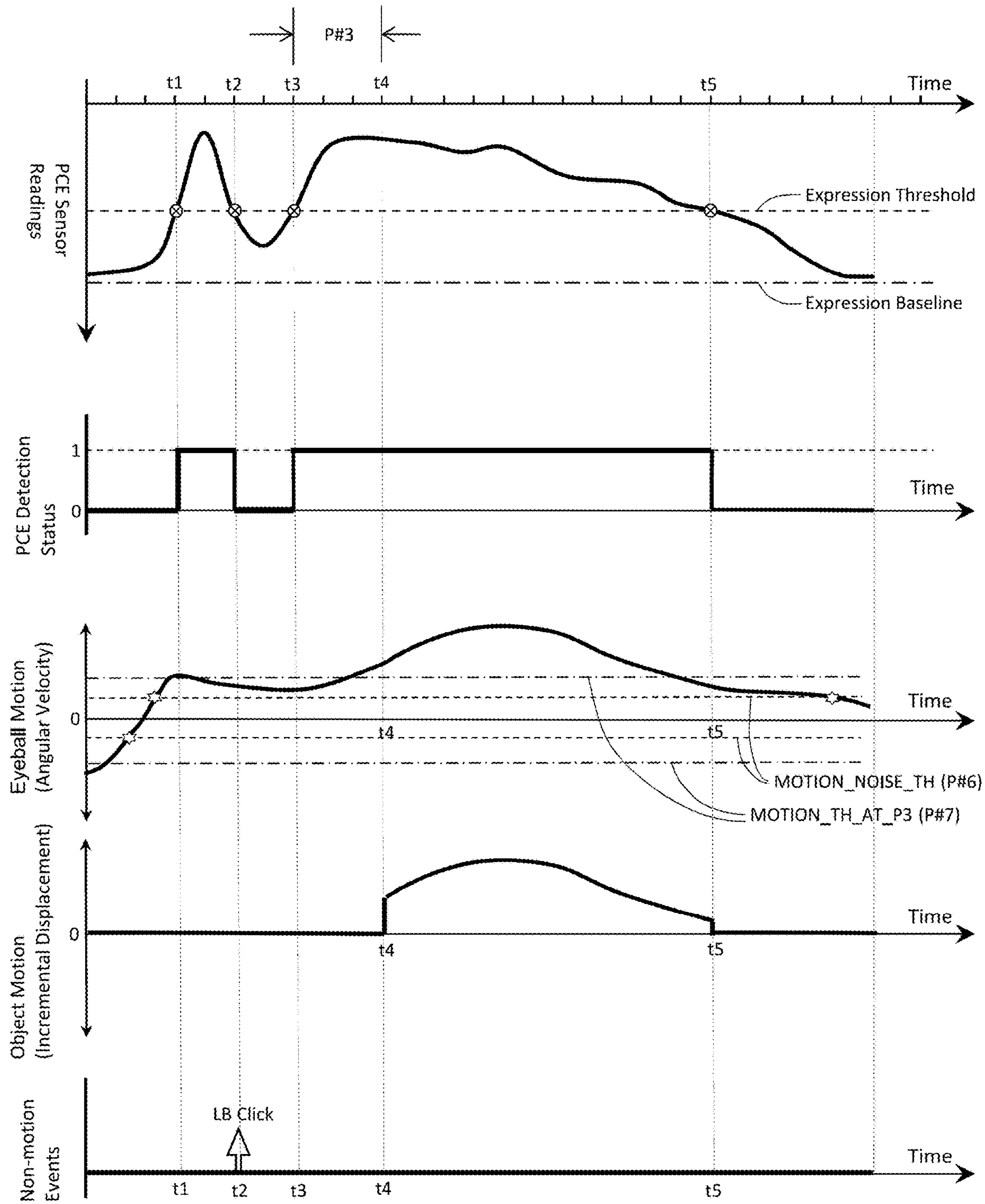
FIG. 47 depicts OOI Motion heuristics with the Eyeball/Gaze tracking in an embodiment of the controller.

FIG. 47 shows exemplary control graphs for an exemplary embodiment using eyeball or gaze tracking for purpose of achieving OOI motion on an electronic device. The overall OOI motion heuristic is explained in U.S. patent application Ser. No. 13/418,331. The PCE Sensor reading graph and the PCE Detection status are as explained in the above mentioned patent application. The third graph (from top) shows Eyeball Motion. The OOI motion does not start unless P #3 amount of time is elapsed after the initiation of a Primary Control Expression (PCE) such as a smile, eyebrow raise, jaw drop, frown, mouth open, mouth pout, etc. (Note: P3 and other parameters are explained in the above mentioned patent application.) The motion of the OOI starts at time t4 and then continues in accordance to the motion of the eyeball and terminates when the user stops the facial expression. In another variation, motion of the OOI starts and continues starting at time t4 in accordance with the eye gaze information itself and terminates when the user stops the facial expression (PCE). This means that in this scenario, at time t4, the OOI can jump to where the user is looking at that time. From that time, the OOI can continue to follow the gaze until time t5 when the OOI motion is stopped (as the PCE is terminated). If the gaze leaves the bounds of the display screen before time t5, the OOI can stay at the last location within the bounds of the screen until the point in time when the user's gaze comes back to be within the bounds of the screen. If the PCE is still active, the OOI then can start moving in accordance to the gaze, however, other variations are possible where the motion of the OOI is disabled once the gaze leaves the screen and not reinstated when the gaze returns to be within the bounds of the screen.

In other variations, different commands can be invoked when the gaze leaves the screen with the PCE still active. For example, starting a PCE/PCM when the gaze is in the middle of the screen, but leaving the bounds of the screen from the right edge if the screen could be taken to mean a "swipe" gesture (similar to a swipe gesture done on touch screen of a phone or tablet, etc.) in the right direction. Similarly, leaving the screen bounds when the PCE/PCM is active from other edges or corner areas of the screen can lead to other commands (such as, but not limited to) swipe left, swipe up, swipe down, Go back/forward, Page Up/down, etc. The invocation of such commands can be made conditional on how far or how fast the gaze or eyeball is moving before/during/after crossing the bounds of the screen. For example, one embodiment can require that the gaze leaves the screen with at least the angular velocity of 30 degrees/second for that departure to be interpreted with any special significance. (Note that other measures of motion can also be used such as translational velocity/acceleration of the gaze, angular acceleration, etc.) Further, different ranges of velocity/motion can lead to different commands. So, if the gaze leaves the screen area from the right edge at angular velocities between 30-90 degrees/second that could be interpreted as a scroll/pan to the right command. However, if the angular velocity is more than 90 degrees, it can be treated as a right swipe. In a further variation, once a command is initiated by moving the gaze out of bounds, the OOI motion can be disabled even if the gaze returns within the bounds while the PCE/PCM is still active, however, the initiated command can be reinitiated automatically at periodic intervals as long as the PCE/PCM is held active (without having to keep on moving the gaze outside the bound). Some embodiments can have commands invoked based on activation of a PCE/PCM and gaze on a particular region within the bounds of the screen. For example, if the user looks towards to the bottom part of the screen, the screen can start scrolling downwards if the user starts a PCE when the gaze is in the bottom part of the screen; the scrolling continues as long as the PCE/PCM is in progress (active). If when the scrolling and PCE/PCM is in progress, the user starts to look at the left side of the screen, then that can stop the down scroll and start a left scroll (or pan) instead. If the user looks at the left corner of the screen and initiates a PCE/PCM, that can start left scroll/pan and down scroll/pan at the same time (and continue till the PCE/PCM is in progress). In some embodiments, different PCE/PCM's can be used to mean different commands as well. For example, if Smile is being used as a PCE to activate/deactivate OOI motion and regular clicks, Eyebrow raises can be used as a PCE to cause a Click-and-Drag by activating the OOI motion upon an eyebrow raise but also sending a Left-Mouse Button Press event just before the OOI starts moving (at time t4) and sending a Left-Mouse Button Release event when OOI motion is disabled at time t5 (just when the PCE is terminated). Using the above illustrative examples, people skilled in the art can realize that different combinations of different parameters such as side or corner of gaze's exit or entry, speed before/during/after exit/entry, time spent outside of bounds (after exit), speed of motion when coming back into the bounds, the place of initiation of PCE (inside/outside the bounds, specific areas of the screens, etc.), types of PCEs, etc. can be combined to define various commands (which in effect can be viewed as eye gestures).

Figure 48:
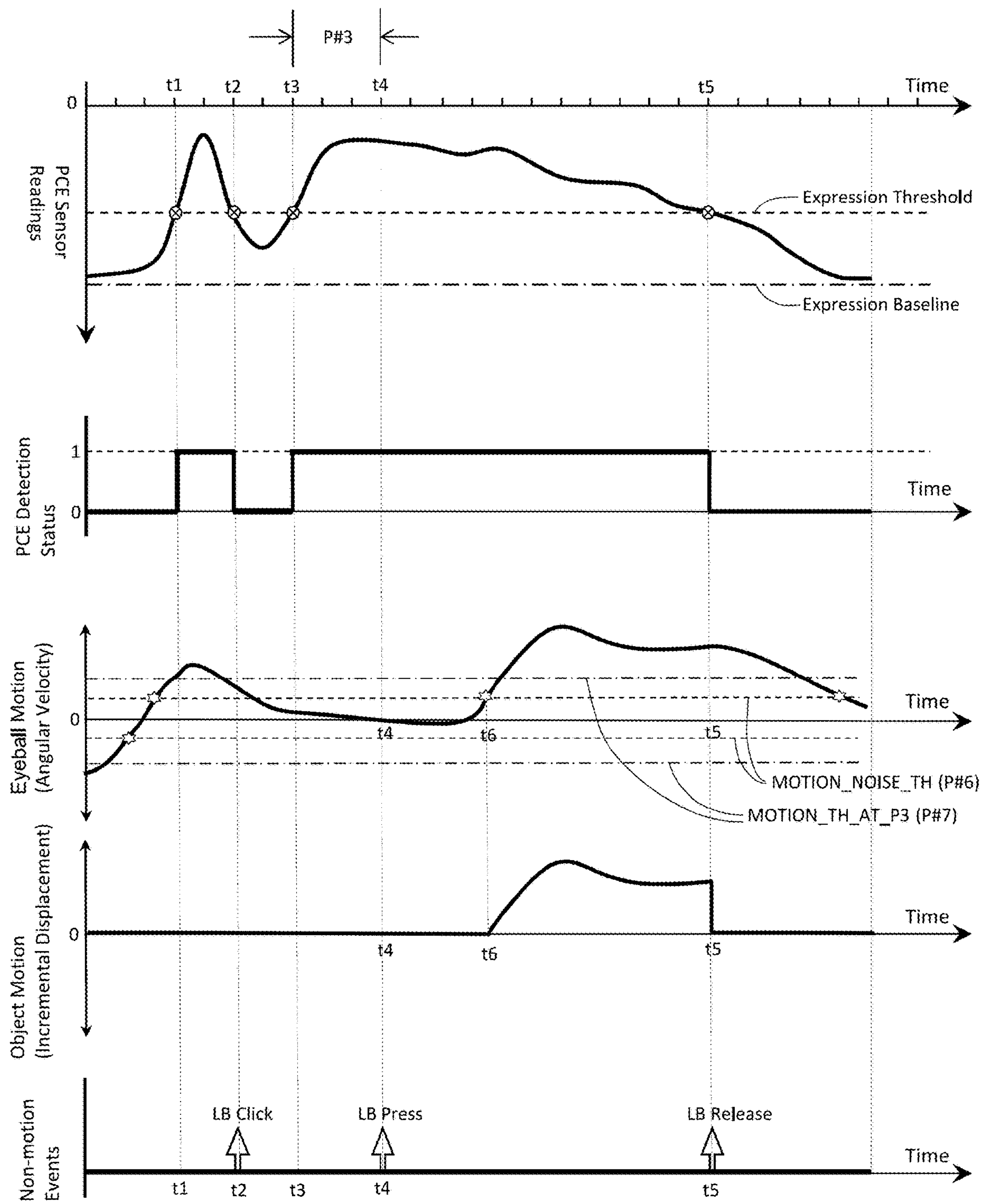
FIG. 48 depicts Click and Drag heuristics with the Eyeball/Gaze tracking in an embodiment.

FIG. 48 demonstrates an embodiment of the Click and Drag heuristics with the Eyeball/Gaze tracking. The user initiates a PCE at time t3 and then holds the eyeball/gaze steady enough that the absolute magnitude of the eyeball motion (angular velocity) does not exceed the value specified by parameter P #7 (Motion Threshold at time P #3 after PCE start) during the time period t3 through t4. Variations of this heuristic are possible wherein the threshold check is done only at one/more specific times during the time period t3 through t4. If eyeball motion during time period t3 through t4 does not exceed P #7 (that is the user's gaze was reasonably steady), then a Left Mouse Button (LB Press) is generated at time t4. (Further variations are possible by checking the cumulative change in gaze direction in the time period t3 through t4 to be within a specified angular displacement threshold, in which case a LB Press event is generated. Similarly, the steadiness of gaze could be ascertained by the user holding the gaze within a specified area on the screen, or any location in space for that matter, during the specified time period (t3-t4 in this example). This specified area could be of any shape or size. OOI motion can start at time t4 and continue in accordance to the eyeball motion until the time the PCE expression ends (shown as time t5 in FIG. 48). Note that similar to the case with head motion, angular motions of the eyeball less than parameter P #6 can be ignored (as shown during time period t4 through t6 in FIG. 48). In a variation, once the OOI motion is started at time t4, the OOI motions keep in accordance to the latest eye gaze direction (instead of instantaneous angular velocity of eye balls) during time t4 through t5. A LB Release event is generated when the PCE is terminated at time t5, thereby completing the Click and Drag process.

Figure 49:
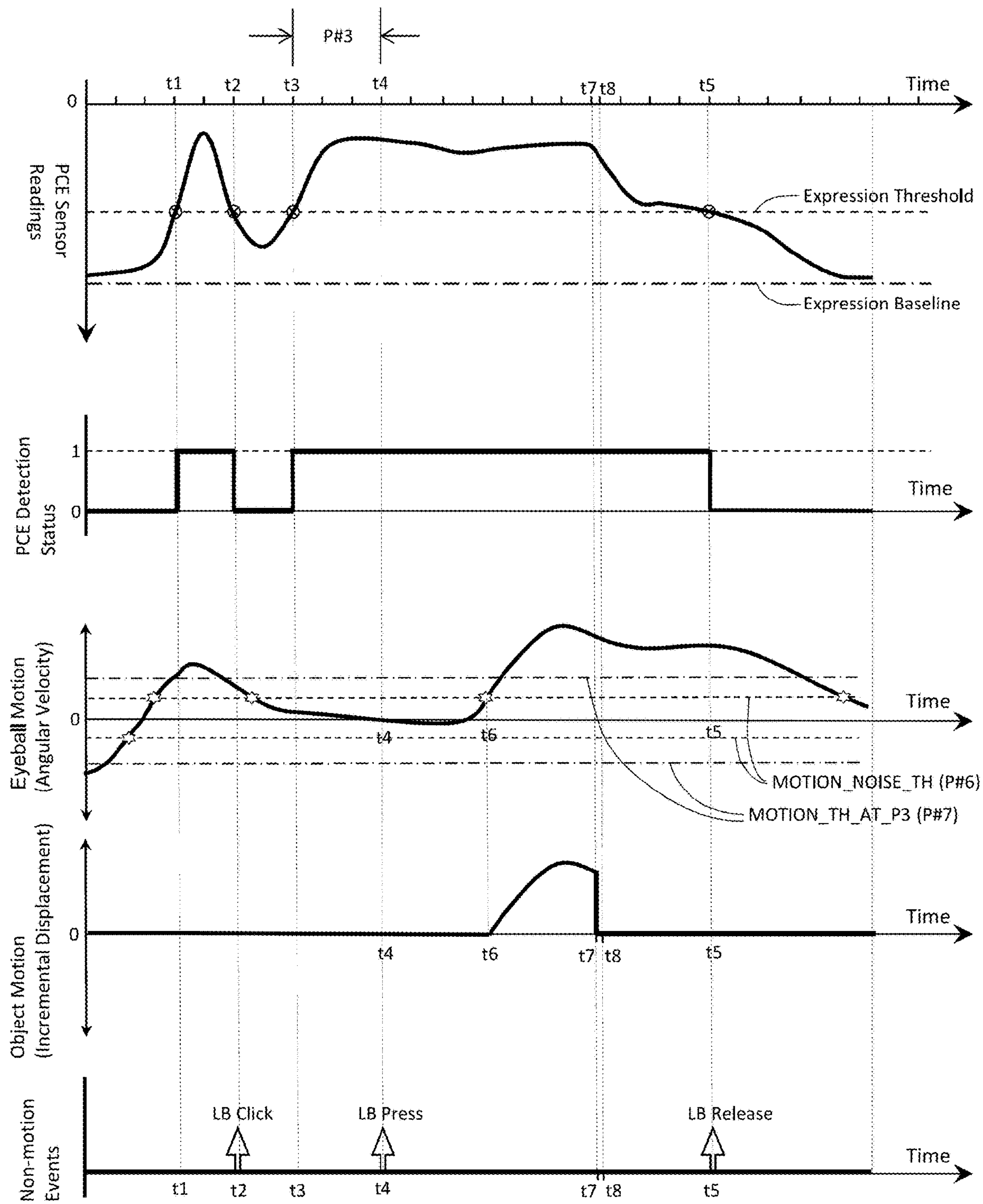
FIG. 49 depicts "PCE Falling Too Fast" heuristics in an embodiment.
Figure 50:
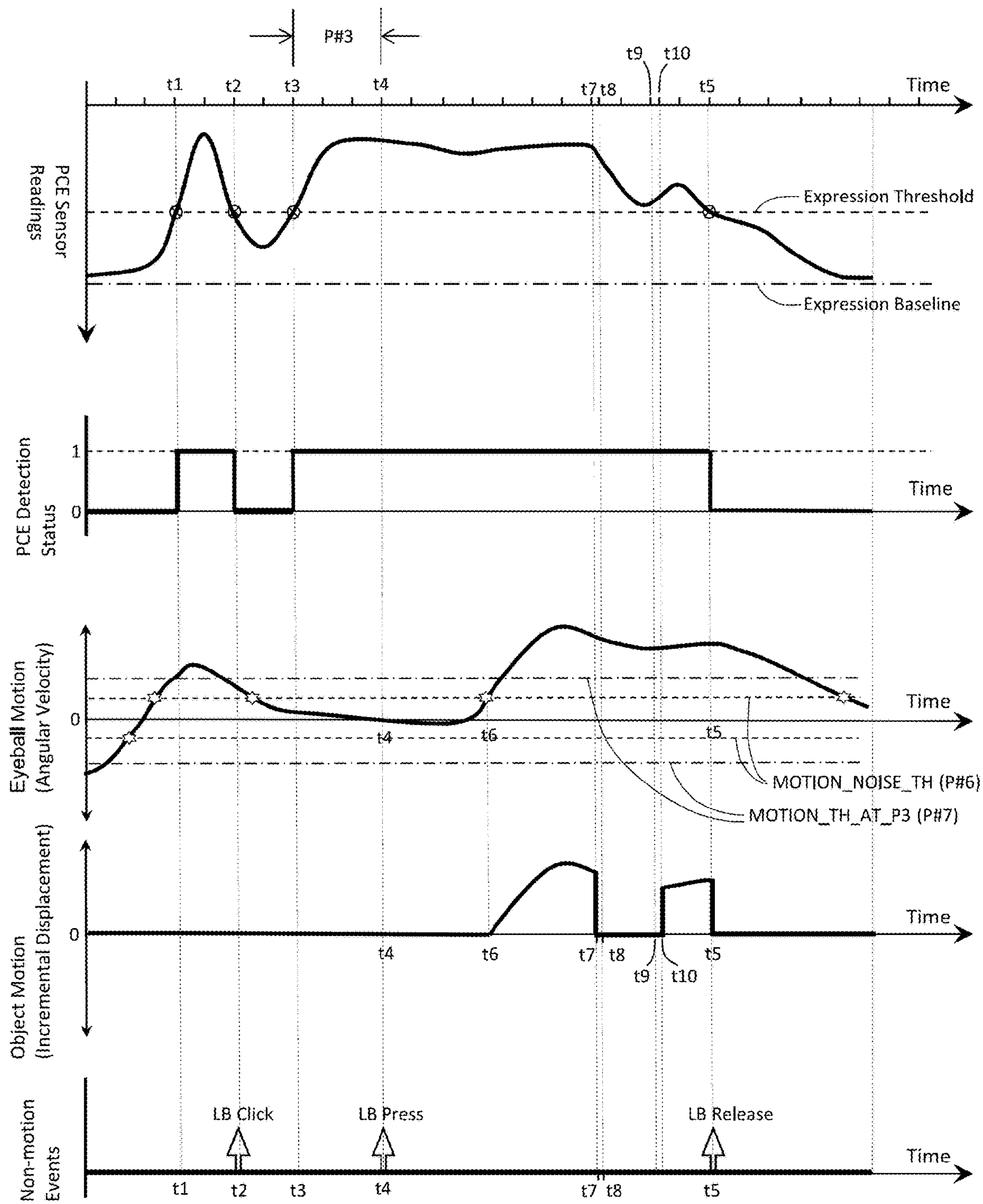
FIG. 50 depicts "PCE Rising Again" heuristics in an embodiment.

FIGS. 49 and 50 illustrate the "PCE Falling Too Fast" and "PCE Rising Again" heuristics. These figures are similar to FIGS. 22 and 23 from the above referenced U.S. patent application Ser. No. 13/418,331, except for the use of "Eyeball Motion" instead of "Head Motion". These heuristics are similar except that they are driven by Eyeball Motion versus Head Motion and the differences and variations as described in the preceding paragraphs.

Figure 51:
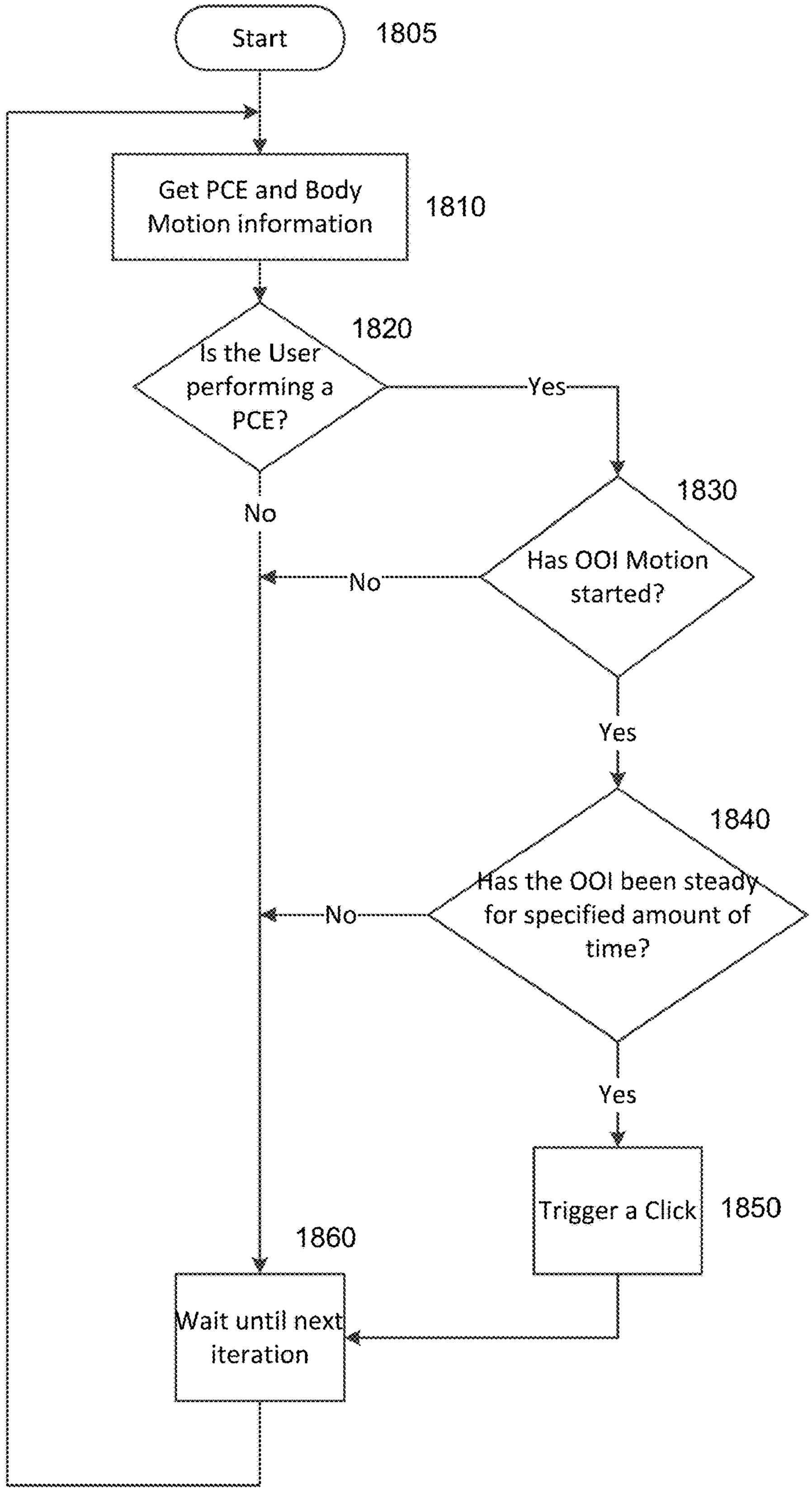
FIG. 51 shows an example of the control flow that can be included in the Control Software of an embodiment of the Controller.

Eye gaze tracking and head tracking systems can utilize dwell-clicking mechanism for selection (clicking). In dwell-clicking, one holds the OOI steady for a specified amount of time for the system to cause a click. Note that this "steadiness" is typically measured by checking if the OOI has been held by the user within certain distance from the initial position or within a specified area of the display screen for specified amount of time. However, this method can cause too many unintentional clicks when a user inadvertently keeps the OOI steady in a part of the screen for more than the specified amount of time. This can lead to user frustration and loss of productivity. Electronic devices can leverage the heuristics described herein where presence of a PCE/PCM could be used to enable dwell-clicking mechanism or any other mechanism(s). In one embodiment, dwell-clicking mechanism is activated/enabled only when a specified PCE is in progress, and is terminated/disabled when the PCE ends. FIG. 51 shows an example of the control flow that can be included in the Control Software of the embodiment of a Controller (as described in the above mentioned US Patent Application) where a PCE is used along with OOI location information, to ascertain a dwell performed by the user is indeed intended to cause a click. (Note that the OOI location information could be derived from OMD/Body Motion information.) The flow starts on step 1805. Step 1810 collects the PCE information and Body motion information (which could be Eye Gaze or Head/Body Motion information). Step 1820 checks if the PCE is currently in progress (that is the user actively making the specified facial expression strongly enough for it to be detected by the system). If the PCE is not currently being performed, the control flow goes to Step 1860 where the system waits for the next iteration to start and goes back to step 1810 to process the next iteration, as well as it can reset the dwell timer. On the other hand, if step 1820 determines that the PCE is being currently performed then step 1830 checks if the OOI motion has been started since the start of this particular PCE. (This effectively checks if time specified by P #3 has elapsed since the start of this PCE, as that is the condition for OOI motion to start.) If OOI motion has not yet started, the control can go to step 1860; otherwise, step 1840 can check if the OOI has been steady for the specified amount of time continuously (this is the dwell check). If not, the control can go to step 1860; otherwise, step 1850 can trigger a click and can reset the dwell time counter. Note that in a variation of this flow, different types of commands (such as single click, double click, right click, scroll, pan, zoom, rotate, etc.) can be triggered at block 1850 based on the length of the dwell time.

Eye gaze tracking and head tracking systems can also utilize blinking or winking to trigger a selection (clicking). Just as dwell-clicking, blink clicking could be combined with a PCE to ascertain user intent (and thereby to avoid unintentional clicks when the user blinks without meaning to click). Further, blinking/winking can also be used along with the PCE for other commands/heuristics. For example, an alternate version of Click and Drag heuristic could be devised as follows. The user starts the OOI motion using head motion/gaze and PCE (as described earlier). However, to cause a Left Mouse Button (LB) Press event (which signifies the start of the dragging process), instead of holding the head/gaze steady, the user can simply blink/wink. This (blink/wink action) can start the Click and Drag process (that is, cause the LB Press event to be generated followed by generation of OOI motion signals based on head motion or gaze). The LB Release event can be generated on the next blink/wink or the end of the PCE (whichever happens first). The LB Release event ends the Click and Drag process. Note that if the LB Release was not caused by the end of PCE (that means the PCE is still active), then the OOI motion continues and the next blink/wink causes another LB Press event thereby starting the next Click and Drag process which ends upon a LB Release event caused by the next blink/wink or end of PCE. This process can continue indefinitely until the PCE is terminated. In a variation of this process, the user could blink/wink a specified amount of times within a specified amount of time duration. For example, instead of a single blink/wink, the user could be required to blink/wink two times within 500 milliseconds to cause the LB Press or LB Release event. Further, similar to blink/wink, other facial expressions that do not interfere with the PCE can be used to cause the LB Press and Release. For example, if the PCE is a smile, then the LB Press/Release can be performed by not only blinks/winks, but also by eyebrow frowns, eyebrow raises and other facial expressions that do not interfere with the performance of a smile (i.e. the PCE in this example).

In some embodiments, eye gaze methods of moving OOI can be used in conjunction with motions of other parts of the body. For example, eye gaze only methods can be used to move and roughly place an OOI on a display screen and then PCE/PCM and OMD (a different OMD other than eye gaze) can be used to fine-tune the placement of the OOI. In another variation, OOI motion can be enabled/initiated when a PCE is initiated and the OOI can be moved in accordance with multiple OMDs such as eye gaze as well as head motion, etc. simultaneously or alternately. For example, the initial motion of OOI can follow eye gaze but then when the eye gaze motion falls below a specified threshold and/or the head/body motion increases above another specified threshold, OOI can be driven by head/body motion instead. In one illustration, OOI can be driven purely by eye gaze till the point that a PCE is started; from this point in time, the OOI motion can be controlled by just the PCE and not the eye gaze. Therefore in this illustration, the gross/large motion of the OOI can be controlled by eye gaze and the fine motion can be controlled by head motion (or any other OMD for that matter). Another illustration of this concept is when the OOI is a scroll-bar (visible or invisible) or all/part of the text/pictures/other matter being displayed in a window on the display screen of a controlled device. The motion of this OOI (which leads to scrolling in this example) can then be made dependent on both the detection of the PCE as well as eye gaze direction value. In other words, scrolling or any other function on the controlled device can be made dependent (or be enabled/disabled) based on occurrence of a specified PCE (at a specified level) as well as eye gaze or head/body pose (or even a gesture). Thereby, for example, scrolling on a tablet or smart phone can be driven by head motion or motion of the tablet or smartphone itself, but only if the user is looking towards the device (or some other specified direction). This concept of using a combination of eye gaze direction and level of PCE/PCM as an enabling or disabling mechanism can be applied to any functions, button, etc. on the controlled device.

In day-to-day use of electronic devices, there are occasions when commands are invoked on the electronic devices without the user really intending to do so. For example, there are times when phone calls are made from mobile phones unbeknownst to the user as buttons get touched or pressed accidentally. Following explanation describes how some heuristics described can help with this common problem as well as many others by use of PCEs/PCMs. In some embodiments users can use PCEs/PCMs to enable or disable any number of buttons or functions on an electronic device. As an illustration, if the facial expression of a smile was the PCE, then the "make a phone call" icon/button on a mobile phone can be conditionally enabled based on the level of smile the user has on their face while attempting to use that "button/icon". (Note that on some electronic devices, it is possible to call someone on the phone by touching their name or other information belonging to them, on the touch screen of the device. For the sake of simplicity of discussion, those areas of the screen that display such information are also implied/included as part of the make-a-phone-call "button/icon".) The camera/image sensor on the mobile phone can capture the image of the user and then image-processing/computer vision algorithms can be used to sense the level of smile on their face. If the smile is determined to be sufficient (that is above a specified threshold or within a specified range), then the "make a phone call" button/icon is enabled so that when the button/icon is touched it would actually attempt to make a phone call. However, if the user was not visible to the image sensor, or looking away (so that their smile was not completely visible) or if their eye gaze was not pointing in a specific direction (e.g. towards a part of the electronic device or surrounding, etc.) or if they were not smiling enough (that is their smile level is not at/beyond a specified threshold), the "Make a phone call" button may be visible but in a disabled state so that even if the user touched the "button/icon", no phone call would be made. In fact, in this example, the button/icon can be hidden on the mobile phone unless the user is smiling enough. Further, when the user is done talking on the phone call, they can be required to perform a PCE/PCM again so that they can activate the "End phone call" button to end the phone call. This illustrates how the heuristic can be used to assure/confirm user intent while using an electronic device. This can be very useful for a multitude of other commands including send email, delete email, delete contact, etc. (with a variety of PCEs/PCMs/combinations thereof) to convey to the electronic device that the user really intends to perform the function and that this command was not invoked accidentally without the user knowledge or intent. Further, this can also streamline user interfaces for electronic devices where the need for asking for user confirmation upon the attempt to invoke certain commands can be alleviated. For example, if the user attempts to "Delete a Contact" while performing the appropriate PCE/PCM at the appropriate level, they may not be asked to provide any further confirmation of their intent. Some embodiments can also provide feedback mechanisms using visual, auditory, tactile, haptic, olfactory, etc. indicators regards to the level of PCE/PCM sensed (as performed by the user) as well as if that is sufficient enough to enable certain commands. Certain commands may require even multiple PCEs/PCMs to be active at the same time to provide confirmation of intent. For example, to delete an email just one PCE (e.g. smile) can be required, but to delete a contact the user can be required to smile and raise their eyebrows at the same time. Further, parameter P #3 (TIME_TO_HOLD_PCE_BEFORE_MOVEMENT, as explained in the above mentioned US Patent application) can be specified on a command by command basis or even on a PCE by PCE basis. Therefore, certain commands/functions can require the PCE (s/PCMs) to be held longer than for other commands/PCEs/PCMs before the command/function can be enabled. On the flip side, a new parameter can be defined that can dictate the amount of time an enabled button/function/etc. can stay enabled even after the completion of PCE/PCM. This can allow prevention of accidental disablement of the command/function if the user happens to look/step away. (Please also refer to concept of "PCE/PCM Stickiness" described later in this document, as that can be also used for enablement/disablement as described here.) Further, as explained elsewhere in the document, a different threshold can be set for enabling versus disabling that can further allow user convenience. In yet another variation, raising a hand can be a designated PCE/PCM, and smile can be another designated PCE/PCM. In this case, enabling a particular command button can be made conditional on the user not only smiling but also raising their hand simultaneously. Similarly, the motion/position of eyeballs (including direction of eye gaze) can also be used as the sole PCM or an additional PCM. Therefore, for example, the "make a phone call" function can be enabled/activated only if the user is looking at the smart phone (the controlled device), or alternatively, the user is looking in a particular direction (by means of combination of head pose and eye gaze direction) as well as simultaneously performing the specified PCE (such as a smile, etc.). Scrolling, Swiping and other functions can also be similarly activated based on presence of combination of a PCE and eye gaze/head pose. Another example can be where the voice recognition function of the controlled device is activated based on a combination of a PCE (Smile, eyebrow raise, etc.) and OMD (such as eye gaze, head motion/pose, hand raise, etc.) It will be obvious to persons knowledgeable in the art that a multitude of combinations of PCEs or PCMs can be used to enable or disable or trigger multitude of commands/functions (software or hardware)/accessories/ etc. that may or may not use OMDs for their execution.

The concept of using combinations of PCEs/PCMs to enable certain functionality can be used for activating certain hardware components. For example, if the designated PCE is a smile, then a laptop computer may not activate its keyboard until the user is facing the laptop and has a smile on his/her face for certain amount of time and/or looking in a particular direction (such as towards the computer). Once activated, the keyboard can be made to stay activated as long as the user is in front of the laptop, without necessarily having that same level of smile that was required to activate the keyboard. However, if the user starts frowning with mouth, or just steps away from the laptop, the keyboard can become inactive. This can even encourage users to smile more often. Note that a neutral expression can also be treated as a type of expression that can be used as a PCE. Therefore, for example, a keyboard or any hardware or command for that matter, can be enabled on a neutral expression from the user, and the command can be disabled on a frown or even a smile. The neutral expression requirement may be sufficient as a confirmation for many commands as the mere presence of the user in front of the electronic device (or in front of a camera) may be a sufficient of a confirmation of the user's intent in executing a number of different commands. Further assurance of user intent can also be had based on user gaze. Certain commands can also require further validation by means of user gaze. Certain commands may be activated only if the user is looking in certain direction. For example, clicking or dragging OOI can require the user to look at a part of the controlled electronic device (such as the camera, display screen, etc.), or even just the general direction of the electronic device. Other commands may be activated when the user is not looking in certain direction. For example, when user is playing a video game or taking a test, certain areas of the screen as well as certain button/icon can be displayed only when the user is not looking at them. (This way someone else sitting next to them can see them but the main user cannot see/use them.) The eye gaze direction can be further combined with PCEs and PCMs to be used as confirmation of user intent, enabling or disabling various commands/buttons/functions, affecting visibility of various areas of the display screen of controlled electronic device, or even enabling/disabling various hardware components, accessories, etc.

Other techniques can also be used in combination with or as replacement of all the above mentioned techniques for establishing user intent. In one embodiment, proximity sensors, distance sensors, touch sensors, image sensors and the like can be used to detect if the electronic device close to another object. Proximity/Touch/presence can be sensed at multiple areas on and around the area/surface of the device that holds or displays those buttons/touch sensitive areas. (Image sensors and others can also be used.) Based on the patterns/shapes of sensed areas of proximity and/or touch, it can be deduced if the object close to or touching the device is small as a fingertip or is a larger part of the body (such as palm or entire finger) or something that may not even be a body part. When size of the area where proximity or touch is detected is larger than a typical fingertip, and/or when the shape of the actual area of touch does not resemble typical shape of a fingertip touch, those instances can be flagged as inadvertent selection/actuation for some commands. This approach can be used to detect potential accidental phone dialing attempts made when carrying a phone on the user's body (in a shirt or pant pocket or other clothing items) or even being carried inside objects such as purses, automobile glove compartments, briefcases, or the like, or even when carrying the device in one's hand. Image processing/Computer Vision techniques can also be used to process data from image or other sensor(s) to determine a human hand was involved in actuating a button/input surface on the device. Image sensors can also continuously keep track of objects in the vicinity of the electronic device so it can be determined if hand like object was indeed sensed coming close to the device around the time of selection/ actuation of a button/command/etc. This can provide information for determination of confidence (factor) that the selection/actuation was user intended. Clues can also be derived based on readings from the inertial sensors contained in the device. For example, if the device is experiencing motions that are not typical of ones experienced when user is holding the device to execute certain action (such as making a phone call, deleting contacts, sending emails, etc.), then that fact can also be used to determine/ influence the confidence in tagging a particular touch/activation was indeed intentional. In another variation, if the electronic device is already experiencing non-typical motions (compared to what is expected during normal use) many of the input areas/buttons/etc. of the device can be disabled in advance for approximately the duration of time those motions persist. (The disablement can start after a time delay when the non-typical motions are initiated and continue for certain time even after the non-typical motions end.) Further, it can also be checked whether multiple button/icons/input areas/etc. are being selected/clicked/invoked simultaneously or in very quick succession to each other; as that would be another potential symptom of accidental activation. On the contrary, presence of some other factors can be used to increase the level of confidence that a particular trigger was intentional. For example, if it is detected the user is looking in a particular direction (such as towards the device) then that can give a high (possibly overriding) boost that the touch/button press/trigger was intentional. Note that image sensors (such as cameras, etc.) do not have to be active all the time and be activated within or for a short period after the touch or some trigger is detected. So, for example, if the controlled device was in sleep mode and a button was pressed/touched (e.g. "make a phone call"), the image sensor can be activated at that time to see if for example the user was looking in a specified direction to determine if the trigger was intentional. Using a combination of above checks as well as others techniques/ mechanisms/sensors/etc., confidence factor(s) can be derived (to represent the chance of user intention) and then be used to either enable/disable/trigger some buttons/icons/functions/input areas/etc. on the electronic device for certain periods of time or to decide if the invocation/selection/clicking of those buttons/icons/input areas/etc. can be ignored. User feedback can also be provided to the user when their potentially inadvertent actions are ignored or are being ignored or likely to be ignored in advance of the action(s).

Some controller embodiments can monitor for time periods wherein an OMD and/or OOI motion and/or OOI position is within a specified range(s) of motion or position. Such time periods will be called as Period(s) of Limited Activity (POLA), and their time duration will be called as Duration of POLA (dPOLA). Note that POLA can include time periods where a user is being within a certain specified range of poses/positions (as measured by poses/positions of the user's body/body parts). POLAs can be included in user gestures or can be treated as user gestures by themselves. Further, POLAs can be defined on an OMD by OMD basis and/or on an OOI by OOI basis. For example, if user's head motion is one OMD and eye gaze is another OMD, the user can be performing a POLA with their head but not with their eyes/eye gaze. Furthermore, performing a POLA with an OMD does not necessarily translate into a POLA with an OOI and vice versa. As an example, if the OOI is a cursor/pointer on a computer display screen, even if it is in a POLA on the screen, that does not necessarily mean that the user's body is necessarily doing a POLA, as that is dependent on the user gesture in progress, gain curves, level of PCE/PCM, etc. Similarly, if the user's head was being used for OMD, and the content being displayed in a window on a display screen of a computer was the OOI, the OOI could be moving (scrolling) even though the head motion is within a limited range of motion since the head position (e.g. tilt angle of the head) could be driving the scrolling action at that particular point in time (again, based on the user gesture being used). POLAs can be used as ACUIs as well as Demarcators in user gestures.

Figure 59:
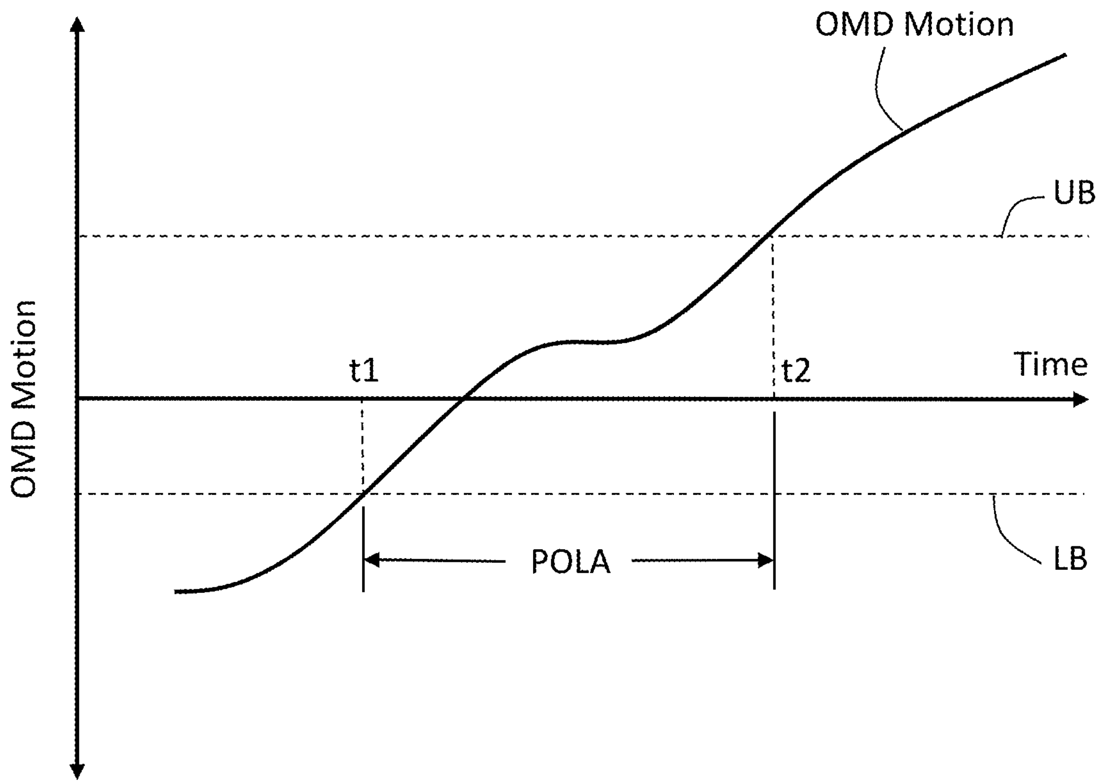
FIG. 59 shows an illustrative example of a POLA in an embodiment of the controller.

FIG. 59 shows an illustrative example of a POLA in an embodiment of a controller. In the figure, UB signifies upper bound for OMD motion magnitude and LB signifies the lower bound. Between times t1 and t2, the OMD motion falls between those bounds and therefore the time period between t1 and t2 is considered to be when that OMD is in POLA.

PCE/PCM Stickiness: FIGS. 47-50 show that OOI motion can be enabled when PCE/PCM Sensor reading is sustained beyond the Expression Threshold for a certain minimum amount of time duration (indicated by P #3). Some embodiments can employ variation of above heuristics wherein if the PCE Sensor reading is sustained for a time duration (called TIME_TO_MAKE_PCE_STICK, designated by parameter P #13), the enabled OOI motion continues in accordance to the OMD even if PCE/PCM Sensor readings fall to back to (or crosses to be within) the PCE Expression Threshold after time t3. This means that if the PCE/PCM Sensor reading is held beyond the Expression Threshold for at least the duration of P #13 (after the start of PCE/PCM), the PCE/PCM can be considered to turn sticky i.e. it can be considered to stay active indefinitely after that point and the OOI Motion can continue in accordance to the OMD indefinitely even after the end of the PCE/PCM that started the OOI motion. (Note that value of P #13 can be set to any value greater than zero or equal to zero. For example, it could be set to be less than the value of P #3. In the embodiments discussed, for illustrative purposes, we will assume it is set to be greater than or equal to the value of P #3.) Once the PCE/PCM is turned sticky, the OOI Motion continues indefinitely even after the PCE/PCM is ended. In this state, the OOI motion can be disabled based on some other event, called the OOI Motion Disabling Event (ODE). One example of an ODE is a POLA performed by the user using a pre-specified OMD and/or by using an OOI. The POLA can use a threshold such as MOTION_NOISE_THRESHOLD or some other defined threshold on motion/position/other appropriate physical quantity. When the time duration of this POLA (dPOLA) equals or exceeds a specified minimum time duration (called as MIN_DPOLA_TO_UNSTICK_PCE, designated by parameter P #14), a sticky PCE/PCM can be unstuck (meaning that OOI Motion can be disabled). Such a POLA is addressed as an ODE POLA. Thus in this illustrative example, OOI motion is started upon a PCE/PCM initiation but ended upon an ODE POLA performed or caused by a designated body part (such as head). The ODE POLA can also be defined in terms of variance of the position of a cursor/pointer/OOI on a display screen of the controlled electronic device. ODE POLA can be also used as an ODE when eye gaze is being used as the OMD. (Note that eye gaze can be viewed as a combination of head pose/position and eyeball pose/position.) Therefore, some embodiments can have OOI motion enabled/started when user starts a PCE such as a Smile, holds that PCE for more than P #13 (to get the PCE stuck) and then continue to move the OOI (without holding the Smile/PCE) using OMD (such as head motion, eye gaze, etc.). When they are satisfied with the position/change in the OOI, they can simply bring the OMD (such as head motion, etc.) to be within the specified threshold for time duration of P #14 (i.e. perform the ODE POLA) thereby bringing the OOI Motion to an end. In an embodiment, when using eye gaze as the OMD, once the OOI motion is started and PCE is ended after it turns sticky, the user can bring the OOI Motion to end by staring (for specified amount of time) at the OOI itself or any other specified direction/area (such as simply away from the screen). In another variation when using eye gaze as OMD, Smile can be used to initiate generation of OOI Motion signals (or any other specified signals for that matter) and end generation of those signals via another PCE such as an Eye Blink.

As mentioned earlier, OOI motion can be interpreted as OOI Modification (where a particular AOI belonging to the OOI is being modified) in the above as well as following discussions. OOI Motion and OOI Modification can be used interchangeably. On the same lines, ODE can be defined as OOI Modification Disabling Event that disables/stops the modification of the OOI as part of a user gesture.

Figure 60:
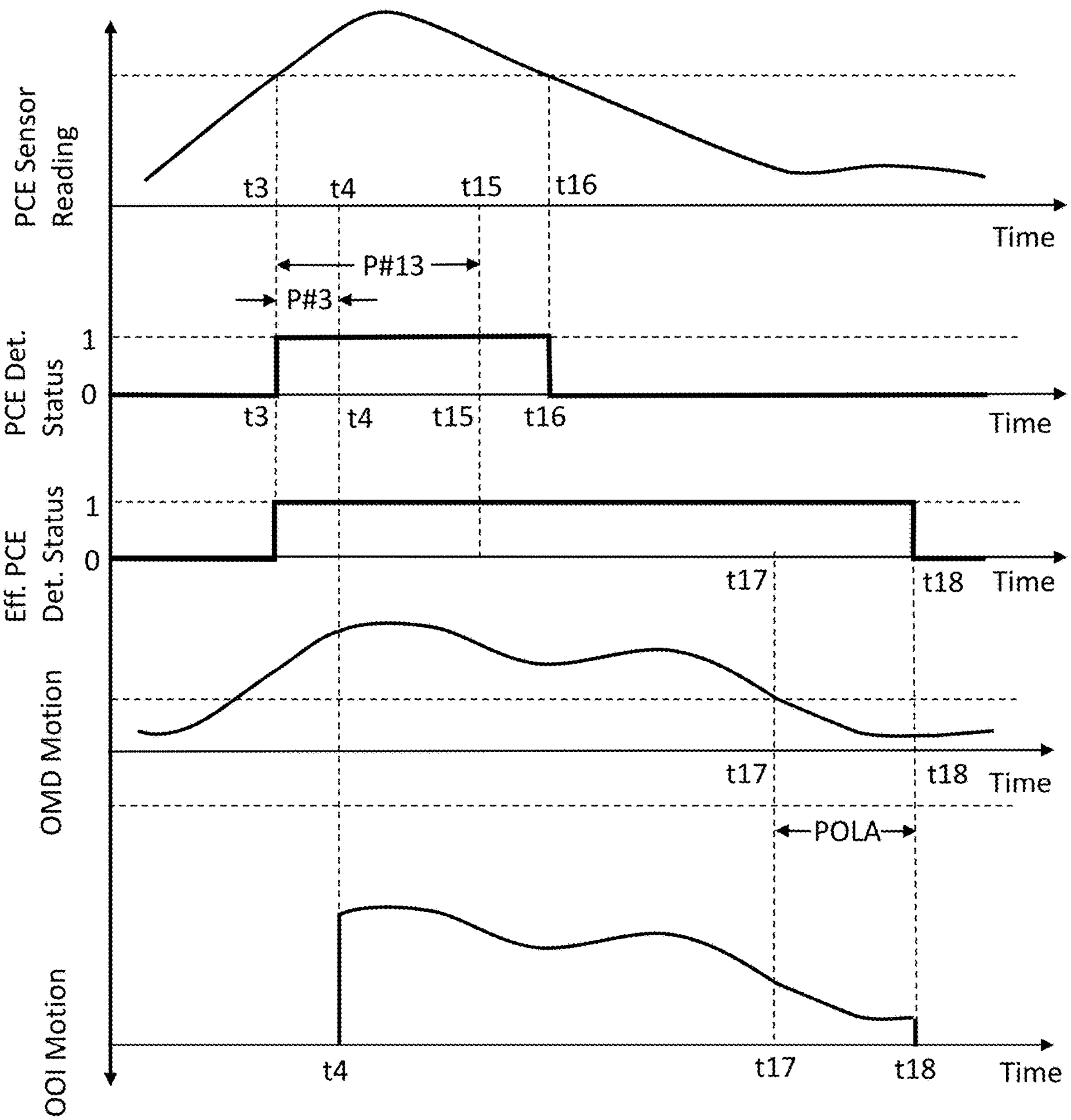
FIG. 60 depicts an illustrative example of PCE Stickiness and use of POLAs as ODE in an embodiment of the controller.

FIG. 60 depicts an illustrative example of PCE Stickiness and use of POLAs as ODE. Further, this embodiment uses the concept of Effective PCE Detection Status, which is based on the actual PCE detection status as well as the PCE Stickiness status of the PCE, which can be finally terminated by an ODE. In the figure, the PCE Sensor reading goes above the PCE threshold (depicted by a dashed line in the figure) during time period between t3-t16 and therefore the PCE detection status is indicated to be 1 during that time period (as shown by the "PCE Det. Status" curve). Parameters P #3 and P #13 are as represented. Given their definitions and explanation in this document as well as the above mentioned US patent application, it can be seen that OOI Motion begins at t4 (that is P #3 time after the start of the PCE at t3). Note that both PCE Detection Status and Effective PCE Detection Status become 1 when active PCE is detected. However, after time t15 (which is P #13 after start of PCE), the PCE turns "sticky" and therefore even after the PCE reading falls below the PCE threshold at time t16, the Effective PCE Detection Status (shown as "Eff. PCE Det. Status" in FIG. 60) continues to be 1 until the time a POLA of minimum specified duration is detected during the time period t17-t18. In this example, it is assumed that this dPOLA (of value t18 minus t17) is greater than or equal to the minimum specified dPOLA required to unstick a PCE. Therefore, when a POLA of at least that minimum specified duration is detected, the Effective PCE Status is reset from 1 to 0 at time t18. The OOI Motion (which in this embodiment is enabled and disabled by Effective PCE Detection Status) therefore comes to an end at t18.

In some embodiments, ODE can be specified to be the start or termination of a designated PCE/PCM/user gesture. Therefore, OOI motion can be enabled when a designated PCE/PCM (such as Smile, Eyebrow raise, Hand raise, etc., or a combination thereof) is started and held for at least P #13 duration, and OOI Motion can be disabled when some designated PCE/PCM/user gesture (which could be similar to the PCE/PCM/User gesture used to enable OOI Motion), is either started or terminated. In other words, in this embodiment, the user can hold a Smile for at least P #13 amount of time duration to enable OOI motion and then stop smiling (since the PCE has turned sticky after P #13 amount of time has passed after initiating the Smile), while still continuing to drive the OOI motion using their OMD. Subsequently, the user can disable OOI motion by a designated PCE such as an eyebrow raise or a PCM such as raising a hand or finger, or a combination of any PCE/PCM with or without a POLA, or even by starting a new smile as the designated the ODE. The disabling of OOI Motion can happen either right when the user gesture is started (e.g. start of a Smile/Eyebrow raise/hand or finger raise/etc.) or it can happen when the user gesture is completed (e.g. termination of the Smile/Eyebrow raise/hand or finger raise/etc.); this choice of using the start event versus termination event can be made based on user preference or system defaults or other mechanism. Further, based on the duration of the PCE/PCM/user gesture, a Click/Select Event can also be generated (as per the Click/Select heuristics). Some embodiments can ignore the occurrence of ODEs when the OOI Motion initiating PCE/PCM is still active (regardless of the fact if that PCE/PCM has already turned sticky). In embodiments where the ODE is different from the PCE/PCM that is designated to initiate OOI Motion heuristic (or to initiate generation of signals for some other appropriate command), it is possible that after the original PCE/PCM (that initiated the OOI Motion) has turned sticky and subsequently terminated (though still sticky), the user reinitiates the same PCE/PCM during the period of PCE stickiness. In such cases, some embodiments can ignore ODEs when they occur during the presence of the latter PCE/PCM. As an illustration, consider an embodiment where Smile is the PCE, POLA is the ODE. In this case, where the original PCE (the first Smile) that initiates the OOI Motion is terminated after turning "sticky" but the OMD is continued to be greater than the prescribed threshold (that is the ODE POLA has not occurred yet), if the user happens to reinitiate the PCE (the second Smile) and sustain it, then even if an ODE POLA occurs during this period (of the second Smile being in progress), that ODE POLA is ignored. Ignoring of the ODE POLA thereby allows continuation of the generation of the control signals (such as OOI Motion signals or others) that were started to be generated upon the first/original occurrence of the Smile/PCE. Further, such reinitiated PCEs can be used to generate different and/or additional control signals (e.g. selection signals, etc.) along with the original control signals (e.g. OOI motion signals) whose generation was initiated by the original PCE/PCM. Consider the following example embodiment that illustrates this situation. Here, the controlled device is a video gaming console, PCE is a Smile, ODE is Mouth Opening action, OMD is Head motion, and the user is playing a video game, and OOI is the graphical representation of a soldier (that is a character in the video game) and is being displayed on a display screen. In this situation, when the user initiates a first Smile the OOI Motion gets enabled, thereby the soldier (OOI) starts moving around in accordance to head motion. Once the PCE gets sticky the first Smile is terminated by the user, but the soldier continues to march in accordance to the head motion. At this point, the user can restart a new Smile (the second Smile). However, at this point, since the first Smile is still stuck, the second Smile can be used to generate different type of signals such as to fire weapons, while the head continues to provide the OMD for the soldier's motion. The firing of weapons can continue till the second Smile is terminated. However, the second Smile can also be allowed to turn sticky thereby causing the weapons to fire even after the termination of the second Smile. After this, a third Smile can be initiated to start generating signals for building a shield around the soldier. After this, if the user opens his/her mouth (thereby performing an ODE), then all the stuck Smiles can be made unstuck (meaning generation of corresponding signals can be stopped). In another variation, the stuck Smiles can be unstuck one at a time for every Mouth Open action, either in First-In-First-Out order or Last-In-First-Out order.

In another illustrative embodiment that uses the concept of PCE Stickiness, Smile is used as PCE to control generation of signals (e.g. for controlling the viewing angle in a video game) using head motion as the OMD, and Smile is (also) used as an ODE. The user can start controlling the viewing angle by initiating a smile and holding until it turns sticky. After this point in time, the viewing angle continues to be controlled based on head motion even if the user has stopped smiling. This viewing angle control can continue until the point in time when the user initiates another Smile (which is also the prescribed ODE). The viewing angle control can be made to stop when this ODE (Smile) is actually started; or started and sustained for certain amount of time; or started and sustained for specific amount of time and terminated; or started and terminated (without regards to how long it was sustained).

Figure 61:
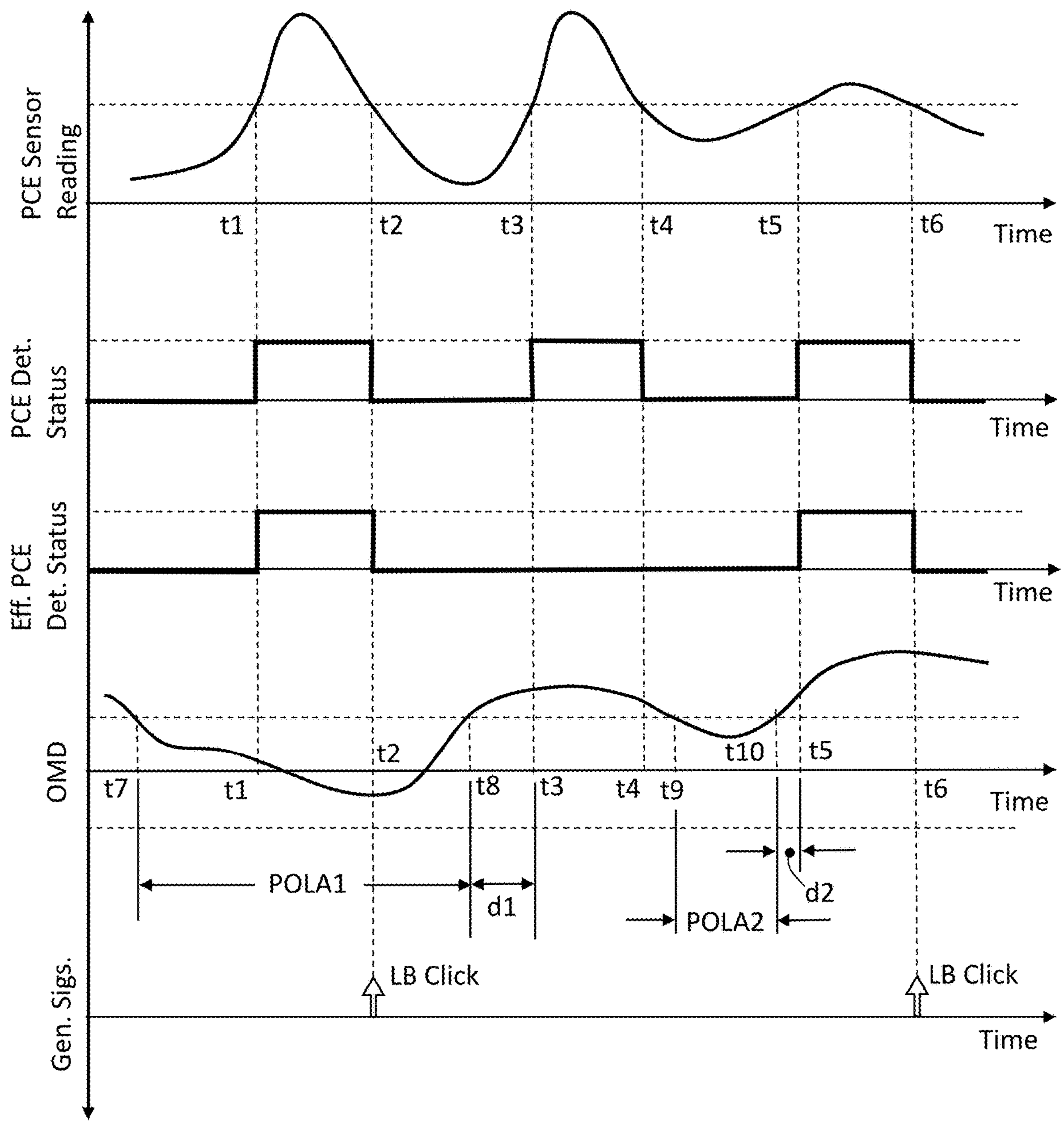
FIG. 61 shows an illustrative depiction of an embodiment using POLA as a mechanism for detecting user intent.

FIG. 61 shows an illustrative depiction of an embodiment using POLA as a mechanism for detecting user intent. In this embodiment, the user is required to old their designated body part (such as head) steady for at least a specified amount of time thereby performing a POLA of minimum time duration no more than a specified max lead time before performing a Smile (an illustrative PCE). The figure shows two POLAs being performed. The first active smile (detected between t1 through t2) is accepted as it is preceded by a POLA of minimum duration. The third smile (during t5 through t6) is shown to be preceded by a POLA d2 milliseconds before the start of smile at t5. In this illustration d2 is less than the max lead time, therefore that Smile is also allowed/accepted as user intentional. However, the smile that last between t3 though t4 does occurs d1 milliseconds before t3, which happens to be more than the max lead time and therefore is not considered to be a user intended smile. Thus, the generated signals ("Gen. Sigs." In the figure) shows LB Click signals being generated only for the first and third smiles (assuming that those smiles have durations that are within the requisite bounds to generate a selection signal).

Additional Indications of User Intent: Some embodiments can require the user to perform "certain actions" (including performing motions/expression/user gestures and/or being in certain ranges of positions/poses) as an indication/additional confirmation of user intent. Only when these "certain actions" are performed that other actions being performed concurrently or subsequently can be interpreted as intentionally performed by the user (for the purpose of generating signals for communication with the controlled device). For example, some embodiments can require additional actions on the part of the user for the enabling OOI motion, beyond what was described in OOI Motion heuristics. In one variation, holding the head/body part in a particular pose or range of poses (for example in a frontal pose where the head pose angles and/or translational position is within certain degrees and/or inches from the perfectly centered position or some other designated position) can be required in addition to performing a PCE/PCM as described in the OOI Motion heuristics. In such variations, if the user initiates a PCE/PCM while in a non-frontal pose, that PCE/PCM can be ignored by the system and thereby no control signals will be generated. The control signals (such as OOI motion signals) can be generated only when PCE/PCM is initiated in a frontal pose. Other such variations can also allow generation of signals even if the user initiates the PCE/PCM outside the frontal pose, but start that generation only when the user transitions into a frontal pose and optionally stop that generation of signals when the user transitions out of the frontal pose. In another example where the PCE is a Smile and the OMD is eye gaze (position/motion), the PCE can be ignored unless the user's eye gaze was pointed in a certain direction (absolute or in relation to the user or controlled electronic device or some object in the environment the user is currently in), or is within a desired range of OMD poses so as to recognize/accept the PCE/PCM for the purpose of initiation of generation of control signals. Some variations can employ multiple OMDs for multiple purposes. For example, some embodiments can employ eye gaze as the OMD to locate a cursor on the display screen of an electronic device, but use head motion as the OMD for indicating user intent. Therefore, for example, they may require the user to hold their head in a specified range of poses (to indicate frontal pose) before they will process a PCE to start generation of OOI Motion or other signals in correspondence to the eye gaze. Other embodiments can totally do away with the need for a PCE/PCM for enabling OOI motion, and only require the head/body part's pose (i.e. angular orientation and translational position) be within a specified range for a specified amount of time (e.g. such as P #13) before the OOI Motion is enabled. As an illustrative example, a user can enable the OOI motion by simply holding their head within certain range of pose/position (e.g. look straight at camera from the front of the camera so that Roll/Yaw/Pitch of the pose of the user's head is within +/−10 degrees and possibly not more than 6 inches off from the camera in the vertical or horizontal direction) for a specified time (e.g. 1000 milliseconds) to enable the OOI Motion (and drive it possibly by eye gaze or any other mechanism), which can later be terminated by any of the specified ODEs. Note that ODEs can also be based on pose/position of a body part, for example, holding the head in a non-frontal pose, finger raised at more than 45 degree angle, opening mouth by at least 25%, etc.

A variety of feedback can be given to the user in regards to their being in an OOI motion enabling pose/position and the amount of time elapsed/remaining before the OOI Motion is actually enabled. Such feedback can be visual, auditory, haptic, olfactory or any other suitable mechanism. In general, feedback can also be provided on any/all aspects of various concepts and components (such as PCE, PCM, OMDs, ODEs, etc.) used in interaction with electronic devices. Visual feedback can include indicators (audio, visual, physical, virtual, etc.), progress meters, change in shape/size/color/texture/behavior/etc. of graphical objects, creation/deletion/animation of graphical objects (based on the state, amount, direction or any other property of PCE, PCM, OMD, ODE, etc.) As an illustration, when a PCE or PCM is initiated a sound signal can be generated as an indicator of that fact. A graphical icon can also be displayed on a display associated with the electronic device or an existing graphical icon can be changed in appearance when a PCE/PCM is initiated. Further, as the PCE/PCM progresses, the sound signals can change and/or the graphical objects can change to provide an indication of the amount of time passed since the initiation of PCE/PCM, the level/amount/direction of PCE/PCM, as well as feedback can also be provided on the OMD itself. The indicators can provide an indication of progress towards the upcoming time milestones/thresholds. For example, once the PCE/PCM is initiated, the indicators can provide an indication on the how much time remains before a time duration threshold is reached, wherein meeting the time threshold results in generation of signals that are different from signals that are generated when the time threshold is not met.

Body motions such as head nods, hand waves, etc. can be used as part of user gestures that are used to communicate with or control electronic devices. However, humans can perform such motions/actions in natural day-to-day living without the intention of controlling or communicating with electronic devices. PCEs/PCMs can be used to convey user intent of interpreting certain designated body motions as user gestures meant to communicate with/control an electronic device. In other words, certain PCE/PCMs/gestures can be used to confirm user intent in communicating with electronic devices. For example, if nodding the head down is the specified user gesture to cause "Page Down" action on a computing device, then the controller can be made to process those body motions/user gesture only when the user is also performing a PCE/PCM (such as Smiling or Raising a Hand or Raise Eyebrow(s), etc.). Therefore, when in front of an electronic device, to cause a "Page Down" command, the user has to not only nod their head but also perform a designated PCE/PCM (such as Raise Eyebrow) at the same time. Further, the concept of PCE/PCM stickiness can also be used here. In such cases, the user could perform the PCE/PCM for a certain minimum amount of time (which can be defined by P #13) and then subsequent motions can be treated as user gestures performed with intention of communicating with or controlling an electronic device, until the point when the user performs a designated ODE (such as a POLA or some other specified gesture). Certain PCE/PCMs (or combinations thereof) can thereby be used to enable or disable recognition of other user gestures and/or translation/use of these other user gestures to cause communication with or control of electronic devices.

POLAs can be used as additional indicators of user intent when performing other user gestures. Some embodiments can require a POLA (of a certain specified minimum and/or maximum time duration) to immediately precede a user gesture. In that case, for example, for a head nod gesture to be recognized as a head nod gesture meant to communicate with an electronic devices (versus just some head nod performed while listening to music with no intention of communicating with an electronic device), then the control system can require that a head nod gesture be immediately preceded by a POLA (possibly with designated required minimum and/or maximum duration) performed by the user, using head motion. In other words, the user can be required to hold their head still for a specified minimum amount of time before performing the head nod, for that head nod to be recognized as an intentional head nod. This can allow the user (and the system) to distinguish user gestures that were performed with deliberate intent of communicating with electronic devices from those that were not. Similar requirements can be made when using POLAs that use pose/position for distinguishing whether certain user gestures are deliberate or user intended. So for example, a head nod gesture may not be recognized/qualified to generate control signals if it was not immediately preceded by the user being within a specified range of head position/poses. An example of this situation can be when the user's head motions are being monitored by a webcam on a smart phone. The user can be required to look in the direction of the smart phone within certain bounds of deviation from a perfectly frontal pose for a certain amount of time just before performing the head nod. Similarly, for example, a Click gesture (using a PCE/PCM) may not be recognized as a user intended Click gesture if it was not preceded by a specified POLA, possibly with a specified minimum and/or maximum limits on the duration of the POLA. As an example of this variation, if the PCE is a Smile and the OMD is head motion, then to generate a click signal as per the Selection Heuristics (as described in the above mentioned patent application), the user can be required to hold their head steady for a prescribed amount of time either immediately or within a certain time duration before starting to perform the smile. The OOI Motion heuristics can also be similarly modified to include a POLA before the PCE is initiated. Similarly, any gesture can require specific POLAs, with or without time bounds, for the purpose of recognizing/processing those gestures.

The concept of looking for some user controllable quantity to be within range (for the purpose of establishing user intent) can be extended to use other physical quantities. Some examples of other physical quantities are sound (vocal or otherwise), intensity of touch/pressure, brain waves, attention/meditation levels, rate of breathing, depth of breathing, tensing of muscles, holding of breath, crossing of eyes, etc. Therefore, for example, a head nod performed by the user may not be recognized or translated into control signals unless the user, for example, is holding their breath or have certain level of attention/meditation (that can be measured by brain waves), muscles of certain specified body parts be tensed or relaxed to a specified level or within range of level, etc.

Some heuristics can use variable time duration requirements for a POLA occurring within a user gesture. For example, when the same user gesture (containing a certain POLA) is performed at different times/under different conditions, the POLAs within that gesture can be specified to have differing time duration requirements under those differing conditions. This is because dPOLA can be specified to be dependent on a physical quantity. For example, the time duration requirement for a POLA in an ODE POLA can be dependent on the speed/magnitude and/or direction of OMD, and/or the location of the OOI at or preceding or during the time the ODE is being performed. For example, the time duration requirement can be longer if the OMD motion magnitude/variation preceding the POLA was steady and/or low, versus if the speed of motion was reducing drastically. This is because the faster reduction in OMD may indicate the user's intent on coming to a standstill much faster, and therefore the required time duration for the POLA can be shorter. In another example, if OMD was head motion, and the OOI was in the upper area of the display screen, the time duration can be made shorter (compared with lower areas of the screen). (The position of the OOI can be determined by the head pose or other techniques.) Such behavior can provide more user comfort as it can be more work for a user to hold a body part such as a head higher versus lower. Similarly, in another variation, the time duration can be made dependent on the amount of distance the OOI has traveled in a particular direction (during that particular OOI motion command). Again, the time duration can be shortened as the OOI travels upwards, or if it is sensed that the user has moved their head close to the boundaries of range of comfortable head poses. Such system behavior can be application specific and the heuristics of determining time duration can be changed according to the needs of the application. For example, if the application was a game designed to give exercise to user's neck muscles, the time duration heuristics can be reverse of what was discussed above (e.g. they could make the duration longer when user is in head poses that are difficult to maintain).

Some embodiments can use multiple OMDs independently or simultaneously or in close conjunction. These OMDs can be provided by different body parts. Each of these OMDs can have their own parameters, gain curves, PCE/PCMs and other settings. As an illustrative example, both eye gaze direction and head motion can be used together to drive OOI motion. Based on the presence of a PCE/PCM, the OOI can move in accordance to the eye gaze as well as head motion. Therefore, if the designated PCE was a Smile, upon start of a Smile the OOI can start moving following the eye gaze as well as the head motion simultaneously. (In a variation, conditional OMD activations can also be defined; for example, head motion information can be used to drive OOI motion only when eye gaze is held relatively steady, that is within designated bounds. Thresholds on eye gaze motion and/or head motion can also be defined above or below which the OOI can move accordance to eye gaze versus head motion/orientation. For example, if eye gaze changes by more than a threshold of 20 degrees in a certain time period, the OOI can move in accordance to eye gaze; or else it can move in accordance to head motion. Blending functions can also be used to determine the amount of influence OMDs can have on OOI motion. In further variation, gain curves and other parameters can be set such that motions of head cause fine motions of the OOI (which can be achieved by using flatter gain curves), whereas the OOI is made to follow the eye gaze in a more responsive fashion for larger eye gaze motions. In effect, the eye gaze direction can be used for quick/large motions of the OOI but the finer motion control can be achieved by using head motion. Such an approach can allow achieving finer and more precise OOI motion control even when eye gaze may not be tracked to a high level of accuracy. (Fine eyeball motions can be harder to track/measure especially using general-purpose optical sensors such as webcams, compared to tracking the large body parts such as the head).

Figure 62:
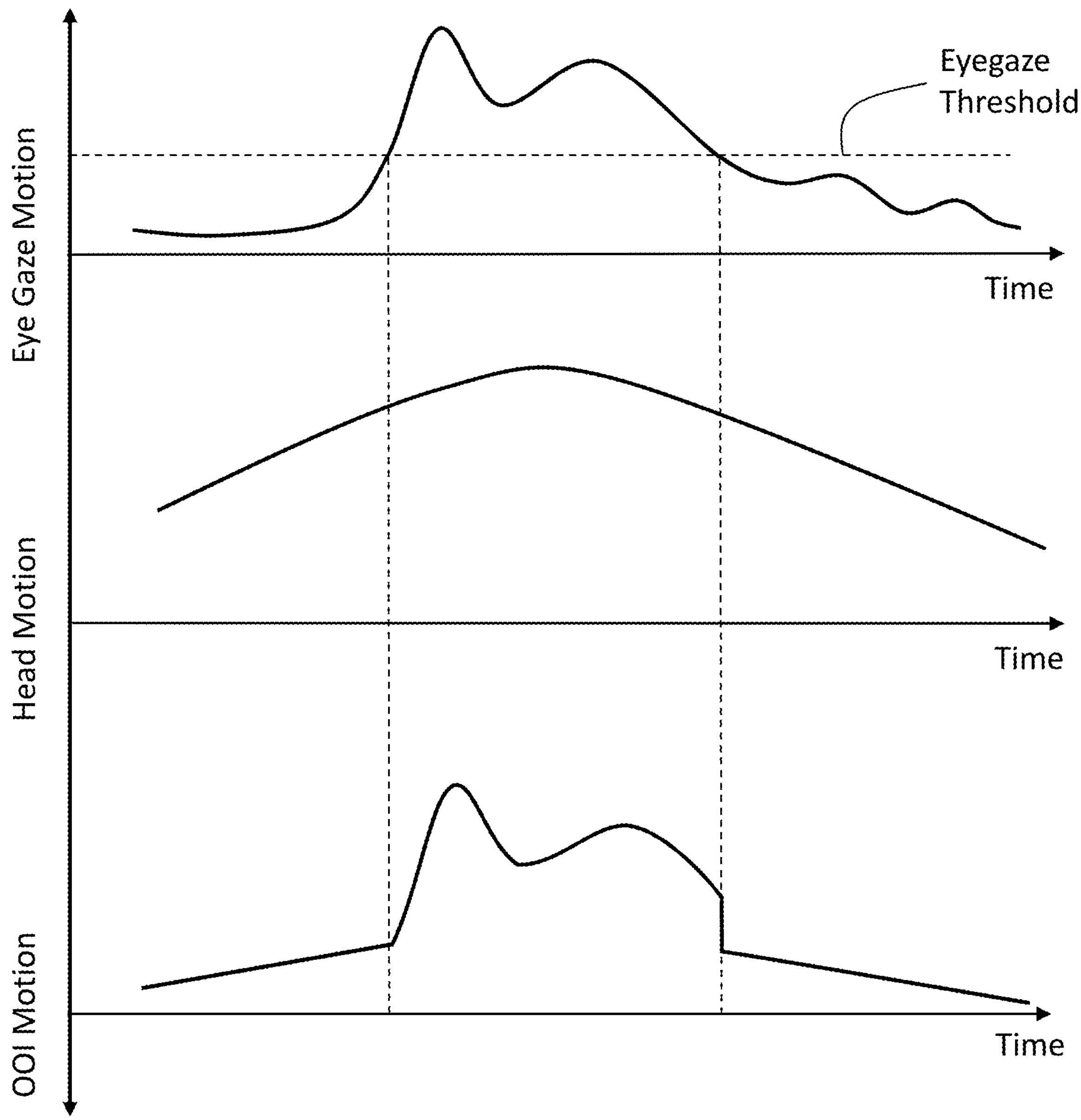
FIG. 62 shows an exemplary illustration of an embodiment when the OOI motion is dependent on both the Eye gaze as well as Head motion as the OMD.

FIG. 62 shows an exemplary illustration of an embodiment when the OOI motion is dependent on both the Eye gaze as well as Head motion as the OMD. The OOI Motion is shown to be in accordance to head motion before the Eye gaze motion exceeds the threshold, after which it is in accordance to the Eye Gaze motion and after the Eye gaze motion falls within the threshold, the OOI motion reverts back to be in accordance to the head motion. In a variation, instead of instantaneous velocity of eye gaze, the amount of displacement experienced by eye gaze over a specified amount of time can be used to be monitored against a displacement threshold. This time duration (during which eye gaze displacement is accumulated) can be specified to start 'n' milliseconds before the instant when the measurement/comparison is done. People knowledgeable in the art can see that many such variations can be created while using the base underlying principle of using two OMDs driving the OOI motion.

Further variations can use different PCE/PCMs with different OMDs. So, for example, the OOI motion can be enabled via the Eyebrow Raise PCE when using Eye Gaze/Eyeball motion as the OMD, whereas a Smile or a Jaw Drop PCE can be used to enable OOI motion when using Head Motion as the OMD. Therefore, in this illustrative example, the OOI does not move in accordance to eye gaze until the user raises one/both eyebrows and then looks in the direction of the final destination of the OOI. Then, the user can lower their eye brow(s) to the normal position and then start smiling to move the OOI in accordance to their head motion. The head motion can be made to move the OOI at a much slower rate, thereby allowing for much more precise OOI movement/location than is possible by eye gaze tracking alone. Note that in other variations, both/multiple OMDs can be used simultaneously while using a common PCE. It will be obvious to people knowledgeable in the art that many more variations are possible by using different types of PCEs/PCMs, OMDs and combinations thereof, different set of parameters, gain curves as well as conditions for usage/activation of the OMDs.

Heuristics for POLA based Multi-Command-Some embodiments can generate signals for multiple commands of different types based on a duration of a POLA performed as part of a user gesture. For that purpose, they can define and use parameters to specify various time requirements (bounds) of a POLA performed following the start or end of a PCE (or a combination of PCEs), or when the PCE(s) simply reaches or crosses specified threshold(s). Each of these parameters can correspond to particular command signal(s) that can be generated based on the performance of the POLA in accordance to the time bound value specified by that parameter. In one embodiment, parameters 15, 16, 17 and 18 (designated as P #15, P #16, P #17 and P #18) can be defined to specify time bounds on a POLA performed after a PCE is initiated. This embodiment of POLA based Multi-command heuristics defines & uses the following parameters—

1. P #15 is MIN_DPOLA_FOR_OPTIONS, which is the minimum time the user needs to cause/perform a POLA in order to invoke an Options Menu (or Options Window or any other Command Menu/Window).

2. P #16 is MIN_DPOLA_FOR_SCROLL, which is the minimum time the user needs to cause/perform a POLA in order to invoke the "Scroll" command.

3. P #17 is MIN_DPOLA_FOR_CLICK_AND_DRAG, which is the minimum time the user needs to cause/perform a POLA in order to invoke the "Click and Drag" command.

4. P #18 is MIN_DPOLA_FOR_RIGHT_CLICK, which is the minimum time the user needs to cause/perform a POLA in order to invoke the "Right Click" command.

Figure 52:
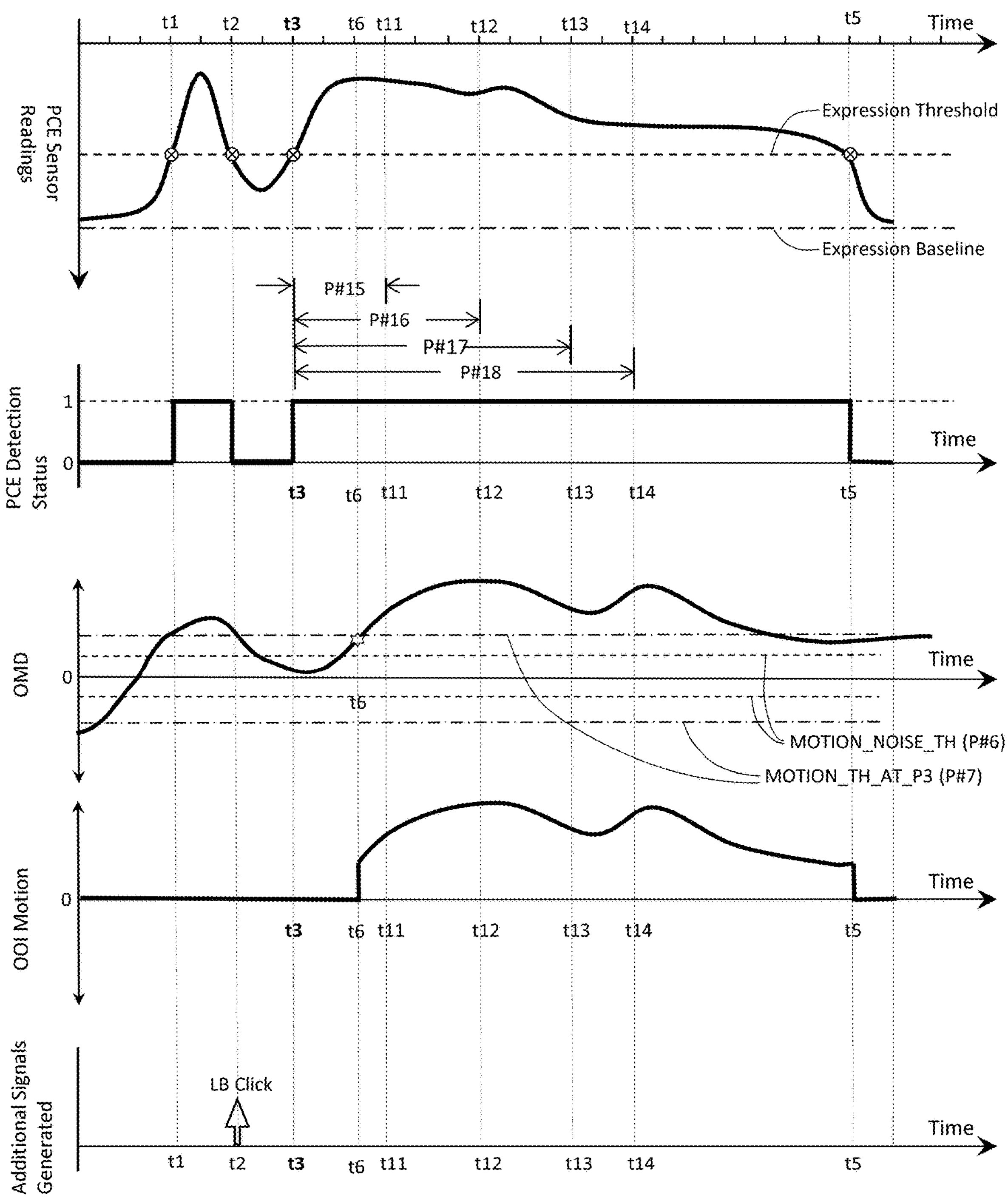
FIG. 52 shows an example of Heuristics of POLA based Multi-Command gesture in an embodiment of the Controller-Part 1.

Given the above parameter definitions, and their values (as depicted in FIG. 52), P #15, P #16, P #17 and P #18 can be viewed as forming a chain (an ordered list) of "minimum dPOLA" parameters used to gauge the duration of the POLA caused/performed by the user immediately following reaching/crossing a threshold by a PCE. (Note that as depicted in FIG. 52, this embodiment uses the same threshold (P #7) for each of the POLA. However, other embodiments can define additional parameters to specify a different threshold value for each of the time segments t3:t11, t11:t12, t12:t13, t13:t14 and t14:15.) In this embodiment, if the duration of the POLA (performed starting at time t3, that is the time of initiation of a PCE) is—

Figure 53:
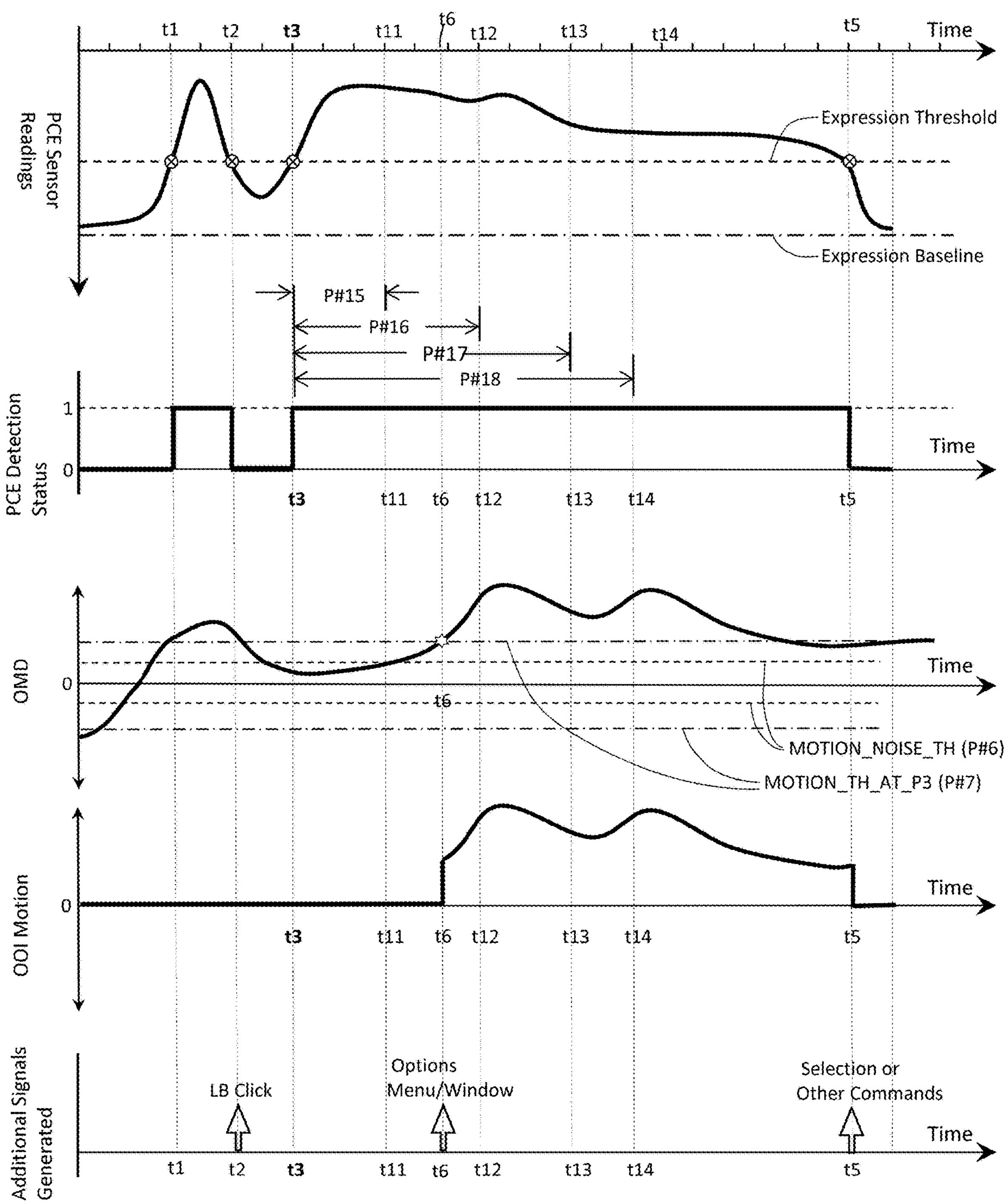
FIG. 53 shows an example of Heuristics of POLA based Multi-Command gesture in an embodiment of the Controller-Part 2.
Figure 54:
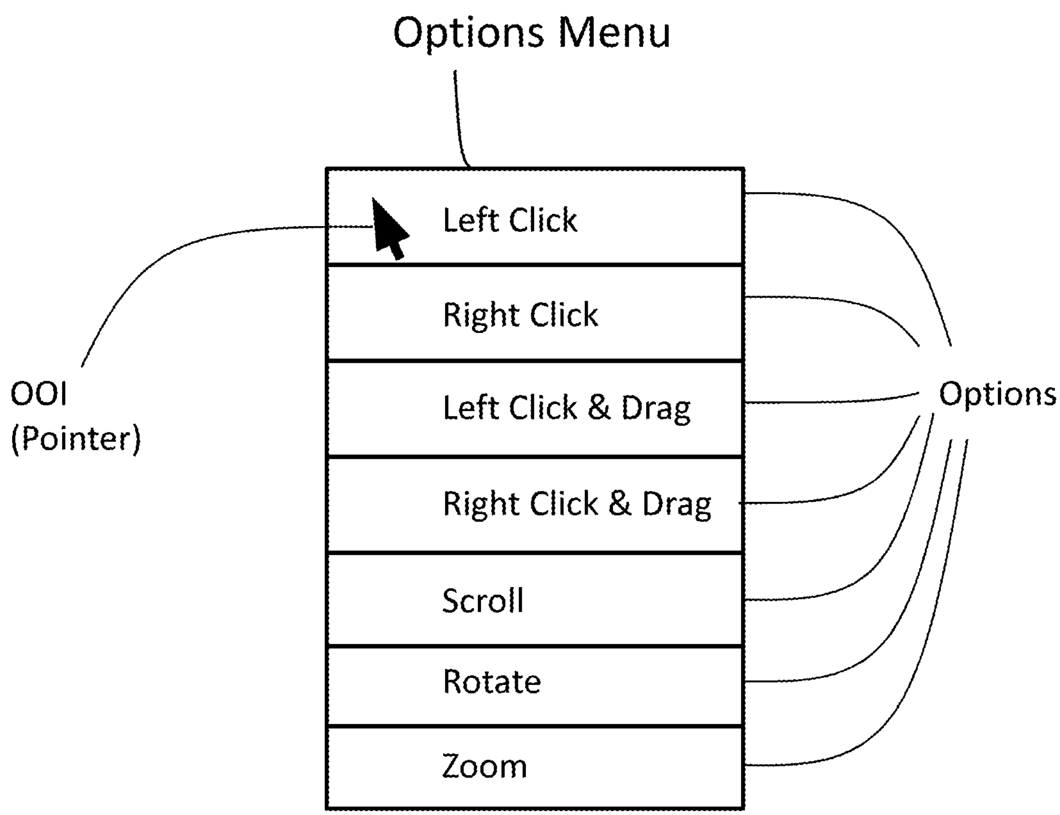
FIG. 54 shows an example Options Menu in an example of Heuristics of POLA based Multi-Command gesture in an embodiment of the Controller.
Figure 55:
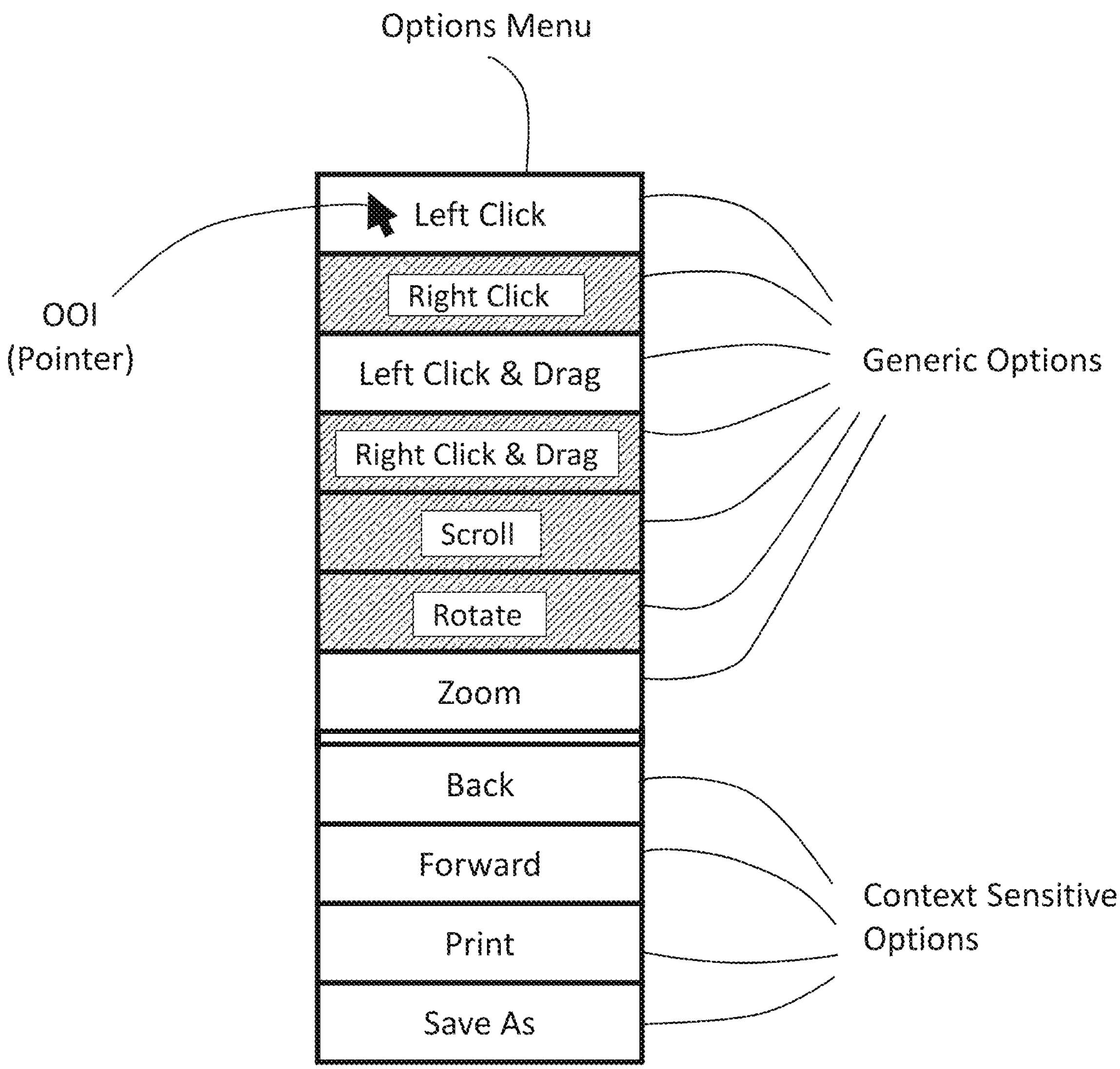
FIG. 55 shows another example Options Menu in an example of Heuristics of POLA based Multi-Command gesture in an embodiment of the Controller.

- >=0 and <P #15—Signals for OOI Motion can be generated starting at or after the time when OMD reaches or crosses a specified threshold (such as P #7). In this embodiment, this happens at time t6. The generated OOI motion signals are in accordance to the OMD. See FIG. 52. Note that in some embodiments, the Motion Noise Threshold is deducted from the OMD before computing OOI Motion, whereas other variations do not.
- >=P #15 (MIN_DPOLA_FOR_OPTIONS) and <P #16—See FIG. 53. Signals for displaying Options Menu or Window can be generated when OMD reaches or crosses a specified threshold (such as P #7). In this embodiment, this happens at time t6. (See FIG. 54 for an embodiment of an Options Menu that can be displayed at or after time t6). Further, signals for OOI Motion can also be generated (starting at or after time t6) wherein the OOI motion is based on the OMD. Thus the user can navigate the OOI (such as a pointer) to a particular location/area on the display Options Menu/Window. Additional signals can be generated at end of the PCE (at or after time t5). One example of an additional signal is a selection signal that can lead to making a selection from the displayed Options Menu/Window (based on the position of the OOI). In this way, Options Menu/Window can provide a convenient way for the user to select from a variety of commands to execute. In one variation, Selection or other command signals can also be generated when user performs POLAs of a specified (minimum and/or maximum) durations subsequent to t6 and/or the display of the Options Menu/Window but before t5 (the end of PCE) and/or before an ODE (if the PCE has turned sticky). Note that the Options Menu in FIG. 54 depicts one embodiment of a list of generic commands that can be invoked from the controller. This list can be augmented by context sensitive commands based on state of the controlled device and/or the position of the OOI on the controlled device. For example, if the OOI is a pointer and the controlled device is a computer, then some or all of the commands (displayed by the operating system of the computer) in the "secondary menu" (normally obtainable by right clicking at that pointer location) can be included in the list of context sensitive options on the Options Menu. For example, if the pointer is currently on a web browser window, then depending on the exact location of the pointer, additional options (such as "Back", "Forward", "Print", "Save As", etc.) can be also included in the list of options in the Options Menu. Further, the state of the computer (operating system) and/or location of the pointer/OOI can also affect the list of generic options displayed in the Options Menu. For example, in the case of the pointer being on the title bar of the web browser window, some options such as "Rotate" may be dropped or rendered inactive on the Options Menu or the list of options could be rearranged to push such options lower on the list. See FIG. 55 for an embodiment of Options Menu showing some generic options as well as some context sensitive options, with some options rendered inactive by graying them out. It should be obvious to persons knowledgeable in the art that amongst other things, the list of commands in the generic as well as the context sensitive part of the options menu/window, the structure, organization, display as well as the mechanics of the operation of Options Menu/Window can be varied and/or combined to create multitude of embodiments, while still using the concepts, principles and heuristics mentioned in this document. The embodiments discussed in this document are only illustrative examples.

Figure 56:
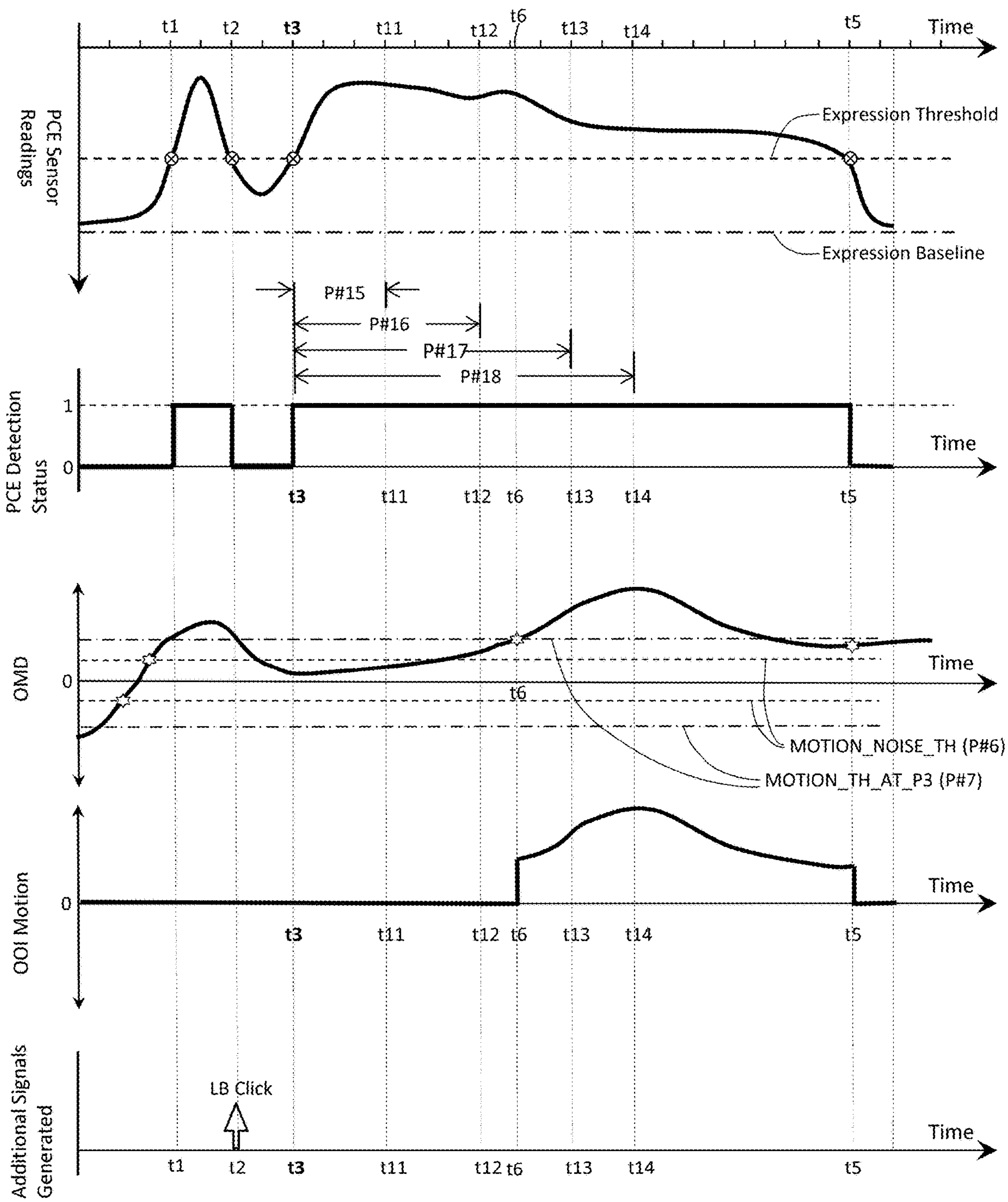
FIG. 56 shows an example of Heuristics of POLA based Multi-Command gesture in an embodiment of the Controller-Part 3.

>=P #16 (MIN_DPOLA_FOR_SCROLL) and <P #17—Signals for Scrolling the currently selected/active Window or graphical or object or input mechanism on the controlled electronic device can be generated in accordance to the OMD (see FIG. 56). The signal generation can start at time t6 (that is when the OMD reaches or crosses the P #7 threshold for the first time after t3). Note that FIG. 56 does not explicitly identify Scrolling signals as such, as in this situation, the content in the displayed Window or the scrollbar of the Window itself is considered the OOI, and the OOI Motion graph represents the generated Scrolling signals. In other variations, scrolling can be replaced with other commands including those that can utilize OMD, e.g. Rotation signals for the current OOI (such as a graphical 2D or 3D Model, etc.). The generated command signals can be in accordance to the OMD and can be stopped when the PCE/PCM is terminated.

Figure 57:
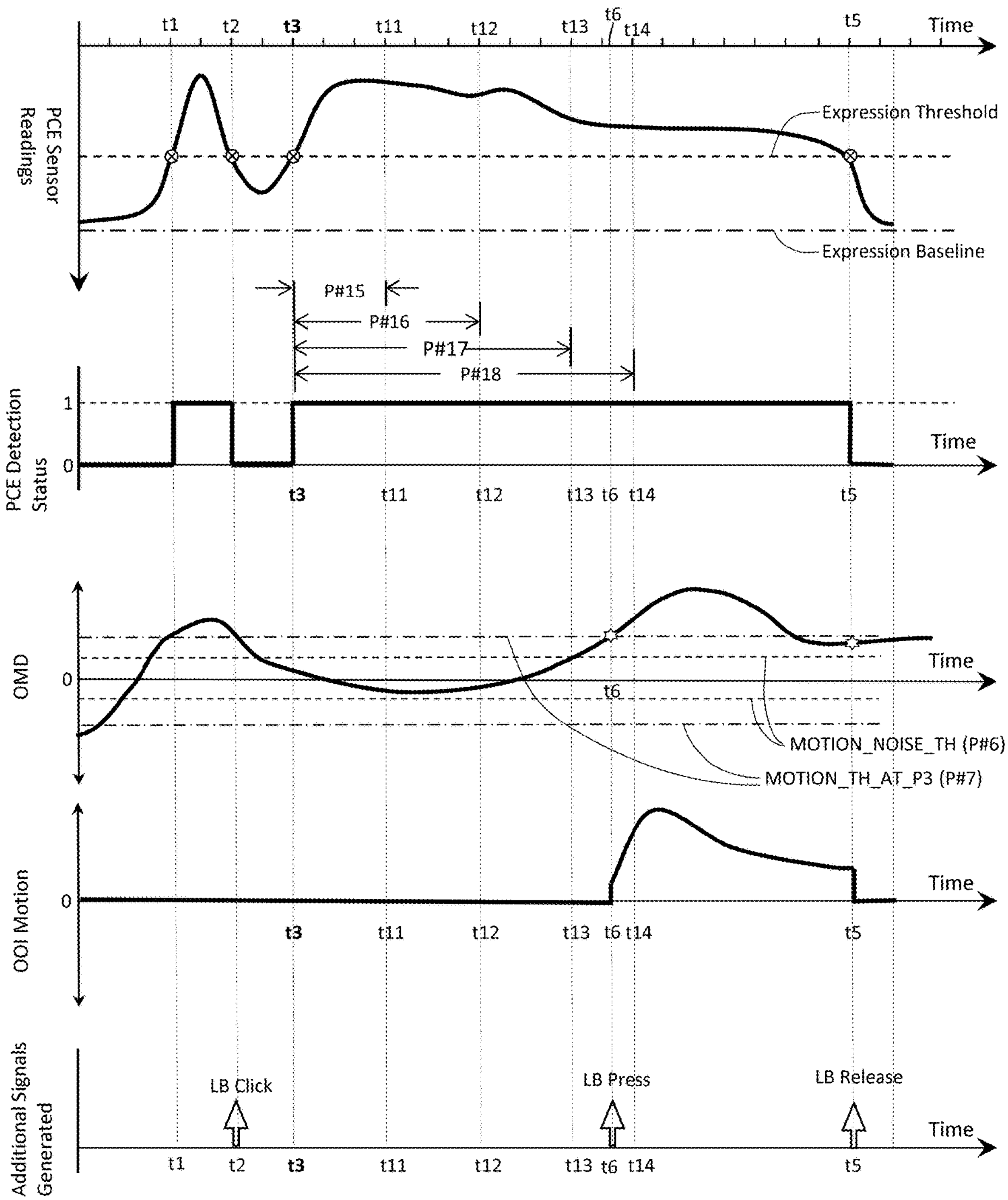
FIG. 57 shows an example of Heuristics of POLA based Multi-Command gesture in an embodiment of the Controller-Part 4.

>=P #17 (MIN_DPOLA_FOR_CLICK_AND_DRAG) and <P #18—Signals for "Click and Drag" command can be generated when OMD reaches or crosses a specified threshold (such as P #7). In this embodiment, this happens starting at time t6. This can include first generating a LB Press signal at the end of the POLA (that is at time t6). This can also include generating signals for OOI motion starting t6 until time t5 when the PCE ends. Further, LB Release signal can also be generated at or after the PCE is ended (time t5). (See FIG. 57.)

Figure 58:
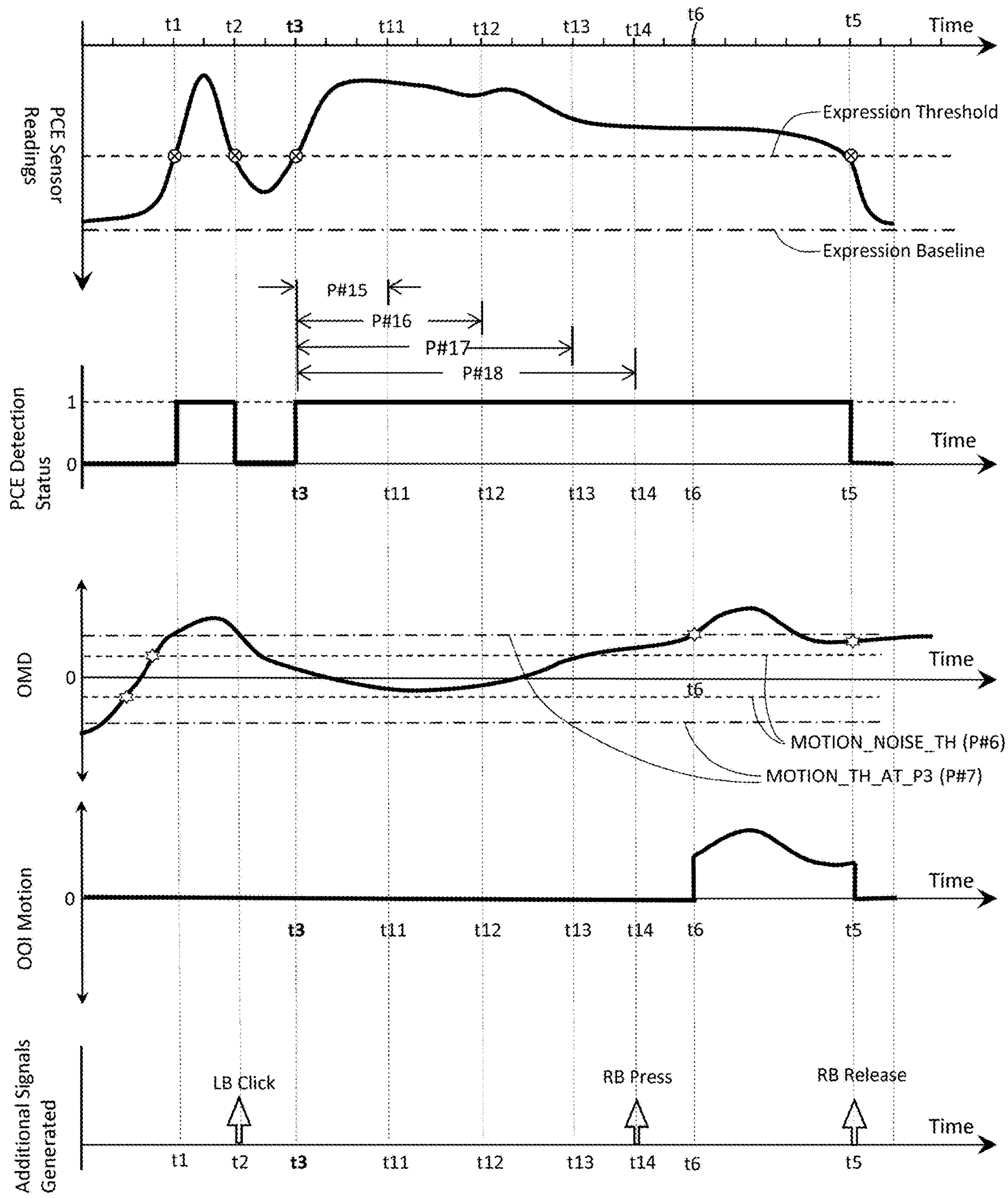
FIG. 58 shows an example of Heuristics of POLA based Multi-Command gesture in an embodiment of the Controller-Part 5.

>=P #18 (MIN_DPOLA_FOR_RIGHT_CLICK) —Signals for Right Button (RB) Press can be generated at time t13 and RB Release can be generated at time t5 (when the PCE is ended by the user). OOI motion signals can be generated starting time t6 (that is when the PCE reaches/crosses the P #7 threshold) as shown in FIG. 58. In another variation, given that P #17 is the last in the chain of minimum dPOLA parameters in this embodiment, the RB Press signal can be generated right at t14 and OOI motion signals can be started as soon t14 as well (subject to OMD being greater than P #6 threshold) and up until the end of PCE.

A multitude of embodiments of heuristics based on a chain of dPOLA parameters can be created by using different types of signals to be generated corresponding to each parameter, different values for each minimum dPOLA, different number of parameters as well as the order of the parameters. Though the concept of "sticky PCE" was not explicitly utilized, it can also be used in conjunction with the concept/heuristics of chained dPOLA parameters. In fact, any concepts/principles/heuristics can be combined to generate multitude of additional embodiments.

As mentioned in the above-mentioned US Patent application, any of the commands (listed above or otherwise) can have different results on different electronic devices. While in some of the above embodiments the controller generates signals for consumption by a computer, other embodiments can generate signals for other electronics devices including tablets, smart phones, home media centers, washing machines, microwave ovens, smart TVs, medical/industrial equipment, etc.; thereby, the interpretation and result of each of the commands can be different for those devices although the concepts/principles/heuristics for generating those commands are the same. One example of this situation is using the Selection heuristic when controlling different types of devices can result in different command signals. When controlling a laptop, the selection command may generate a left mouse button click signal. However, when controlling a tablet or smart phone, the same Selection heuristic may generate a touch signal. Similarly, a selection command on an entertainment system may actually be a button press command signal and so on.

It will be obvious to persons knowledgeable in the art that the principles and heuristics described herein c used regardless of the method/type of sensors/hardware/algorithms used to detect and measure body motions, facial expressions, facial muscle movement, or other user actions that can be used as PCEs/PCMs/OMDs/ODEs independently or in conjunction with others. These principles and heuristics can also be employed to generate different and/or additional control signals (and their combinations) compared to the control signals (and their combinations) mentioned in this and above mentioned document(s). Various concepts/principles described can be combined together to obtain multitude of variations/embodiments.

Following is description of illustrative embodiments detailing definition/specification of various user gestures and their mapping into commands for the controlling an Electronic Device (See Table 1). Further, as part of the explanations of specific user gestures, general purpose principles and techniques are also discussed that can also be used with other embodiments and/or create newer embodiments of control systems or user gestures. Although Smile is used as the Primary Control Expression (PCE) in many embodiments, other expressions may also be used as the PCE. Further, as discussed before, PCMs (Primary Control Motions) as well as other body actions can be used as or in place of PCEs in any or all situations, including disclosed concepts/principles, heuristics, embodiments, etc. Also note that while the following details various body part motions in the exemplary definition of user gestures, they can be substituted by positions of body parts instead. E.g. Yaw motion head can be substituted by Yaw position of the head in a user gesture, and so on.

Further note that any PCE/expression in a user gesture can be substituted by another input mechanism(s). For example, instead of smiling as part of a user gestures, the user could instead press or touch a button or a key or touch sensitive surface or switch or even use their hands/other body parts to make gestures (such as waving/swiping hands/arm, kicking, punching, raising a hand, opening or closing of a palm/hand, finger pointing, lifting or pointing a combination of fingers and/or thumb, making a pinch gesture with index finger and thumb, etc.). Therefore, for example, Smile initiation could be replaced by button/key press/change in touch status and/or Smile termination could be replaced by button/key release/another change in touch status. In other embodiments, the Smile action can be replaced by a PCM such as Raising a Hand, etc. Even with such substitutions, the principles disclosed in this application are still valid and can be used in design of user interfaces for controllers and control systems and other electronic devices.

TABLE 1

An illustrative Embodiment of Gesture based User Interface (that can be used as part of a Control System)

| Command to be Invoked (on the Controlled Electronic Device and/or Controller/Controlling System) | User Gesture to Invoke the Command (Symbolic Representation and Explanation) |
|---|---|
| Move/Modify Cursor or OOI (Object of Interest) | <S * {YP} {YP#} S><br>Description of Symbolic representation: Initiation of a Smile followed by FLBP (where all motions are ignored for a specified duration of time), followed by indefinite period of Yaw and/or Pitch motions only, followed by another (indefinite) period of Yaw, Pitch as well as "No Motion", followed by termination of the Smile.<br>Explanation and Discussion: This user gesture begins with user initiating a Smile. For a certain specified time period immediately after the initiation of the smile all motions are ignored (FLBP). This FLBP can thereby give the user a chance to settle down and not cause any unintentional cursor/OOI motions. Immediately after the FLBP, the user is expected to have at least some period of Yaw and/or Pitch motion (which is important to distinguish this gesture from the "Window Scroll/Pan" and "Click and Drag" gesture; explained later) followed by indefinite period of Yaw/Pitch/No motion. During these last two periods, the events for cursor/OOI motion can be sent in accordance with the Yaw and Pitch motion (subject to heuristics explained in the above referenced patent applications). The motion events stop when Smile terminates indicating the end of the user gesture.<br>Note: This process is as explained in the first referenced US patent applications above. See the patent application for more details of impact of other heuristics on the motion of OOI.<br>Note: As mentioned previously, since this user gesture lists only S, Y, P and "#" in its definition, all other motion types (such as R, Tx, Ty, Tz) as well as expressions can be ignored during this user-gesture. Similar approach can be taken for other user gestures as well, where motions and expressions not specified in the user gesture definition can be ignored for purpose of recognizing that user gesture.<br>Note: The duration of the FLBP represented by "*" is a matter of user preference, and could be set to zero time duration.<br>Note: It is not necessary for the user to complete a user gesture for the system to recognize it and to start processing it. This command is just one example of such a situation. In this case, the system can start generating events (such as motion events) right after a part (e.g. "<S * {YP}" or "<S *") of the complete user gesture is recognized |
| Click or Select | [<S>]<br>Description of Symbolic representation: An expression of a Smile is initiated and terminated in a TMB fashion (that is the total duration of the smile falls within a specified range of time duration.)<br>Explanation and Discussion: When the user completes a Smile within a specified range of time duration, a Click or Selection command can be issued to the Electronic Device.<br>On certain Electronic Devices (such as computers) a "Click"/Selection results in a "Left Mouse Button Press" signal, however, other embodiments and/or devices can have other signals generated, such as touch signals, accessibility switch signals, other button press and/or release signals, keyboard key press and/or release signals, etc.<br>Note: Presence or absence of motion before, during or after the smile can be ignored as long as the smile is completed in the specified time duration, for that smile to be mapped (translated) to a click/selection command on the electronic device.<br>Note: Additional details are included in the above referenced US patent applications. |
| Scroll/Pan a Window or Screen | <S * ## {YP} {YP#} S><br>Description of Symbolic representation: A Smile is initiated, followed by a FLBP, followed by period of No Motion (whose duration is equal to or greater than a specified threshold corresponding to "##"), followed by an indefinite period of Yaw and/or Pitch, followed by another indefinite period of Yaw/Pitch/No Motion, followed by termination of the Smile.<br>Explanation and Discussion: This user gesture starts with user starting to Smile. Once the Smile is started, a FLBP gives the user a chance to settle down by ignoring their motions for certain fixed time duration. After that point, the user is expected to hold their head/body/part of body still (for a minimum specified amount of time which is the specified duration for "##") so that there is a period of No Motion as far as Yaw and Pitch motions are concerned. At the end of this No Motion period, a period of combination of Yaw and Pitch motions is started. At this time, the system recognizes the gesture as one for Scroll/Pan and thereby starts sending scroll/pan or equivalent events through the remainder of the user gesture, until the point in time when the user terminates the Smile. |

TABLE 1-continued

| An illustrative Embodiment of Gesture based User Interface (that can be used as part of a Control System) | |
|---|---|
| Command to be Invoked (on the Controlled Electronic Device and/or Controller/Controlling System) | User Gesture to Invoke the Command (Symbolic Representation and Explanation) |
| | One embodiment sends Up and Down Scroll/Pan events (or equivalent) corresponding to the Pitch motions and Left and Right Scroll/Pan events (or equivalent) corresponding to the Yaw motions. Other embodiments can map events to motions differently.<br>Note: The specified threshold time for No Motion for this user gesture (i.e. "##") in this embodiment can be less than the one specified for Click and Drag defined below (which uses "###" as the specified threshold for No Motion). Further, the maximum allowed duration of the No Motion action in this user gesture can be less than "###" threshold for Click and Drag. However, other embodiments can use "###" for Scroll/Pan gesture and "##" for Click and Drag gesture. |
| Click and Drag | <S * ### {YP#} S> Or<br><S * ### {YP} {YP#} S><br>Description of Symbolic representation: A Smile is initiated, followed by a FLBP, followed by period of No motion (whose duration is equal to a specified threshold), followed by an indefinite period of combination of Yaw, Pitch and No Motion, which is then followed by termination of the Smile.<br>Alternatively, a Smile is initiated, followed by a FLBP, followed by a period of No Motion (whose duration is equal to a specified threshold), followed by an indefinite period of Yaw, Pitch; followed by yet another period of Yaw/Pitch/No Motion, which is then followed by termination of the Smile.<br>Explanation and Discussion: This user gesture starts with user starting to Smile. Once the Smile is started, a FLBP can allow the user to settle down (by ignoring motions for specified amount of time) and for them to hold their head/body/part of body/controller still so that there is a period of No Motion as far as Yaw and Pitch motions are concerned. (Note that in this embodiment, the period of No Motion is larger than the one for "Window Scroll/Pan" explained above.) At the end of this period, a Left Mouse Button (LMB) Press event (or some other event) can be generated. Following this point, the cursor/OOI can become eligible to start moving in accordance to the Y and P motions (and subject to other heuristics as explained in the above referenced patent applications) until the point in time when the Smile is ended. At that point, a LMB Release event (or some other event) can be generated.<br>Note: If there are no Yaw or Pitch motions observed throughout this user gesture, then this motion/position/expression pattern can result in a LMB Press event followed by a time lag which is followed by a LMB Release event without any motion of the cursor/OOI. This user gesture hence can be used to generate a slow prolonged Click/Select (Long Press or Click or Touch, etc) on certain Electronic Devices and possibly have a different interpretation (that is a different set of events/commands generated) than a regular Click/Select.<br>Note: The alternative definition (the second one provided above) provides flexibility to define additional user gestures similar to this user gesture albeit with even longer initial periods of No Motion.<br>Note: The specified threshold time for No Motion for this user gesture in this embodiment is more than the one specified for Pan and Scroll. However, other embodiments may have that reversed.<br>Note: As mentioned above, FLBP time duration can be varied for this user gesture (and all the others as well) as per user preference, and can even be reduced to zero. |
| Right Click or Right Select or Secondary Menu | {R>} [~] [<S>]<br>Description of Symbolic representation: A Right Roll motion (of indefinite length) starts this user gesture; followed by a time bound VLWP that waits for a TMB Smile<br>Explanation and Discussion: The user gesture begins with a Right Roll motion; this motion does not have a time bound but other embodiments may have it to be time bound. The system starts looking for start of the Smile right after the initiation of the R> motion, however, the countdown associated with the VLWP does not start until R> motion is ended. If a Smile is not already initiated, the system starts a VLWP looking for a Smile to be initiated (within the time bound as specified for the VLWP). Regardless of when the Smile is initiated, it has to be completed within the bounds defined for the TMB Smile for this user gesture, for the user gesture to be recognized.<br>Note: Presence or absence of motion during the Smile is irrelevant if the smile is completed in the specified time duration (of a TMB Smile).<br>Note: A different threshold (other than the MNT) can be defined for the R> motion to detect if the R> motion has in fact started. This R Threshold can be greater than the MNT to make the user be more deliberate in initiating |

TABLE 1-continued

| An illustrative Embodiment of Gesture based User Interface (that can be used as part of a Control System) | |
|---|---|
| Command to be Invoked (on the Controlled Electronic Device and/or Controller/Controlling System) | User Gesture to Invoke the Command (Symbolic Representation and Explanation) |
| | this user gesture (thereby reducing unintentional triggering of this user gesture/command). This approach can be taken for any user gestures to force the users to make their motions a bit more exaggerated during certain user gestures to avoid unintentional triggering.<br>Note: Time and magnitude bounds can be specified on the "R>" motion.<br>Note: Another variation of the user gesture for this command can be "{R>} [<S>]", which can allow the user to start the Smile even before the {R>} has ended. Meaning, there can be overlap between the R and S actions.<br>Note: Effectively, a designated action performed just prior to a user gesture can change the interpretation of that gesture. In this case, a user gesture for Left Click command generates a Right Click instead, when preceded by a specified "R" action. This designated action can be called "Modifier Action". |
| Right Click and Drag | {R>} [~] <S* ## {YP#} S> Or<br>{R>} [~] <S* ## {YP} {YP#} S><br>Description of Symbolic representation: This user gesture starts with Right Roll motion (of indefinite length), followed by a time bound VLWP that waits for a Smile. The Smile is followed by a FLBP after which a period of No Motion is expected. This is followed by either a combination of Yaw/Pitch/No Motion or a first a combination of Yaw/Pitch motion and then followed by a combination of Yaw/Pitch/No Motion. The user gesture ends with end of the Smile.<br>Explanation and Discussion: The user gesture begins with a Right Roll motion; this motion does not have a time bound (though other embodiments can have it be time bound). The system starts looking for start of the Smile right after the initiation of the R> motion, however, the countdown associated with the VLWP does not start until R> motion is ended. If a Smile is not already initiated, the system starts a VLWP looking for a Smile to be initiated (within the time bound as specified for the VLWP). Regardless of when the Smile is initiated, a FLBP follows (wherein all motions are ignored for the specified time period). Immediately after this FLBP, the system expects a period of No Motion (where no significant Yaw/Pitch/Roll motions are expected). At the end of this No Motion period a Right Mouse Button (RMB) Press event (or an equivalent event or some other desired event) can be generated. Following this point, the cursor/OOI is eligible to start moving in accordance to the Y and P motions (and subject to other heuristics as explained the above referenced patent applications) till the point in time when the Smile is ended. At that point, a RMB Release event (or equivalent or other desired event) can be generated.<br>Note: The "R" action that is started before the beginning of the facial expression ("<S"), can be viewed as a Modifier Action that modifies the interpretation of previously defined Left Click and Drag user gesture.<br>Note: If there is no Yaw or Pitch motion observed throughout this user gesture, then this gesture results in a RMB Press event followed by a time lag that is followed by a RMB Release event without any motion of the cursor/OOI. This user gesture hence can be used to generate a slow prolonged Right Click/Secondary Menu commands on certain Electronic Devices. Such prolonged patterns without any significant motions could also be used to generate other commands/events in other embodiments.<br>Note: The alternative version requires a period of Yaw/Pitch right after the period of No Motion, which is then followed by a combination of Yaw/Pitch/No Motion. This version allows for additional user gestures be defined (resulting in different commands being issued) where the period of No Motion is longer than the one in this user gesture.<br>Note: Further variations are also possible by eliminating the VLWP from the user gesture completely by thereby allowing the user to start the Smile part of the user gesture even before the R part has ended. |
| Go Back Or Swipe Left | [<$Y^2$] [~] # Or<br>#[<$Y^2$] [~] # Or<br>[<$Y^2$] * # Or<br>[<$Y^2$]<br>Description of Symbolic representation: A TMB Left Yaw motion (that is a Left Yaw which has both a time and magnitude bound) is followed by a time bound VLWP period where any motions are ignored until No Motion is encountered. Alternatively, the above pattern could also be preceded by a period of No Motion. In a further variation, the first pattern can have the VLWP replaced by a FLBP. In another variation, no POLA may be required at the end of the user gesture.<br>Explanation and Discussion: This first version of the user gesture starts with a TMB Left Yaw motion, followed by a VLWP that terminates upon specified time limit or upon detecting a period of No Motion. A "Go Back" |

TABLE 1-continued

An illustrative Embodiment of Gesture based User Interface (that can be used as part of a Control System)

| Command to be Invoked (on the Controlled Electronic Device and/or Controller/Controlling System) | User Gesture to Invoke the Command (Symbolic Representation and Explanation) |
|---|---|
| | or "Swipe Left" or an equivalent command is issued upon encountering the period of No Motion of specified minimal duration. For example, when using Internet Browser, this user gesture may lead to a "Alt + Left" event and/or a "Backspace" on a Windows based device.<br>Note: The second version of the pattern listed above includes a period of No Motion at the beginning (compared to the first version). This can allow further distinction of intentional motions from unintentional motions when the system performs gesture recognition. This approach can be used to have periods of No Motion preceding a user gesture's pattern or ending a user gesture with a period of No Motion can be used for some of the other user gestures in this or other embodiments. In fact, some embodiments of the User Interface can instruct the users to possibly start every user gesture with a period of No Motion and possibly end every user gesture with a period of No Motion as well. This approach can lead to simplification of the gesture recognition algorithm as well as lead to lower incidence of cases where commands are triggered by the system without the full intent of the user.<br>Note: The VLWP allows for ease of use for users as it allows them to come back to a more comfortable position after the TMB Yaw motion.<br>Note: The third version listed above has a FLBP instead of a VLWP as in the first version.<br>Note: An alternative version of this user gesture can be simply "[<$Y^2$]" which is simply a TMB Left Yaw. Though simpler, this version can be more prone to be triggered unintentionally. It will be obvious to a person in the field that several more combinations are possible using FLBP, VLWP and period of No Motion before or after the "[<$Y^2$]" motion. Further, the time durations/bounds of the FLBP, VLWP, and No Motion can be increased or decreased (up to substantially equal to zero) as per user or developer preference, for this user gesture or any other user gesture. |
| Go Forward Or Swipe Right | [$Y^2$>] [~] # Or<br>#[$Y^2$> ] [~] # Or<br>[$Y^2$>] * # Or<br>[$Y^2$>]<br>Description of Symbolic representation: A TMB Right Yaw motion followed by a time bound VLWP period where any motions are ignored until period of No Motion is encountered. Alternatively, the above pattern could also be preceded by a period of No Motion. In a further variation, the first pattern can have the VLWP replaced by a FLBP. In another variation, no POLA may be required at the end of the user gesture.<br>Explanation and Discussion: The first version of this user gesture starts with a TMB Right Yaw motion, followed by a VLWP that terminates upon specified time limit or upon detecting a period of No Motion. A "Go Forward" or "Swipe Right" or an equivalent command is issued upon encountering the period of No Motion of specified minimum duration. For example, when using Internet Browser, this user gesture can lead to generation of a "Alt + Right" event/signal on a Windows based device.<br>Note: The VLWP allows for ease of use for users as it allows them to come back to a more comfortable position after the TMB Yaw motion. It also allows for discriminating between intentional and unintentional gestures. However, this VLWP (and the following period of No Motion) could be treated as an optional part of the user gesture and removed. The same approach (of treating VLWP as optional) could be taken with other commands as well to simplify their user gestures but at the risk of increasing unintentional triggers.<br>Note: Periods of No Motion could be inserted at the beginning and/or VLWP be replaced by FLWP and time bounds/durations can be increased or decreased (to up to zero), as per earlier discussion, for this or any other user gesture. |
| Window Minimize | [$Y^2$>] [~] [$P^2$>] [~}# Or<br>[Y>] [~] [P>] [~}#<br>Description of Symbolic representation: A TMB Right Yaw motion followed by a time bound VLWP that waits for a TMB Down Pitch motion, followed by another time bound VLWP that waits for No Motion.<br>Alternatively, a time bound Right Yaw motion (without bounds on the speed/magnitude) followed by a VLWP (with a time bound) which waits for a Down Pitch motion (which is also time bound), which is followed by another time bound VLWP that waits for No Motion.<br>Explanation and Discussion: This user gesture starts with a TMB Right Yaw motion followed by a time bound VLWP that waits for a TMB Down Pitch motion. The VLWP between the two motions allows for user friendliness/convenience by permitting some irrelevant motions between them (that may |

TABLE 1-continued

An illustrative Embodiment of Gesture based User Interface (that can be used as part of a Control System)

| Command to be Invoked (on the Controlled Electronic Device and/or Controller/Controlling System) | User Gesture to Invoke the Command (Symbolic Representation and Explanation) |
|---|---|
| | be unintentionally triggered). Given that this VLWP is time bound, the upper limit of the time bound could be made very small or bit large based on user preference, or even set to zero (effectively removing it from the definition of the user gesture). The following time bound VLWP allows for better discrimination between intentional and unintentional gestures, however, it may be treated as optional and removed based on user preferences or other criteria.<br>Alternatively, as described the second representation, the TMB motions (which have both a time as well as speed bound) may be substituted by motions with only a time bound. This allows for user convenience whereby they do not have to be precise when gesturing the TMB motions. However, a tradeoff has to be made since motions that are more forgiving may lead to higher number of unintentional gestures.<br>Other alternative representation could also be had by mixing and matching TMB versus only time bounded Yaw and Pitch motions.<br>A Window Minimize command or equivalent command or any other desired event is issued at the end of the user gesture.<br>Note: Further variations are possible by eliminating the VLWP from the user gesture to allow P motion to start even before Y motion is completed.<br>Note: Further variations can be obtained by substituting VLWPs by POLAs or periods of No Motion, or by adding POLAs or "#" action immediately after the VLWPs. |
| Window Maximize | [Y$^2$>] [~] [<P$^2$] [~}# Or<br>[Y>] [~] [<P] [~}# Or<br>[Y>] [~] [<P$^2$][~}#<br>Description of Symbolic representation: A TMB Right Yaw motion followed by a VLWP (with a time bound) which waits for a TMB Up Pitch motion, followed by another time bound VLWP that waits for No Motion.<br>Alternatively, a time bound Right Yaw motion (without bounds on the speed) followed by a VLWP (with a time bound) which waits for an Up Pitch motion (which is also time bound), which is followed by another time bound VLWP that waits for No Motion.<br>Explanation and Discussion: This user gesture starts with a TMB Right Yaw motion followed by a time bound VLWP that waits for a TMB Up Pitch motion. The VLWP between the two motions allows for user friendliness/ convenience by permitting/ignoring some irrelevant motions between them. Given that this VLWP is time bound, the upper limit of the time bound could be made very small or bit large based on user preference, or even set to zero (effectively removing it from the definition of the user gesture). The following time bound VLWP allows for better discrimination between intentional and unintentional gestures, however, it may be treated as optional and removed based on user preferences or other criteria.<br>Alternatively, as described the second representation, the TMB motions (which have both a time as well as speed bound) may be substituted by motions with only a time bound. This allows for user convenience whereby they do not have to be precise when gesturing the TMB motions. However, a tradeoff has to be made since motions that are more forgiving may lead to higher number of unintentional gestures.<br>In a further variation (as shown in the third version), a combination of TMB motion with time bound motion can also be used. Here the Y motion has only a time bound but the P motion is TMB (that is has both time and magnitude bound). It will be obvious that the Y motion can be made TMB and P motion can be made time bound only instead in yet another variation.<br>A Maximize Window (or equivalent or other desired) command is issued at the end of the gesture.<br>Note: Further variations are possible by eliminating the VLWP from the user gesture to allow P motion to start even before Y motion is completed.<br>Note: Further variations can be obtained by substituting VLWPs by POLAs or periods of No Motion, or by adding POLAs or "#" action immediately after the VLWPs. |
| Enter/OK/Return | [P$^2$>] [~] [<Y$^2$] [~}# Or<br>[P>] [~] [<Y] [~}#<br>Description of Symbolic representation: A TMB Down Pitch motion followed by a time bound VLWP that waits for a TMB Left Yaw motion, followed by another time bound VLWP that waits for No Motion.<br>Alternatively, a time bound Down Pitch motion (without bounds on the speed) followed by a VLWP (with a time bound) which waits for a Left Yaw motion (which is also time bound), which is followed by another time bound VLWP that waits for No Motion. |

TABLE 1-continued

An illustrative Embodiment of Gesture based User Interface (that can be used as part of a Control System)

| Command to be Invoked (on the Controlled Electronic Device and/or Controller/Controlling System) | User Gesture to Invoke the Command (Symbolic Representation and Explanation) |
|---|---|
| | Explanation and Discussion: This user gesture starts with a TMB Down Pitch motion followed by a time bound VLWP that waits for a TMB Left Yaw motion. The VLWP between the two motions allows for user friendliness/ convenience by permitting some irrelevant motions between them (that may be unintentionally triggered). Given that this VLWP is time bound, the upper limit of the time bound could be made very small or large based on user preference, or even set to zero (effectively removing it from the definition of the user gesture). The following time bound VLWP can allow for better discrimination between intentional and unintentional gestures, however, it may be treated as optional as well and removed based on user preferences or other criteria.<br>Alternatively, as described the second representation, the TMB motions (which have both a time as well as speed bound) can be substituted by motions with only a time bound. This allows for user convenience whereby they do not have to be precise when gesturing the TMB motions.<br>Note: Further variations are possible by eliminating the VLWP from the user gesture to allow Y motion to start even before P motion is completed.<br>Other alternative representation could also be had by mixing and matching TMB versus only time bounded Yaw and Pitch motions.<br>A "Return"/"Enter" key press event (command signal) or an "OK" button press signal on a window or equivalent command signal or any other desired event/signal can be issued at the end of the user gesture. |
| Cancel or Undo | [P$^{2}$>] [~] [Y$^{2}$>] [~]# Or<br>[P>] [~] [Y>] [~]#<br>Description of Symbolic representation: A TMB Down Pitch motion followed by a time bound VLWP that waits for a TMB Right Yaw motion, followed by another time bound VLWP that waits for No Motion.<br>Alternatively, a time bound Down Pitch motion (without bounds on the speed) followed by a VLWP (with a time bound) which waits for a Right Yaw motion (which is also time bound but without bounds on speed), which is followed by another time bound VLWP that waits for No Motion.<br>Explanation and Discussion: This user gesture starts with a TMB Down Pitch motion followed by a time bound VLWP that waits for a TMB Right Yaw motion. The VLWP between the two motions allows for user friendliness/ convenience by permitting some irrelevant motions between them (that may be unintentionally triggered). Given that this VLWP is time bound, the upper limit of the time bound could be made very small or large based on user preference, or even set to zero (effectively removing it from the definition of the user gesture). The following time bound VLWP allows for better discrimination between intentional and unintentional gestures, however, it may be treated as optional as well and removed based on user preferences or other criteria.<br>Alternatively, as described the second representation, the TMB motions (which have both a time as well as speed bound) may be substituted by motions with only a time bound. This allows for user convenience whereby they do not have to be precise when gesturing the TMB motions.<br>Other alternative representation could also be had by mixing and matching TMB versus only time bounded Yaw and Pitch motions.<br>A "Cancel" event can be generated on a window and/or an "Undo" command or equivalent command or any other desired event can be issued at the end of the user gesture.<br>Note: Further variations are possible by eliminating the VLWP from the user gesture to allow Y motion to start even before P motion is completed. |
| Desktop Show/Hide | [<Y$^{2}$] [Y$^{2}$>] [<Y$^{2}$] [~]# Or<br>[Y$^{2}$>] [<Y$^{2}$] [Y$^{2}$>] [~]# Or<br>[Y$^{2}$>] [<Y$^{2}$] [Y$^{2}$>] Or<br>[Y>] [<Y] [Y>] Or<br>[<Y] [Y>] [<Y]<br>Description of Symbolic representation: A first TMB yaw motion followed by second TMB Yaw motion in opposite direction (to the first motion), which in turn is followed by a third TMB Yaw motion in opposite direction to the second one. The last TMB Yaw motion is followed by a time bound VLWP waiting for No Motion. The Yaw motions can be with or without speed bounds. The VLWP and No Motion periods can be optional.<br>Explanation and Discussion: This user gesture has multiple alternatives as explained above. At the end of the user gesture, if all windows are not already minimized, a Windows Minimize (or equivalent) command can be issued; otherwise, a Windows Maximize (or equivalent) command can be issued.<br>Note: It is possible to set different bounds (of time and speed) on each of the Yaw motions. These bounds could be varied based on user preference or |

TABLE 1-continued

An illustrative Embodiment of Gesture based User Interface (that can be used as part of a Control System)

| Command to be Invoked (on the Controlled Electronic Device and/or Controller/Controlling System) | User Gesture to Invoke the Command (Symbolic Representation and Explanation) |
| --- | --- |
| | desired feel of the system (that is, a system that is very particular about how motions are performed versus being forgiving).<br>Note: In further variations, any of the magnitude bounds could be dropped, based on the user or developer preference. Further, as mentioned previously, the period of No Motion can be introduced at the beginning in the definition of any of the user gesture. |
| Zoom Or Rotate (Simple Version) | <S * {R} {R #} S><br>Description of Symbolic representation: A Smile initiation followed by a FLBP, followed by a Roll Motion (in either direction), followed by combination of Roll Motion and No Motion for indefinite amount of time, and followed by termination of the Smile.<br>Explanation and Discussion: If Smile initiation is followed by a FLBP where all motions are ignored followed by a Roll Motion. Roll motions are translated into Zoom commands and sent to the appropriate Electronic Device/Controller/Controlling system in real time at regular intervals. The direction of the Roll Motion can be used to determine if the command being sent is Zoom in or Zoom out. (In other embodiments, Rotation command signals could be sent instead of Zoom command signals.) This process continues until the Smile terminates.<br>Note: As discussed before, as per user preferences and/or preference of the system designer, the length of the FLBP can be made very small or even zero.<br>Note: FLBP could also be replaced by a VLWP such as "[~]R".<br>Note: The Zoom command can be combined with other commands as explained below. |
| Zoom Or Rotate (Simple Version with Translation instead of Roll) | <S * {Tx} {Tx #} S><br>Description of Symbolic representation: A Smile initiation followed by a FLBP, followed by a Translational Motion along X axis (in either direction), followed by combination of Translational Motion in X axis and No Motion for indefinite amount of time, and followed by termination of the Smile.<br>Explanation and Discussion: If Smile initiation is followed by a FLBP where all motions are ignored followed by a X Translation. X Translation motions are translated into Zoom command signals and sent to the appropriate Electronic Device/Controller/Controlling system in real time at regular intervals. The direction of the Translational motion can be used to determine if the command being sent is Zoom in or Zoom out. (In other embodiments, Rotation command signals could be sent instead of Zoom command signals.) This process continues until the Smile terminates.<br>Note: As discussed before, as per user preferences and/or preference of the system designer, the length of the FLBP can be made very small or even zero.<br>Note: FLBP could also be replaced by a VLWP such as "[~]Tx".<br>Note: This version of the Zoom/Rotate command can also be combined with other commands as explained below. |
| Zoom/Rotate (Combined with other commands) | (1) <S * {RYP} {RYP#} S> Or<br>(2) <S * ## {RYP} {RYP#} S> Or<br>(3) <S * ### {RYP#} {RYP#} S><br>Description of Symbolic representations: (1) A Smile initiation followed by a FLBP, followed by a combination of Roll, Yaw and Pitch Motions, followed by another period of Roll/Pitch/Yaw/No Motion (wherein Roll is guaranteed to be present in the combination) followed by termination of the Smile. This is very similar to user gesture for Cursor/OOI motion; the difference being Roll Motion is added to the user gesture.<br>(2) A Smile initiation followed by a FLBP, followed by period of No Motion of specified duration. This is followed by a combination of Roll, Yaw and Pitch Motions, followed by another period of Roll/Pitch/Yaw/No Motion (wherein Roll is guaranteed to be present in the combination) followed by termination of the Smile. This is very similar to user gesture for Scroll/Pan command; the difference being Roll Motion is added to the user gesture.<br>(3) A Smile initiation followed by a FLBP, followed by period of No Motion of specified duration (different than one from #2 above). This is followed by a combination of Roll, Yaw and Pitch Motions, followed by another period of Roll/Pitch/Yaw/No Motion (wherein Roll is guaranteed to be present in the combination) followed by termination of the Smile. This is very similar to user gesture for Click and Drag command; the difference being Roll Motion is added to the user gesture.<br>Explanation and Discussion: This is an illustration of how different commands can be combined in one user gesture. In this case, the Zoom command is combined with a Cursor/OOI move command by adding R Motion to the user gesture (as in representation #1 above), or with Window |

TABLE 1-continued

An illustrative Embodiment of Gesture based User Interface (that can be used as part of a Control System)

| Command to be Invoked (on the Controlled Electronic Device and/or Controller/Controlling System) | User Gesture to Invoke the Command (Symbolic Representation and Explanation) |
|---|---|
| | Scroll/Pan command by adding R Motion to the user gesture (as in representation #2 above), or with Click and Drag command by adding R Motion to the user gesture (as in representation #3 above). Each of these user gestures with R motions work almost exactly as their counterparts (that do not have the Roll motions) with the difference that these user gestures also cause Zoom events (or equivalent) to be sent (in accordance to the "R" motion) along with the other events (such as cursor/OOI motion, scroll/pan or click and drag events sent in the original user gestures).<br>Note: Further variations of the embodiment can be had by substituting "R" by "Tx", "Ty" or "Tz" in these three user gestures.<br>Note: Similar to combining Zoom functionality with other three commands mentioned here, other functionality could also be readily combined. For example, "Tx" could be included in the motion combinations to cause rotation (of the image or 3D model on the screen) about X-axis, "Ty" for rotation about Y-axis and "Tz" for rotation about the Z-axis. Such functionality can be very helpful for any applications that use 3D models or images.<br>Note: Other embodiments can substitute {RYP} with {TxTyTz} and vice versa.<br>Note: The FLBP ("*") and the period of No Motion ("#") are optional. As noted elsewhere, the "S" can be substituted by any other user action (that may or may not be a facial expression, in this or any other user gesture.) |
| Generic OOI Manipulation command | (1) <S * {RYPTxTyTz #} S> Or<br>(2) {RYPTxTyTz} <S * {RYPTxTyTz #} S> {RYPTxTyTz} Or<br>(3) <M * {RYPTxTyTz #} M> Or<br>(4) <S * {RYPTxTyTz #} S> <M * {RYPTxTyTz #} M><br>Description of Symbolic representations: (1) A Smile initiation followed by a FLBP. This is followed by a combination of Angular or Translational Motions/Positions of a designated body part (along any of the 3 axes), followed by termination of the Smile.<br>(2) This representation is an expansion of variation (1) above, but with additional blocks of motion/positions performed by the user along all 3 axes before and after the part that represents variation (1).<br>(3) An opening of mouth is initiated followed by a FLBP. This is followed by a combination of Angular or Translational Motions/Positions of a designated body part (along any of the 3 axes), followed by termination of the mouth open facial expression (that is, closing of the mouth).<br>(4) This variation is simply a combination of variations (1) and (3)<br>Explanation and Discussion: This user gesture is an illustration of how all different motions and positions of a designated body part or designated set of body parts can be used to manipulate an OOI and/or its view on a display screen.<br>OMD Used: Head motion or position.<br>User Action To Command Signals mapping:<br>Roll, Yaw, Pitch motion/position of head-Commands to affect Roll, Yaw, Pitch (motion/orientation of OOI)<br>Translation motion/position of head along X axis-Command signals to move the OOI in X direction (of the head coordinate system)<br>Translation motion/position of head along Y and Z axis-Command signals to translate/pan the OOI along the vertical or horizontal axis of the display screen<br>Use of the User Gesture-variation (1):<br>After the user starts a smile, after a possibly brief FLBP, the control software start generating signals to modify the OOI as per the command mapping described above. When the user rotates the head along one of the 3 axes, the control software can generate command signals to rotate/manipulate the OOI in corresponding axes, in the virtual space. (Virtual display screen refers to situations when there is no physical display screen, but when images can be directly projected on the retina of the user's eye.) When the user starts performing translational motions in the X axis, the control system can generate command signals to translate the OOI along the X axis in virtual space (closer or farther based on the direction of the user's motion). Whereas, when the user performs translation actions in the Y or Z axes (in Head Coordinate System), the control software can generate signals to translate the OOI in the vertical and/or horizontal axes on the |

TABLE 1-continued

An illustrative Embodiment of Gesture based User Interface (that can be used as part of a Control System)

| Command to be Invoked (on the Controlled Electronic Device and/or Controller/Controlling System) | User Gesture to Invoke the Command (Symbolic Representation and Explanation) |
| --- | --- |
| | physical or virtual display screen. If the OOI is a 3D virtual object, this user gesture can basically manipulate the OOI in 6 degrees of freedom.<br>Use of the User Gesture-variation (2):<br>This user gesture can represent a system when the control software is always monitoring and acting upon any motion/position variation of the user's head is detected. However, this embodiment can manipulate the actual motion/position of the OOI in the virtual or real space (based on motion/position of the user's head) only when a smile is active. On the other hand, the embodiment can manipulate only the camera/view angles when no active smile is detected.<br>Use of the User Gesture-variation (3):<br>When a mouth open is detected to be active, the control software can change the display of the OOI on the display screen in accordance to the monitored motion/position of the users head. (This is different from variation (1) where the coordinates of the OOI can be changed in the virtual space.) This is analogous to manipulating only the view/camera angle from whose perspective the OOI is displayed on the display screen (again without actually changing the coordinates or the orientation of the OOI in the virtual space). Therefore, the X translation of user's body part can simply enlarge or reduce the size of the OOI on the display screen (similar to zoom in or out command), possibly accompanied by display of additional or lesser number of details and information about the OOI. (For example, if the OOI was a 3D solid model of a part being designed in a CAD system, when the user zooms in, that can not only show the model bigger in size, but it could also expose additional information (some of it textual), such as dimensions, material properties, tolerance information, manufacturing information, etc. In another example, if the OOI was a map being displayed on the display screen, zooming out could not only make things look smaller but also hide finer level details such as smaller streets, house numbers, interesting locations, etc., and zooming in would do the reverse.) Similarly, in response to Y and Z motions of the user, the control software can simply pan the camera/view angle in corresponding directions on the display screen, without actually changing the coordinates of the OOI in the virtual space. Similarly, by performing rotational motions, the camera/view angle can be changed to show the OOI in correspondingly rotated views (without changing the angular position/orientation vector of the OOI in the virtual space). In this case, it can be said that the camera/view angle (rather than the real or virtual object) is the real OOI.<br>Use of the User Gesture-variation (4):<br>This variation is simply a combination of variations (1) and (3). Therefore, the system can generate signals to modify the camera/view angles to manipulate the display of virtual objects on the display screen when open mouth facial expression is active. On the other hand, system can generate signals to modify an object in real or virtual space (by possibly changing the object of interest's coordinates or other attributes in real or virtual space) when a smile facial expression is detected to be active. If both expressions are active at the same time, the control software can generate signals to modify one or both of the OOIs (Camera/view angle and real/virtual object), possibly based on user preferences.<br>Note: The FLBP ("*") and the period of No Motion ("#") are optional. As noted elsewhere, the "S" can be substituted by any other user action (that may or may not be a facial expression, in this or any other user gesture.) |
| Initialize/Recalibrate Controller/Control System | [$P^2$>] [<$P^2$] [$P^2$>] [<$P^2$] [~] [<$Y^2$] [$Y^2$>] [~]#<br>Description of Symbolic representation: A sequence of TMB Down Pitch followed by Up Pitch, repeated twice, followed by a VLWP waiting for a TMB Left Yaw followed by TMB Right Yaw, followed by another VLWP waiting for a period of No Motion.<br>Explanation and Discussion: The user gesture is designed to reduce risk of unintentionally triggering this command, without making it unduly hard to execute it intentionally. After the last period of this user gesture (that is the period of No Motion) the Initialize/Recalibrate command is issued to the |

TABLE 1-continued

An illustrative Embodiment of Gesture based User Interface (that can be used as part of a Control System)

| Command to be Invoked (on the Controlled Electronic Device and/or Controller/Controlling System) | User Gesture to Invoke the Command (Symbolic Representation and Explanation) |
|---|---|
| | Controller/Control System itself. This last period of No Motion is helpful to allow the user to settle down and get ready for the initialize/recalibration process since typically that requires the user to hold steady (that is have minimal motion).<br>Note: Other embodiments can replace any of the $P^2$ or $Y^2$ motions with P or Y respectively. Also, the VLWPs can be dropped from the user gesture in other embodiments. |

Note:
The above table was just one collection of embodiments illustrating the principles of this invention. Many different other embodiments are possible using the principles above. Further, different embodiments are possible by simply substituting a PCE (Primary Control Expression) in a user gesture with another PCE or with a PCM or with combination of PCEs and PCMs. For example, one could simply substitute expression of Smile by other PCE such as Jaw drop or move side to side, Eyebrown Raise or Lowering, Puff/Such action, Eye Squint, Eye Close, Eye Blink, Mouth Open/Close, Frowing, Pulling a corner of the lips, Puckering lips etc. or by PCMs (Primary Control Motions) performed using other parts such as Raising/Moving Shoulders(s). Raising Arms, Raising Hands, Waving Heads, Rotating Arms/Hands, Kitcking, Punching, Moving out Elbows, Leaning/Twisting/Swaying Torso, Tilting Head up or down for a certain amount of time, etc., or their combination(s). Similarly, OOI Modification Drivers (OMDs) can also be varied to derive further variations. As an example, some user gestures can use motions of the head versus others user gestures can use motions/positions of the eyeball(s) (which can comprise eye gaze) as OMD. Motions/expressions/actions that are neither PCEs, PCMs or OMDs, can also be varied across different embodiments of the same user gesture. For example, motion type (e.g. rotation versus translation, X-axis versus Y-axis, velocity versus acceleration, velocity versus position, etc.), direction, speed, time bounds, magnitude bounds can be varied. Further, parts of any of the described or derived embodiments can be used independently and/or in combination with parts of other embodiments.

Variations are possible by inserting/prefixing a specific sequence of motions or expressions or actions called the Gesture Wakeup Sequence (GWS) at the start of some or all user gestures to help with recognition of those particular user gestures. For example, a period of No Motion (i.e. "#") can be used as a GWS and be inserted/prefixed at the start of any/all of the above user gestures. Accordingly, user gesture for Select command can be said to be changed from being "[<S>]" to "#[<S>]", user gesture for Go Forward command can be said to be changed from "[$Y^2$>][~]#" to "#[$Y^2$>][~]#", and so on. In other words, in variations that use the "#" GWS, any user gesture (including some/all of the ones defined in Table 1 above) can be recognized by the system only if they are immediately preceded by a GWS (which in this case is a POLA which happens to be a period of No Motion of a certain minimum duration). This requirement (of a user gesture being preceded by period of GWS such as No Motion) can provide the further assurance to the control system that the motion/user action pattern sensed has a high probability that it was performed intentionally by the user. Further, it can also provide a convenient method to the user of conveying their intent in achieving particular response from the system (such as generating certain signals) when a certain set of body actions are performed. One example of this situation is when the user is watching their computer, smart TV, smart glasses, etc. while exercising; there is a possibility that they may wince or grin while exercising leading to the system interpret that as a Smile performed by the user in order to execute a user gesture such as Select. However, if a GWS of "#" is required by the system, the user will be required to hold their head/body parts/eye gaze/head pose/etc. (i.e. whatever is the provider of the OMD) steady/within a specified range of motion or position for just a brief moment (i.e. minimum time duration) before their smile action is recognized as part of a user gesture meant to evoke a response from the system. In this fashion, requiring a GWS before the actual user gesture can thereby reduce the chance of false positives without requiring too much of effort from the user.

In another variation, the body actions sequence of "#[~]" can be used as a GWS. Here, an addition of a time bounded VLWP of a specified maximum length right after the period of No Motion can provide additional convenience to some users. For example, user gesture for Select command can be said to be changed from being "[<S>]" to "#[~][<S>]". If for illustrative purposes we say that the time bound on the VLWP was 200 milliseconds, and the minimum time period for "#" was 50 milliseconds, then for the system to recognize the user gesture of "<S>", it would have to be immediately preceded by a period of No Motion of at least 50 milliseconds in duration, followed immediately by an intermediate period (i.e. the VLWP where all motions and body actions other than Smile are ignored) before initiation of a Smile, and wherein the duration of this intermediate period (i.e. the VLWP) is no more than 200 milliseconds. The insertion of a VLWP can help certain users to prepare for the next action in the user gestures. For example, users with Cerebral Palsy may have smiles on their faces unintentionally or as a by product of another user action that they may be trying to achieve. They may have trouble starting a smile immediately after a period of No Motion. Having a "#" as well as a VLWP in the GWS can help them with conveying intention as well as convenience in performance of user gestures that have actions such as smiling.

In another variation, the motion sequence "[$P^2$>][~]#" can be used as the GWS; in this case, the complete user gesture for Select command can be said to be changed from being "[<S>]" to "[$P^2$>][~]#[<S>]", user gesture for Go Forward command can be changed from "[$Y^2$>][~]#" to "[$P^2$>][~]#[$Y^2$>][~]#", and so on. As seen above, a GWS can be very short and simple or be longer and more elaborate. Different types of GWSs can be used for different user gestures and can be required to be performed or not, based on user preference and various modes or states of the system. The use of GWS can help with reducing the chance of unintentionally performed motions from being interpreted as deliberately performed user gestures.

Note that some variations can require GWS for any or all user gestures, whereas other variations can require GWSs for only select few user gestures. Further, different GWSs can be required for different user gestures and multiple GWS's can be used for the same user gesture(s) as well. GWSs can be temporarily enabled or disabled automatically by the system, or based on user request. For example, when the system senses certain patterns of ambient motions and positions (say when the user is running or exercising, in an inclined posture on an exercise bike, on a stepping or elliptical machine, skiing or biking outdoors while wearing an electronic device such as smart glasses, smart helmet, etc.), the system can automatically activate the requirement of having GWS be performed before some or all user gestures. Conversely, when the user motions seem to have subsided, the system can automatically disable the requirement of GWS. The user can also explicitly invoke an "Exercise Mode" (i.e. turn on or off the requirement of GWS) before/after undertaking certain activities.

In other embodiments, concept of Session Wakeup Sequence (SWS) can be used. SWS is a mechanism (a motion/expression sequence, physical or virtual input mechanism) that can be used to kick off a Signal Generation Session (SGS) which is a time period when the system can generate signals in response to recognized user gestures. In other words, SWS can be used as an activation "switch" for activating the generation of control signals (in response to performance of user gestures). This SGS (started by the control system after the occurrence of a SWS) can be of fixed duration or a variable duration in length. For example, a fixed length SGS can last for 30 seconds after a SWS (wherein control signals are generated in response to gestures started by the user within those 30 seconds); and no control signals are generated after the expiration last user gesture that was started within those 30 seconds. However, in another example, if a SWS can be specified to start control signal generation session of variable length and different rules can be used to specify the end of the SGS. In one variation, once started, the SGS can continue to extend a designated amount of time period (say 10 seconds in this example) beyond the completion of the last user gesture started within the SGS. This can allow the SGS to last indefinitely (beyond the first 30 seconds) as long as some user gesture is started within the 10 seconds from the end of a previous user gesture that was part of the SGS. If the SGS has lasted for at least the initial duration of 30 seconds, and no new user gestures were performed within 10 seconds from the end of the last user gesture that was part of the SGS, the SGS comes to an end. (After the end of an SGS, control signals will not be generated even if user performs valid user gestures until the point another SWS is performed.) It will be obvious to persons skilled in the art that the lengths of time and the rules for definition of the duration of a SGS can be easily changed to different amounts and different logic/rules could be used to extend the duration of a SGS (or to terminate a SGS). In some embodiments, SWS can be a specified sequence of motions or expressions; for example, "[<P$^2$]", "#[<P$^2$][~}#[<S>][~}#", etc. In other embodiments users can trigger a SWS or even a GWS, using a physical/virtual input mechanism rather than using body motions or expressions. For example, the user could use an input mechanism (or combination of input mechanisms) including a push button, a key on the keyboard, a touch activated switch, a voice command, a foot pedal, a sip-and-puff switch, a brain-wave/ECG based switching mechanism, EMG based switch, etc., or even click/select an icon/graphical image on the display of the control system/control system/controlled device or use other virtual or programmatic mechanisms to start generation of command signals instead of using a gesture based SWS or GWS.

Different embodiments are also possible by using the current position of the head/body part being tracked or of the controller with respect to the HCS instead of using the current speed/velocity (of the head/body part/controller). For example, in case of the Cursor/OOI Motion user gesture, instead of using the current Pitch (angular) speed to drive the motion of the cursor (in Y direction of the display screen), the current (angular) position along the Pitch axis (Z-axis) could be used instead. This substitution could be done based on motion type or user gesture or any combination of motion type and user gesture or for all motion types and user gestures. Therefore, in this example, the Y position of the cursor/OOI could be driven by the angular position about the Z-axis (in the Head Coordinate System) but the X position of OOI could be driven by the angular speed about the Y-axis. Thus, one can create a multitude of embodiments by mixing and matching the use of speed versus positions in any or all user gestures and for any or all motion types. It will also be obvious to people skilled in the art that, for purposes of monitoring motions which are neither PCM or OMD, (such as the ones used in non-OOI motion commands Go Back, Go Forward, Window Max/Min, and others), the same approach of using position instead of speed in definition and recognition of gestures can be taken.

Note that the recognition of a user gesture and generation of commands/events/signals corresponding to a recognized user gesture can be done in two or more separate processes or processors. For example, when a user performs the "Cancel" user gesture, one part of the control system can recognize that user gesture and map it to the Cancel user gesture, however, rather than generating a "Cancel" event right away, it can pass information about the recognized user gesture to a process running on another part of the control system or the controlled device itself to process the information and generate appropriate control signals at the right time. For example, if the controller was a head based controller and the controlled device was a computer, the controller would send a signal to the computer to indicate that a Cancel gesture was recognized, and then the computer (or its operating system or a program/process running on the operating system), based on which window was active would interpret/convert that signal into either a "Cancel" button press event (if for example the current window had a "Cancel" button) or an "Undo" command (if for example the current window was a word processing/spreadsheet application).

Concept of Modes—Various user gestures in a gesture based user interface can be interpreted differently based on concept of Mode. A Mode is the state that a controller/controlling system or the controlled electronic device at a given instant of time. Mode determines how the controller/controlling system will interpret a particular user action or a user gesture. In other words, the same user action/gesture can be interpreted and translated (into command signals for a controlled electronic device) differently based on what Mode the controller/controlling system/controlled device is in at the time when the user gesture is performed. It is not required that a Mode be applicable to (that is, change interpretation of) all user gestures; a Mode can be defined to change the interpretation/translation of only specific set of user gestures.

Note: When no mode has been previously activated by the user, the system is said to be in Normal Mode. The embodiment in Table 1 can be said to show the user gestures and their interpretations in the Normal Mode for that embodiment.

A Mode can be initiated by either using an input mechanism (such as button press, configuration setting, touch, etc.) on the controller or the controlling system, or via a user gesture specifically designed to start/trigger a Mode. These input mechanisms or the user gestures that initiate a Mode are called the Mode Start Triggers for that Mode. Once initiated, certain user gestures (as specified in the definition of that particular Mode) can be interpreted/translated differently until the point in time when the Mode is terminated. A Mode can be terminated by an input mechanism or a user gesture designed to terminate the Mode or by starting a user gesture that is specified to end a particular existing Mode as well as possibly performing additional actions. These input mechanisms and user gestures that terminate a Mode are called Mode End Triggers. Note that every Mode is required to have at least one start and end trigger. It is also possible to have the same user gesture be specified as the start as well as the end trigger.

Following is an illustrative example of a Mode. The example builds on the embodiment user interface detailed in the Table 1. This Mode is called Easy Motion Mode. Easy Motion mode can allow user to move the cursor/OOI without requiring the user to Smile (which part of the user gesture for cursor/OOI movement as in Table 1). The user can initiate the Easy Motion Mode when he/she wants to move the cursor/OOI continuously for a long time. Easy Motion Mode provides additional user convenience in such situations. Please see the following for definition of the Easy Motion Mode.

TABLE 2

Illustration of Easy Motion Mode - First Embodiment

| Easy Motion Mode | |
|---|---|
| Purpose | Allow user to move cursor/OOI without having to use Smile or any other facial expression continuously. This can allow for additional ease of use in certain user scenarios. |
| Possible Start Triggers | (1) User gesture: [$P^2$>] [~] [<S>]<br>TMB Down Pitch followed by a time bound VLWP waiting for a TMB Smile, followed by a TMB Smile.<br>(2) Input Mechanism:<br>A physical or virtual input mechanism (such as a button, icon, switch, slider, etc.) on the controller or the controlling system can be used. Voice based command could also be used as a start trigger.<br>(3) Extraneous Motions: Hand Wave<br>Assuming that motion of hands are not being tracked by the controller/controller system to be part of a user gesture, extraneous motions such as a Wave of a hand could be used as a Start trigger. (Other user action involving hands, arms, legs, torso, or tensing certain muscles, performing mental activity, etc. can also be used as start triggers.)<br>Note: Any combination of the above triggers can be used to create further variations of the embodiment. |
| User gestures Affected | (1) <S * {YPR} { YPR#} S><br>This user gesture causes Cursor/OOI motion in Normal mode. However, when Easy Motion Mode is active, this user gesture does the opposite; it stops Cursor/OOI motion when the user starts this user gesture (right after the "<S"). Further, no Zoom (or Rotate or equivalent) command signals are generated.<br>(2) {YPR}<br>When Easy Motion Mode is in effect, the user gesture for Cursor/OOI motion will simply be "{YPR}". This means that once the Easy Motion Mode is started, the cursor can move in accordance to the Yaw and/or Pitch motion (without need to hold the Smile) and the display in the active Window can Zoom in accordance with the Roll motion.<br>(3) <S * ## {YPR#} S><br>The system stops cursor movement right after "<S". After the "<S * ##" part of the user gesture is completed, the system starts rotating the image or 3 D model or any selected object/OOI in the window/on screen along the X, Y and Z axes in accordance to R, Y, P motions respectively. (Note that in Normal Mode, this user gesture may have caused a Windows Scroll/Pan or Click and Drag based on the length of the "No Motion" period.) Such functionality can be very helpful for any applications that use 3 D models or images or objects.<br>Note: Any combination of the above gestures can be used to create further variations of the embodiment. |
| Possible End Triggers | (1) User gesture: [$P^2$>] [~] [<S>]<br>TMB Down Pitch followed by a time bound VLWP waiting for a TMB Smile.<br>(2) Input Mechanism:<br>A physical or virtual input mechanism (such as a button, icon, switch, slider, etc.) on the controller or the controlling system.<br>(3) User gesture: <S * [~] [$P^2$>]~S><br>A Smile followed by a FLBP, followed by a VLWP waiting for a TMB Down Pitch. The TMB Down Pitch then is followed by VLWP (without any time bound) waiting for end of Smile to terminate the Easy Motion Mode.<br>Note: It is desirable, though not necessary, for the specified maximum total time duration allowed between start of Smile to start of the TMB Down Pitch in this user gesture to be less than or equal to the specified |

TABLE 2-continued

| Illustration of Easy Motion Mode - First Embodiment | |
|---|---|
| Easy Motion Mode | |
| | maximum total time duration allowed between start of Smile to start of Yaw/Pitch in user gestures for Scroll/Pan and Click and Drag. This allows for easier distinction of this user gesture.<br>Note: Any combination of the above triggers can be used to create further variations of the embodiment |

TABLE 3

| Illustration of Easy Motion Mode - Second Embodiment | |
|---|---|
| Easy Motion Mode | |
| Purpose | Allow user to move cursor/OOI without having to use Smile expression continuously. This can allow for additional ease of use in certain user scenarios. |
| Possible Start Trigger(s) | (1) User gesture: [$P^2$>] [~] [<S>]<br>TMB Down Pitch followed by a time bound VLWP waiting for a TMB Smile. Easy Motion Mode is started at the end of the TMB Smile.<br>(2) Input Mechanism:<br>A physical or virtual input mechanism (such as a button, icon, switch, slider, etc.) on the controller or the controlling system can be used to start this mode. Voice based command input can also be used as a start trigger.<br>(3) Extraneous Motions: Hand Wave<br>Assuming that motion of hands are not being tracked by the controller/controller system to be part of a user gesture, extraneous motions such as a Wave of a hand could be used as a Start trigger. (Other body gestures involving hands, arms, legs, torso, etc. can also be used as Start triggers.)<br>Note: Any combination of the above triggers can be used to create further variations of the embodiment. |
| Commands (user gestures) Affected | (1) {YPR}<br>When Easy Motion Mode is in effect, the user gesture for Cursor/OOI motion combined with Zoom will simply be "{YPR}". This means that once the Easy Motion Mode is started, the cursor will move in accordance to the Yaw and/or Pitch motion. (Note that without the Easy Motion Mode, the user gesture for this command is "<S * {YPR} {YPR#} S>" as in Table 1.)<br>Note: In this embodiment, none of the other commands that begin with "<S" are not listed as affected. That allows user gestures for commands such as Click/Select, Scroll/Pan, Click and Drag to remain the same, thereby alleviating the need for the user to remember the modified user gesture for those commands in Easy Motion Mode. Further, the original user gesture for cursor/OOI motion is not listed here either; it is listed under End Triggers instead.<br>Note: Other gestures could be added to this list to create further variations of the embodiment. |
| Possible End Trigger(s) | (1) User gesture: [$P^2$>] [~] [<S>]<br>TMB Down Pitch followed by a time bound VLWP waiting for a TMB Smile.<br>(2) Input Mechanism:<br>A physical or virtual input mechanism (such as a button, icon, switch, slider, etc.) on the controller or the controlling system.<br>(3) User gesture: <S * {YPR} {YPR#} S><br>This user gesture causes Cursor/OOI motion combined with Zoom in Normal mode. In this embodiment, when Easy Motion Mode is active, this user gesture still works the way it works in the Normal mode (i.e. causes cursor/OOI motion in accordance to Y and P motions and Zoom according to R motions), however, with the difference that at the end of this user gesture, it also terminates the Easy Motion Mode. This allows the user to terminate the Easy Motion Mode while leaving the cursor/OOI precisely at the desired location.<br>Note: Any combination of the above triggers can be used to create further variations of the embodiment. |

Modes can also be defined such that the same user gesture may result in different commands based on what mode the system is in. For example, the user gesture for cursor motion in Normal Mode can lead to panning of the view in a 3D Modeling mode; a click and drag user gesture from Normal Mode can be made to cause rotations in 3D Modeling mode; the zoom gesture from Normal Mode can be made to cause the camera position in relation to the 3D model and so on.

Some embodiments can define user gestures that do not rely on any PCEs for purpose of performing user gestures. For example, a head or a hand worn device can allow the user to perform user gestures without use of any facial expression. Some embodiments can use certain head motions/positions (including tilting/pitching of the head up or down, rolling the head, yaw rotation left/right or any combination), actions involving input mechanisms (such as touching, tapping, touching and holding on a touch sensitive surface on the controller or controlled device or any other suitable device, pressing a button or a switch, etc.), touching/pressing a touch and/or pressure sensitive surface, voice based commands, or a combination of such user actions as user gestures specified to start generating command signals for OOI modification/motion, selection, scroll or pan, navigation, etc. In such embodiments, operations that can continue over a period of time (such as those involving OOI motion, Click and Drag, Scroll/Pan, etc.) can be terminated based on occurrence of POLAs (such as period of No Motion) or any specified user gesture. Some head worn devices can also use concept of Modes described above for purpose of control (of themselves or acting as controllers of other devices).

Some embodiments can use specified combination of actions as the starting trigger for starting OOI Motion (or OOI Attribute Modification) instead of a PCE or PCM. For example, they can use combination of head nod (up/down), head shake (side to side), rotation, roll or tilt in specified direction(s), possibly within specified limits of magnitude and possibly to be performed within certain limits of time, as triggers to be used to start modification of an OOI. Following Table 4, is an illustration of some combinations possible using Pitch head motion (nod) as the primarily ingredient for the trigger. (Note that Pitch action can be substituted by other actions.)

TABLE 4

Exemplary Embodiments of Start Trigger (that can be used to start generation of OOI Attribute Modification signals)

| # | Trigger Action that can start generation of Signals such as OOI Modification Signals | Description |
|---|---|---|
| 1 | <P | A pitch motion of the head upwards. This can also be described as a tilting the head up. |
| 2 | <P> | An upward pitch followed by a downward pitch. This can also be described as an up and down head nod. |
| 3 | <$P^2$> | A upward pitch followed by a downward pitch, both of whom fall within specified magnitude bounds. |
| 4 | [<$P^2$>] | A upward pitch followed by a downward pitch, both of whom fall within specified magnitude bounds and the whole action is performed within specified time bounds. |
| 5 | {#}[<$P^2$>] | Same as #4 above, but wherein the pitch motion is also immediately preceded by a period of No Motion, possibly of a specified minimal length. |
| 6 | {#}[<$P^2$>]{#} | Same as #5 above, but wherein the pitch motions are also followed by a period of No Motion, possibly of specified minimum length. |
| 7 | {#}[<$P^2$>][~][#] | Same as #5 above, but wherein the pitch motions are also followed by a variable length waiting period (with a specified limit on its maximum duration) followed by a period of No Motion which possibly has a specified minimum length and/or maximum length. |

As mentioned before, the "P" motion can be substituted by Y or R, or can be replaced by any combination of P, Y and R motions. Further the head motions can be replaced by motions of any other body part, including but not limited to hand/arm motions and eye motions/eye gaze. The "P" action can even be substituted by an audio signal such as the user making a sound of increasing or decreasing frequency or even simply issuing a vocal command such as by saying "Move Object". As mentioned above, triggers can be made of combination of actions in any of the 3 axes (translational or rotational) rather than just P motion/position. In some embodiments, for example, the user may be required to trace a specified shape by using head motion. For example, the user may require to move their head so that their nose roughly follows a circular, square, rectangular, elliptical, triangular, heart shaped, or linear trajectory (or some combination), possibly within specified bounds of time. Trajectories can be of any shape and size and can be open or closed (loop). In variations, as long as the user starts (a set of user actions) and reaches back to the same approximate position and/or orientation (upon completing the user actions), possibly within specified (minimum and/or maximum) time bound, that can be considered to be a trigger. A trajectory started or performed in a clockwise motion can be considered to be different from one started or performed in an anti-clockwise direction, even though the shapes of the trajectories may be the same. (Thereby every shape can lead to at least two different types of triggers, used for different purposes.)

Similar to variation (7) in Table 4 (where the user's head/nose can come back to roughly the same position at the end of the trigger compared to at the start of the trigger), one trigger action can be where the user is instructed to move their head in space such that their nose follows a trajectory that can trace a closed loop (within a specified tolerance zone) such that the entire motion is possibly finished in specified amount of minimum and maximum time limits, wherein the magnitude of head motion can also be within specified amount of magnitude bounds, and the head motion can be immediately preceded by a period of No Motion with specified time bound, and can be followed by a variable length waiting period (VLWP) with a time bound, wherein the VLWP can be terminated upon a period of No Motion (possibly of a specified minimum and/or maximum duration). To an external observer, the user may seem to be performing a loop motion with their face/head followed by additional motion of the head to get ready to begin OOI motion/modification with their head.

OOI Modification/Motion initiated without use of PCE/PCM can be also terminated by other specified actions that may not involve PCE/PCM; such actions can include POLAs including dwelling action possibly performed for specified minimum duration of time. As an example, following table (Table 5) illustrates an embodiment where some of the commands are invoked without use of PCE or PCM.

TABLE 5

An illustrative embodiment of gestures based User Interface that can be implemented without the use of a PCE or PCM.

| Command to be Invoked (on the Controlled Electronic Device and/or Controller/ Controlling System) | User Gesture to Invoke the Command (Symbolic Representation and Explanation) |
|---|---|
| Modify an OOI (Object of Interest) | {#}[<P$^{2}$>][~][#]{YP}#<br>The initial action sequence of "{#}[<P$^{2}$>][~][#]" can be considered as a start trigger. OOI modification signals can be generated in accordance to the "{YP}" motion/actions, wherein the generation is stopped when a period of No Motion "#" (possibly of minimum specified length) is encountered.<br>Further variations of this gesture can be as below, where a Roll motion can serve as a start as well as end trigger. (Using Roll motion can be advantageous in some situations as those motions/positions are orthogonal to and distinct from Pitch and Yaw, which can be more intuitive to some users as OMD actions.)<br>{#} [R]{YP}[R] or<br>{#} [R][#]{YP}[R]<br>In the last variation, note the [#] inserted after the first [R] in order to ascertain the user holds their position right after the first [R] for at least a certain minimum amount of time. (Note that in this case the trigger action consists of motion R which is orthogonal to motions Y and P that affect the attributes of the OOI.) Similarly, a "#" could be added right after the second [R]. This variation can also be made more specific by specifying direction of R, for example as follows -<br>{#}[<R][#]{YP}[R>] or<br>{#}[R>][#]{YP}[R>] or<br>{#}[R>][#]{YP}[<R] |
| Left Click/Select/Tap (on a touch surface) | [>P<] or<br>[P>]<br>The first variation can be viewed as opposite to the "<P>" used as the start of OOI Motion trigger.<br>The second variation is a simplified version of the first version and requires just a Down Pitch action.<br>A requirement for a period of No Motion "#" (of minimum specified length) can be added to the beginning of each of the user gesture definitions above.<br>Note: Some embodiments can generate a designated key/button press/release, touch start/end signals instead of mouse button press/release signal(s). |
| Right Click Or Long Press | Y> [>P<] or<br>[Y>] [>P<] or<br>Y> [P>]<br>First variation can require a right yaw motion followed by a Down and Up Pitch motion/action. The Pitch action can have time and magnitude bounds. The Right Click, Long Press (or equivalent) signals can be generated at the end of the Pitch.<br>The second variation is similar to the first one, with the difference that the first action (Yaw) can be required to have time and/or magnitude bounds.<br>The third variation is a simplified version when a Right Yaw action is followed by a Down Pitch action, where in the Pitch motion can have time and magnitude bounds. |
| Click and Hold / Left Mouse Button Press and Hold | <Y [>P<] or<br>[<Y][>P<]<br>The first variation shows a Left Yaw action/motion followed by a time and magnitude bounded sequence of Down Pitch followed by an Up Pitch. (When the actions are performed with the head, this can look like a left yaw motion of the head followed by a TMB downward nod of the head.) The Left Mouse Press signal (or equivalent) can be generated at the end of the Pitch action.<br>The second variation is similar to the first variation with the difference that the first action (left Yaw) also can have a time and/or magnitude bound.<br>Y, P, R actions following either of the above variations can be interpreted as OOI modification actions, possibly terminated by an ODE such as a POLA, at which point additional signal (such as a mouse button release) can be generated to match the button press signal. E.g. In the below gesture,<br>[<Y][>P<] {YPR} {#}<br>the release signals can be generated when the {#} POLA is detected, probably right after it attains the minimum required time duration. |

TABLE 5-continued

An illustrative embodiment of gestures based User Interface that can be implemented without the use of a PCE or PCM.

| Command to be Invoked (on the Controlled Electronic Device and/or Controller/ Controlling System) | User Gesture to Invoke the Command (Symbolic Representation and Explanation) |
|---|---|
| Swipe Left | [<Y>] or<br>[<Y] Y><br>Both variations above show a Left Yaw followed by a Right Yaw action. The Swipe Left signal is generated after the Right Yaw action is complete. The Right Yaw action in the second variation can impose a minimal bound on the time duration of the Right Yaw action, and the swipe signal can be generated right after that minimal time duration condition is satisfied (rather than waiting for the Right Yaw motion/action to complete). |
| Swipe Right | [>Y<] or<br>[Y>] <Y<br>These user gestures are similar to the Swipe Left user gesture with the difference that Left Yaw is substituted by Right Yaw and vice a versa. |
| Scroll/Pan | <R [#] {YP}# or<br>{#} <R> [#] {YP}# or<br>[<R>] [#] {YP}# or<br>#[<R>] [#] {YP}#<br>The above variations show some roll motion (with or without time and magnitude bounds, possibly sandwiched in between periods of No Motion (with or without time bounds) followed by Yaw and Pitch motions, terminated by period of No Motion, where in the scrolling/panning command signals are generated in accordance to the direction and/or magnitude of the Yaw and Pitch motions. The generation of the signals can end as soon as a period of No Motion of minimum specified duration is encountered ("#"). |

Note:

Actions such as "[<P>]" can look like a regular up and down head not to a casual observer; however, it is not because they have to be completed in precise time and magnitude bounds, thereby raising awareness of the user while performing them and thereby bringing in a high degree of user intent. This awareness and communication of user intent can be further enhanced by adding a requirement of a POLA (such as "#") before or after such actions.

Note:

In the above table as well as any other variations of user gestures (anywhere else in this or referenced documents) where two orthogonal motions follow each other, periods of No Motion, POLAs or FLBPs or VLWP can be inserted between them for user convenience. E. g., "[<Y][>P<]" can be substituted by "[<Y]{#}[>P<]" or "[<Y]{#}[>P<]" or" [<Y]{~}[>P<]", or "[<Y]{~}[>P<]", and so on. Further, such insertions can be made between any two consecutive linear segments, regardless of the angle between them. Therefore, for example, the action sequence "P>Y>" can be replaced by "P> [#] Y>" or "P> [~] Y>" and so on, but even "P> P>" can be replaced by "P> [#] P>" or "P> [~] P>", and so on. This principle can be further applied to non-linear segments of motions in a user gesture. For example, if a user gestures includes of a motion in the shape of an arc (or any non-linear shape), followed by motions in shape of another arc (or any other non-linear shape), then a "#", "~" and/or "*" can be introduced between them (possibly with specified minimum and/or maximum time limits). These introductions can not only make it easier for the user to perform those motion/position actions, but also can help with ascertaining user intent (intentionality of the user) behind those actions.

TABLE 6

An embodiment of a User Interface using User Gestures with prominence of Roll Motion/Position actions.

| Command to be Invoked | User Gesture to Invoke the Command |
|---|---|
| Move/Modify an OOI (Object of Interest) | {#}[<R][~][#]{YP}#<br>The start trigger is performance of a roll motion to the left, preceded by an optional period of No Motion and followed by a VLWP that looks for another period of No Motion. The {YP} motions after that are used for generation of the OOI modification signals, which can end upon encountering a POLA such as a period of No Motion.<br>{#}[<R][#]*{YP}#<br>In this variation, the bounded VLWP is replaced by a FLBP. Here the user can be required to hold their position steady (to perform the [#]) right after the Roll motion to confirm the OOI Modification start trigger, then given some time (via the * FLBP) to get into a position to start modifying the OOI in accordance to the {YP} motion. The signal generation for OOI modification continues until when the YP motions are brought to be within specified limits for at least a minimum amount of specified time.<br>{#}[<R>][<R][#]*{YP}#<br>In this variation, the system requires an additional [<R>] action in the start trigger. This can help with confirmation of user intent. (This approach of requiring additional actions can be used in any user gestures.)<br><P {YP} Or<br>{#}<P {YP} {#} |

TABLE 6-continued

An embodiment of a User Interface using User Gestures with prominence of Roll Motion/Position actions.

| Command to be Invoked | User Gesture to Invoke the Command |
|---|---|
| | The last two variations above are simpler versions of the previous variations, with optional periods of No Motion, possibly with specified minimum and maximum time duration requirements. |
| Scroll/Pan | {#}[R>][~][#]{YP}# Or<br>[#][R>][#]*{YP}#<br>This gesture is very similar to the ones for OOI Motion/Modification, with the exception of the direction of the Roll Motion (right versus left). The right roll can be used to move contents of a window (on the display of the controlled electronic device) as opposed to a mouse cursor/pointer or other graphical icon or input mechanism. The window in focus performs a scroll action in accordance to the { YP} motion until a POLA is encountered.<br>Note: These variations can be simplified similar to the simplification of the variations for OOI Modification gesture. |
| Click and Drag | {#}[<R][~][##]{YP}#<br>{#}[<R][##]*{YP}#<br>{#}[<R>][<R][##]*{YP}#<br>These variations are very similar to the OOI Motion gestures described above with the difference that the second period of No Motion is longer. This is indicated by "[#]" with two dots (versus only one dot in "[#]"). Here, the user can be required to hold steady for a longer period to indicate they want to cause a Left Mouse Button Press signal (or a touch and hold signal on a touch sensitive surface or any other equivalent signal) to be generated upon performance of the [##]. The following {YP} then can generated OOI motion/modification signals until the ODE "#" (period of No Motion) is encountered, when a Left Mouse Button Release signal (or signal signifying termination of touch of a touch/pressure sensitive surface or equivalent signal) is generated, in effect bringing the Click and Drag command to an end.<br>Note that if the user does not perform the {YP} action, but performs a "#" (i.e. period of No Motion) instead, then that is still treated as a "Click and Drag" operation where the button press and release signals are generated without any motion between the two. This in effect can be treated as a Click command.<br>Note: The above gesture definitions can be used for generating signals using the Right Mouse Button on a computer mouse (or equivalent) by substituting a "[R>]" for a "[<R>]". |
| Click/Select | {#}[<R][~][###]<br>{#}[<R][###]<br>{#}[<R>][<R][###]<br>A Selection signal can be generated at the end of the [###] action. A Left Mouse Button click can be generated based on use of [<R] in the above gesture and a Right Mouse Button click can be generated for the variations below.<br>{#}[R>][~][###]<br>{#} [R>][###]<br>{#}[<R>][R>][###]<br>It will be obvious that the [<R] can be used for Right Click and [R>] can be used for Left Click instead. |
| Swipe Left | $[\#][<Y^2]$ or<br>[#][P>][<Y]<br>The first variation shows an optional period of No Motion followed by a left time bounded yaw with possibly magnitude bound(s) as well. The Left Swipe command signal can be generated at the end of the gestures. In some controllers, a Click and Drag command with motion to the left side can also generate a Left Swipe signal.<br>Note that the above variations can also use [<Y>] instead of [<Y], or $[<Y^2>]$ instead of $[<Y^2]$.<br>The second variation requires and additional down pitch. Additions like these (especially motions in an axis different from the axis of the main motion) can be useful in ascertaining user intent and weeding out gestures performed unintentionally by the user. It can also increase the efficacy of the gesture detection algorithms, both in terms of CPU performance as well as lowering of false positives and/or false negatives. Note that the added orthogonal action can require different time and magnitude bounds to make it easier to perform in relation to the original user gesture. For example, a wider time duration range may be specified to complete the additional action as well as a wider range of magnitudes of motion may be allowable. Therefore, as per the second variation above, the user can be required to gently rotate the head in generally the downward direction (down pitch) before flicking it side ways to the left (left yaw). Given that human beings generally do not move their heads abruptly in orthogonal directions, use of consecutive orthogonal motions can be very helpful in communicating and detecting user intention. Generally speaking, it could be said that when user gestures are designed to start with actions in orthogonal axes, that can lead to easier ascertainment of intentionality behind those user actions. This can be especially true when at |

TABLE 6-continued

An embodiment of a User Interface using User Gestures with prominence of Roll Motion/Position actions.

| Command to be Invoked | User Gesture to Invoke the Command |
| --- | --- |
| | least one of those consecutive actions in orthogonal directions have requirements around time and magnitude bounds.<br>Right swipe can be had by substituting [<Y] by [Y>], [<Y>] by [> Y <], [<$Y^2$] by [$Y^2$>], and [<$Y^2$> ] by [>$Y^2$<]. |
| Swipe Right | [#][<$Y^2$] or<br>[#][P>][Y>]<br>The first variation shows optional period of No Motion followed by a left time bounded yaw with possibly a magnitude bound as well. The Right Swipe command signal can be generated at the end of the gestures. In some controllers, a Click and Drag command with motion to the right side can also generate a Right Swipe signal.<br>Note that the above variations can also use [>Y<] instead of [Y>], or [>$Y^2$<] instead of [$Y^2$>].<br>The second variation requires and additional down pitch. Additions like these (especially motions in an axis different from the axis of the main motion) can be useful in ascertaining user intent and weeding out gestures performed unintentionally by the user. |
| Page Down | [#][$P^2$>] or<br>[#][Y>][$P^2$>]<br>The first variation can require a time bound and magnitude bound down pitch, possibly preceded by an optional POLA such as a period of No Motion. The Page Down signal can be generated when the [$P^2$>] action is detected.<br>The second variation inserts an additional motion ([Y>]) which is in an orthogonal direction to the main defining motion of the gesture that happens along the P axis. The Page Down signal can be generated when the [$P^2$>] action is detected.<br>Note that the above variations can also use [>$P^2$<] instead of [$P^2$>]. |
| Page Up | [#][<$P^2$] or<br>[#][Y>][<$P^2$]<br>The first variation can require a time bound and magnitude bound down pitch, possibly preceded by an optional POLA such as a period of No Motion. The Page Down signal can be generated when the [<$P^2$] action is detected.<br>The second variation inserts an additional motion ([Y>]) which is in an orthogonal direction to the main defining motion of the gesture that happens along the P axis. The Page Down signal can be generated when the [<$P^2$] action is detected.<br>Note that the above variations can also use [<$P^2$>] instead of [<$P^2$]. |
| Zoom In or Out | [P>]{R}#<br>A down pitch (possibly time as well as magnitude bound) followed by a Roll motion causes zoom in or out command. The command signals can be generated continuously in accordance to direction and/or magnitude of R motion. The generation of signals can be ended upon a POLA such as period of No Motion. Note that [P>] can be substituted by a [<P] or even a [<Y] or [Y>]. |

Note:
The User Gestures in Table 6 can be used with Smart Glasses and other Head Worn Devices (including but not limited to Head/Ear Phones, Ear Buds, Eye Wear, Augmented Reality or Virtual Reality Devices), as well as other Wearables (such as wrist bands) as well as Hand Held controllers, where the pointing is often done by Yaw and Pitch actions and the wearable device may not be able to sense facial expressions.

TABLE 7

An embodiment of a User Interface using User Gestures that can be used with Smart Glasses and other Head Worn Devices (including but not limited to Head/Ear Phones, Ear Buds, Eye Wear, Augmented Reality or Virtual Reality Devices), as well as other Wearables (such as wrist bands) as well as Hand Held controllers.

| Command to be Invoked | User Gesture to Invoke the Command (and Explanation) |
| --- | --- |
| Move/Modify an OOI (Object of Interest) | {#}[<R]*{YP}#<br>The "{#}[<R]" action sequence is used as a start trigger. The start trigger here constitutes a Left Roll motion (with time and magnitude bounds) which is preceded by an optional period of No Motion of at least a specified minimum length. Once the complete start trigger is performed, the control system can ignore all motions for the duration of the following FLBP ("*"). The subsequent {YP} motions can be used to generate signals to modify the current OOI. This generation of signals can end when a POLA is encountered, which in this case is a period of No Motion of a minimum specified duration.<br>{#}[<R][~][#]{YP}#<br>In this variation, the FLBP of the first variation is replaced by a bounded VLWP that looks (waits) for "[#]" (that is a period of No Motion with a lower |

TABLE 7-continued

An embodiment of a User Interface using User Gestures that can be used with Smart Glasses and other Head Worn Devices (including but not limited to Head/Ear Phones, Ear Buds, Eye Wear, Augmented Reality or Virtual Reality Devices), as well as other Wearables (such as wrist bands) as well as Hand Held controllers.

| Command to be Invoked | User Gesture to Invoke the Command (and Explanation) |
|---|---|
| | as well as upper bound on its duration) to occur. The use of VLWP therefore gives user some limited time to settle down after performing the Roll motion before starting to generate the signals to modify the OOI in accordance to the "{YP}" motions, until a POLA ("#") is encountered.<br>{#}[<R>][<R]*{YP}#<br>This is a variation of the first variation above. In this variation, the system requires an additional [<R>] action in the start trigger. This additional requirement can further help with confirmation of user intent and reduce false positives when recognizing gestures. (This approach of requiring additional actions can be used with any user gestures.)<br>Some embodiments can do away with the "{#}" at the beginning of the user gesture variations above. |
| Scroll or Pan | {#}[R>]*{YP}# Or<br>{#}[R>][~][#]{YP}#Or<br>{#}[>R<][R>]*{YP}#<br>These variations are the same as the variations described for Move/Modify OOI command above, with the difference that the Left Roll action is replaced by the Right Roll action and vice versa, and Scroll or Pan command signals are generated in accordance to the {YP} motions.<br>Some embodiments can do away with the "{#}" at the beginning of the user gesture variations above. |
| Zoom or Rotate | {#}[R>]*[##]{YP}# or<br>{#}[R>][~][##]{YP}# or<br>{#}[>R<][R>]*[##]{YP}{#}<br>These variations are similar to variations for Scroll and Pan above but with some differences. In the first variation, there is a period of No Motion at the end of the FLBP (that is a "*"). In the second variation, the period of No Motion has a minimum time bound which is higher in value than the one used for Scroll/Pan. For the third variation, there is a period of No Motion after the FLBP. Zoom in or out command signals can be generated in accordance to the Pitch motions/actions, wherein for example, Up Pitch actions can result in zooming out and Down Pitch can result in zooming in. Similarly, Rotate Left (anticlockwise) or Right (clockwise) commands signals be generated based on Yaw Left or Yaw Right actions. Note that the magnitude of the generated Pitch or Rotate command can be based on the magnitude of the Pitch or Yaw actions and/or the amount of time the Pitch or Yaw action is performed. The signals can stop being generated when the last period of No Motion ("#") is performed.<br>Some embodiments can restrict the user command to be only a Zoom or a Rotate based on some criterion evaluated at the beginning of the "{YP}" action and locking the subsequent generation of commands to be either Yaw or Pitch to be based on that criterion. For example, if the Yaw action's absolute magnitude was larger than the absolute magnitude of Pitch at the beginning of the "{ YP}" part of the user gesture, then the system can ignore the Pitch actions for the remainder of the user gesture, and in effect treating that user gesture as a Rotate user gesture.<br>It will be obvious to persons knowledgeable in the art that the Pitch can be substituted for Yaw (and vice versa) in the user gestures above to generate the Zoom or Rotate command signals. Further, the direction of the Pitch or Yaw can be switched while generating the Zoom or Rotate signals as well. (For example, Up Pitch action can result in zooming in and Down Pitch can result in zooming out.) |
| Click or Select or Tap/Touch | [P>] or<br>{#}[P>] or<br>{#}[>P<] or<br>{#}[P>][<P] or<br>{#}[P>][#][<P]<br>The first variation is simply a Pitch Down motion performed within specified bounds of time and magnitude. At the end of satisfactory performance of the motion, at least one signal is generated intended to cause a Click or Select or a Tap or Touch action on the device being controlled. The Click command signal can be equivalent to a Left Mouse Button Click signal (generated by a computer mouse or touchpad).<br>The second variation requires a period of No Motion of a minimum specified duration, before the Pitch motion is initiated.<br>The third variation is similar to the second variation, albeit with an additional requirement of a Pitch Up motion following the Pitch Down motion.<br>The fourth variation is functionally the same as the third variation, however, represented a little differently to explicitly show a time and magnitude bounded Pitch Up motion following the Pitch Down Motion. Note that the time and magnitude bounds on the Pitch Down motion can be different from those on the Pitch Up motion. |

TABLE 7-continued

An embodiment of a User Interface using User Gestures that can be used with Smart Glasses and other Head Worn Devices (including but not limited to Head/Ear Phones, Ear Buds, Eye Wear, Augmented Reality or Virtual Reality Devices), as well as other Wearables (such as wrist bands) as well as Hand Held controllers.

| Command to be Invoked | User Gesture to Invoke the Command (and Explanation) |
|---|---|
| | The fifth variation is a variation of the fourth variation, where a period of No Motion (with both a specified lower and a specified upper bound on the length of the period of No Motion) or a POLA is inserted between the two Pitch motions. This addition can provide convenience to the user as well as help with the gesture recognition algorithms. |
| Right Click or Back Button or Escape Button | [<P] or<br>{#}[<P] or<br>{#}[<P>] or<br>{#} [<P][P>] or<br>{#}[<P][#][P>]<br>The five variations above are same as the five variations for the Click/Select/Tap command above with the difference that the Pitch Down motions have been replaced by Pitch Up motions and vice versa. Also, at the end of the performance of the user gesture, a signal equivalent to click of a Right Mouse Button (on a computer mouse or touchpad) or the Back Button or Escape Button (for example, on devices based on Android operating system), can be generated. |
| Click and Drag OOI | {#}[<Y][P>]*{YP}# Or<br>{#} [<Y][P>][~}#{YP}# Or<br>{#} [<Y][P>][<P]{YP}#<br>The gesture can begin by user performing a period of No Motion (possibly of a minimum specified duration), after which the user can perform a Left Yaw motion followed by a Pitch Down Motion within specified individual time bounds and with magnitudes within specified ranges. After this point, there can be three variations as depicted above.<br>In the first variation, the system can ignore all motions for a specified time period (as shown by "*", a FLBP). After the expiration of the FLBP, a Left Mouse Button Press signal (or equivalent) can be generated.<br>In the second variation, the system can ignore all motions for a specified maximum time period, until a period of No Motion of minimum specified duration is performed (as shown by "[~] #", a VLWP). After the successful completion of the VLWP (that is the user performing the "#" within the max time bound of the VLWP), a Left Mouse Button Press signal (or equivalent) can be generated. (Note: IF the user does not perform the "#" within the specified time bound of the VLWP, the system can reject the gesture. The user actions performed so far for this gesture can be ignored, and the system can go back to waiting for a new gesture to be performed by the user.)<br>In the third variation, the user can perform a Pitch Up motion within a specified time and magnitude bound. After completion of the Pitch UP, a Left Mouse Button Press signal (or equivalent) can be generated.<br>After the above, OOI modification signals can be generated in accordance to the Yaw and Pitch motions. The generated signals can stop when a period of No Motion of a minimum specified duration is encountered ("#"). At this point, a Left Mouse Button Release (of equivalent signal) can be generated.<br>Note: In some systems, a Touch Start signal (indicating initiation of a touch of a touch sensitive surface of a device, such as a touch sensitive display screen of the device) can be considered as equivalent to the Left Mouse Button Press signal. Similarly, an End of Touch signal (indicating the ending of a touch that was previously started) can be considered to be equivalent to the Left Mouse Button Release signal. Further, some systems can generate additional signals during the time period between the generation of the Touch Start and End of Touch Signal to signify/simulate continuous touch by the user).<br>Some embodiments may not require the "{#}" at the beginning of the user gesture.<br>Some embodiments can use "<P" instead of "P>" and vice versa in the variations above. Further, some embodiments can generate Right Mouse Button signals instead of the Left Mouse Button signals described above. |
| Swipe Left or Right | Swipe Left:<br>[P>][<Y] Or<br>{#}[P>][<Y] Or<br>{#}[P>][#][<Y]<br>The first variation includes a Down Pitch followed by a Left Yaw (both with time bounds). In the second variation, the gesture can begin by user performing a period of No Motion (possibly of a minimum specified duration), after which the user can perform a Pitch Down motion followed by a Left Yaw motion. A Swipe Left signal can be generated at the end of the Yaw action. The third variation can work very similarly to the second variation, with the difference that the user can also perform a period of No Motion (possibly with lower as well as higher bound on the time duration of the period) between the Pitch and the Yaw actions. |

TABLE 7-continued

An embodiment of a User Interface using User Gestures that can be used with Smart Glasses and other Head Worn Devices (including but not limited to Head/Ear Phones, Ear Buds, Eye Wear, Augmented Reality or Virtual Reality Devices), as well as other Wearables (such as wrist bands) as well as Hand Held controllers.

| Command to be Invoked | User Gesture to Invoke the Command (and Explanation) |
|---|---|
| | In some devices that have touch sensitive surfaces (for example, smart phones and tablets), wherein the user can swipe on the surface using a body part (such as a finger), the time taken to complete the swipe and the distance covered by the body part while in touch with the touch sensitive surface can have an impact on the amount and/or type of signals generated from the swipe action. For example, a TMB short swipe can result in quickly changing the displayed object on the display screen of the device from one graphical object (or set of graphical object) to another in a quick succession. Whereas, a slow and long swipe can result in the display showing a slow or slower deliberate transition (possibly on the display screen) from the first graphical object (or set of graphical objects) to another graphical object (or set of graphical objects). All three variations of the swipe gesture above can mimic this effect, wherein the generated signals for a swipe command can emulate a quick and short swipe or a slow and long swipe based on the speed of the performance of the Pitch and/or Yaw actions. Some embodiments can have the speed and/or length of the generated swipe command be driven by only the second action (i.e. the Yaw action in the above variations). Some embodiments can start generating the swipe command signals when the second action (i.e. the Yaw action in the variations above) begins and end the generation when the second action ends. In effect, the control system can emulate initiation of a touch of the touch sensitive surface by the user when the second action is started and continue emulating the touch until the end of the second action or the end of the gesture. This emulated touch can begin at/from the current or last location of a mouse pointer or cursor on the screen, or from the center of the screen, or from the end point of the previous swipe command (whether or not that swipe command was performed by the user by physically touching the touch sensitive surface or was an emulated swipe), or a specified number of pixels/distance away from any of the above mentioned locations, one of the edges of the display screen, or any other suitable location. During this emulation, the system can also generate signals for emulating the change in location of the emulated point of touch on the touch sensitive surface, by generating signals to emulate the change in the location of the emulated touch (on the touch sensitive surface) in accordance to the second action (that is the Yaw motion in this embodiment).<br>{#}[P>][#][Y]# (Fourth variation)<br>The fourth variation above is similar to the third variation above with the difference that the second action is a generic Yaw action (as against a Left Yaw in the third variation). This variation can therefore lead to a Left or a Right Swipe based on either the direction of the motion/action at the beginning of the second action (i.e. Yaw in this case) and/or the instantaneous direction of the second action. Thus the system can start generating signals for left or right swipe when the second action starts, but then change (and continue to change) the direction of the generated swipe signals when the second action changes direction. This (possibly continuous) change in direction can be achieved by changing the instantaneous location of the emulated touch point based in accordance to the instantaneous direction and/or magnitude of the second action.<br>{#}[<Y] (Fifth variation)<br>Some embodiments can implement the fifth variation for the Swipe Left command, which is simply a Yaw Left action, possibly preceded by a period of No Motion, wherein the Yaw Left action may have time and/or magnitude bounds. A Left Swipe signal can be generated at the end of the Yaw Left Action.<br>Some embodiments may not require the "{#}" at the beginning of the user gesture.<br>Swipe Right:<br>[P>][Y>] Or<br>{#}[P>][Y>] Or<br>The Swipe Right user gesture variations above are shown to be very similar to the first three variations of the Swipe Left gesture illustrated above, with the difference that the Left Yaw action ("[<Y]") can be replaced by a Right Yaw action (such as "[Y>]"). The generation of the command signals can work similar to above descriptions of Swipe Left command as well with the difference that Swipe Right command signals are generated (instead of Swipe Left command signals).<br>{#}[Y>]<br>This variation can also be used for Swipe Right (similar to the Swipe Left fifth variation). |
| Swipe Up or Down | Swipe Up:<br>[Y>][<P] or<br>{#}[Y>][<P] or<br>{#}[Y>][#][<P] |

TABLE 7-continued

An embodiment of a User Interface using User Gestures that can be used with Smart Glasses and other Head Worn Devices (including but not limited to Head/Ear Phones, Ear Buds, Eye Wear, Augmented Reality or Virtual Reality Devices), as well as other Wearables (such as wrist bands) as well as Hand Held controllers.

| Command to be Invoked | User Gesture to Invoke the Command (and Explanation) |
|---|---|
| | As shown in the first and second variations above, the gesture can begin by user performing a period of No Motion (possibly of a minimum specified duration), after which the user can perform a Yaw Left motion/action followed by a Pitch Up motion/action. A Swipe Up signal can be generated at the end of the second action (Pitch). The third variation can work very similarly to the first two variations, with the difference that the user can also perform a period of No Motion (possibly with lower as well as higher bound on the time duration of the period) between the Yaw and the Pitch actions.<br>In some devices that have touch sensitive surfaces (for example, smart phones and tablets), wherein the user can swipe on the surface using a body part (such as a finger), the time taken to complete the swipe and the distance covered by the body part while in touch with the touch sensitive surface can have an impact on the amount and/or type of signals generated from the swipe action. For example, a quick short swipe can result in quickly changing the displayed object on the display screen of the device from one graphical object (or set of graphical object) to another in a quick succession. Whereas, a slow and long swipe can result in the display showing a slow or slower deliberate transition (possibly on the display screen) from the first graphical object (or set of graphical objects) to another graphical object (or set of graphical objects). All three variations of the swipe gesture above can mimic this effect, wherein the generated signals for a swipe command can emulate a quick and short swipe or a slow and long swipe based on the speed of the performance of the Pitch and/or Yaw actions. Some embodiments can have the speed and/or length of the generated swipe command be driven by only the second action (i.e. the Pitch action in the above variations). Some embodiments can start generating the swipe command signals when the second action (i.e. the Pitch action in the variations above) begins and end the generation when the second action ends. In effect, the control system can emulate initiation of a touch of the touch sensitive surface by the user when the second action is started and continue emulating the touch until the end of the second action or the end of the gesture. This emulated touch can begin at/from the current or last location of a mouse pointer or cursor on the screen, or from the center of the screen, or from the end point of the previous swipe command (whether or not that swipe command was performed by the user by physically touching the touch sensitive surface or was an emulated swipe), or a specified number of pixels/ distance away from any of the above mentioned locations, one of the edges of the display screen, or any other suitable location. During this emulation, the system can also generate signals for emulating the change in location of the emulated point of touch on the touch sensitive surface, by generating signals to emulate the change in the location of the emulated touch (on the touch sensitive surface) in accordance to the second action (that is the Pitch motion in this embodiment).<br>{#} [Y>][#][P]{#} (Fourth variation)<br>The fourth variation above is similar to the third variation above with the difference that the second action is a generic Pitch action (as against a Up Pitch in the third variation). This variation can therefore lead to a Up or a Down Swipe based on either the direction of the motion/action at the beginning of the second action (i.e. Pitch in this case) and/or the instantaneous direction of the second action. Thus the system can start generating signals for up or down swipe when the second action starts, but then change (and continue to change) the direction of the generated swipe signals when the second action changes direction. This (possibly continuous) change in direction can be achieved by changing the instantaneous location of the emulated touch point based in accordance to the instantaneous direction and/or magnitude of the second action.<br>{#}[<P] (Fifth variation)<br>Some embodiments can implement the fifth variation for the Swipe Up command, which is simply a Pitch Up action, possibly preceded by a period of No Motion, wherein the Pitch Up action may have time and/or magnitude bounds. A Swipe Up signal can be generated at the end of the Pitch Up Action.<br>Some embodiments may not require the "{#}" at the beginning of the user gesture.<br>Swipe Down:<br>[Y>][P>] or<br>{#}[Y>][#][P>]<br>The Swipe Down user gesture variations above are shown to be very similar to the first three variations of the Swipe Up gesture illustrated above, with the difference that the Pitch Up action can be replaced by a Pitch down action (such as "[P>]"). The generation of the command signals can work similar to |

TABLE 7-continued

An embodiment of a User Interface using User Gestures that can be used with Smart Glasses and other Head Worn Devices (including but not limited to Head/Ear Phones, Ear Buds, Eye Wear, Augmented Reality or Virtual Reality Devices), as well as other Wearables (such as wrist bands) as well as Hand Held controllers.

| Command to be Invoked | User Gesture to Invoke the Command (and Explanation) |
| --- | --- |
| | above descriptions of Swipe Up command as well with the difference that Swipe Down command signals are generated (instead of Swipe Up command signals).<br>{#}[P>]<br>This variation can also be used for Swipe Down (similar to the Swipe Up fifth variation). |
| Zoom or Rotate | {#}[R>]*{YP}#<br>The "{#}[<R]" action sequence is used as a start trigger. The start trigger here constitutes a Left Roll motion (with time and magnitude bounds) which is preceded by a period of No Motion of at least a specified minimum length. Once the complete start trigger is performed, the control system can ignore all motions for the duration of the following FLBP ("*"). The subsequent {YP} motions can be used to generate signals to modify the current OOI. This generation of signals can end when a POLA is encountered, which in this case is a period of No Motion of a minimum specified duration.<br>{#}[<R][~][#]{YP}#<br>In this variation, the FLBP of the first variation is replaced by a bounded VLWP that looks (waits) for "[#]" (that is a period of No Motion with a lower as well as upper bound on its duration) to occur. The use of VLWP therefore gives user some limited time to settle down after performing the Roll motion before starting to generate the signals to modify the OOI in accordance to the "{YP}" motions, until a POLA ("{#}") is encountered.<br>{#} [<R>][<R]*{YP}#<br>This is a variation of the first variation above. In this variation, the system requires an additional [<R>] action in the start trigger. This additional requirement can further help with confirmation of user intent and reduce false positives when recognizing gestures. (This approach of requiring additional actions can be used with any user gestures.) |

Note 1:

The tables in this document are exemplary collections of embodiments illustrating various principles disclosed. Many different other embodiments of user getures, user interfaces, control systems, methods, etc. are possible using the principles above by simply substituting one type of motion or action with another, as well as by inserting or removing periods of No Motion or other POLAs in the defintion of gestures. In particular, in user gesture definitions where a motion/action along one axis is shown to be immediately followed by another motion/action performed along a different axis, a POLA can be inserted (between those two motions/actions) to allow the user to transition between two motions in a comfortable fashion. It will be obvious that such POLAs can have a lower time bound on the duration of the POLA to be specified to be equal to zero or a suitable non-zero value. For example, the user definition "[#][Y>][<P$^2$]" (for Page Up from Table 6) can be replaced by "[#][Y>][#][<P$^2$]", in insert a No Motion POLA between the time bound Y and P motions. Further, for this user gesture or any other user gestures described, varied time and magnitude bounds can be imposed or removed on each of the motions/actions to obtain even more variations. Variations can also be obtained by replacing periods of No Motion by a more generic POLA (where the bounds on the motion or position may not be substantially close to zero) in any/all user gesture definitions.

Note 2:

Many of the user gesture described above use POLAs such as period of No Motion to stop generation of command signals. Some embodiments can also use other actions such as motion along an axis that is orthogonal to the axis/axes of motion in accordance to which the signals are being generated. For example, if the user gesture for OOI Modification was "{#}[<R]*{YP}#", where in the signals were being generated in accordance to "{YP}" and the generation of signals was being terminated by a period of No Motion {"#"), then a variation of this user gesture can be "{#}[<R]*{YP}[R]" where performing a Roll motion of specified minimum magnitude for a minimum duration of time can be used as a trigger to stop the generation of the command signals. The terminating trigger as well as the start triggers can also be other actions that may not involve any discernable motion, for example a voice command, jaw clenching, holding breath, tightening a muscle, changing brain wave pattern, moving eye gaze in a specified pattern, etc.

Note 3:

Different actions in a particular user gesture can be performed using different body parts. For example, in one embodiment, the user gesture for modifying OOI can be "{#}[<R]*{YP}#" where in, the "<R" can be performed by using user's head, the "{YP}" could be performed using arm/hand/hand held controller/ wearable ring controller/ etc.

Note 4:

While the above user gestures refer to motions, any of those motions can be replaced by actions that may not involve continuous motion. In some embodiments, a Pitch motion in a user gesture can be substituted by a Pitch position or displacement (angular position along the axis about which the Pitch motion is being measured). Further, angular motion/positions can be substituted by linear motions/positions along the same or different axis. For example, Pitch angular motion can be substituted by linear motion or displacement along he Y axis, Yaw angular motions can be substituted by linear motion or displacement along the Z axis. These substitutions can be useful with hand-held controllers, finger/hand/arm worn controllers, or even in controllers that rely on camera for sensing motion or positions of user's body parts.

Note 5:

User feedback can be provided by audio, visual, haptic as well as any other suitable methods during the progress and processing of a user gesture. Feedback can be provided during performance as well as upon completion of each individual action in the user gestures, including but not limited to the start, progress and end of the periods of No Moion, POLA, FLBP, VLWPs, etc. Indicators can also be provided at end of recognition of each of the constituents of each action in a user gesture, possiblyalong with hint of what action needs to be performed next after the completion of the current action. Some embodiments can suppress such indicators after the user becomes familiar or skilled with performance of some of the gestures. Feedback can be provided in form of audio signals or visual progress meters as the user is performing a period of No Motion or any other POLA or even FLBPs or VLWPs in any of the described gestures. The audio signals can increase or decrease in frequency as a POLA/FLBP/VLWP is initiated and as it comes to an end. The progress meters can be visual and be shown in form of thermometer like (thin rectangular display that fills up) or circular (clock-like) graphical objects. Audio signals can be generated as per success or failure of some or each component action of a user gesture, and can accompany the visual feedback. Textual information or symbols (static or animated) can also be displayed at suitable locations. Variety of feedback can also be provided when the OOI is being actively modified in accordance to the OMD. Haptic feedback can be provided, possibly via any device or object being worn by the user, in a similar fashion indicating start, progress, successful completion or failure of some or all of the actions in the user gesture or the entire user gesture itself.

TABLE 7-continued

An embodiment of a User Interface using User Gestures that can be used with Smart Glasses and other Head Worn Devices (including but not limited to Head/Ear Phones, Ear Buds, Eye Wear, Augmented Reality or Virtual Reality Devices), as well as other Wearables (such as wrist bands) as well as Hand Held controllers.

| Command to be Invoked | User Gesture to Invoke the Command (and Explanation) |
|---|---|

Note 6:
The term "Click", or "Select" can be taken to include generation of any signals equivalent to a click done using a computer mouse or signals representing a tap on a touch sensitive surface or press on a pressure sensitive surface or press of a selection button/input mechanism or any other equivalent signals. They can be replaced by or are equivalent to button press and release signals generated by accessability switches, gaming consoles or joysticks, etc. Furthermore, some controllers/control systems can have them mapped to any particular command or a macro, possibly when some other program is detected to be running on the device. For example, if a FPS (First Person Shooter) video game is running on the controlled electronic devicem a Click or Select can be mapped to showing the health of the main character instead of causing a regular action (such as firing a weapon) that may normally happen on a click of a computer mouse.

Note 7:
Any user gesture definition can be modified by inserting additional motions along axes that are orthogonal to th axes of motions already present in the user gesture definition. Such additions can be useful in ascertaining user intent and can help with filtering out actions/gestures that may have been performed unintentionally by the user. Some embodiments can have additional motion inserted just before the preexisting motion (that is orthogonal to). Further note that the time bounds and the magnitude bounds on these additionally inserted motions can be different from the preexisting motions. For example, some embodiments can have the additional motions to have a less stringent time bound and can allow for lower magnitiudes (of motion) as well.

Note 8:
The user interface embodiments described in this document can be used with a variety of controllers/control systems. For example, they can be used with smart glasses, head mounted displays, head phones, head sets, head worn accessories, hand held controllers, arm bands, rings worn on fingers, other wearables or devices held or worn by the user, or even with tablets, laptops, desktop computers, smart phones, smart TVs and any other electronic devices can need controlling or be used as controllers. They can also be used with variety of sensors ranging from (but not limited to) inertial sensors to image sensors to biometric sensors. Further, the user interfaces described can be implemented as apparatuses, computer software stored on non-transient computer storage media, software API (Application Programming Interfaces) and be implemented as processes and methods as well.

Note 9:
Some embodiments can use multiple variations of user gesture definitions to cause signal(s) to be generated for a particular command on the controlled device.

Note 10:
Some embodiments can implement only the lower bound or the upper bound for time or magnitude of motions/actions included in "[ ]" in user gesture definitions. For example, the user gesture definition "[P>]" may be implemented such that it ignores the upper bound on time duration or magnitude of the Pitch action. Therefore, performing a down Pitch with at least a specified magnitude and for at least the specified duration can generate a specified signal the moment the action is sustained for at least the minimum specified time duration.

Note 11:
In practice, users may not necessarily be able to perform actions/motions specified in user gesture definitions with absolute purity. That is, while performing the motions or actions specified for a particular gesture, they may inadvertently end up performing additional motions/actions that are not part of the specified gesture definition. For example, while performing a Yaw motion as part of a gesture, the user can end up performing certain amount of Pitch motion at the same time unintentionally. In another example, while performing Roll motion with the head, some Yaw or Pitch motion as part of a gesture, the user can also be inadvertently performed. Some embodiments can ignore or correct for such superfluous unintentional motions/actions based on a variety of criteria. For example, some embodiments can ignore the superfluous motions if the superfluous motions are within a specified threshold. The said threshold can be defined based on absolute magnitude of the experienced superfluous motions, or can be based on the ratio of the superfluous motion to the intended motion, or can be based on the difference in magnitude between intended and superfluous motion, etc. Other criteria to detect, ignore or take in account for superfluous can be also used. The above approaches can be especially useful when monitoring for Roll motions of head. This is because many times users will perform superfluous motions in Yaw and Pitch axes when performing Roll actions using their head. Using the above principles can improve the detection of those user gestures (involving Roll head action) and make it a bit easier for the user to perform then.

Performing Roll motion with the head can be difficult for some users, and therefore can be prone to extraneous/inadvertent Yaw or Pitch motions creeping in. As mentioned earlier, some embodiments can ignore other (superfluous) motions when the user starts performing motions/actions that match with motions/actions in a predefined gesture. Such embodiments can further require that the motions in the predefined gesture are performed with magnitude above a certain threshold. This approach can be especially useful when performing gestures that involve Roll motion of the head; here, Yaw or Pitch motions of the head can be ignored when the Roll motions are being performed with a magnitude greater than a certain Roll motion threshold and/or the ratio of the Roll motion's magnitude to Pitch or Yaw motion is greater than a certain threshold ratio. Users can also be instructed to perform head Roll motions (in any user gesture) by focusing on the motion of their chin to cause the Roll motion. For example, the user can be instructed to point their chins towards an imaginary spot a few inches (0-12 inches or any other comfortable distance) directly in front of their left or right shoulder. Another way is to instruct the users to tip their head sideways, as if trying to pour some liquid out of left or right ear on or around their left or right shoulder (respectively); this approach can also be an easy way for the user to learn and perform roll motions with their head. Yet another way of instructing the user (to perform Roll motion with their head) is by asking them to tip their head sideways as if they wanted to touch the side of their ear to the top surface of their shoulder (which is closer to that ear). Roll motions of the head are not as commonly performed by people (compared with Pitch and Yaw motions), so using Roll motions, especially as triggers in gestures, can be advantageous in some embodiments.

As illustrated in above embodiments, some user gestures can have (sequence of) actions that can involve motion of head, eyeballs (and/or eye gaze), hands/arms/fingers or other body parts, body worn or hand held controllers, etc., so that the direction of said motion is changed abruptly while performing the gesture. Some sequence of actions can be viewed as, as if, the user is trying to trace the letter "L" in various orientations and directions by using a body part or their eye gaze. Some examples of this are the action sequences "[Y>][$P^2$>]" or "[P>][<Y]" and the like. Such motion sequences can look like tracing of letter "L" in different orientations. Note that the time and magnitude bounds can be different for each leg of the "L". Other sequence of actions can be viewed as, as if, the user is changing the direction of the motion to be opposite of the previously performed motion. Some examples of this can include motion sequences such as "[<P>]", which represents two motions performed one after another (which is Pitch in this example) in opposite direction. Note that in this situation, the time and magnitude bound on the motion can be different in different directions. Therefore, in this example, the Up Pitch motion can be performed at a different speed and time duration than the speed and time duration of the Down Pitch. User gestures designed so as to include action sequences that have sudden change in direction of motion (such as change in direction by roughly 90 degrees or 180 degrees) can be recognized easier via software algorithms (including machine learning algorithms). This can help reduce the number of false positives (in detection of gestures), which can be crucial for usability of a system utilizing gesture recognition. Such sudden change in directions can also be helpful in design of start triggers. POLAs, VLWPs, FLBPs or periods of No Motion can be introduced between any two consecutive actions (in a user gesture) to further help the user in performance of those user gestures, especially when the two consecutive actions involve a sudden change in direction of motion or position of the designated body part. Further, inclusion of superfluous action that requires the user to perform sudden change in motion (in a user gesture) benefits the system in recognizing those actions as intentional. For example, a “P><P” performed with the head can be a user gesture that looks like a head nod. However, requiring additional Yaw motion (however slow or fast, long or short) immediately before or after the Pitch action sequence can help decrease the false positives in detection of those nods. E.g. “Y>P><P”, “[Y] P><P”, “P><P [Y]” or “P><P<Y” can be easier to be ascertained as user intended, especially if time and magnitude bounds are placed on the original actions of the user gestures and/or the superfluous actions added to the user gesture. POLAs, VLWPs, FLBPs or periods of No Motion can be introduced at the beginning and/or end of the superfluous actions to help decrease in false positives as well.

PCE/PCM Stickiness: As discussed in this and referenced applications, generation of command signals for OOI motion/modification can be started when PCE/PCM Sensor reading is sustained beyond a specified Expression Threshold for a certain minimum amount of time duration. Some embodiments can employ variation of above heuristics wherein if the PCE/PCM Sensor reading is sustained for a time duration (called TIME_TO_MAKE_PCE_STICK, designated by parameter P #13 in some of the above referenced applications), the enabled OOI motion continues in accordance to the OMD even if PCE/PCM Sensor readings fall back to (or crosses to be within) the PCE/PCM Expression Threshold. This means that if the PCE/PCM Sensor reading is held beyond the Expression Threshold for at least the duration of P #13 (after the start of PCE/PCM), the PCE/PCM can be considered to turn sticky i.e. it can be considered to stay active indefinitely after that point and the OOI Motion can continue in accordance to the OMD indefinitely even after the end of the PCE/PCM that started the OOI motion. (Note that value of P #13 can be set to any value greater than zero or equal to zero.) Once the PCE/PCM is turned sticky, the OOI Motion can continue indefinitely even after the PCE/PCM is ended. In this state, the OOI motion can be disabled based on some other event, called the OOI Motion Disabling Event (ODE). One example of an ODE is a POLA performed by the user using a pre-specified user action (e.g. POLA of head, etc) and/or by using an OOI. The POLA can use a threshold such as MOTION_NOISE_THRESHOLD or some other defined threshold on motion/position/other appropriate physical quantity. When the time duration of this POLA (dPOLA) equals or exceeds a specified minimum time duration (called as MIN_DPOLA_TO_UNSTICK_PCE, designated by parameter P #14), a sticky PCE/PCM can be unstuck, meaning that OOI Motion can be terminated. Such a POLA is addressed as an ODE POLA. Thus in this illustrative example, OOI motion is started upon a PCE/PCM initiation but ended upon an ODE POLA performed or caused by a designated body part (such as head, eyes, hands, etc.). The ODE POLA can also be defined in terms of variance of the position of a cursor/pointer/OOI on a display screen of the controlled electronic device. ODE POLA can be also used as an ODE when eye gaze is being used as the OMD. (Note that eye gaze can be viewed as a combination of head pose/position and eyeball pose/position.) Therefore, some embodiments can have OOI motion enabled/started when user starts a PCE such as a Smile, holds that PCE for more than P #13 (to get the PCE stuck) and then continue to move the OOI (without holding the Smile/PCE) using OMD (such as head motion, eye gaze, etc.). When they are satisfied with the position/change in the OOI, they can simply bring the OMD (such as head motion, etc.) to be within the specified threshold for time duration of P #14 (i.e. perform the ODE POLA) thereby bringing the OOI Motion to an end. In an embodiment, when using eye gaze as the OMD, once the OOI motion is started and PCE is ended after it turns sticky, the user can bring the OOI Motion to end by staring (for specified amount of time) at the OOI itself or any other specified direction/area (such as simply away from the screen). In another variation when using eye gaze as OMD, Smile can be used to initiate generation of OOI Motion signals (or any other specified signals for that matter) and end generation of those signals via another PCE such as an Eye Blink.

As mentioned earlier, OOI motion can be interpreted as OOI Modification (where a particular AOI belonging to the OOI is being modified) in the above as well as following discussions. OOI Motion and OOI Modification can be used interchangeably. On the same lines, ODE can be defined as OOI Modification Disabling Event that disables/stops the modification of the OOI as part of a user gesture.

Figure 27:
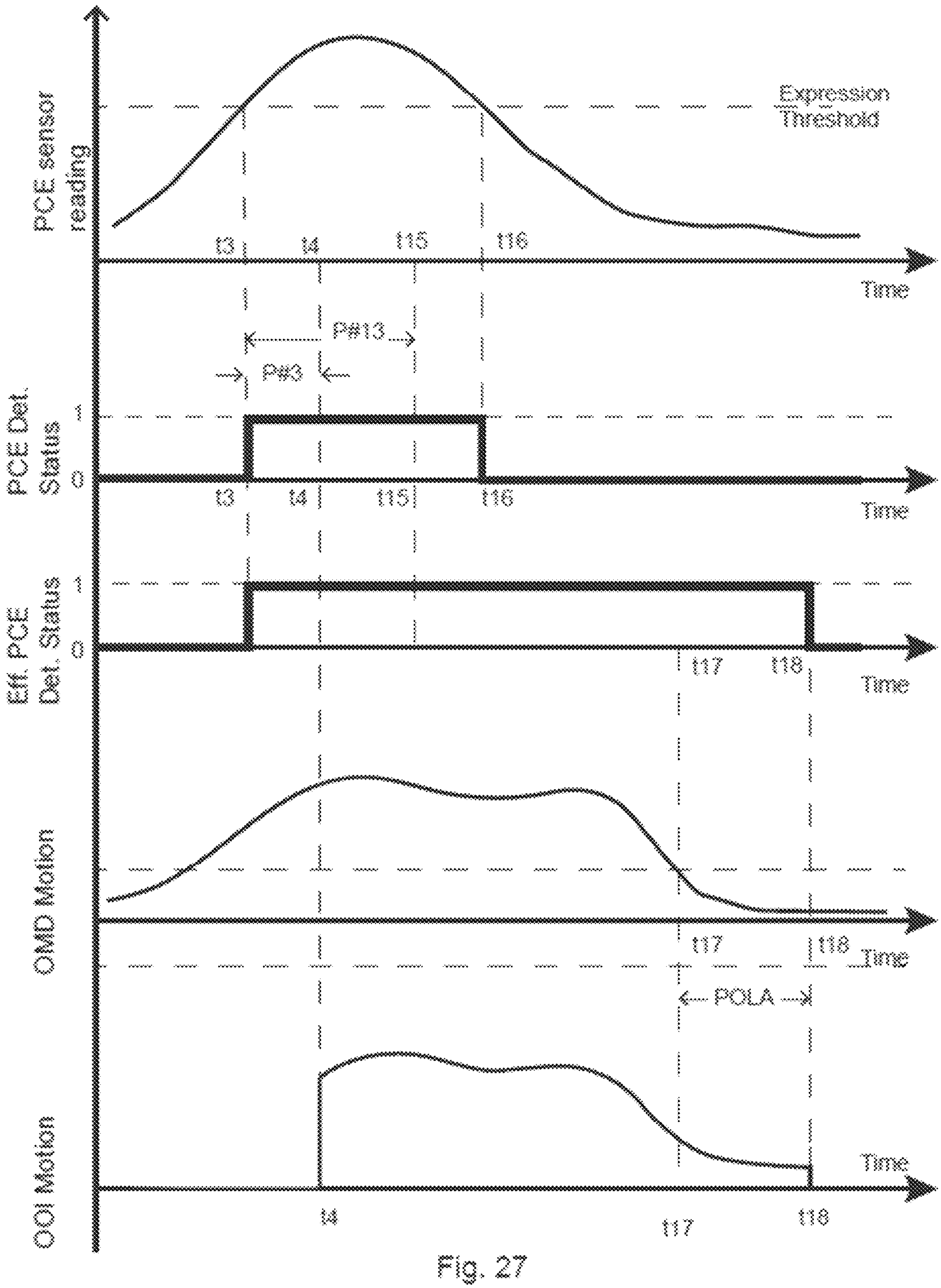
FIG. 27 illustrates an exemplary embodiment that uses the concept of PCE Stickiness and POLAs as ODE.

FIG. 27 depicts an illustrative example of PCE Stickiness and use of POLAs as ODE. Further, this embodiment uses the concept of Effective PCE Detection Status, which is based on the actual PCE detection status as well as the PCE Stickiness status of the PCE, which can be finally terminated by an ODE. In the figure, the PCE Sensor reading goes above the PCE threshold (depicted by a dashed line in the figure) during time period between t3-t16 and therefore the PCE detection status is indicated to be 1 during that time period (as shown by the “PCE Det. Status” curve). Parameters P #3 and P #13 are as depicted in the figure. (See referenced applications for description of some illustrative parameters, such as P #3, P #13 and others.) Given their definitions and explanation in this document as well as the above referenced US patent applications, it can be seen that OOI Motion begins at 14 (that is P #3 time after the start of the PCE at t3). The OOI Motion is shown in accordance with the OMD Motion (which is schematically illustrated as the OMD Motion plot in the figure). Note that both PCE Detection Status and Effective PCE Detection Status become 1 when active PCE is detected. However, after time t15 (which is P #13 after start of PCE), the PCE turns “sticky” and therefore even after the PCE reading falls below the PCE threshold at time t16, the Effective PCE Detection Status (shown as “Eff. PCE Det. Status” in FIG. 27) continues to be 1 until the time a POLA of minimum specified duration is detected during the time period t17-t18. In this example, it is assumed that this dPOLA (of value t18 minus t17) is greater than or equal to the minimum specified dPOLA required to unstick a PCE. Therefore, when a POLA of at least that minimum specified duration is detected, the Effective PCE Status is reset from 1 to 0 at time t18. The OOI Motion (which in this embodiment is enabled and disabled by Effective PCE Detection Status) therefore comes to an end at t18.

In some embodiments, ODE can be specified to be the start or termination of a designated PCE/PCM/user gesture. Therefore, OOI motion can be enabled when a designated PCE/PCM (such as Smile, Eyebrow raise, Hand raise, etc., or a combination thereof) is started and held for at least P #13 duration, and OOI Motion can be disabled when some designated PCE/PCM/user gesture (which could be similar to the PCE/PCM/User gesture used to enable OOI Motion), is either started or terminated. In other words, in this embodiment, the user can hold a Smile for at least P #13 amount of time duration to enable OOI motion and then stop smiling (since the PCE has turned sticky after P #13 amount of time has passed after initiating the Smile), while still continuing to drive the OOI motion using their OMD. Subsequently, the user can disable OOI motion by a designated PCE such as an eyebrow raise or a PCM such as raising a hand or finger, or a combination of any PCE/PCM with or without a POLA, or even by starting a new smile as the designated the ODE. The disabling of OOI Motion can happen either right when the user gesture is started (e.g. start of a Smile/Eyebrow raise/hand or finger raise/etc.) or it can happen when the user gesture is completed (e.g. termination of the Smile/Eyebrow raise/hand or finger raise/etc.); this choice of using the start event versus termination event can be made based on user preference or system defaults or user interface for changing settings, or other mechanism. Further, based on the duration of the PCE/PCM/user gesture, a Click/Select Event can also be generated (as per the Click/Select heuristics).

Some embodiments can ignore the occurrence of ODEs when the OOI Motion initiating PCE/PCM is still active (regardless of the fact if that PCE/PCM has already turned sticky). In embodiments where the ODE is different from the PCE/PCM that is designated to initiate OOI Motion heuristic (or to initiate generation of signals for some other appropriate command), it is possible that after the original PCE/PCM (that initiated the OOI Motion) has turned sticky and subsequently terminated (though still sticky), the user reinitiates the same PCE/PCM during the period of PCE stickiness. In such cases, some embodiments can ignore ODEs when they occur during the presence of the latter PCE/PCM. As an illustration, consider an embodiment where Smile is the PCE, POLA is the ODE. In this case, where the original PCE (the first Smile) that initiates the OOI Motion is terminated after turning "sticky" but the OMD is continued to be greater than the prescribed threshold (that is the ODE POLA has not occurred yet), if the user happens to reinitiate the PCE (the second Smile) and sustain it, then even if an ODE POLA occurs during this period (of the second Smile being in progress), that ODE POLA is ignored. Ignoring of the ODE POLA thereby allows continuation of the generation of the control signals (such as OOI Motion signals or others) that were started to be generated upon the first/original occurrence of the Smile/PCE. Further, such reinitiated PCEs can be used to generate different and/or additional control signals (e.g. selection signals, etc.) along with the original control signals (e.g. OOI motion signals) whose generation was initiated by the original PCE/PCM. Consider the following example embodiment that illustrates this situation. Here, the controlled device is a video gaming console, PCE is a Smile, ODE is Mouth Opening action, OMD is Head motion, and the user is playing a video game, and OOI is the graphical representation of a soldier (that is a character in the video game) and is being displayed on a display screen. In this situation, when the user initiates a first Smile the OOI Motion gets enabled, thereby the soldier (OOI) starts moving around in accordance to head motion. Once the PCE gets sticky the first Smile is terminated by the user, but the soldier continues to march in accordance to the head motion. At this point, the user can restart a new Smile (the second Smile). However, at this point, since the first Smile is still stuck, the second Smile can be used to generate different type of signals such as to fire weapons, while the head continues to provide the OMD for the soldier's motion. The firing of weapons can continue till the second Smile is terminated. However, the second Smile can also be allowed to turn sticky thereby causing the weapons to fire even after the termination of the second Smile. After this, a third Smile can be initiated to start generating signals for building a shield around the soldier. After this, if the user opens his/her mouth (thereby performing an ODE), then all the stuck Smiles can be made unstuck (meaning generation of corresponding signals can be stopped). In another variation, the stuck Smiles can be unstuck one at a time for every Mouth Open action, either in First-In-First-Out order or Last-In-First-Out order.

In another illustrative embodiment that uses the concept of PCE Stickiness, Smile is used as PCE to control generation of signals (e.g. for controlling the viewing angle in a video game) using head motion as the OMD, and Smile is (also) used as an ODE. The user can start controlling the viewing angle by initiating a smile and holding until it turns sticky. After this point in time, the viewing angle continues to be controlled based on head motion even if the user has stopped smiling. This viewing angle control can continue until the point in time when the user initiates another Smile (which is also the prescribed ODE). The viewing angle control can be made to stop when this ODE (Smile) is actually started; or started and sustained for certain amount of time; or started and sustained for specific amount of time and terminated; or started and terminated (without regards to how long it was sustained).

Figure 9:
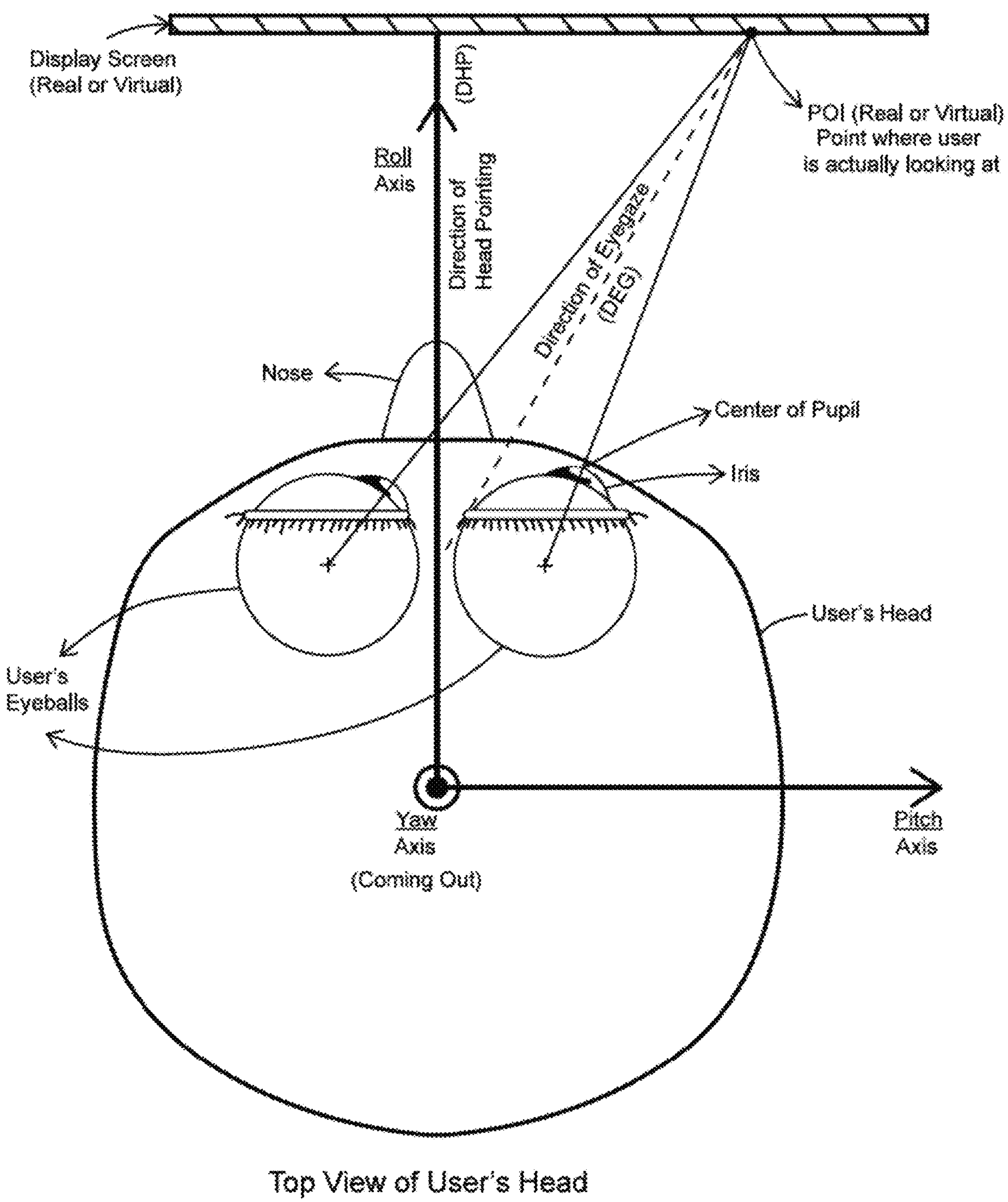
FIG. 9 illustrates an exemplary Direction of Eye Gaze versus Direction of Head Pointing in an Embodiment.

Some embodiments can use eye gaze along with some of the above principles to define user gestures to generate various commands signals meant to control or affect an OOI, a device or a system being controlled. In one embodiment, the system can include an eye tracker that can track the direction or a point in space (real or virtual) where the user is looking. Let us call this direction the Direction of Eye Gaze (DEG for short), and point in space as Point of Interest (POI). The DEG can be different from the direction where the user's head is pointed; let us call the latter the Direction of Head Pointing (DHP for short). DHP can be aligned with the Roll Axis of the user's head or be parallel to the Roll axis but in the XY plane of the Head Coordinate System. FIG. 9 shows a top view of user's head (in a schematic form), and shows the DHP aligned with the Roll Axis of the user's head. The DEG can be determined based on the orientation of one or both of user's eye ball(s). The user may be looking at a real point in space or a virtual point in virtual space (possibly presented to the user on a display screen or as a projection on/in the user's eye). The display screen itself can be real or virtual, planar or spherical or any other convenient shape. If the display screen is real, it can be in form of a display screen part of the eyewear or headgear being worn by the user. In one embodiment, an Object of Interest (such as, for example, a graphical icon such as a mouse pointer) can continuously adjust according to the DEG, possibly according to one of the OOI Motion gestures/heuristics described in this or referenced documents. (Note that this OOI may or may not be visible to the user, though the system may be updating its attributes according to the DEG.) As an illustrative example, if the OOI is a mouse pointer, the OOI can move continuously according to the DEG. (The mouse pointer can be optionally displayed on a display screen). If the user performs pre-defined sequence(s) of user action(s) such as a combination of head motion along the Pitch, Yaw or Roll axis, then predesignated command signals can be generated in response to those predefined sequence(s). Further those generated command signals can be made to affect the real or virtual objects the user may be looking at (possibly as determined by the user's DEG or POI). Therefore, for example, if the user is looking at a particular point on a display screen, and s/he performs a Down Pitch action (e.g. as indicated by the symbolic representation "[P>]", "[>P<]", or other suitable action, possibly with their head), then that can generate a Left Click or equivalent selection command signal at or around the POI. If the user performs an Up Pitch action (e.g. as indicated by the symbolic representation "[<P]", "[<P>]" and so on), then that can generate a Right Click or equivalent selection command signal at or around the POI. Similarly, a Left Yaw (possibly performed as per the symbolic representation "[<Y]" or "[<Y>]") can generate signal for Left Mouse Button Press (to indicate start of a Drag or Swipe Command) and a Right Yaw (possibly performed as per the symbolic representation "[>Y]", "[>Y<]", etc.) can generate a Shift+Left Mouse Button Press command signal. (Note that commands such as Drag or Swipe can be brought to an end based on an ODE such as a POLA or some other predefined action sequence.) The system can require that these pre-defined sequence(s) of user action(s) be performed only after the DEG or the POI has been reasonably steady (as determined by being within a specified tolerance zone) for at least a minimum amount of specified time, for the command signals to be generated. (This can be viewed as the user performing a POLA, possibly for a specified minimum amount of time while looking at a POI. Let us call this action POI POLA.) This tolerance zone can be specified in number of degrees (for the DEG) or number of pixels or a suitable unit of distance for the POI, or as a combination of the aforementioned as well as any other suitable criteria. Therefore, as an illustration, if the user is looking at a particular point (or surrounding region of +/−25 pixels or voxels) on a display screen for a minimum of 250 milliseconds, then if the user performs a Down Pitch action with the head (e.g. "[P>]"), a Left Click/Touch/Selection command signal can be generated at that point on the display screen. (That is, if the POI/DEG was not steady enough for at least 250 ms, then a following "[P>]" action may not generate any command signal.) Some systems can further require that the DEG or POI be also steady (as measured by a specified tolerance on POI or DEG) during the performance of the pre-defined sequence(s) of user action(s) as well, before command signals can be generated. In this scenario, the tolerance zone used for determining steadiness before the sequence(s) of user action(s) can be different from the tolerance zone used during the sequence of user action(s). Some systems can also require that the POI POLA be performed no more than a designated lag time period between the start or end of POI POLA and the start/end of the following action sequence or user gesture intended to cause a command signal to be generated at the POI of the POLA. Some embodiments can have the tolerance zone to be used before or after the action sequence to be sufficiently large so as to effectively eliminate the check for steadiness (before and/or after the initiation of the action sequence). It will be obvious that different actions can be substituted in or added to the illustrative examples of action sequences above to generate various different command signals at the POI of the POI POLA, using the principles described above.

Note: While this illustration shows POI in the plane of the display screen, that may not be always true. Some eye tracking systems can detect the distance of the object (from the user's eyes) at which the user may be looking at. Further, some devices can present graphical object in 3D virtual space, and not on a 2D display screen. Principles disclosed in this application can be used in all these situations.

Use of Steady Eye Gaze Before and During Performance of Other User Actions

Figure 28:
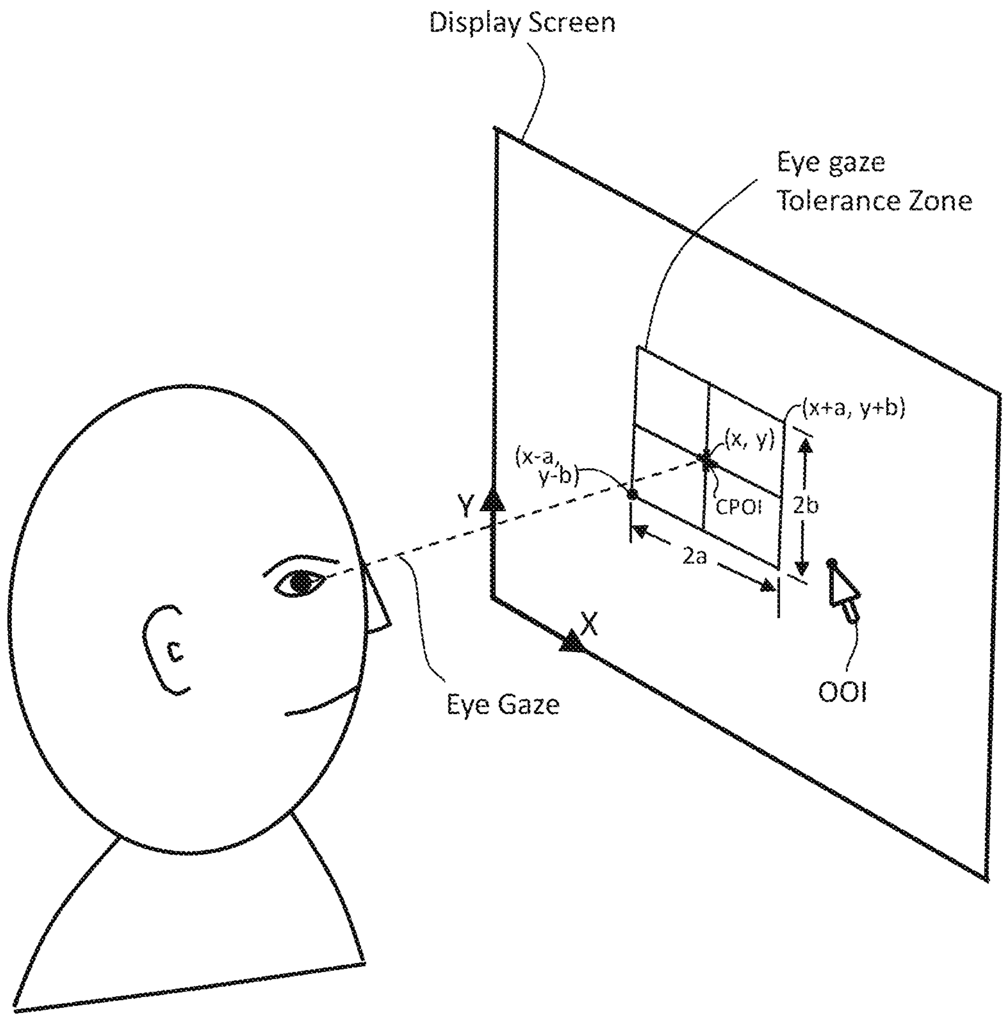
FIG. 28 illustrates an exemplary Eye Gaze Tolerance zone for measuring steadiness of Eye Gaze, wherein the Eye Gaze Tolerance zone is centered at the CPOI.
Figure 29:
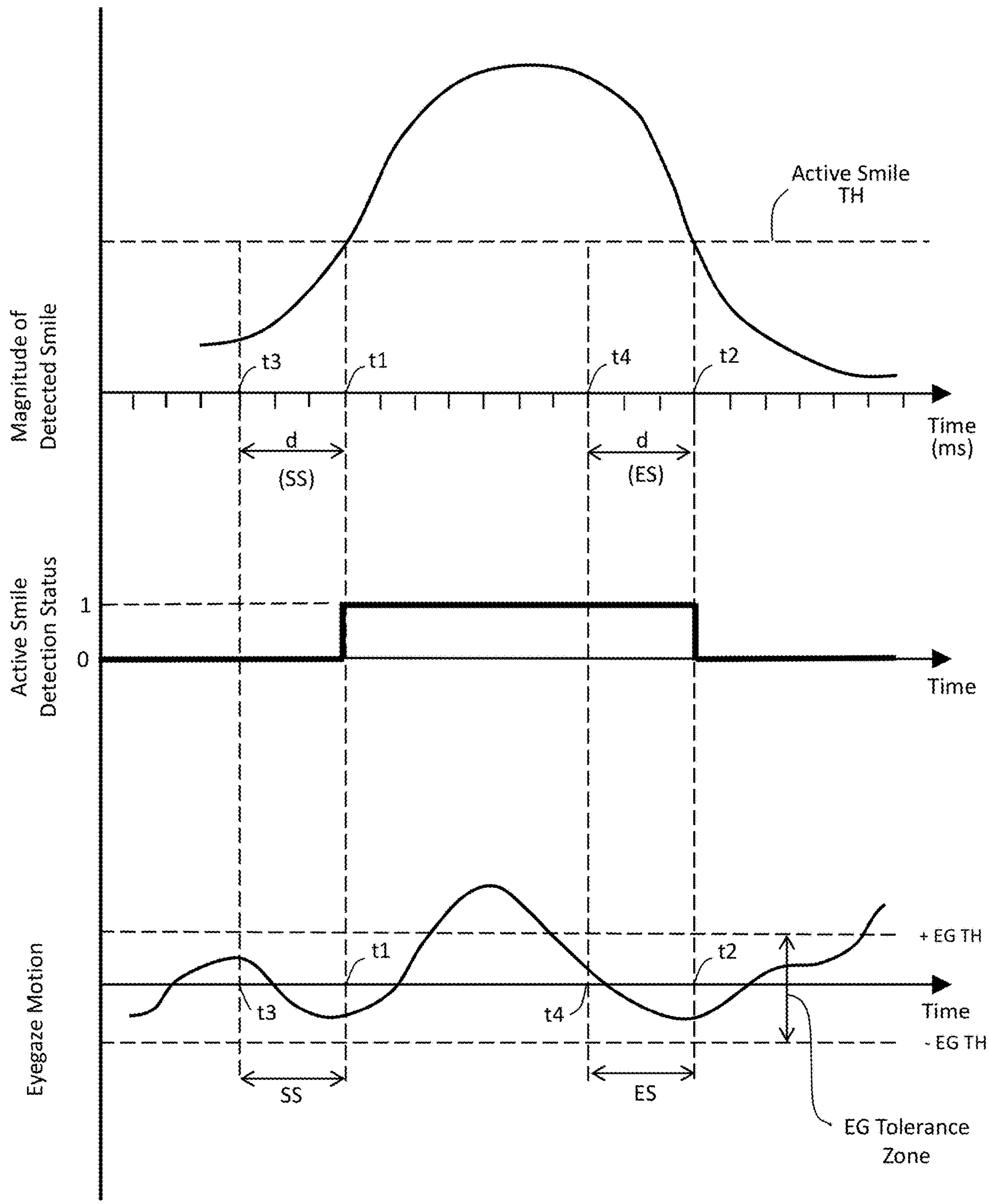
FIG. 29 illustrates an exemplary variation of Smile Facial Expression in relation to steadiness measurement of user's Eye Gaze.

In some embodiments, the steadiness of eye gaze can be used as a further confirmation of user intent when performing a user gesture. For examples of some user gestures, see Tables 1 through 7. They describe illustrative embodiments of a gesture based user interfaces. Any of the described user gestures (as well as any other user gestures) that contain start or end of a facial expression can be enhanced to include an additional requirement that the user have their eye gaze (DEG or CPOI) be "steady" (for example, stay within a specified zone, possibly on the display screen) during the start or end of the facial expression. For example, if the user was performing the Select user gesture consisting of the "[<S>]" sequence of user actions, then the system can require that the user hold their eye gaze steady just before the performance of the "<S" (i.e. the start of a smile) as well as just before "S>" (i.e. end of a smile) user actions. FIG. 28 shows the user looking at a display screen (real or virtual). The point where the user is looking at is calculated (possibly by an eye gaze sensor) to be at coordinates (x, y) on display screen coordinate system. If the specified steadiness tolerance zone was defined to be rectangular in shape '2*a*' in length and '2*b*' in height centered around the Calculated Point of Interest ("CPOI"), then the user can be required to hold their eye gaze ("EG") within the "EG Tolerance Zone" rectangle just before the "<S" and "S>" actions. Lower left corner of the EG Tolerance Zone rectangle would be at coordinates (x-a, y-b) and the top right corner would be at coordinates (x+a, y+b). Sec FIG. 29 for further explanation. The Magnitude of Detected Smile plot of FIG. 29 shows variation of magnitude of detected smile (as measured by a smile sensor), with the depiction of the "Active Smile TH" which is the threshold magnitude. A smile facial expression can be considered to be active only when its magnitude is larger than the threshold. Therefore, in FIG. 29, smile is active during time period t1:t2, as shown in the Active Smile Detection Status plot. An active smile is shown to be detected (that is started) at time t1 and ended at time t2. If the "Required Duration of time to Hold Eye gaze Steady" (RDHES) was 'd' milliseconds, then the user can be required to hold their eye gaze steady during the period SS (that is time period t3:t1, which is just before the detection of an active smile) and during the period ES (that is t4:t2 time period, which is just before the end of active smile). The Eye Gaze Motion plot of FIG. 29 shows variation of eye gaze motion (schematically) in relation to an eye gaze threshold (TH) that can signify the containment of the eye gaze within an EG Tolerance Zone. It shows that the eye gaze is within the tolerance zone during SS as well as ES. Note that some embodiments can calculate the CPOI at t3 as CPOI3 and then require all the subsequent CPOIs during time period SS to fall within the tolerance zone centered around CPOI3, as a measure of steadiness of the eye gaze during SS. Other embodiments can instead calculate the CPOI at time t1 and then make sure that all the preceding CPOIs during SS time period had fallen within the tolerance zone centered around CPOI1 (that is the CPOI at time t1). Other embodiments can have a tolerance zone of circular or elliptical shapes or some other convenient shape. Some embodiments can simply require that the distance between CPOI3 and CPOI1 be no greater than a specified max distance without regards to all other CPOI measurements between t3:t1. (This latter approach can be more forgiving as it allows for temporary distractions of the user by allowing for their eye gaze to wander off some, as long as the user's eye gaze comes back to be close enough to the CPOI3 at time t1). The eye gaze steadiness requirements can be similarly applied and verified in the ES time period. Therefore, in this scenario, if the eye gaze is found to be steady during SS and ES time periods, only then an active smile can be considered to be detected during time period t1:t2. In this embodiment, if eye gaze steadiness test fails at either at SS or ES time period, then the entire sequence of user actions ("[<S>]") can be considered to have failed and the control system may not generate any command signals to correspond to that user gesture. In other embodiments, the eye gaze steadiness requirement may be applied to only one of the SS and the ES period. In other variation, the steadiness requirement may be applied to time period t3:t2, and it yet another variation, it may be applied to t1:t2 time period.

Note: The user action of holding eye gaze steady (within certain bounds of displacement and possibly for a specified amount of time) can be seen as a Period of Limited Activity (POLA) being performed with POI, and thus can be called POI POLA. As seen above, POI POLAs can be required to be performed at the same time as other user actions are being performed.

Note: While some embodiments can require for a POI POLA to immediately precede the start or end of a detected active FE, some embodiments can allow for a grace period between the end of the POI POLA and the start or end of the active FE. That is, even if the eye gaze is not steady during this grace period, as long as this grace period is no longer than a maximum allowed grace period duration, the following start or end of the active FE will be treated as a valid event. (This assumes that the POI POLA satisfies all the other specified requirements including minimum time duration.) Further, this concept of grace period occurring prior to a POI POLA can be applied to any POLAs in user gestures that use the POLAs. On the other hand, some embodiments can require the POLA to be active not only before but also during the actual start/end of the active FE or even some time beyond it.

Note: Some control system embodiments may determine the steadiness of the eye gaze based on variance in DEG instead of CPOI.

Note: Some control system embodiments may display a visual representation of the CPOI, tolerance zone as well as POI POLA on the display screen, as well as provide visual, audio, haptic and other types of feedback on the performance and success of the POI POLA. The feedback may be provided in real time.

Note: Some embodiments can have tolerance zone of a different shape. For example, instead of the tolerance zone being a rectangle centered around CPOI (at a particular time), it can be circular in shape with size (radius) 'r' with the center at the CPOI.

Note: Some systems can also require that the POI POLA be performed no more than a designated maximum lag time period (MLTP) before certain user actions in a user gesture (for those actions to cause a command signals to be generated). The MLTP can be measured from the start or end of the POI POLA to the start or end of the following user actions it is associated with. It will be obvious that different actions can be substituted in or added to the illustrative examples of action sequences above to generate various different command signals, using the principles described above. For example, head motion actions (e.g. head nods/shakes/rolls) can be substituted by arm/hand/finger actions (e.g. pointing gesture made with the index finger, pinch gesture, raising a hand in a Vulcan salute, making a fist, clapping, waving, etc.), facial expression actions (e.g. smile, wink, blink, opening mouth, puckering lips, raising an eye brow, twitching a facial muscle, etc.), contracting/tensing/relaxing specified muscles in the body, making a sound, giving a verbal command, and so on.

Note: Same or different sensors can be used to determine the DEG, POI as well as the motion/position of body parts used in the sequence(s) of body action(s). In one embodiment, an image sensor (monitoring the position/orientation of user's eyeball) to determine DEG, can also be used to get an indication of motion of head of the user based on the relative location of the various "features" on the eye. These "features" can be corners of the eye, center of the pupil, interesting locations on the iris or the sclera, interesting locations on the eyelids, the glint(s) on eyeball cast by a light source, etc. In other embodiments, inertial sensors (such as MEMS gyroscopes or accelerometers, radar sensors, etc.) can be used to get an indication of the motion/position of a body part of the user (such as the head). In other embodiments, a different image sensor(s) may be used for getting information indicative of motion of body part(s) than what is used for determining the DEG. Some embodiments can use MEMS sensors (instead of or in conjunction with image sensors) to determine user's eye gaze.

Figure 30:
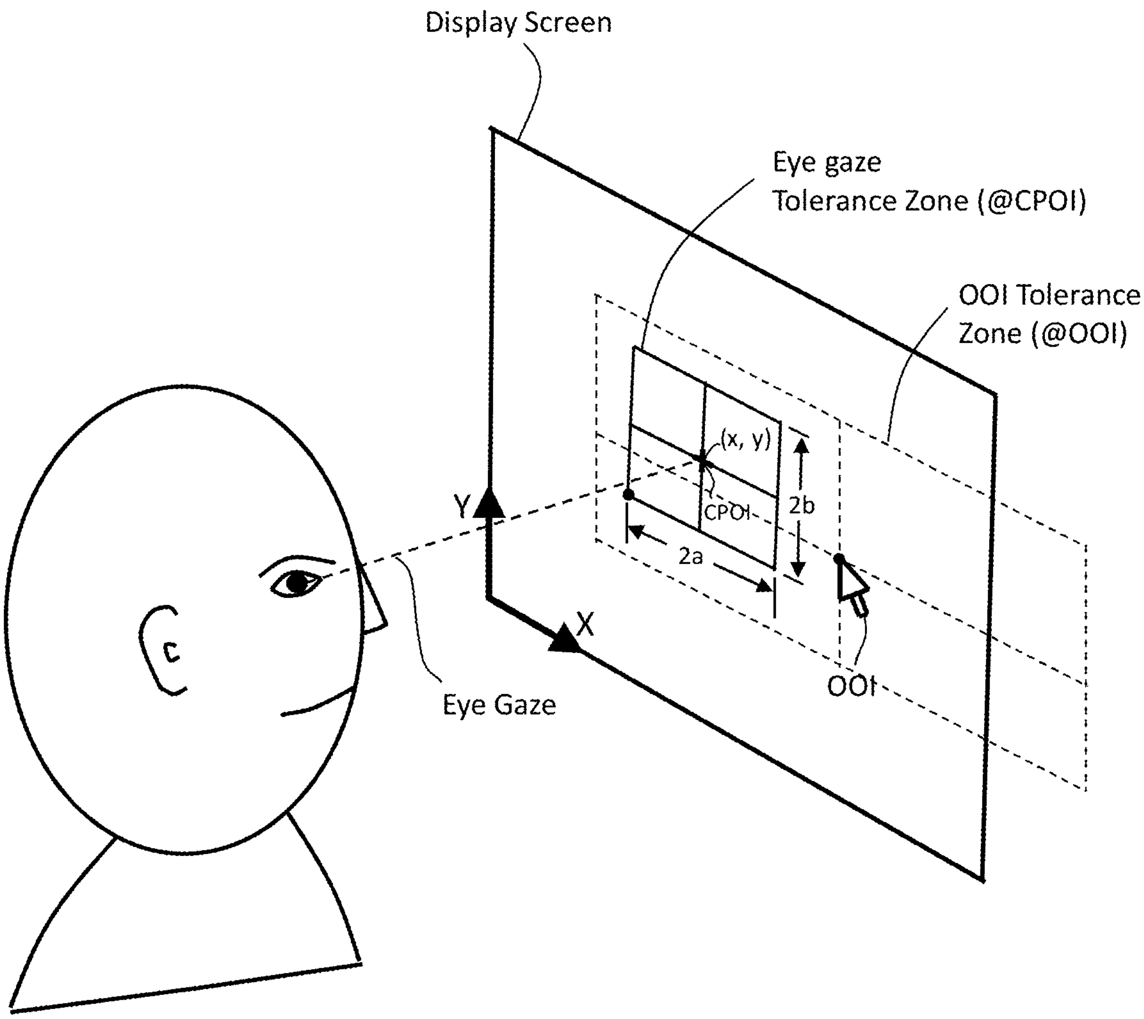
FIG. 30 illustrates an exemplary Eye Gaze Tolerance zone for measuring steadiness of Eye Gaze, wherein the Eye Gaze Tolerance zone is centered at the location of OOI.

The above paragraphs illustrated how eye gaze steadiness can be used as a measure of user's focus/attention and therefore the user's intent when performing various actions in a user gesture. Note that the CPOI computed during the steadiness determination may or may not be close enough to the OOI that may be affected by the generated command signals at the end of the user gestures. For example, if the OOI was a mouse pointer, the location of the mouse pointer may or may not fall within the EG Tolerance Zone. However, other variations can require that the some or all the CPOIs calculated during the performance of a part or whole of a user gestures be within a certain distance from (or be within certain tolerance zone centered around) the location of the OOI. See FIG. 30 for an illustration of this. In this embodiment, the system can also require that the EG Tolerance Zone be within the OOI Tolerance Zone. (Note that the OOI tolerance zone can be of different shapes and sizes as per the requirements on the control system.) The OOI Tolerance Zone requirement can make sense when the resulting command signals (of the performed user gesture) are applicable to the location of the OOI. For example, for left or right click user gestures, it can be important that the user be cognizant of the location of mouse pointer OOI and therefore have their eye gaze be generally in the direction of the location of the OOI. However, for certain other commands such as Swipe (up, down, left or right), Desktop Show/Hide, Go Forward/Backward/Home, or other commands that are not affected by the current location of the mouse pointer OOI, the awareness of the mouse pointer OOI location) may or may not be critical based on the program running or the operating system running on the controlled electronic device.

A control system may impose the eye gaze steadiness requirement to entire user gesture or only parts of it. For example, as seen above, some embodiments may require eye gaze steadiness during performance of the entire user gesture. Here are a few examples—

| | |
|---|---|
| [<S>] | (Click/Select) |
| {R>} [~] [<S>] | (Right Click) |
| [<Y$^2$] [~] # | (Go back or Swipe left) |
| #[Y$^2$>] [~] # | (Go back or Swipe left) |
| [Y$^2$>] [~] [P$^2$>] [~] # | (Window Maximize) |
| [P$^2$>] [<P$^2$] [P$^2$>] [<P$^2$] [~] [<Y$^2$] [Y$^2$>] [~] # | (Initialize) |

Whereas, the steadiness requirement can be made applicable only to the underlined portions of the following user gestures.

| | |
|---|---|
| [<S>] | (Click/Select) |
| <S * {YP} {YP#} S> | (Move/Modify OOI) |
| <S * {YP} {YP#} S> | (Move/Modify OOI) |
| <S * ## {YP} {YP#} S> | (Scroll or Pan) |
| <S * ### {YP#} S> | (Drag or Tap + Hold + Move) |
| {R>} [~] [<S>] | (Right Click) |
| {R>} [~] <S* ## {YP#} S> | (Right Click and Drag) |
| [Y$^2$>] [~] # | (Go back or Swipe left) |
| #[Y$^2$>] [~] # | (Go back or Swipe left) |
| [Y$^2$>] [~] [P$^2$>] [~] # | (Window Maximize) |
| [P$^2$>] [<P$^2$>] [P$^2$>] [<P$^2$] [~] [<Y$^2$] [Y$^2$>] [~] # | (Initialize) |
| <S * {R} {R #} S> | (Zoom or Rotate) |

Note that certain user gestures such as Select, Right Click, Swipe Left, Windows Maximize, Initialize, etc. occur on both the above lists, meaning that some variations can require eye gaze steadiness throughout the performance of certain user gestures whereas other variations may require steadiness over only parts of the same user gestures.

Note that the above lists are only a sample of some of the candidate user gestures that can require POI POLA during the entire performance of user gesture or during only parts of a user gesture. Any new/different user gestures can be created and the requirement of performance of POI POLA may be applied to all or any parts of those user gestures.

Note: Commands corresponding to user actions can be generated to be applicable at one of the CPOIs computed during the performance of the POI POLA (that is the location where the user is determined to be generally looking during the POI POLA) for certain user gestures and/or in certain control system embodiments. In other user gestures or variations of control systems, the commands can be generated to be applicable to the location of a designated OOI (e.g. a mouse pointer or a reticle being displayed on the display screen) instead of the location of CPOI. For example, the generated commands for the Click/Select user gesture may be applied at the location of the mouse pointer on the display screen at the time of detection of the Click/Select gesture. Whereas, the generated command for the Window Maximize user gesture may be applied to the window that the user was determined to be looking at during the POI POLA (and not where the mouse pointer may be located at that time.)

Note: Same or different sensors can be used to determine the DEG, POI as well as the motion/position of body parts used in the sequence(s) of body action(s). In one embodiment, an image sensor (monitoring the position/orientation of user's eyeball) to determine DEG can also be used to get an indication of motion of head of the user based on the relative location of the various "features" on the eye. These "features" can be corners of the eye, center of the pupil, interesting locations on the iris or the sclera, interesting locations on the eyelids, the glint(s) on eyeball cast by a light source, key points to track as used in computer vision techniques, etc. In other embodiments, inertial sensors (such as MEMS gyroscopes or accelerometers, radar sensors, etc.) can be used to get an indication of the motion/position of a body part of the user (such as the head). In other embodiments, a different image sensor(s) may be used for getting information indicative of motion of body part(s) than what is used for determining the DEG. Some embodiments can use MEMS sensors (instead of or in conjunction with image sensors) to determine user's eye gaze.

Using the above principles, the content on a display screen or an OOI can be scrolled, moved, rotated, zoomed, panned when the user performs a POI POLA (possibly for at least a minimum required time) and then moves/rotates their head (possibly as measured by change in DHP or movement of tracked features of the user's face captured by an image sensor), by a minimum required amount in a specified direction. The command signal generation can initiate once the user's head is moved/rotated by the minimum required amount and then continue indefinitely. The command can end (i.e. the command signals can stop being generated) when the user moves/rotates their head back to roughly the position their head was at the time of the initiation of the rotation and/or possibly holds their head steady for another minimum specified amount of time or performs another POI POLA or a designated ODE (possibly even using a PCE/PCM). For example, if a user performs a POI POLA on an OOI (such as a virtual 3D Model) displayed on their head worn device (such as Augmented/Virtual/Mixed Reality headset), a subsequent Yaw, Pitch, Roll of their head can cause the OOI to rotate/change orientations as per their subsequent head motions. However, if a PCE/PCM is active at the time of POI POLA or during the subsequent head motions, the system can generate signals to translate the OOI (instead of rotation), or any other command signals to modify the OOI for that matter. Some embodiments can provide visual indication of the POI and/or the OOI that is "selected" as a result of the performance of the POI POLA. In further variations, some embodiments can require a POLA based on head motion/position (Head POLA) in lieu of or in addition to the POI POLA. Some embodiments can decide not to require steadiness of the DEG or POI once the command is initiated.

It will be obvious that any number and variety of command signals can be generated by the system based on different sequences of user actions. Similarly, any number, variety and combination of sensors can be used to get information indicative motion or position of different body parts of the user or different user actions of the user.

In some embodiments, an OOI (e.g. a cursor or pointer or a graphical icon on a display screen of a device) can be moved/modified in accordance to user action such as eye gaze or head motion of the user, wherein the motion is initiated upon a first user action such as blinking of at least one eye, winking, squinting/changing the amount of opening of the eye (possibly beyond a specified threshold), opening an eye wide, crinkling around the corner of the eyes or any area surrounding the eye, moving an eyebrow, smile, mouth twitch, mouth open/close, twitching/pulling/moving a corner of lip(s), frowning, sticking the tongue out, wiggling the tongue, inflating the nostrils, puffing checks, sucking checks, sucking/puffing action, moving an eyebrow(s), squinting eye(s), making eye(s) bigger (by opening it/them wide), lip pucker, or any other facial expressions or any other designated user action. As an example, OOI motion/modification can be initiated upon performance of a designated user action such as blinking or winking or other suitable action. The user can place the OOI at a particular spot on a display screen by looking at that spot and blinking/winking. The blinking/winking action can be taken as a cue by the system to generate command signals to move the OOI to that spot. After the OOI is moved to the spot, it can stay there till the user looks at another spot and performs another blink (or any other designated user action). Alternatively, the OOI can keep on moving once the OOI Motion is initiated by the first designated user action and can be terminated by an ODE (OOI Motion/Modification Disabling Event). That is, for example, once the OOI Motion is initiated by a blink/wink or other designated first user action, it can continue to be moved/modified in accordance to the eye gaze and/or head motion or motion of other designated body part, until the point the user performs a second user action such as another blink, wink, smile, mouth twitch, mouth open/close, twitching/pulling/moving a corner of lips, puckering lips/making a kissing shape with lips, sticking the tongue out, wiggling the tongue, inflating the nostrils, puffing cheeks, sucking checks, sucking/puffing action, moving an eyebrow(s), squinting eye(s), making eye(s) bigger (by opening it/them wide), lip pucker, or any other facial expressions or any other designated user action. The second user action can also include performance of a POLA such as the user simply holding their gaze or head steady for designated amount of time and/or within certain limits of range of motion or position. Use of a POLA for disabling the OOI Motion/Modification can be called the “Dwell Park” concept/principle/heuristic wherein OOI Motion/Modification is ended upon hovering the OOI for a designated minimum duration or time and/or within a designated area on the display screen and/or within designated limits of motion, or any other suitable criteria for measuring the hover action.

OOI Stickiness: In some embodiments, the OOI can move in accordance to motion of a body part such as the head. For example, the OOI motion can start when the head motion exceeds a first start motion threshold. Upon start of the OOI motion, it can continue until the user performs a POLA using their head, that is, the head motion is held within a second head motion threshold for at least a designated amount of time. At that time, the OOI motion/modification can come to a stop. In this variation, the first start motion threshold can be made unequal to the second head motion threshold. For example, by making the first threshold larger than the second threshold, it can make restarting the OOI motion a bit harder. This can make it feel that the OOI has become sticky as it takes additional effort to start its motion than to continue the motion. This can be advantageous in scenarios where the user needs to park the OOI in its location for a while, without disturbing its position by unintentional body/head motions. Once the user is ready start OOI motion again, they can start moving their head at a rate larger than the first start motion threshold and then continue the OOI motion with lesser effort before bringing it to a stop. This concept of stickiness of OOI can also help the user to move the OOI through large distances using only limited amount of body/head motions, by covering the large distances in multiple steps of shorter distances. For example, if the user desires to move the OOI through a distance of 30 inches on the display screen from the left edge to the right edge, but if their head motion range allows only 10 inches of OOI motion, they could move that distance in 3 steps of 10 inches. In every step, they would move their head from left to right at a higher speed than the first start motion threshold to start the OOI motion; continue moving their head rightwards until they cannot move their head anymore; hold the head steady for a designated amount of time (so that their head motion is within the second head motion threshold) to bring the OOI motion to an end; then move/rotate their head back to the left (to a comfortable head position) at a lower speed than the first start motion threshold (so that the OOI position is left parked/undisturbed), and then repeat the process. Note that in this principle, head can be substituted by any other body part or mechanism being used to move the OOI. Persons knowledgeable in the art can see that the above disclosed concepts/principles can be combined with other concepts/principles described in this or referenced documents.

Figure 10:
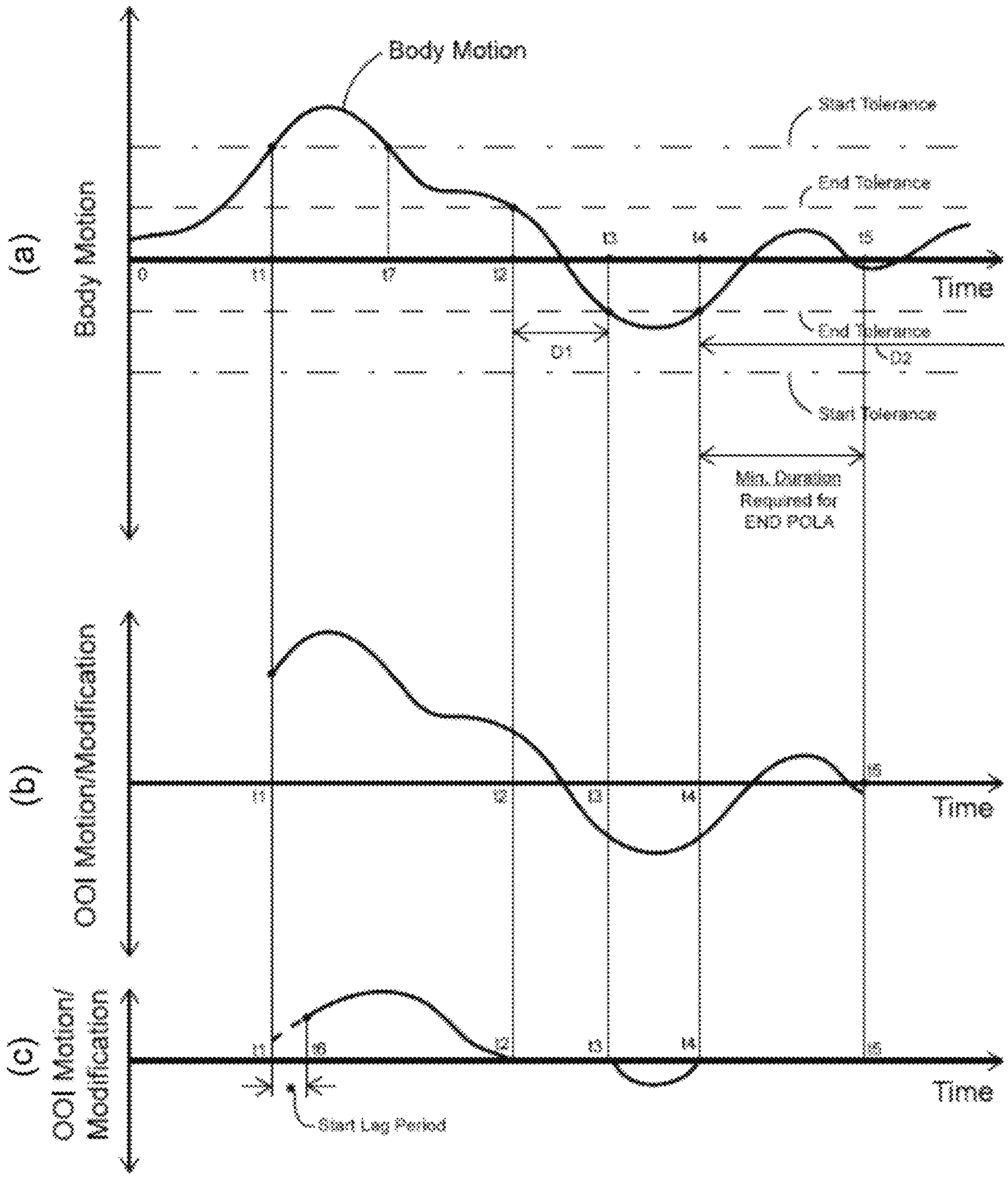
FIG. 10 illustrates an exemplary embodiment Using POLAs for Start as well as End Triggers while Generating Signals, and in particular part (a) of this Figure illustrates Body Motion over time that can be used to determine if the user is performing or not performing a POLA with the designated body part; part (b) of this Figure illustrates OOI Motion/Modification signals that can start being generated in accordance to the Body Motion; and part (c) of this Figure illustrates a further variation where while the OOI Modification signals are in accordance to the Body Motion, their magnitude is not directly proportional to the Body Motion.

In some embodiments, termination of a POLA can be used as trigger to start OOI Modification. FIG. 10 illustrates an embodiment where POLAs are used for both start and end triggers. A body part of the user (or an object whose motion or position can be affected by the user) can be designated as the “body part” which will be monitored by the system to enable the user to perform a user gesture to affect an OOI. The motion of this body part (“Body Motion” as schematically shown in part (a) of FIG. 10) over time then can be used to determine if the user is performing or not performing a POLA with the designated body part. Limits on body motion (thresholds) can be specified to determine if the user is performing a POLA. The dashed and dash-dot lines in the figure show the limits of motions that can be used to determine if the user is performing a POLA. In this example, the limit on the body motion (Start Tolerance) is higher for the POLA that will be used as a trigger to start OOI modification, compared to the POLA that will be used as the end trigger (End Tolerance). As in the figure, the (magnitude of) monitored motion of the user’s body part crosses the start threshold (“start tolerance” used by the start trigger POLA) at time t1 (thereby terminating the POLA that was in progress until time t1). The body motion then falls to be within the end threshold (the “end tolerance” used by the end trigger POLA) at time t2. At time t1, given that the body motion crosses the start threshold (and possibly terminates the start POLA), OOI Motion/Modification signals can start getting generated in accordance to the body motion, as shown in part (b) of the figure. Once OOI Modification signals start getting generated, they can continue until the end POLA is performed. At time t2, the magnitude of body motion does indeed fall within the zone of end tolerance, however, it lasts only for duration DI (shown as t3-t2 in the figure, wherein t3 is the time when the body motion ceases to be within the end tolerance zone). In this illustration, the duration t3-t2 is shown to be lesser than the minimum required duration of an end POLA, which is shown to be equal to t5-t4 (in the figure). Note that t2, t3, and t4 are all points in time when the body motion crosses the End Tolerance. As shown in the figure, the body motion is within the End Tolerance during time period t4:t5 for the duration of the Minimum Duration Required for End POLA. Therefore, the user can be considered to have performed an end POLA at time t5. Thereby, the generation OOI Modification signals can end at time t5, as shown in parts (b) and (c) of the figure. Part (c) of the figure shows a further variation where while the OOI Modification signals are in accordance to the body motion, their magnitude is not directly proportional to the body motion. In this case, the signals are shown to be suppressed (or to have the magnitude of OOI modification reduced to zero) when the body motion falls within a third specified tolerance zone. In this illustration, the tolerance zone used is the same as the second tolerance zone (the tolerance zone of End POLA), however, it is obvious that a different tolerance zone could have been used. (Note: The tolerance zones can be asymmetric about the X axis, meaning the magnitude of the tolerance on the positive side may not be the same as the magnitude on the negative side.) The variation in part (c) also indicates a further variation where the OOI Modification signals can start after a time lag after time t1 (rather than starting substantially close to time t1). This Start Lag Period can be used to provide the user an opportunity to get better prepared to start modifying the OOI after time t1. Part (c) of the figure shows Start Lag Period during time period t1:t6, during which generation of signals is optional. This Start Lag Period can be considered to be akin to the Blackout Period described earlier. Note that the Start Lag Period (SLP) can be made variable (instead of being fixed in value). For example, the SLP can be defined to start at t1 (the time when body motion first crosses the first threshold) and end at the second crossing of the same threshold (that is at time t7). Alternatively, SLP can also be said to end at time t2, when body motion crosses the second threshold (i.e. the End Tolerance) for the first time after time t1. The end effect of this can be that the user is required to move the body part at a higher magnitude to indicate intent to start OOI Modification, however, the signals start getting generated only when the user subsequently slows down the body part to be within a Signal Generation tolerance (threshold) zone, probably for a specified amount of time (Signal Generation POLA time), which may or may not be less than the Minimum Duration Required for the End POLA. Once the signal generation is started, terminating the generation can require an End POLA. In this case, the signal generation can start at time t2 (instead of t1) and end at 15. In embodiments that have Signal Generation POLA time equal to or greater than the Minimum Duration for End POLA, the overall user gesture would have three different POLAs-Start POLA, followed by a Signal Generation POLA, followed by an End POLA. (Note that the threshold value for the Signal Generation POLA can be the same or different from the End POLA.) In this case, the signals can be generated starting the completion of the Signal Generation POLA and end upon the completion of the End POLA.

Figure 11:
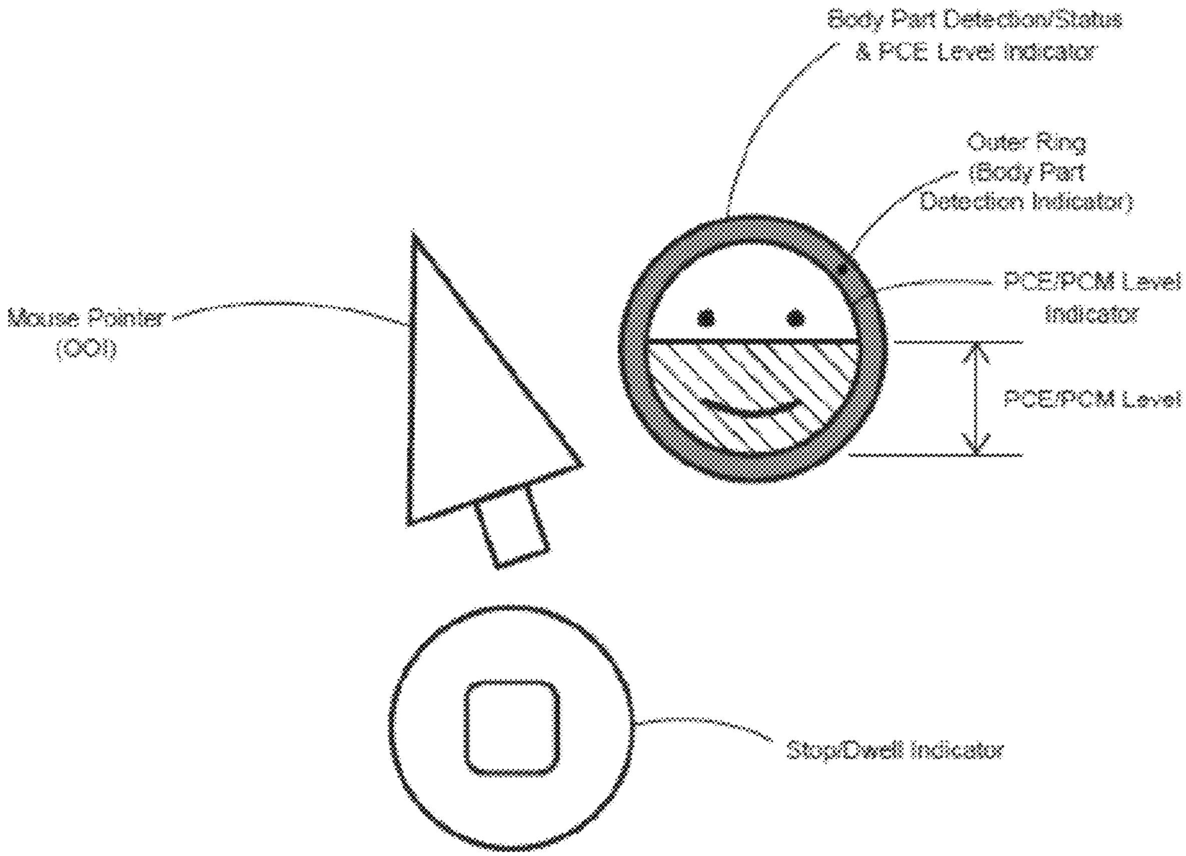
FIG. 11 illustrates an exemplary embodiment of Visual Feedback Provided to User including Body Part Detection Status Indicator, PCE Level Indicator and Stop/Dwell Indicator.

Some embodiments can provide feedback (to the user) on the status, magnitude, direction and other suitable characteristics of body motion, Facial Expressions, POLA (start, progress, end) and any components of user gestures. FIG. 11 shows an embodiment where visual feedback is provided to the user, possibly on a display screen. The OOI used in this illustration is a mouse pointer. A first graphical object (which happens to be on the right side of the figure) is shown to be used as a "Body Part Detection/Status and PCE Level Indicator". This graphical object is shown to consist of multiple components. The first component (outer ring in this illustration) can be used to show the status of detection of a body part being monitored, possibly for body motion or PCE or both. This first component can convey the status of body part detection by changing color, shape, texture, etc. The second component of this graphical object is the inner part that can show level of monitored PCE/PCM (Primary Control Expression/Motion). The shaded/colored area in the PCE/PCM Level indicator can change based on the level of monitored PCE/PCM. While the illustration shows the height of the shaded area changing based on the level of PCE/PCM, other variations are possible. For example, the level can be indicated by the shaded area in the form of a circular ring where the radius and/or thickness of the shaded ring shaped area is changed based on the level of the PCE/PCM. Alternatively, the entire area could be colored but the color itself is changed (or simply made darker or lighter, translucent or opaque) based on the level of the PCE/PCM, and so on. A second graphical object is shown to visually indicate the status of a POLA or "dwell gesture" being performed by the user (via a designated body part). Again, the shape, size, color, texture, visibility, translucency and other visual characteristics can be changed according to the body motion and/or the duration of time for which the body motion is within the specified limits of the POLA.

Figure 12:
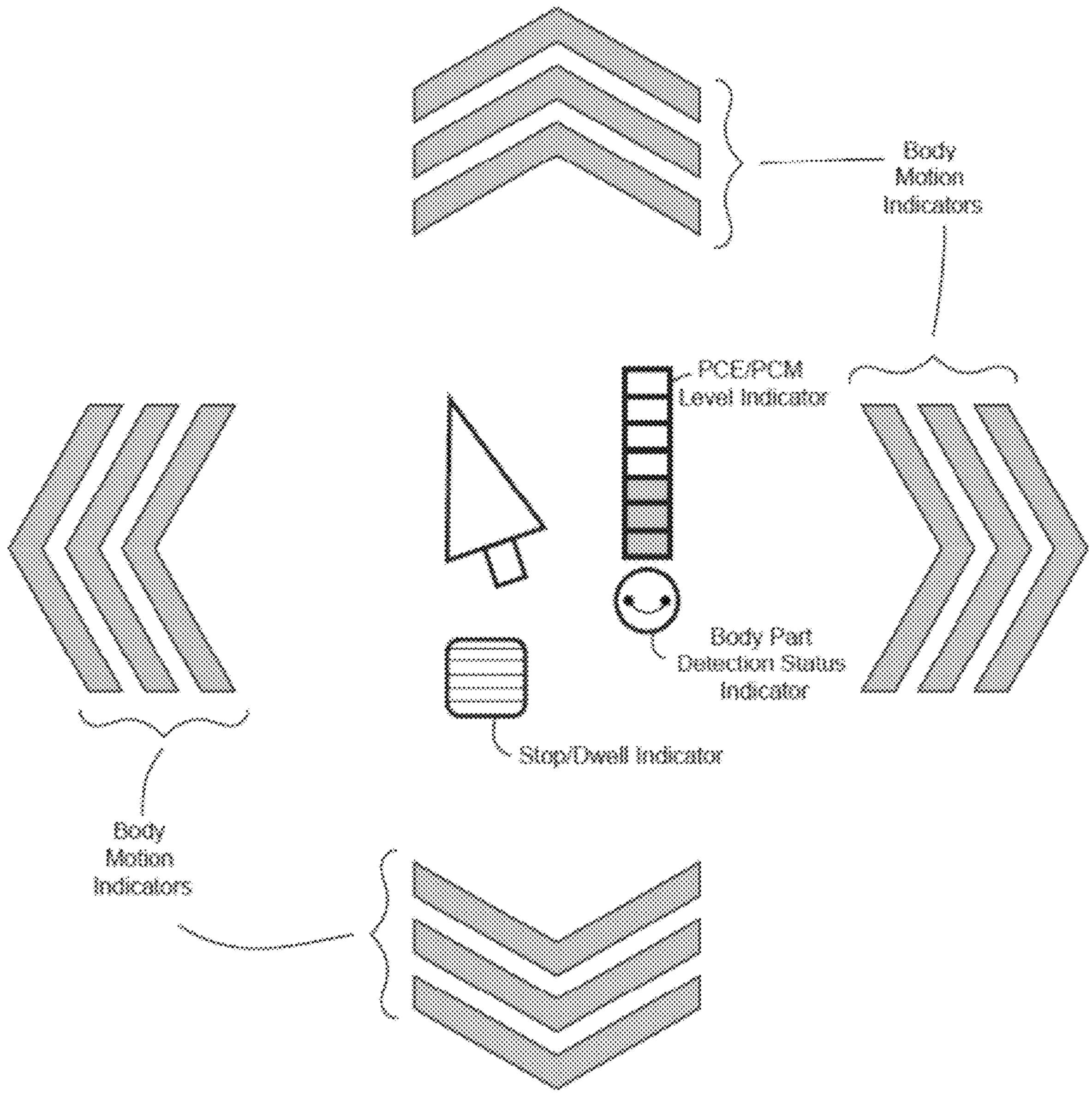
FIG. 12 illustrates an exemplary embodiment of Visual Feedback Provided to User including Body Part Detection Status Indicator, PCE/PCM Level Indicator, Stop/Dwell Indicator and User Action Indicators.

FIG. 12 illustrates another embodiment where visual feedback is provided to the user on various statuses and levels of body motions, user actions, PCE/PCMs, and other variables that may be part of a user gesture, or may help the user to perform a user gesture. It shows PCE/PCM Level Indicator separated out from the Body Part Detection Status Indicator. A Stop/Dwell indicator is also shown that can indicate when the monitored body part is held "stationary" (that is steady within certain specified limits of motion or position). Additional Body Motion Indicators are also illustrated that provide feedback on the body motion being performed by the user. These indicators can change shape, color, texture, number of components, position, visibility and other visual characteristics based on the user's actions. As an illustration, FIG. 13 shows an embodiment where the number of '>' shapes displayed is changed based on body motion. In this example, at a particular instant in time, the user is moving the body part faster in the right direction while simultaneously moving it downwards at a lower speed. That indication is provided by showing more '>' shapes pointing towards the right and less shapes being pointed downwards. The colors of those shapes can also be made different to further highlight speed differences. The top and left pointing shapes are not visible as the body part is not moving in those direction. In a variation, the Stop/Dwell Indicator can be replaced by the Body Motion Indicator, wherein Body Motion Indicators in all four directions can be made visible or invisible, to indicate the body part is stationary.

FIG. 14 illustrates an embodiment where the shape, size, color and other visual characteristics of the OOI itself can be modified based on components of a user gesture or other actions or statuses that can help the user in performing a user gesture. In this figure, the OOI is the mouse pointer. The OOI is colored/shaded to varying degree, in accordance to the PCE/PCM level at any particular instant. FIG. 15 shows the visual feedback when the Body Part is being moved (towards the left at this instant, by showing motion trail towards the right of OOI), regardless of the fact if the OOI itself is also actually moving. In fact, when the OOI itself starts moving, some embodiments can make the motion trails (or body motion feedback indicators in general) to be invisible. Note that the number of shapes displayed in the trail or the size or shape of the trail itself, can be varied based on the magnitude of the motion. Some embodiments can display graphical animations (instead of fixed shapes) as part of the various indicators. Note: The position of the various indicators can be decided in relation to the position of OOI, or bear no relation to it at all. For example, the indicators can be a fixed or variable distance away from the OOI in certain orientations. In some embodiments, they can be just a few pixels adjacent to the OOI and move along as the OOI moves or is modified while maintaining the same distance and relative orientation. In others, the distance from OOI or the orientation related to the OOI change based on the magnitude or direction of body motion, PCE/PCM, or any other suitable criteria. In other embodiments, the indicators can be always at fixed locations, possibly at designated spots on display screen (such particular edges, corners or center of the display screen).

Figures 16A, 16B, 16C, 16D, 16E, 16F:
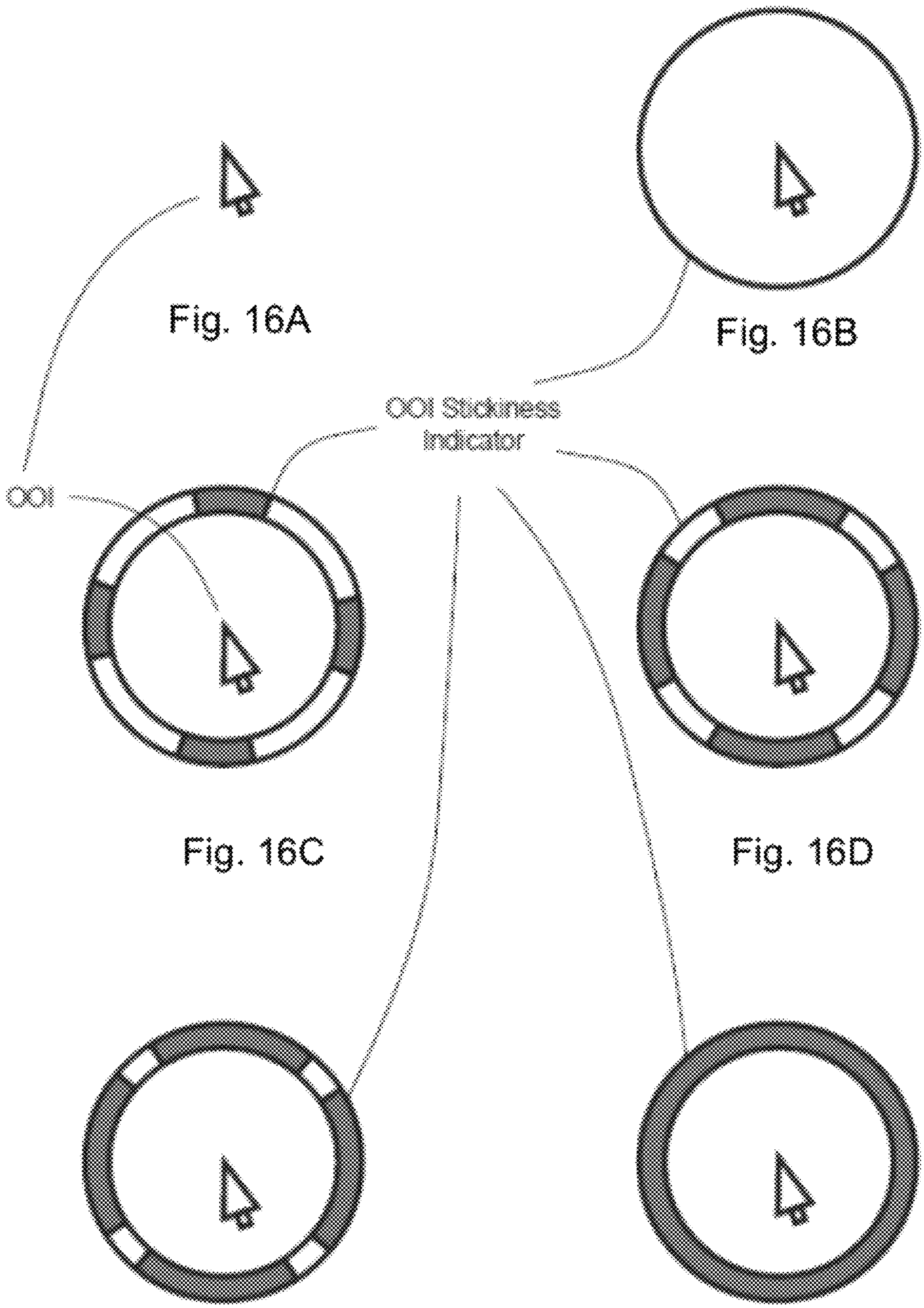
FIG. 16A illustrates an exemplary embodiment of OOI Stickiness Indicator with no indicator around the OOI when the magnitude of body motion is below the MNT.
FIG. 16B illustrates an exemplary embodiment of OOI Stickiness Indicator with a circular indicator around the OOI when the magnitude of detected body motion is higher than the MNT, but still quite small compared to the start motion threshold.
FIG. 16C illustrates an exemplary embodiment of OOI Stickiness Indicator with a more prominent visual indicator than FIG. 16B around the OOI, indicating higher detected magnitude of body motion but still lower than the start motion threshold.
FIG. 16D illustrates an exemplary embodiment of OOI Stickiness Indicator with a more prominent visual indicator than FIG. 16C around the OOI, indicating higher detected magnitude of body motion but still lower than the start motion threshold.
FIG. 16E illustrates an exemplary embodiment of OOI Stickiness Indicator with a more prominent visual indicator than FIG. 16D around the OOI, indicating higher detected magnitude of body motion but still lower than the start motion threshold.
FIG. 16F illustrates an exemplary embodiment of OOI Stickiness Indicator with a full ring visual indicator when body motion equals or exceeds the start motion threshold, indicating the start of OOI motion signal generation.

FIGS. 16A through 16F show an embodiment where visual indicators are provided around a mouse pointer (the OOI) based on the detected body motion, in relation to the start motion threshold. This approach can be used when using the principle of OOI Stickiness. FIG. 16A shows no indicator around the OOI when the magnitude of body motion is below the MNT. FIG. 16B shows a circular indicator around the OOI when the magnitude of detected body motion is higher than the MNT, but still quite small compared to the start motion threshold. FIGS. 16C, 16D and 16E show progressively more prominent visual indicator (in the shape of a broken ring progressively getting fuller) around the OOI, in correspondence to progressively higher detected magnitude of body motion, however, still lower than the start motion threshold. FIG. 16F shows visual indicator (in the shape of a full ring) when body motion finally equals or exceeds the start motion threshold, indicating the start of OOI motion signal generation. Once the OOI start moving, the visual indicator can optionally continue to be displayed and also possibly move along with the OOI. As the visual indicator is updated in real time in response to the detected body motion (OMD), the user effectively sees an animation that provides them a real-time feedback on how much they need to move the designated body part to overcome the start motion threshold as well as how close they are to the start motion threshold in case they do not trigger OOI motion.

Figures 17A, 17B, 17C, 17D, 17E, 17F:
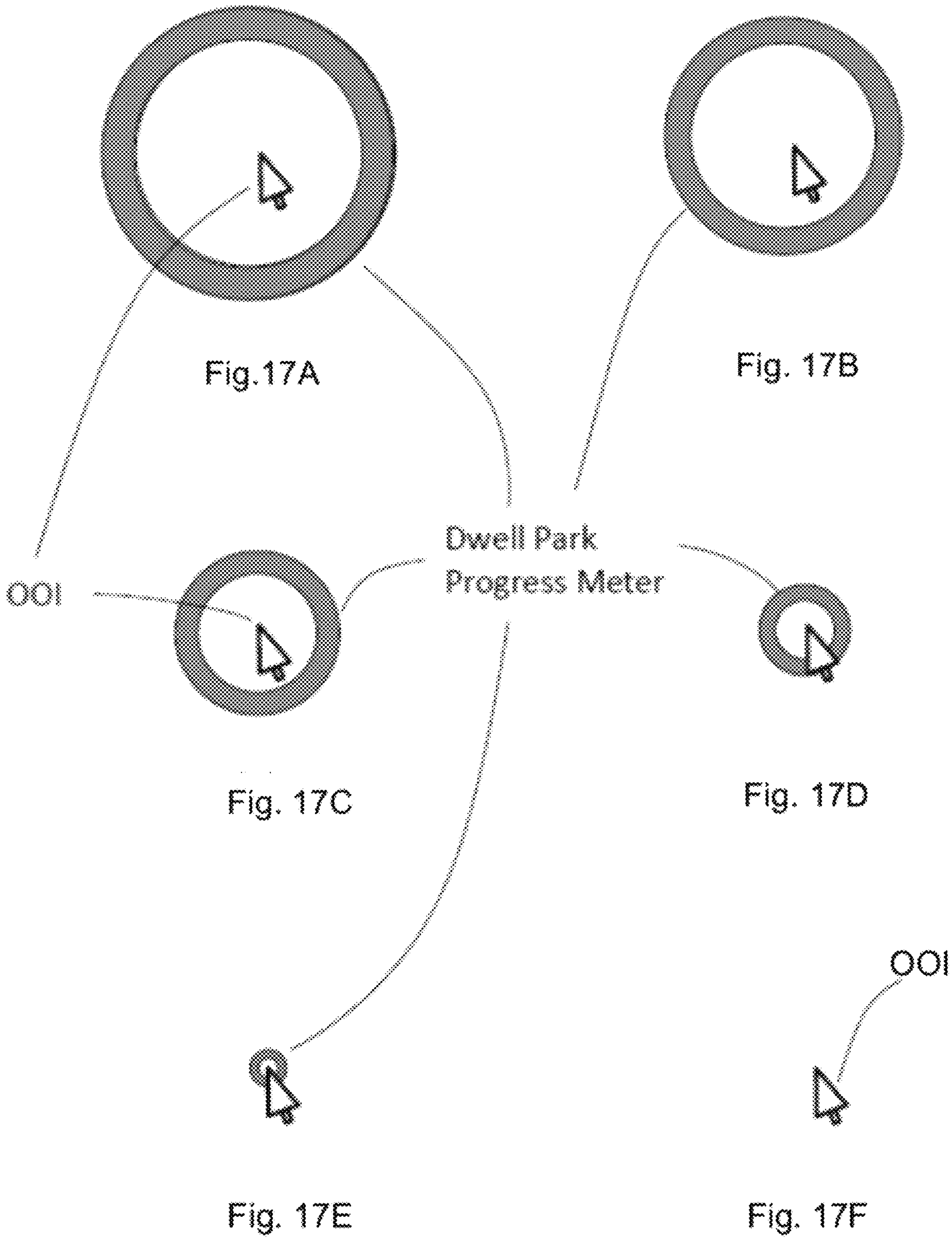
FIG. 17A illustrates an exemplary embodiment of Dwell Park Progress Meter with a full ring around the OOI when the OOI is in motion and the magnitude of the body motion is above the end motion threshold.
FIG. 17B illustrates an exemplary embodiment of Dwell Park Progress Meter where the size of the visual indicator is smaller than FIG. 17A indicating the body motion fell below the end motion threshold and continues to stay below it.
FIG. 17C illustrates an exemplary embodiment of Dwell Park Progress Meter where the size of the visual indicator is smaller than FIG. 17B indicating the body motion continues to stay below the end motion threshold for a longer duration than in FIG. 17B.
FIG. 17D illustrates an exemplary embodiment of Dwell Park Progress Meter where the size of the visual indicator is smaller than FIG. 17C indicating the body motion continues to stay below the end motion threshold for a longer duration than in FIG. 17C.
FIG. 17E illustrates an exemplary embodiment of Dwell Park Progress Meter where the size of the visual indicator is smaller than FIG. 17D indicating the body motion continues to stay below the end motion threshold for a longer duration than in FIG. 17D.
FIG. 17F illustrates an exemplary embodiment of Dwell Park Progress Meter where the visual indicator disappears indicating the body motion continues to stay below the end motion threshold for a duration equal to or longer than required to complete a POLA.

FIGS. 17A through 17F show an embodiment illustrating how visual indicators can change when the magnitude of body motion falls below end motion threshold, and can finally disappear when the OOI gets dwell/hover parked. FIG. 17A shows a full ring around the OOI when the OOI is in motion and the magnitude of the body motion is above the end motion threshold. However, when the OMD (body motion) magnitude falls below the end motion threshold, the visual indicator can start changing to indicate that fact, and it can continue to change as the body motion continues to be within the end motion threshold. In this embodiment, the size of the visual indicator changes progressively from FIG. 17B through FIG. 17E (and finally disappears in FIG. 17F) in accordance to the time elapsed since the last time the body motion fell below the end motion threshold and continuously stayed below it. In this embodiment, the size of the visual indicator is an indication of amount of time spent in period of No Motion (by the user holding still/dwelling/hovering). The change in shape/size of the visual indicator can be in accordance to the time remaining to successfully complete a POLA to bring the OOI motion to an end, that is to Dwell Park the OOI. When the required duration of the POLA (to bring the OOI motion to an end) is met or exceeded, the visual indicator can completely disappear, and the OOI can become sticky again. (Refer to section on OOI Stickiness.)

Control Systems Using Multiple OMDs

Many control systems employ only one OMD to change an OOI. For example, if the OMD is eye gaze, then an OOI can follow the CPOI on the display screen. Other systems using head motion as the OMD can have the OOI be modified in accordance to the change in position or velocity of the user's head. However, each OMD has its advantages and disadvantages. For example, determination of the POI (CPOI) in an eye tracking based system is often fraught with inaccuracies and rarely is pixel perfect. Therefore, while the user may be looking at POI, the system may compute it to be at CPOI (Calculated POI), which may or may not coincide with the POI. Whereas, systems using head motion as the OMD, may be able to calculate head motion quite accurately and without noise, however, given that users often need to move/modify an OOI (such as a mouse pointer) moving their head often can become tiring to some users. As in the referenced documents, we disclose control systems that can employ multiple OMDs to move/modify the OOI. This allows for taking advantage of the benefits of various OMDs while compensating for their shortfalls. For example, some embodiments can employ head motion as well as eye gaze as OMDs. In some of such embodiments, criteria can be specified to define how one OMD is used versus the other when modifying an OOI. One such criteria can use magnitude of a designated OMD to determine which OMD (of the multiple possible OMDs) to use. For example, the system can specify a threshold on the magnitude of a first OMD, above which only the first OMD can be used to generate OOI modification signals (OM signals) and below which only a second OMD (that is distinct from the first OMD) can be used to generate the OM signals. As an illustration, if the first OMD was eye gaze and second OMD was head motion, then if at any point in time the eye gaze was changing by an amount greater than a designated eye gaze threshold, then the OOI (for example a mouse pointer on a display screen of the controlled electronic device) would move according to the changes in the eye gaze. (Note that this eye gaze threshold can be defined on the angular velocity of the DEG, displacement of POI or displacement of DEG, or any other suitable criteria.) Further, the displacement could be measured from various events in time. For example, the displacement could be measured in relation to (a) the DEG/POI/CPOI during a previous or immediately previous iteration (with respect to the current iteration), (b) the location of OOI the last time the OOI was affected by the any OMD, (c) the location of OOI the last time the OOI was affected by eye gaze OMD in particular, (d) DEG/POI/CPOI at beginning, end or during a previous or last eye gaze fixation, (c) DEG/POI/CPOI at a specified time duration ago (from the current time or from start time of current iteration), or (f) any other suitable point in time. However, if the change in eye gaze is within the threshold, then the system can switch generation of signals to be based only on head motion OMD.)

Warping of OOI Based on Head Motion, Facial Expressions or Other User Actions

In some embodiments, an OOI can be configured to be modified using user's eye gaze as the OMD. In such embodiments the OOI can change in accordance to the user's eye gaze, during every iteration (of the control software) where enough sensor data is available to calculate the user's eye gaze. This can lead to frequent modification of the OOI. This can be annoying to the user, especially if the OOI is displayed on screen. This is because sometimes the user may be looking around (on the screen or beyond) without intending to move or change the OOI. To alleviate this, rather than continuously modifying the OOI based on detected eye gaze, the control system can initiate OOI modification (in accordance to the eye gaze) only when the user performs a designated user action/gesture called the OOI modification start trigger (OMST). An OMST can be an action such as an eye blink/wink/squint, eyebrow motion, smile, mouth open/close, lip twitch, nose twitch, or any other suitable facial expression, or head/hand/body part motion/pose/orientation/configuration, or any physical, verbal or mental action, or a combination of any such actions. This concept can be called Warping, wherein the OOI can suddenly change (and possibly jump on a display screen) or be suddenly modified according to where the user is (determined to be) looking, when the user performs the OMST. If the OMST is a facial expression, this can be called Facial Expression based Warping (FE Warp) of the OOI. If the OMST is head motion, then it can be called Head Motion based Warping (Head Warp) of the OOI. A designated OMST can also be making a hand gesture, tightening a bodily muscle, attaining a mental state (as measured by brain waves), making a sound (e.g. a clicking sound, verbal command, etc.), moving the tongue, clenching teeth, or any other suitable action. Sec referenced applications for additional examples of start triggers, including U.S. patent application Ser. No. 15/469,456 which lists illustrative examples of head motion based start triggers that can be used to start generation of OOI modification command signals.

Figure 31:
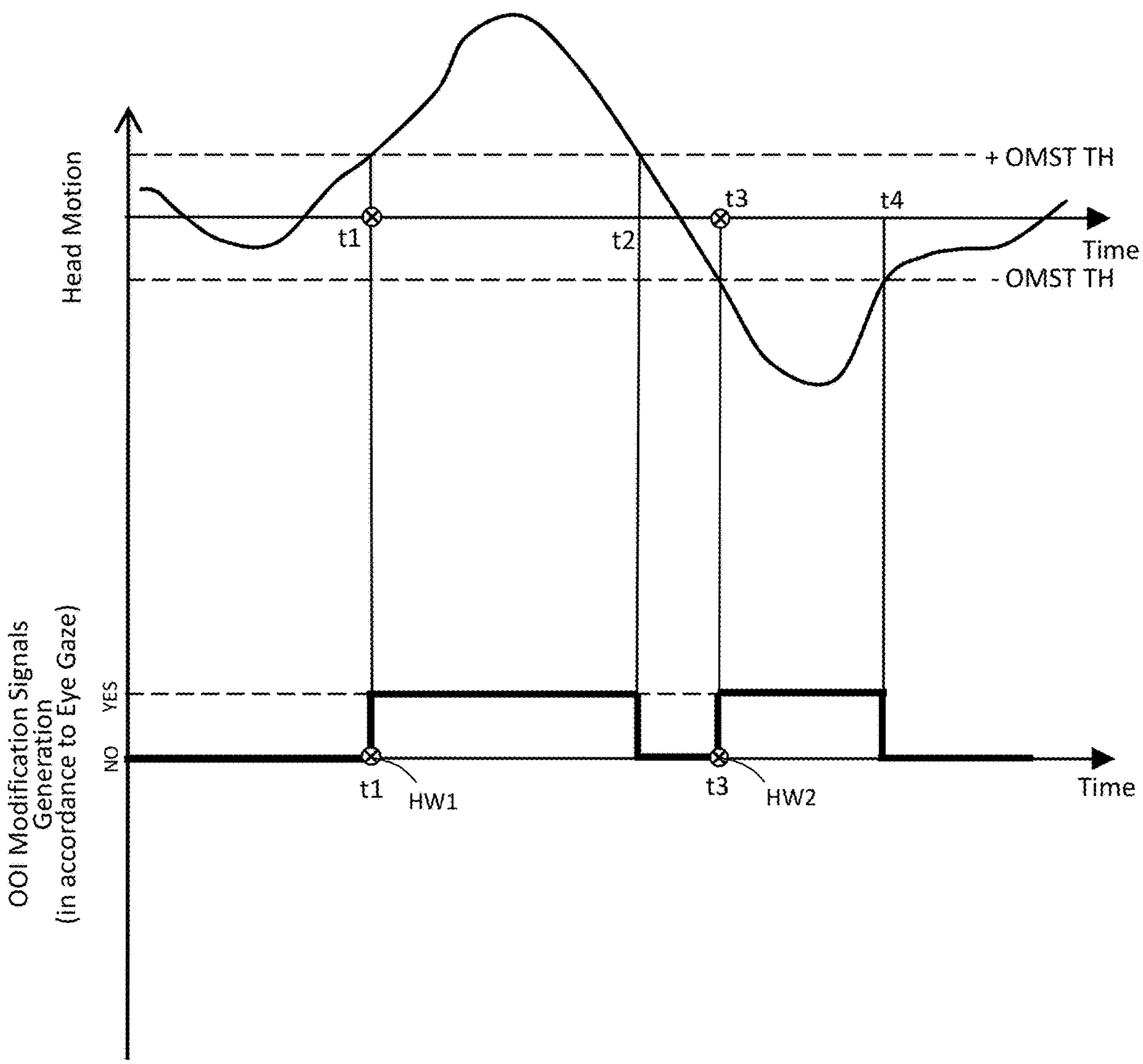
FIG. 31 illustrates an exemplary Head Motion pattern to trigger OOI Warp based on Head Motion in an embodiment.

As an illustrative example, in a system configured to move the mouse pointer (OOI) in accordance to the user's eye gaze (OMD), if head motion was the OMST, the mouse pointer may not move even if the user's eye gaze was moving around, unless and until the user moved their head by at least a specified minimum amount (OMST Threshold, aka OMST TH). That is, when the user is ready to move the mouse pointer, they can simply look to the spot they want to move the mouse pointer to and then move their head (at a magnitude larger than the OMST TH); this can lead to the mouse pointer instantaneously jumping to where they are looking. After the jump to this location, the OOI can stay there indefinitely, unless the user continues to move their head by at least the OMST TH (i.e. performs the OMST). See FIG. 31 for an illustration. The Head Motion plot of the figure schematically shows the motion of user's head over time. The OMST TH is illustrated. The magnitude of head motion is shown to be within the OMST TH prior to time t1, but then exceed it during time period t1:t2, drop within it during t2:t3, and then exceed it again during t3:t4. Therefore, in this embodiment, the first head warp (HW1) is experienced at time t1, that is when the generation of OOI modification commands in accordance to user's eye gaze is initiated. That means that the mouse pointer is moved from its previous position to CPOI at time t1 ($CPOI_1$), and then it can be continuously moved in accordance to the CPOI (computed during every iteration) during the time period t1:t2. The mouse pointer then can come to rest at the CPOI computed at time t2 ($CPOI_2$) and can stay at that location till the next occurrence of a warp. The second head warp (HW2) is experienced at time t3, wherein the mouse pointer can again start moving in accordance to the user's eye gaze between the time period t3:t4, and the OOI can come to rest at CPOI computed at time t4. Such a system can therefore allow the user to freely look around (at the display screen or elsewhere) without having the mouse pointer constantly follow their eye gaze, as long as the user was also holding their head steady enough (i.e. not moving it more than the specified OMST TH).

Note: In the above embodiment, the mouse pointer (OOI) was being exclusively modified based on the eye gaze (that is where the user was looking at) between the periods of t1:t2, and t3:t4. This exclusivity may not exist in some other variations.

Figure 32:
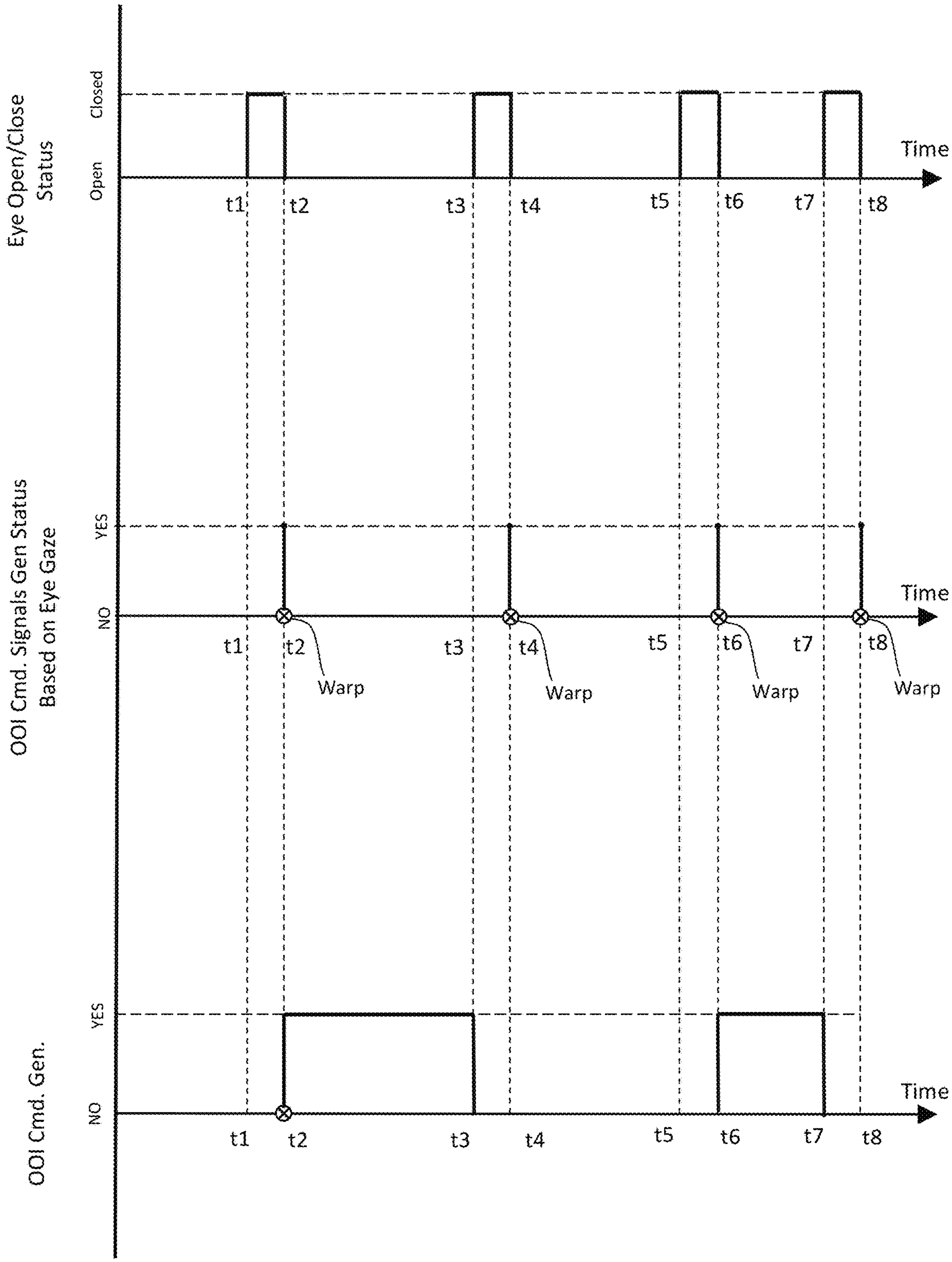
FIG. 32 illustrates an exemplary OOI Warps based on Blinks in an embodiment.

In some embodiments, a facial expression can be specified to be an OMST. For example, if an eye blink was an OMST, the OOI would be modified (e.g. get moved to the location where the user is looking) when the user blinks. However, once the OOI gets modified, it can stay unchanged at the new state/location. See FIG. 32 illustrating an embodiment showing OOI warping based on blinks. The Eye Open/Close Status plot (part (a)) of the figure shows eye open close status, and the OOI Cmd. Signals Gen. Status plot (part (b)) shows status of generation of OOI modification command signals (that are in accordance to the eye gaze signals). The user starts a blink (by closing their eyes) starting at time t1 through time t2 when they open their eyes. The control system can compute the CPOI right after the blink is completed (at time t2) and generate command signals to move the mouse pointer/OOI to be in accordance to the coordinates of $CPOI_2$. (Note that if the plane where the OOI is displayed does not coincide with the plane used for calculation of CPOI, then the coordinates of CPOI may not match the coordinates of the OOI). In this embodiment, there are no OM signals generated after time t2 until time t4 when the next completed blink is detected. Note that some systems can imposes a minimum duration requirement on the blinks. That is, for example, if a time duration t1:t2 was not longer than a minimum required blink duration, then that blink can be ignored for OOI warping purposes by the control system. See the OOI Cmd. Gen. plot (part (c) of the figure) for a variation where the system initiates and keeps on generating OM signals (based on eye gaze) upon/after the first blink until it encounters a second blink, where the second blink is used as an indicator (end trigger) to stop generation of the OM signals (at time t3). There can be no OM signals generated between times t3:t5, and the signal generation is restarted at t6 which continues till t7 (the time when the fourth blink is started). This assumes that all four blinks were valid (that is, for example, of at least the minimum specified duration), otherwise as stated before, invalid blinks can be simply ignored and the system can reinstate the OM signal generation status that existed just before that blink was encountered. In this embodiment, every odd number valid blink is treated as an OMST and every even number valid blink is treated as an ODE (OM signal generation Disabling Event). Note: In some variations, the OM signals generated at the onset of a blink based warp can be based on the last CPOI calculation before the user closed their eye. E.g., the CPOI used to place the OOI at time t2 may be from the CPOI during the iteration just before time t1. Some embodiments may consider the point the user is looking at or fixating just before the blink (rather than just after the completion of the blink) as a more reliable indicator of where the user intended to move the OOI. The same approach can be used with other user actions designated to trigger OOI warps.

Figure 33:
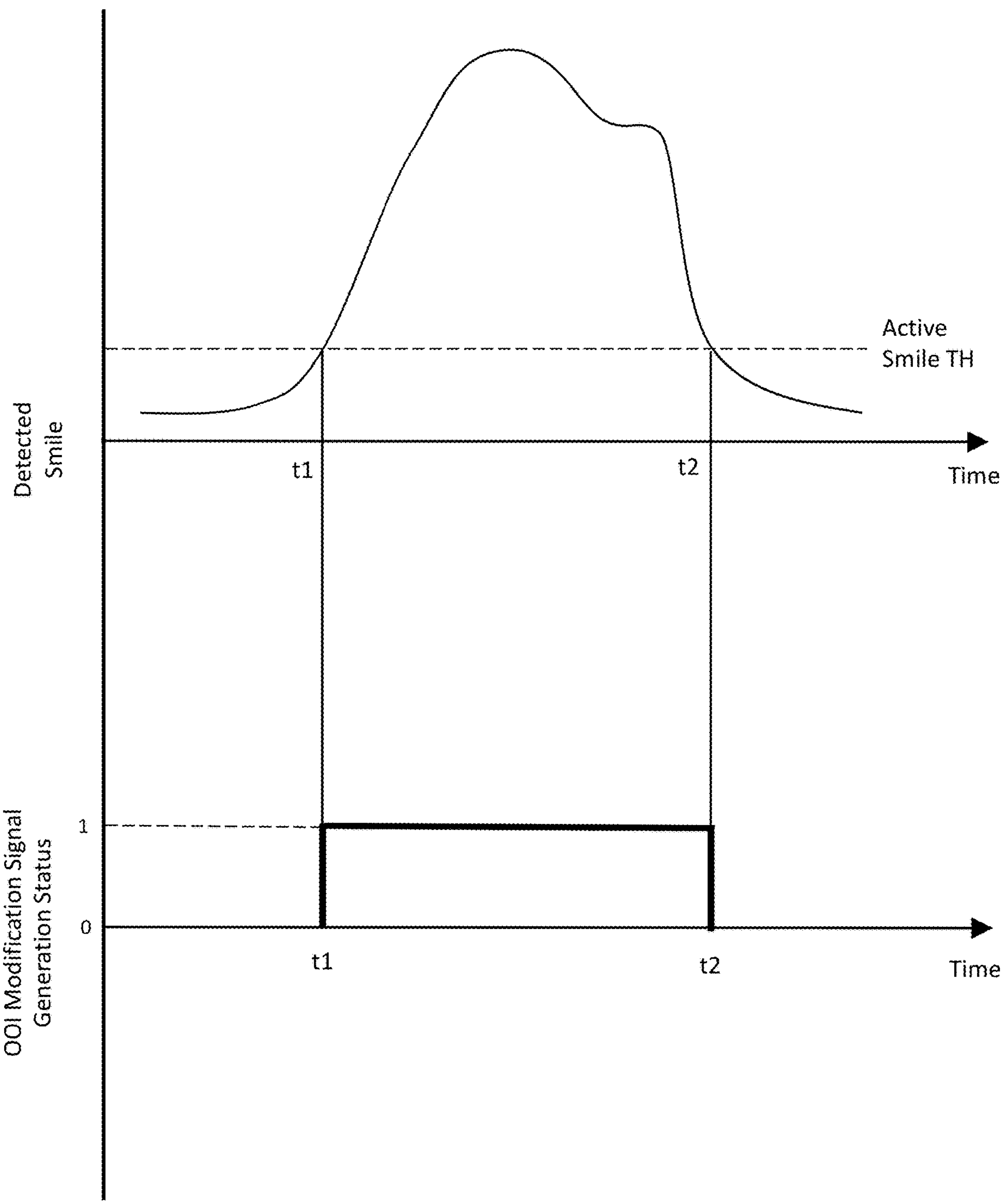
FIG. 33 illustrates an exemplary OOI Modification Signal Generation based on detection of an Active Facial Expression.

In another example, if the OMST was the facial expression of smile, the OOI can get modified according to the eye gaze when a smile of magnitude greater than the OMST TH is detected; and in a further variation, the OOI can be continuously modified as per the eye gaze, as long as the facial expression is detected to be above the OMST TH or a different specified threshold. See FIG. 33 for an illustration of OOI modification being generated based on detection of an active facial expression. The Detected Smile plot of the figure shows variation of detected smile, wherein it is beyond the Active Smile Threshold only between times t1 and t2. The OOI Modification Signal Generation Status plot of the figure shows the status of OM signal generation. It shows that those signals are generated (in accordance to eye gaze) only between the times of t1:t2. The OOI can be abruptly modified (warped) to CPOI computed at time t1 and then can be further modified in every subsequent iteration according to the CPOI computed at that iteration, up to time t2 when the detected smile becomes non-active (i.e. drops below the active smile threshold), and then the system can leave the OOI at coordinates corresponding to $CPOI_2$ (the CPOI calculated at time t2) until the next OMST is encountered. As illustrated in this embodiment, an (active) smile start event can be treated as a OMST and end of active smile can be treated as an ODE.

The concept of OOI Warping (whether based on facial expressions, head motion or any other designated body action) can therefore provide an easy and precise way of indicating user intent to moving/modifying or start moving/modifying an OOI in accordance to an OMD.

In a variation of systems using body motion (such as, for example, head or hand motion, etc.) as the OMST, additional conditions can be imposed before the system can start generating the OOI modification command signals. For example, the system can also require the body motion (OMST) be performed in a particular direction, before it can be considered as a valid OMST to trigger generation of signals for OOI modification. As an example, the system could require head motions be only along the horizontal direction going right or left, or be a side-to-side shake, or be only in a downward nod of the head, or some other combinations of head motions. Alternatively, some systems can require the head motion to be in the direction of the POI. That is, if the user's head was pointed towards point P on the screen (i.e. the intersection of DHP with the surface of the display screen, see FIG. 9) but if their eye gaze was pointed towards POI, then the system can require that the user move their head so that the DHP traces the vector going from point P to POI/CPOI (within certain required tolerance). Therefore, even if the user moved their head (while looking at the POI) at a magnitude larger than the OMST TH, if the direction of head motion was not sufficiently correct (and possibly for sufficient amount of time duration), then that user action may be ignored (that is, not considered as a valid OMST to start command signal generation). Note that other variations can require the OMST head motion to be in opposite direction compared to the P-POI/CPOI vector; this requirement can be beneficial in systems that tend to underestimate the location of the POI. Regardless, imposing a direction requirement (in addition to the magnitude requirement of an OMST) can help with reducing false positives when using an OMST.

Additional conditions (beyond the OMST) can be required to be satisfied before the system can start generating command signals to modify the OOI. For example, in a variation, some systems can also look to the size (or change in size) of user's pupil as an indicator of user intent. Some systems can require pupils of the user's eye to dilate (that is increase in size) by a specified minimum amount before, during or immediately after the performance of the OMST. Further, the system can require that this dilation persist for at least a specified minimum amount of time. Some systems can also compensate for change in lighting conditions (around the user) when computing the dilation of the user pupils. Some systems can also compensate for the size, color, brightness, or nature of objects (such as inanimate versus animate, moving versus stationary, male versus female gender, their closeness to the DEG or the user's eye, etc.) shown on the display screen (real or virtual) or in the visual field of the user, when computing the pupil dilation changes. Some systems can also compensate for non-visual stimuli or other conditions causing cognitive load to the user, before computing the amount of dilation that could be correlated/attributed to user intent. In such embodiments, if the additional eye pupil dilation requirements are not met, the system may not start generating the OM signals even if the OMST conditions were met.

In some embodiments, immediately after the warping of OOI, it can be continued to be modified based on multiple OMDs. In such cases, the magnitude and direction of OOI modification can be based on the relation between magnitude and direction of first OMD to magnitude and direction of second OMD. For example, the OOI motion calculated at a particular point in time can be in accordance to the OMD with larger magnitude at that particular instant. In another embodiment, OOI motion calculated at an instant can be based on the OMD with the lower magnitude at that instant. In other variations, the OOI modification can be based on a combination of both (or all) the designated OMDs (i.e. including their magnitudes and/or their directions). In other variations, change in eye gaze vector (CEGV) can be calculated and used to determine which OMD is used to drive the OOI modification. The CEGV can be calculated either between two consecutive iterations, or over some specified number of iterations (possibly up to the current iteration), or over a designated time period (possibly just before and up to the current iteration) or any other suitable interval, and also possibly including filtering out of some of the eye gaze vector calculations attributable to noise or random or unintentional motions of the eye or head. The CEGV then can be used to determine if the OOI should be modified in accordance to the eye gaze OMD versus some other OMD (such as head motion) for the current iteration. For example, if the CEGV is less than a specified CEGV threshold, then the OOI can be modified in accordance to head motion (i.e. the second OMD instead of eye gaze). Note that if the head motion during a particular iteration happens to be zero in magnitude, the magnitude of OOI modification can still be zero even though CEGV is non-zero, if the CEGV is less than the specified CEGV threshold. In effect, the effect of eye gaze on OOI can be suppressed if CEGV is within a specified threshold. In other variations, the effect of eye gaze can be suppressed when it is larger than a second designated CEGV threshold. This for example can help with not modifying the OOI if the user happens to look away from the screen. Some embodiments can designate a variety of CEGV values and then suppress or enable OOI modifications based on if the CEGV falls within or outside specified range of values.

Note: The CEGV can be calculated between two designated eye gazes possibly as physical distance or number of pixels on the display screen between the two CPOIs (corresponding to the two eye gaze vectors) or as the angular deviation between two designated eye gaze vectors or any other suitable method of determining the change between some specified number of designated eye gaze vectors.

In some embodiments, where both eye gaze and head motions are being tracked, the OOI motion start trigger could be performance of a head motion by the user, wherein the magnitude of the head motion is larger than a first designated head motion threshold. The OOI (possibly shown on the display screen of an electronic device) can stay stationary despite changes in the eye gaze point as the user looks around. However, when the user performs a head motion larger than a specified threshold, the OOI can be modified in accordance to the latest eye gaze point (i.e. possibly jump to the latest coordinates of the eye gaze point). However, after that sudden change in the OOI attributes (such as coordinates), it can start following the head motion (that is, for example, the coordinates of OOI can change in accordance to the head motion) until the occurrence of an ODE (such as a POLA performed with the head motion). (Note that when the OOI is being moved by means of their head, if the user looks away from the current location of the OOI by more than a specified amount, the OOI can jump to a new location that corresponds to the new eye gaze point. If that happens, the OOI can continue to move from that new location in accordance to the head motion, provided that the head motion is larger than some specified designated threshold, which may or may not be the same as the first designated head motion threshold.) In a variation, some embodiments may disallow the eye gaze to affect the OOI modification while the OOI modification is being driven by head motion. In further variation, that disallowance may be in effect only based on certain detected state(s), such as presence of a body action including facial expression, hand/finger gesture, etc., or detection of key press state of mouse button or keyboard or an adaptive switch, touch state of a touch sensitive surface or specified state of some type of manual input mechanism. For example, if at the start of the OOI modification based on head motion it is detected that a mouse key is in depressed state, the OOI motion can only follow the head motion (and not the eye gaze) until the point in time when the mouse key is released.

Note: The principles/concepts of Facial Expression Warping and Head Warping can be used along with the principle/concept of CEGV based OMD determination.

Note: Warping can be done based on any body parts (and not just facial muscles or head).

Here are a few embodiments illustrating use of additional OMDs after the warping process. As previously seen, some embodiments can start generating OM signals when a valid OMST (including any additional requisite conditions) is encountered. At this point, the OOI can get moved/modified according to the user's eye gaze and then it can be left there indefinitely unless the OMST conditions are met again. In some variations, however, once the OOI is moved/modified as per the eye gaze (the first OMD) as part of the warp, it can be subsequently modified by means of a second OMD (such as head motion, hand motion, or motion of some other body part). See FIG. 34 for an illustration on such an embodiment. Here are the various parameters for this illustrative embodiment—

- OOI=Mouse pointer
- OMST=Head motion (above OMST TH).
- OMD1=Eye gaze (at Warp, and possibly conditionally during Post-Warp Period (PWP))
- OMD2=Head Motion (at PWP, possibly conditionally based on OMD1)
- ODE=ODE POLA (performed by head). Head motion required to be at or within ODE POLA TH for two consecutive iterations.

Figure 34:
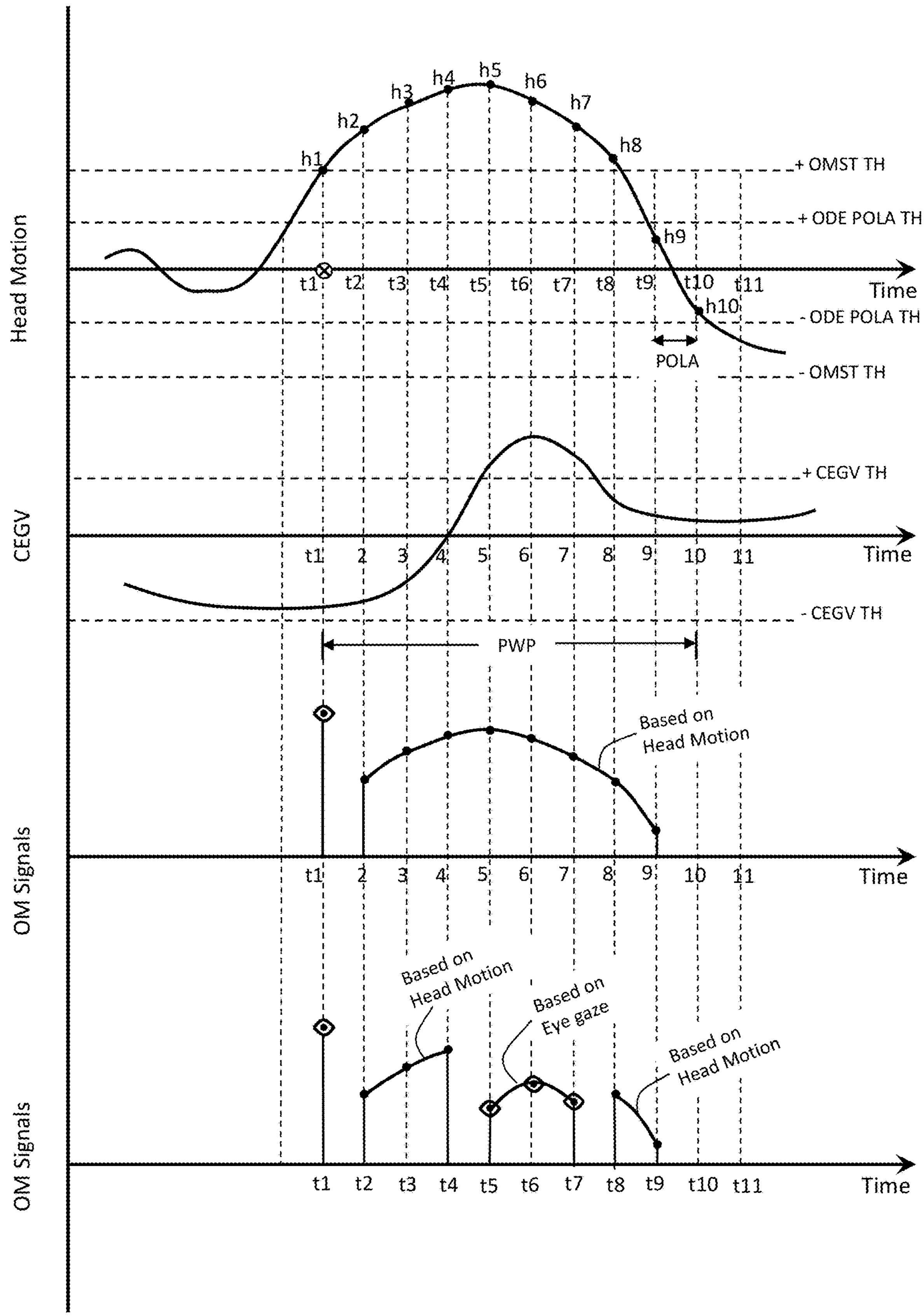
FIG. 34 illustrates an exemplary generation of OOI Modification signals in accordance to Head Motion versus Eye Gaze based on CEGV Threshold, in some embodiments.

The X axis in all of the parts of FIG. 34 represents time. Further, the tick marks on the X axis can indicate the start time of each iteration in the main loop of the control system software/process. The tick marks are shown at constant time intervals for this embodiment indicating there is a constant time interval between two iterations, and possibly also between readings taken from the same sensor during two consecutive iterations. The Head Motion plot of FIG. 34 schematically represents variation of head motion over time. The Y axis can represent head motion which can be based on readings from a sensor sensing head motion. Though there can be multiple sensors providing multiple readings of motion (rotational and translational) along various axes, for purposes of simplicity of illustration (in this as well as all other figures) we are showing only one head motion variation. (Remember, as mentioned earlier that head "motion" can be based on head velocity readings obtained from the motion sensor during a particular iteration, or, it can be head displacement or change in head position detected between the previous and current iteration. Displacement can be converted to velocity given that velocity is displacement divided by time.) The tolerance zone for OMST is shown via the +/−OMST TH lines. The tolerance zone for ODE POLA is shown via the +/−ODE POLA TH lines. The CEGV plot of FIG. 34 shows variation of the CEGV (as measured between two subsequent iterations) schematically. Designated threshold on the CEGV is depicted by the +/−CEGV TH lines. The upper OM Signals plot of FIG. 34 depicts representation of OM signals generated in response to head motion (from the Head Motion plot of the figure) and CEGV variation (from the CEGV plot of the figure). It can be seen that while head motion and CEGV values are non-zero most of the time up to time t1, no OM signals are generated. At time t1, head motion readings obtained at that iteration indicate head motion to be at or above the OMST TH. This causes a head warp, that is, the system can generate OM signals to place the mouse pointer (OOI) at the calculated POI (CPOI1). Note that CPOI1 can be calculated based on readings obtained (during the iteration started at time t1) from various sensors that help measure eye gaze of the user. Note that the head motion reading (h1) obtained at iteration of t1 can be ignored in generation of the OM signals at time t1; they (the OM signals) can be entirely based on the CPOI1 at time t1. Starting at t2, however, the generated OM signals can be based only on head motion, until and including iteration at 19 wherein the magnitude of head motion drops below ODE POLA TH but is still non-zero. At iteration of t10, the magnitude of head motion is non-zero but still within ODE POLA TH bound, and given that ODE POLA is considered to be complete if head motion is within the POLA TH for two consecutive iterations, the generation of OM signals can be brought to an end at this iteration. Therefore, generation of OM signals can be suppressed starting at t10 until possibly another OMST is encountered in the future. Note that while the OM signals generated at t1 can place the OOI precisely at CPOI1, signals generated at 12:19 can be generated purely on head motion signals. Given that head motion signals can represent incremental head displacement experienced from iteration to iteration, the OM signals generated during t2:t9 can (incrementally) displace the OOI by an amount proportional to the measured head displacement at a particular iteration (from the location of the OOI during the previous iteration). For example, the location of the OOI at end of iteration t1 (L1) is equal to CPOI1 (due to the warp). At iteration t2, the OOI location (L2) can get updated to CPOI1+g(h2), where 'g' can be any suitable (gain) function that provides an output displacement value for a given input displacement value. (The gain function can be a simply a constant non-zero multiplication factor.) At iteration t3, the OOI location L3 is set to L2+g(h3) and so on, until iteration 19 where L9=L8+g(h9), and at iteration t10, L10 can be equal to L9 (or alternatively be equal to L9+g(h10)). Starting at t11, however, given that a valid ODE POLA can be considered to be detected by end of iteration t10, generation of OM signals can be suppressed starting at t11, indefinitely till possibly another OMST is detected.

Note: the time period t2: t10 can be called a Post Warp Period (PWP) (where OM signals can be generated in response to designated OMD(s)). It can start right after OMST is encountered and it can end upon occurrence of an ODE.

Note that in the above embodiment, as seen in the upper OM Signals plot of FIG. 34, no consideration is given to the value of CEGV during the Post Warp Period in generation of the OM signals. However, in a variation as shown in the lower OM Signals plot of FIG. 34, the choice of OMD to use for generation of OM signals is based on the eye gaze signals. As shown in the lower OM Signals plot, when the eye gaze signals indicate CEGV value greater than or beyond a designated CEGV threshold at any particular time (iteration) in the PWP period, the generated OM signals can be in accordance to only the eye gaze signals (and without regard to the amount of head motion indicated by head motion signals). That is in this situation, the OM signals can place the OOI directly at the calculated CPOI obtained at that iteration, in effect ignoring the head motion readings obtained at that iteration. Therefore, while (similar to variation in the upper OM Signals plot), $$L2 = L1 + g(h2)$$

$$L3 = L2 + g(h3)$$

$$L4 = L3 + g(h4)$$

during time t5:t7, when CEGV is beyond CEGV threshold, location of OOI can be in accordance to the eye gaze (in effect ignoring head motion readings), as follows $L5=CPOI_5$ $L6=CPOI_6$ $L7=CPOI_7$ And then during t8:t9, because CEGV is within the CEGV threshold, OM signals can be based on head motion OMD (in effect ignoring eye gaze readings during those iterations) as follows $$L8 = L7 + g(h8)$$

$$L9 = L8 + g(h9)$$

And then, at t10, generation of OM signals can come to an end due to detection of a valid ODE at t10, thereby not affecting the position of the OOI at t10 (and leaving it where it was at end of the t9 iteration).

Figure 35:
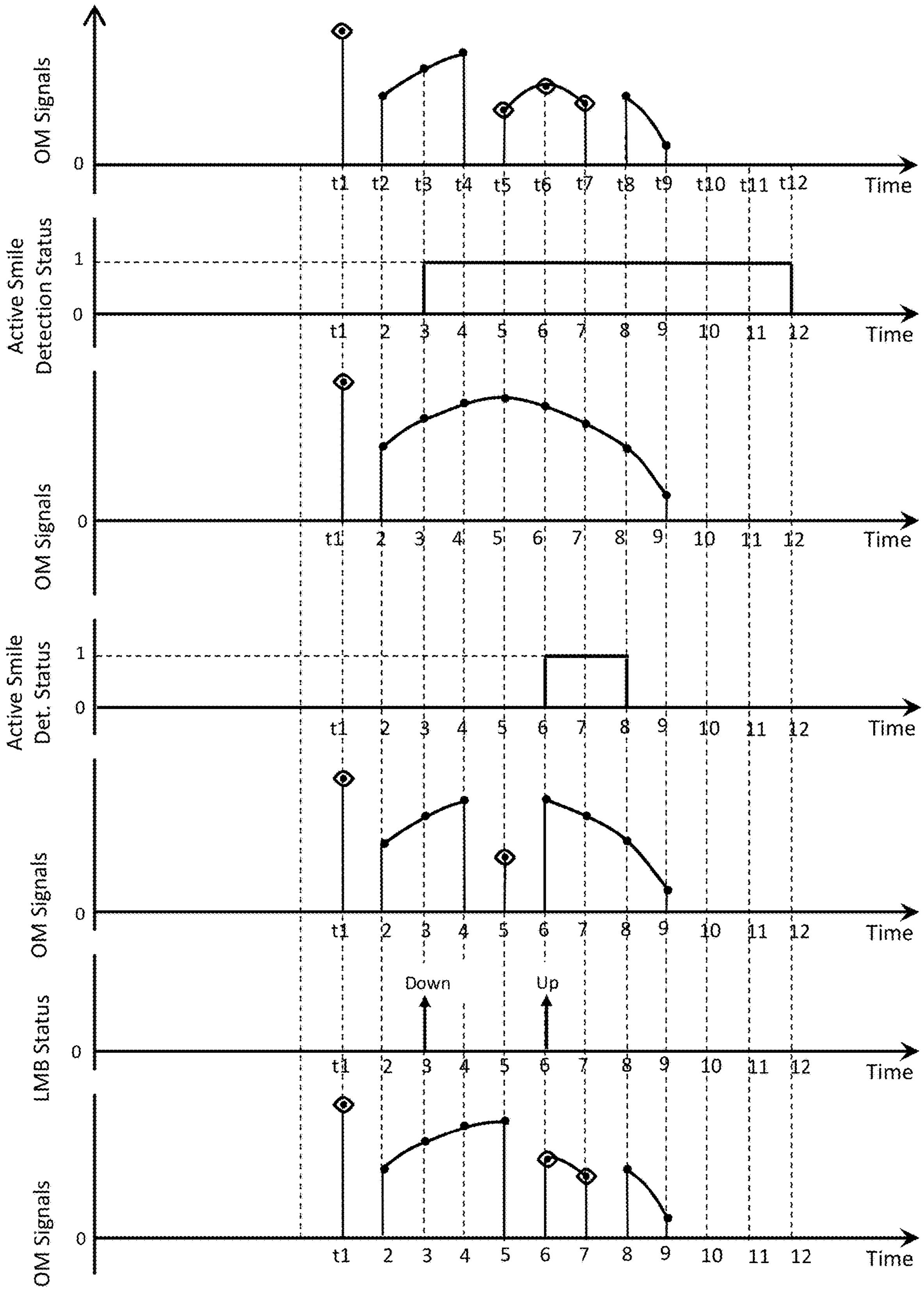
FIG. 35 illustrates an exemplary generation of OOI Modification signals in accordance to Head Motion versus Eye Gaze based on active FE active status and Mouse Button status, in some embodiments.

See FIG. 35 for further variations based on the embodiment shown in the lower OM Signals plot of FIG. 34. The top (first) OM Signals plot of FIG. 35 reproduces the lower OM Signals plot of FIG. 34 for sake of convenience of explanation. The underlying head motion and CEGV plots (corresponding to OM Signals show in the top OM Signals plot of FIG. 35) are also the same as the Head Motion and CEGV plots shown in FIG. 34; however, are not re-illustrated in FIG. 35 (for sake of avoiding redundancy). In one variation, when a designated facial expression is detected to be active, OM signals are only generated with one type of OMD (and the use of other OMD is suppressed). For example, one embodiment can suppress use of eye gaze signals for OM signal generation, during iterations when an active smile is also detected. See the upper Active Smile Detection plot of FIG. 35 for active smile detection status and the second OM Signals plot for corresponding OM signal generation. Note that since active smile is detected during the time period of t3:t12, OM signals are based only on head motion signals during the entire PWP, even though CEGV is beyond the CEGV TH during t5:t7. Therefore, the second OM Signals plot shown in FIG. 35 looks similar to the upper OM Signals plot of FIG. 34 (instead of the lower OM Signals plot of FIG. 16) even though the control system can generate signals based on eye gaze signals when those signals indicate CEGV greater than a designated CEGV threshold. See the second Active Smile Detection plot of FIG. 35 for another plot of active smile detection status, where the smile is shown to be active only between t6:t8. See the third OM Signals plot of FIG. 35 for corresponding OM signals generation. Note that while OM signals at t5 are based on eye gaze signals at t5, they are only based on head motion signals during t6:t8 even though eye gaze signals indicate CEGV greater than CEGV threshold during t6 and t7 as well. In another variation, the suppression of use of eye gaze signals (for purposes of generating OM signals) can be based on presence of other conditions such as press/release status of a mouse button, keyboard key, status of an input mechanism (connected to the controller or controlled device), tensing of a designated muscle, state of a program or in a program running on the electronic device, a voice command to start or stop suppression, level of opening of user's eye, dilation level of user's pupil, or any other suitable user action. The LMB Status plot and the bottom (fourth) OM Signals plots of FIG. 35 illustrate an embodiment that suppresses use of eye gaze in OM signal generation when the left mouse button (LMB) is in pressed state. The LMB Status plot of FIG. 35 shows status of left mouse button (physical or virtual, as perceived by the operating system of the controller device or the controlled device). It shows that the status of the Left Mouse Button is changed to "Down" (or "Pressed") at time t3 and to "Up" (or "Released") at time t6. Therefore, even though CEGV is beyond CEGV threshold during t5:t7, OM signals are generated based on head motion during t5 (when left mouse button state is still "Down"). OM signals are based on eye gaze during 16 and t7 (when left mouse button reverts to "Up" state).

Note: This conditional suppression of eye gaze signals for OM signal generation can allow the user to look around (the display screen or otherwise) when in middle of modifying an OOI via another OMD (e.g. head/hand/finger/arm/any suitable body part motion), using a simple user action that does not interfere with that the operation they might be performing on the controlled device. This is especially useful if the path OOI takes on the display screen is important to the user, e.g. while using a drawing/sketching/painting program, such as Microsoft Paint, on the electronic device, or when playing video/computer game. When engaged in such activities, it may be desirable for the OOI to follow the motion of a body part being used to define the path of the OOI and not be affected by user's eye gaze, at least during certain times during the activity.

CEGV measurement with respect to CPOI at designated event

As illustrated in FIG. 34 and FIG. 35, some embodiments can measure CEGV between every iteration. That is, CEGV at iteration 'i' can be defined as $CEGV_i=(CPOI_i-CPOI_{i-1})$, where 'i' is the iteration number.

However, in certain embodiments, especially during the PWP, CEGV value at an iteration can be computed to be based on change from a designated event. For example, the designated event can be the last occurrence of warp, last fixation of the eye, last time a designated facial expression was detected to be active, last time the user tensed up a designated body part/muscle, etc. So, for example, for embodiments illustrated in FIG. 34 and FIG. 35, CEGV at an iteration during PWP can be defined as $CEGV_i=(CPOI_i-CPOI_1)$, where 'i' is the iteration number and wherein $CPOI_1$ is the CPOI computed at the iteration when warp is detected for the current PWP. That is, "detection of the latest warp" is the designated event for measuring CEGV in the PWP for this embodiment. CEGVs calculated based on or with respect to a designated event (and not with respect to previous iteration) can be called Event Based CEGV (or ebCEGV for short). Therefore, the above equation can be rewritten as—

$ebCEGV_i=(CPOI_i-CPOI_1)$, where 'i' is the iteration number and wherein $CPOI_1$ is the CPOI computed at the iteration when warp is detected for the current PWP.

Figure 36:
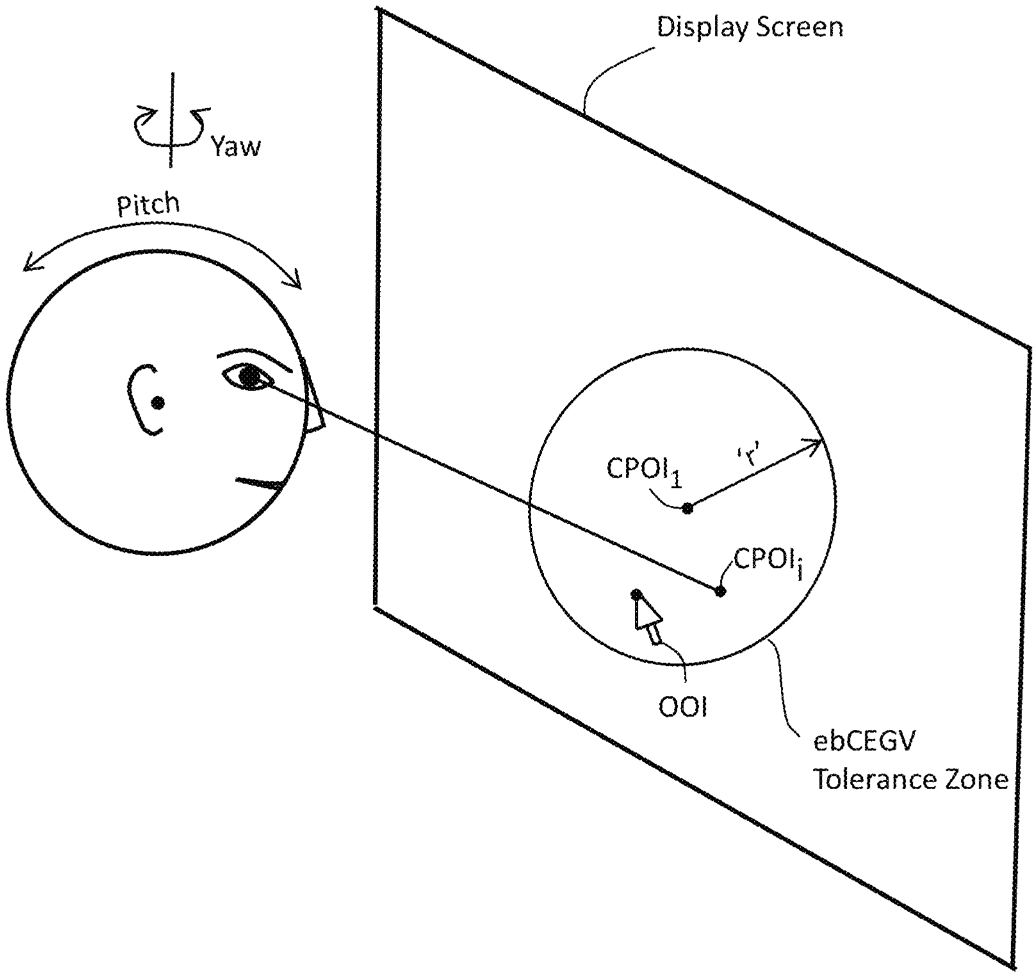
FIG. 36 illustrates an exemplary ebCEGV Tolerance Zone, wherein designated event is the last OOI Warp and the ebCEGV Tolerance Zone is centered around CPOI at the designated event.

See FIG. 36 for an illustration of such an embodiment. Parameters of this embodiment are as follows—

OOI=Mouse pointer

OMST=Head motion (above a specified OMST TH).

OMD1=Eye gaze (at Warp, and possibly conditionally during PWP)

OMD2=Head Motion (during PWP, possibly conditionally based on OMD1)

ODE 1—ODE POLA (performed by head). Head motion required to be at or within ODE POLA TH for two consecutive iterations.

ODE 2—ebCEGV during PWP exceeding a specified ebCEGV TH (wherein designated event for ebCEGV is latest warp)

FIG. 36 shows schematic representation of ebCEGV tolerance zone for the above embodiment. Point CPOI1 (on the display screen) represents the CPOI at warp time. The CPOI for current iteration 'i' is displayed as point CPOIi. The circle with radius 'r' (where 'r' is equal to ebCEGV TH) centered at CPOI1 represents the tolerance zone established for the current PWP. In this embodiment, as PWP starts, if the CPOI stays within the tolerance zone, head motion is continued to be used to further modify the location of the mouse pointer (i.e. OM signals are generated based on head motion signals). If the user happens to perform ODE 1 (that is POLA using head motion) while maintaining the POI/CPOI within the tolerance zone circle, then the PWP can come to an end leaving the OOI at the last location. However, this embodiment also has a second ODE (ODE 2) designated, which is defined which is based on the CEGV. As per ODE 2, this PWP can terminate if at any iteration (during PWP) the ebCEGV (as measured with respect to CPOI1) is greater than the ebCEGV TH. That is, if the CPOI for a particular iteration during the PWP happens to fall outside the tolerance zone circle, then that can also lead to ending of OM signal generation based on head motion. In a variation of this embodiment, when a current PWP is ended based on ebCEGV exceeding ebCEGV TH (i.e. based on ODE 2), that can be also treated as start trigger of a new warp wherein the OOI can be placed at the latest CPOI (that was computed during the iteration that detected the ODE 2). After the occurrence of this ebCEGV based warp, a new PWP can be started which can be terminated by ODE 1 or ODE 2. If the new PWP is terminated by ODE 2, then yet another warp can be started followed by yet another PWP, and the process can continue indefinitely. Therefore, this embodiment can be viewed as having two OMSTs as follows—

OMST 1=Head motion (above OMST TH)

OMST 2=PWP of the previous warp terminated based on ebCEGV (during that PWP) exceeding ebCEGV TH (when measured from CPOI at the time of the previous warp).

Note: When multiple OMSTs or ODEs are specified for an embodiment, by default detection of one OMST or ODE is sufficient, unless description of an embodiment explicitly calls out for multiple OMSTs or ODEs to be detected at once.

Note: A visual representation of tolerance zone can be provided on the display screen (as feedback to the user) in any/all of the embodiments. Visual, audio, tactile, haptic, etc. feedback can be provided upon warp, start of PWP as well as termination of PWP.

In another variation, the designated event for determining ebCEGV during PWP can be motion of the OOI. That is, at any iteration, the CPOI can be compared with the latest coordinates of the OOI. This would mean that if the OOI was moved/modified in the previous iteration, then ebCEGV at iteration 'i' would be $ebCEGV_i=CPOI_i-L_{i-1}$ where $L_{i-1}$ is the location of OOI at iteration (i−1).

Or we could simply say that ebCEGV for this embodiment can be defined as $ebCEGV_i=CPOI_i-L$ where L is the location of OOI at the start of current iteration.

This variation is similar to the previous, with the difference that the tolerance zone circle is placed around the latest location of OOI and it keeps on moving after every iteration wherein the OOI is moved. See FIG. 37 that shows illustration of this embodiment. This figure is similar to FIG. 36, with the notable difference that the tolerance zone circle is centered around the latest location of OOI (Point L). Therefore, as OOI is modified by OM signals generated during PWP, the tolerance zone circle keeps on updating accordingly. In effect, as long as the user keeps on looking within the circle, OM signals are generated based on head motion. However, if the user looks outside of the circle, then that triggers an ODE 2 (as explained in the previous paragraph). This constant update of the center of the tolerance zone to the latest location of the OOI can be beneficial to users because during the PWP process the OOI may have drifted (gotten modified) far away from CPOI1, thereby causing a higher likelihood of triggering ODE 2 and thereby unintentionally triggering a new warp (which can cause an unintentional sudden jump of the OOI to the latest CPOI location).

Figure 37:
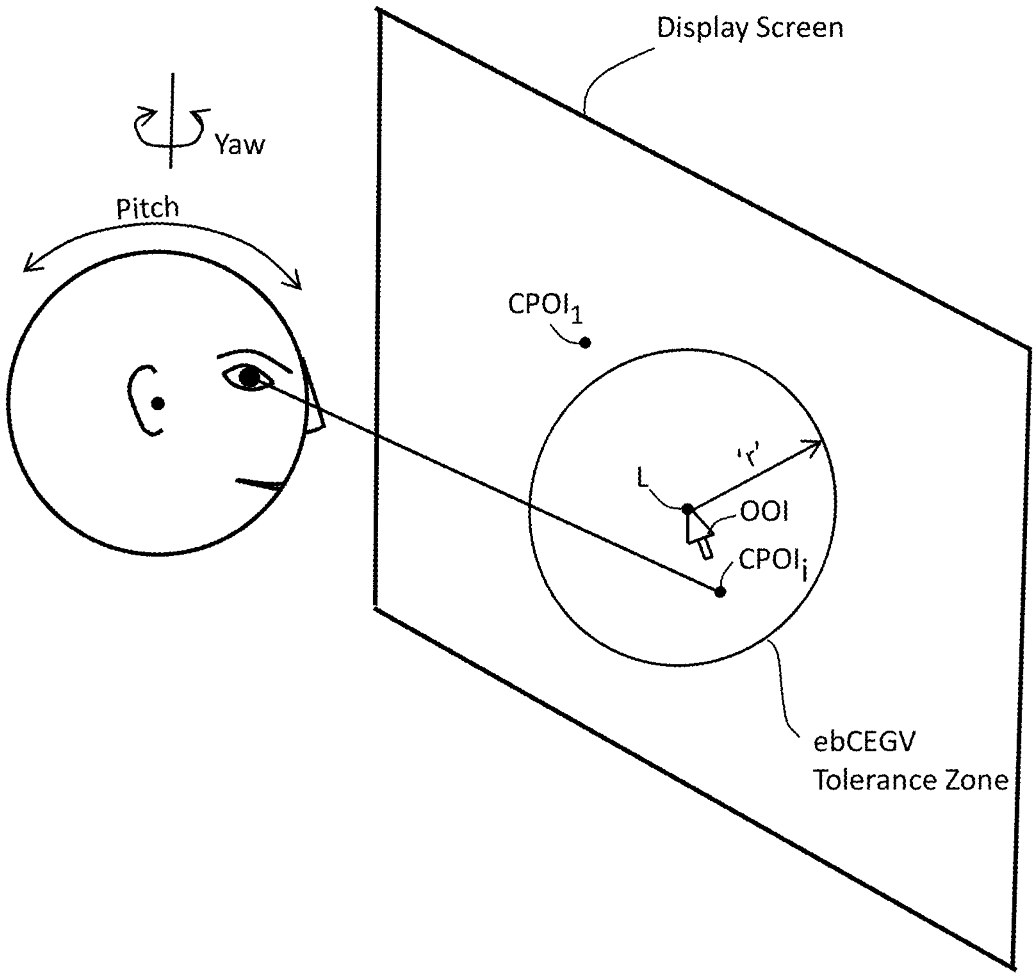
FIG. 37 illustrates an exemplary ebCEGV Tolerance Zone, wherein designated event is motion of OOI and the ebCEGV Tolerance Zone is centered around the last location of the OOI.

In an embodiment that can be viewed as a superset of the embodiment from FIG. 37, the ebCEGV (based on L) heuristics can be used not only during a PWP, but always. Here are some illustrative parameters for this embodiment—

OOI=Mouse pointer

OMST 1=Head motion (above a specified OMST TH).

OMST 2=ebCEGV based on L (the latest location of OOI) exceeding a first ebCEGV TH OMD1=Eye gaze (at Warp, and possibly conditionally during PWP)

OMD2=Head Motion (during PWP, possibly conditionally based on OMD1)

Eye gaze motion/displacement used=ebCEGV$_i$=(CPOI$_i$−L) for iteration i.

(That is, eye gaze motion at any iteration is measured based on difference between current CPOI and the last value or location of OOI)

ODE 1—ODE POLA (performed by head). Head motion required to be at or within ODE POLA TH for two consecutive iterations.

ODE 2—ebCEGV based on L (the latest location of OOI) exceeding a second specified ebCEGV TH. (The second ebCEGV TH may or may not be equal to the first one.)

In such embodiments, when the first ebCEGV TH is equal to the second ebCEGV TH, OMST 2 and ODE 2 become equivalent to each other. That is, looking away from L (by greater than or equal to the ebCEGV TH) can end a PWP (if any is in progress) and can cause a new warp as a result of the same user action (of looking away far enough from the L). However, in a variation, some embodiments can decouple the two effects. That is, in such embodiments performance of ODE 2 can only cause a termination of a PWP in progress, and require an additional user action (OMST2) to cause a new warp. This way the user can leave the OOI at the last refined location obtained during the PWP (wherein a OMD1 and OMD2 together may have been used to fine tune the OOI location.) In variations, the first and second ebCEGV TH can be made unequal to each other to allow further control to the user.

Note that the CEGV TH used to conditionally determine which OMD is used during PWP (eye gaze versus head motion) can be set to a lower value than both the first and second ebCEGV THs (used for the OMST 2 and ODE 2 respectively), to facilitate a proper fine tuning of the OOI location during PWP without inadvertently causing termination of the PWP.

Note that as mentioned before, each of the OMSTs designated for this embodiment can be used independently of each other for full effect. Similarly, each of the ODEs can also be used independently of each other.

In a variation of the above embodiment, the two OMSTs can be made dependent on each other for them to take effect (in triggering a warp). Or in other words, they could be combined together to form one OMST as follows.

OMST=Head motion (above a specified OMST TH) provided that ebCEGV based on L exceeds ebCEGV TH (at the same time)

OMD1=Eye gaze (at Warp, and possibly conditionally during PWP)

OMD2=Head Motion (during PWP, possibly conditionally based on OMD1)

Eye gaze motion/displacement used=ebCEGV$_i$=(CPOI$_i$−L) for iteration i.

(That is, eye gaze motion at any iteration is measured based on difference between current CPOI and the last value or location of OOI)

ODE 1—ODE POLA (performed by head). Head motion required to be at or within ODE POLA TH for two consecutive iterations.

ODE 2—ebCEGV based on L (the latest location of OOI) exceeding a specified ebCEGV TH.

Figure 38A:
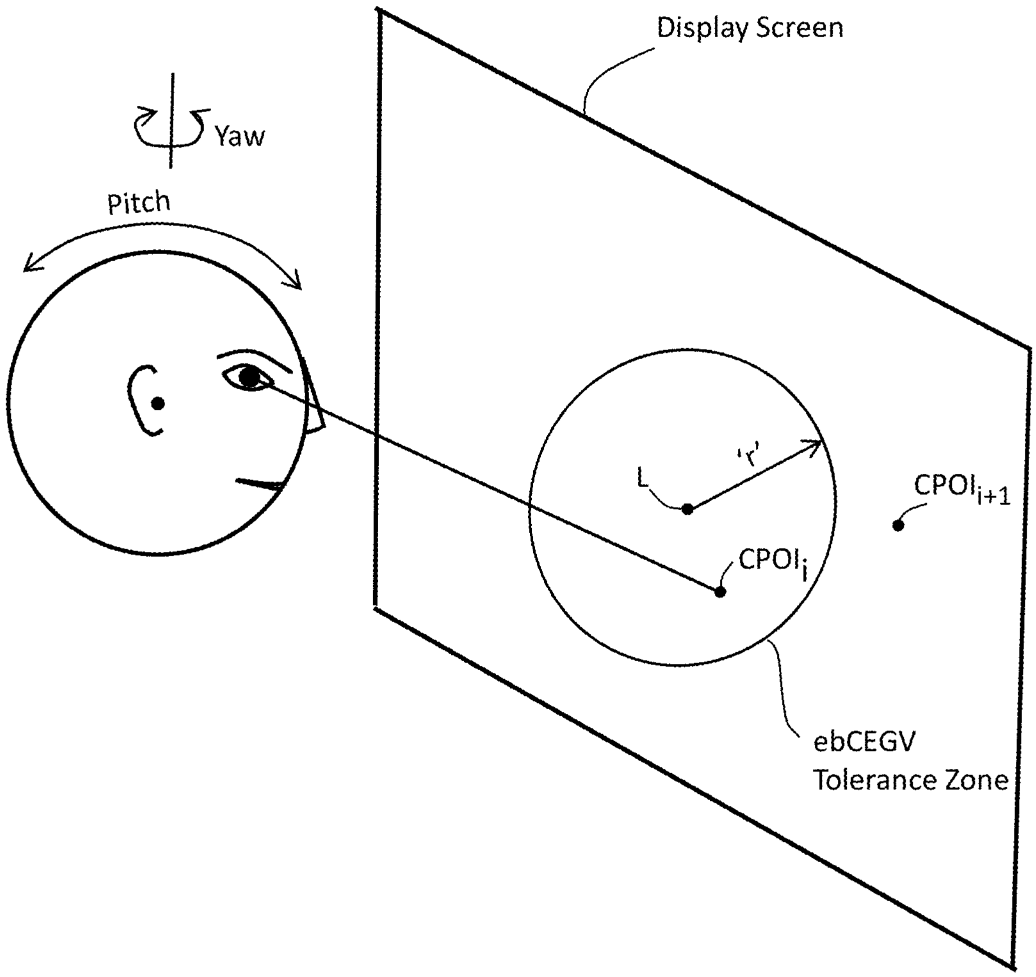
FIG. 38A illustrates an exemplary ebCEGV Tolerance Zone, wherein designated event is motion of OOI and the ebCEGV Tolerance Zone is centered around the last location of the OOI and wherein the OOI Warp Start Trigger is based on combination of Head Motion and Eye gaze, and in particular shows the CPOI (Calculated Point of Interest) for iteration 'i+1" is outside the ebCEGV Tolerance Zone.
Figure 38B:
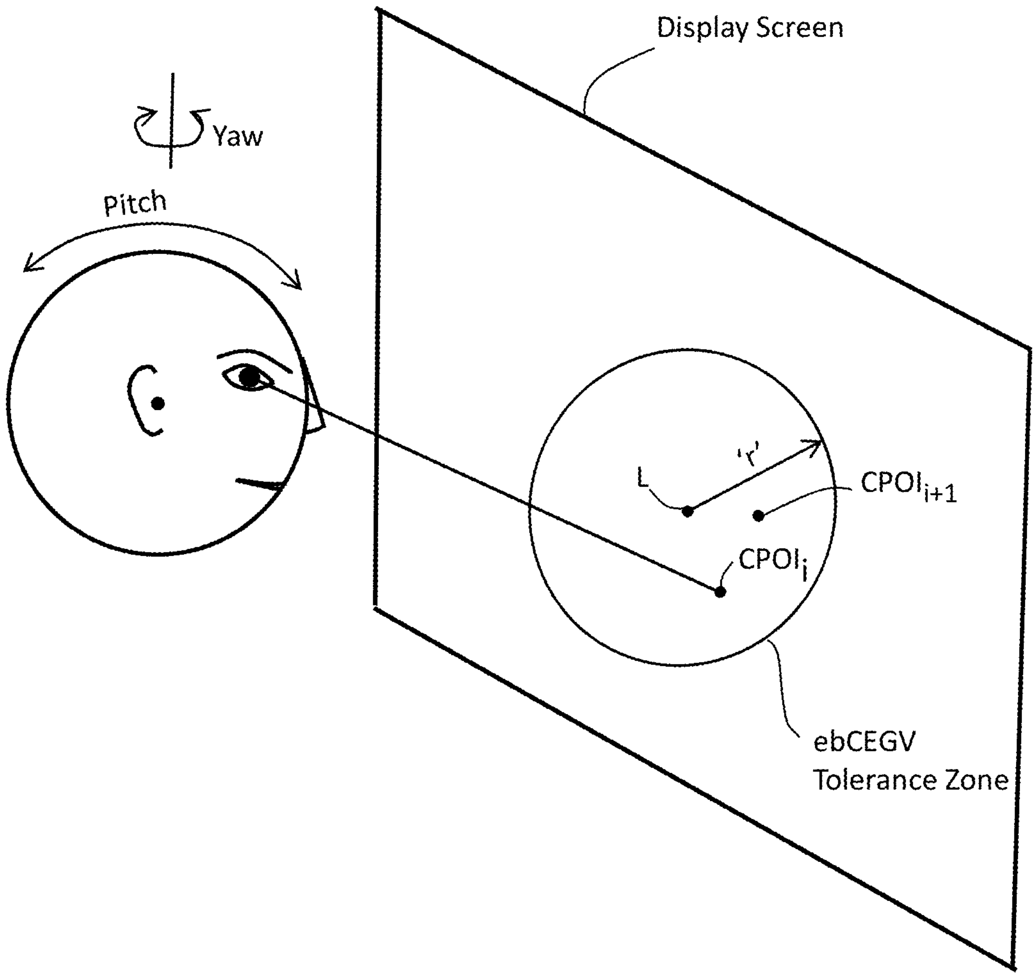
FIG. 38B illustrates an exemplary ebCEGV Tolerance Zone, wherein designated event is motion of OOI and the ebCEGV Tolerance Zone is centered around the last location of the OOI and wherein the OOI Warp Start Trigger is based on combination of Head Motion and Eye gaze, and in particular shows the CPOI for iteration 'i+1" is within the ebCEGV Tolerance Zone.

Sec FIGS. 38A and 38B for an illustration of this embodiment. It shows OOI at point L on the display screen and the ebCEGV tolerance zone circle centered around L. In FIG. 38A, the eye gaze shifts to CPOIi+1 during iteration i+1, but if the head motion stays within OMST TH, then there will not be a warp triggered at iteration i+1, and the system can keep generating OM signals according to head motion. However, if the head motion also happened to exceed OMST (at iteration i+1), then that can trigger a warp that would move the OOI to CPOIi+1. In FIG. 38B, CPOIi+1 is shown to be within the tolerance zone circle. Therefore, regardless of whether head motion at i+1 exceeds or stays within the OMST TH, the system may not trigger an OOI warp based on the above defined OMST. This embodiment can thereby provide additional flexibility to the user to look around as the OOI is being actively modified, but also give them a predictable way of triggering a warp.

Note: The designated event for ebCEGV calculation can be any user action including detection or termination of an active facial expression, a hand gesture, a vocal command, entering a meditative state (as indicated by brain wave levels), pressing a keyboard key, adaptive switch button or mouse button, moving the mouse by hand (or some other mechanism) in middle of a PWP, tensing a designated muscle, etc.

Warp and Post Warp Phases—Further Variations

As seen in previous paragraphs, the warping concept can be very useful in systems where eye gaze is an OMD (or at least one of the OMDs). That is, in such systems, the OOI can be affected by the eye gaze (DEG/POI/CPOI) of the user at least some of the time. In traditional systems using eye gaze as OMD, the control system can either have the OOI be continuously modified by the eye gaze OMD, or they require the users to go through a multi-step process to activate or deactivate the modification of OOI via eye gaze. The continuous modification of OOI can get annoying (due to unintentional modification of the OOI) and the multi-step process for activating/deactivating OOI modification can get cumbersome. The concept of OOI warping can allow for indication of user intent (for starting to modify the OOI via use of user's eye gaze) in a simple and reliable fashion. However, warping the OOI can be only the first step in what the user may intend to do. Given the inherent inaccuracies in eye tracking systems (which cause CPOI not to be exactly at the POI of the user), typically further adjustment of the OOI may be required to attain the user intended modification of the OOI in a precise fashion. Therefore, the overall process followed by the user can be considered to have two phases-Warp step and a Post-Warp phase. Large but possibly imprecise modifications of OOI can be achieved via eye gaze in the warp step, and the subsequent fine modifications can be achieved in a post-warp phase. Sec following paragraphs for explanation of the two phases and variations possible.

Warp Phase:

Warp phase is when an OOI, which may not be being affected by eye gaze at the current time, is instantaneously modified in accordance to the user's eye gaze upon detection of performance of a designated start trigger by the user. This designated start trigger (aka OOI Modification Start Trigger, or OMST for short) can be a designated sequence user actions performed by the user for initiating OOI modification. The OMST can be a combination of variety of user actions including (but not limited to) motion of a body part, performing a facial expression, tensing of a designated muscle in the body, pressing a button, touching a touch sensitive surface, making a hand gesture, issuing a voice command, blinking an eye, squinting an eye, twitch of a designated muscle (including a facial muscle), tightening of a sphincter, performing a designated mental action (e.g. concentration, relaxation, imagination of a specified physical action such as pushing/pulling/lifting and object, thinking of saying yes or no, etc.), or any other specified user action. When a start trigger (OMST) is detected by the control system, the control system can start generating command signals to move/modify the OOI in accordance to the eye gaze.

For example, if the start trigger was specified to be motion of the head, upon detection of head motion, the OOI can be modified in accordance to the user's eye gaze. If for example the OOI was a mouse pointer on a display screen, upon detection of head motion (the OMST in this example), the mouse pointer can move to the location of user's eye gaze (POI/CPOI) at the time of detection of the start trigger. If before the OMST was detected the mouse pointer was away from the POI/CPOI, then upon the detection of OMST, it may appear as if the mouse pointer jumped from that location to the POI/CPOI instantaneously (upon the detection of the OMST).

Note: The term "motion" of an object can be interpreted as velocity or displacement of that object measured over a particular time period, e.g. displacement of the object going from one iteration to the next. Note that in a typical control system, the processor can process the output it receives from some/all the sensors during every iteration. These iterations can be started every 'n' milliseconds (i.e. specified time interval between consecutive iterations) or an iteration can start immediately after the completion of the previous iteration. Given that velocity is defined as displacement over time, and displacement is change in position, the term "motion" can be used to imply velocity or displacement or change in position. Therefore, the term "motion threshold" could be interpreted as a velocity (magnitude) threshold or a displacement threshold wherein the displacement is measured between two consecutive iterations or between a pair of specified events. For example, the pair of specified events could be the end of the last PWP (see following paragraphs for explanation of PWP) and the start of current Warp phase. Another example of pair of specified events is detection of the last OMST and acquisition of latest motion or position readings from an appropriate sensor. Some embodiments can use the mean or median of the sensor readings made over the specified amount of time immediately before the current iteration, and so on.

Time and magnitude bounds as well as direction requirements can be specified for any of the user actions before those user action can be considered to be valid start triggers/OMSTs. For example, if head motion was the specified start trigger, then the control system can require the head motion of be of at least a specified minimum magnitude. Some systems can further require the head motion (of specified minimum magnitude) to be maintained for at least certain minimum duration of time, possibly continuously (or alternatively on an average or other suitable measure, over the time period of specified minimum duration), before the head motion can be considered to be a valid start trigger.

Some systems can impose a requirement that the body/head motion be in the direction of the POI/CPOI. For example, only those head motions that lead to a decrease in the angle between DEG and DHP can be considered to be valid start triggers. Therefore, even though the user moved the head in such a way that the magnitude of the motion was higher than the specified minimum start trigger magnitude, and that motion was maintained for at least the specified minimum start trigger duration, if the motion was such that the angle between DEG and DHP was increasing, then that head motion can be ignored by the system and the warp process may not be started.

Note: The minimum magnitude threshold for the body actions (for them to be considered valid start triggers) can be set to minimum detection threshold of the sensor(s) sensing those body actions. That is, the moment the body action is detected by the sensor, it could be considered to have met the minimum magnitude requirement. However, it can be advantageous to set the minimum magnitude threshold to be higher than the minimum detection threshold of the sensor, as this can allow for user convenience. For example, if head motion was the start trigger, and the minimum detection threshold of the head motion sensors was 0.1 degrees/second (angular velocity), however, if the minimum magnitude threshold (for start trigger purposes) was set to 5 degrees/second, then the user could find it easier to hold their head "steady" for extended periods and thereby avoid unintentional head motions from triggering OOI warps. In other words, given that many users can find it difficult to hold a monitored body part (e.g. head) extremely steady, if the minimum magnitude threshold (for a body action used for OMST) was set too low (such as close to or equal to the sensor's minimum detection threshold), then that would lead the system to frequently detect performance of OMST, leading to frequent modifications of the OOI without the user's intention to do so, leading to the annoyance that we are trying to remedy in the first place. Therefore, it can be advantageous to set various thresholds (OMST, active facial expression, etc.) to much higher values compared to the sensor minimum detection threshold of respective sensors. Further, a user mechanism can be provided to the user to set these thresholds based on their preference, explicitly or implicitly. The explicit method can involve where the user can set a numerical value of a threshold. An implicit method can involve doing a calibration where the system can figure out a suitable threshold value.

See Table 4 from the referenced U.S. patent application Ser. No. 15/469,456 for some illustrative examples of OMSTs. As mentioned in the reference application, the "P" motion can be substituted by Y or R, or can be replaced by any combination of P, Y and R motions. Further the head motions can be replaced by motions of any other body part, and any designated combinations of the basic motions (of head or any designated body parts) can be used as the start trigger. Note that designated configuration of body parts can also be used as start triggers. For example, holding an arm out with the hand in a pointing configuration (using a stretched index finger but other fingers in a closed first configuration), touching the tip of the index finger and tip of the thumb, bringing tips of all fingers of a hand together, and so on.

Embodiments of the control systems can use different combinations of the time, magnitude and direction requirements on the start trigger actions. They can also use variety of velocity, displacement or position thresholds. Other suitable requirements on start triggers can also be further specified. For example, a system can require the user to hold their breath when performing the start trigger gesture.

Post-Warp Phase/Period (PWP):

Once the OOI warp is performed (based on detection of a designated OMST, and the OOI possibly instantaneously being modified as per the eye gaze), the Post-Warp Period can be considered to start immediately afterwards. The PWP can be considered to be started following the iteration in which performance of a valid OMST was detected. Note that commands signals to modify the OOI in accordance to the eye gaze (DEG/POI/CPOI) can be generated in the same iteration that detected the OMST. Once the PWP is started, it can last until the end trigger (for ending generation of OM signals at the end of PWP) is detected. There are several options on what control systems can do during the PWP.

Figure 39:
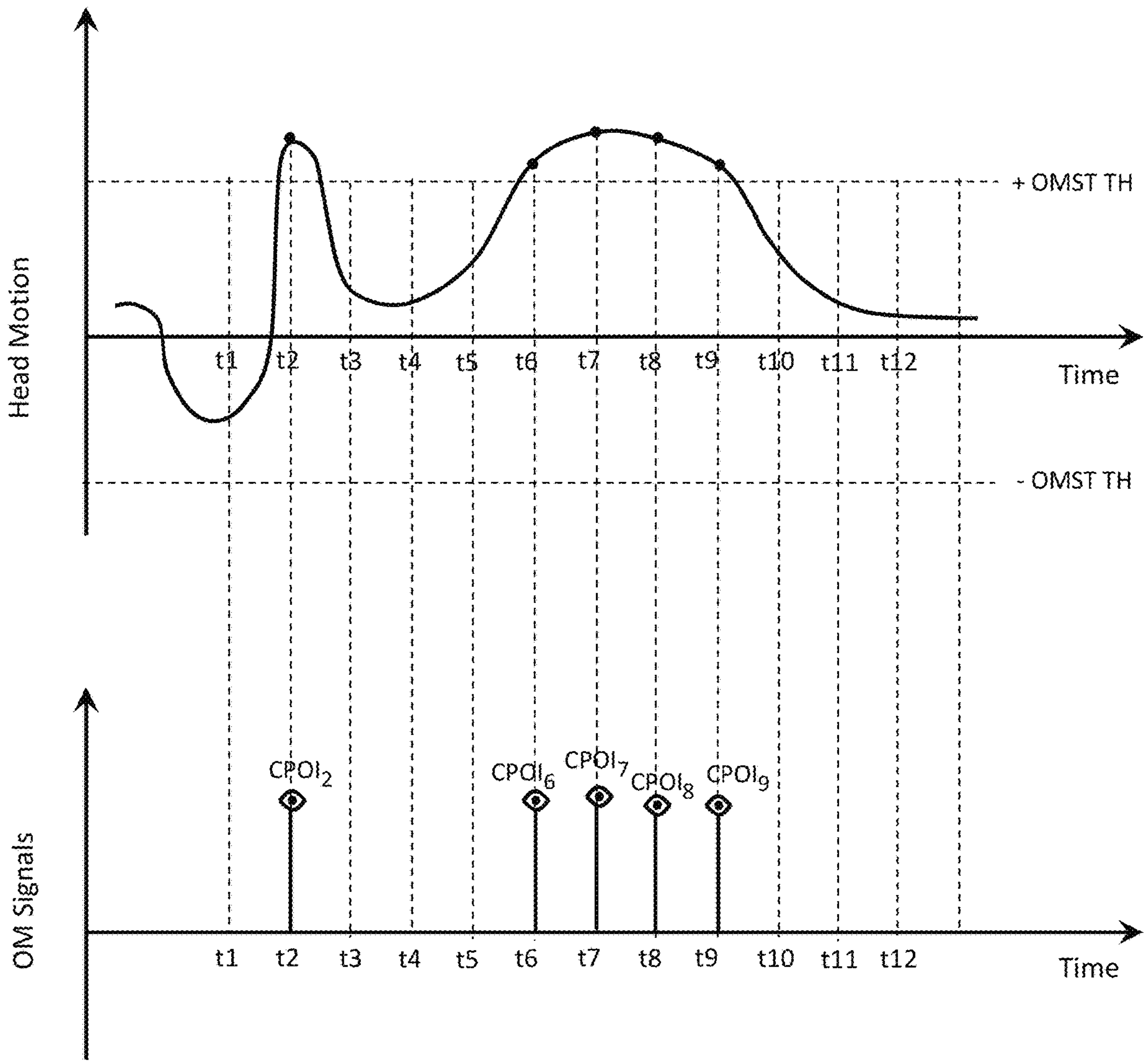
FIG. 39 illustrates an exemplary Head Motion and corresponding OOI Modification Signals based on the principle of OOI warping, wherein there is no Post Warp Period.

Option i: The control system can stop generating any further command signals (to modify the OOI), possibly immediately after the warp, and it can simply wait for the next occurrence of a designated OMST (to again start generating any command signals to modify the OOI) or look for some other user action. In effect, in this variation, it can be considered as if the PWP did not even exist (or as if the PWP was of zero duration). If in an embodiment the OMST was head motion (above head motion threshold), then the OOI can lay unmoved on the display screen until the user moved their head (by at least the designated OMST TH value), and at that point the OOI can shift to the CPOI at the time the valid OMST was detected. And right after that the OOI can stay at that location until the user repeated the warp process (by moving their head again). See FIG. 39 for an illustration of this. The Head Motion plot of FIG. 39 shows schematic representation of head motion plotted against time, and the OM Signals plot shows generation of OM signals in response to OMST. At time t2, head motion is shown to exceed the OMST TH; that triggers a warp causing the system to generate OM signals based on CPOI2. However, the head motion signals are shown to fall within the +/−OMST TH zone during t3:t5 so no OM signals are generated at that time. Between time period t6:t9, head motion signals are shown to be beyond the OMST TH so OM signals can be generated for each of those iterations (wherein the signals are in accordance to the CPOI computed at those iterations). It can be considered as if there was a new OOI warp detected for each iteration in the t6:t9 period, though to the user it may feel as if the OOI is following their eye gaze continuously during that time period.

Option ii: The control system can start generating command signals to modify the OOI according to designated user actions (performed by the user during the PWP).

Option ii(a). In one variation, after the initial instantaneous modification of the OOI according to the eye gaze (as part of the OOI warp), the system can continue to modify the OOI (during the PWP) in accordance to the eye gaze until a specified end trigger is encountered. As described in the referenced application(s), the end triggers (to end generation of OM signals) can be a variety of user actions. Some of those actions can include performance of a POLA (with head, eyes or suitable body part), blinking, winking, squinting, smiling, or other facial expressions, voice command, press or release of a button, touch of a touch sensitive surface, tensing of a muscle, changing the mental state, etc.

In one variation, the end trigger can be a POLA (dwell or hover action) performed with the eye gaze, possibly for a minimum specified duration of time. That means that after the warp is completed, the OOI can jump in accordance to user's eye gaze and continue to move in accordance to the eye gaze until the user finally holds their eye gaze relatively steady at some point in space (wherein the steadiness can be measured based on a specified amount of positional/angular tolerance on the eye gaze and possibly a minimum amount of time could be specified for which the eye gaze has to be held continuously steady). Upon occurrence of the specified end trigger, the generation of OM signals can come to an end and then the system can resume to look for the next occurrence of the start trigger to restart the OOI warp and post-warp process. Note: Fixation of eye gaze can also be considered to be a POLA and thereby be used as an end trigger to bring the PWP to an end.

In a variation, the end trigger can include a facial expression such as squinting the eye, raising an eye brow, smiling, opening the mouth, twitching or tensing a facial muscle, blinking, winking, or any other suitable facial expression.

Note that magnitude and time bound requirements can be specified on any user actions (including facial expressions) designated to be an end trigger.

Option ii (b). In another embodiment, after the initial instantaneous modification of the OOI according to the eye gaze (that is after the OOI warp), the system can continue to generate signals to modify the OOI based on a different user action than just the eye gaze. This different user action can be (1) based on the body part that was used in specification of the start trigger, or (2) based on a different body part/user action that was not part of the start trigger, or (3) based on a combination of eye gaze and a different user action.

Figure 40A:
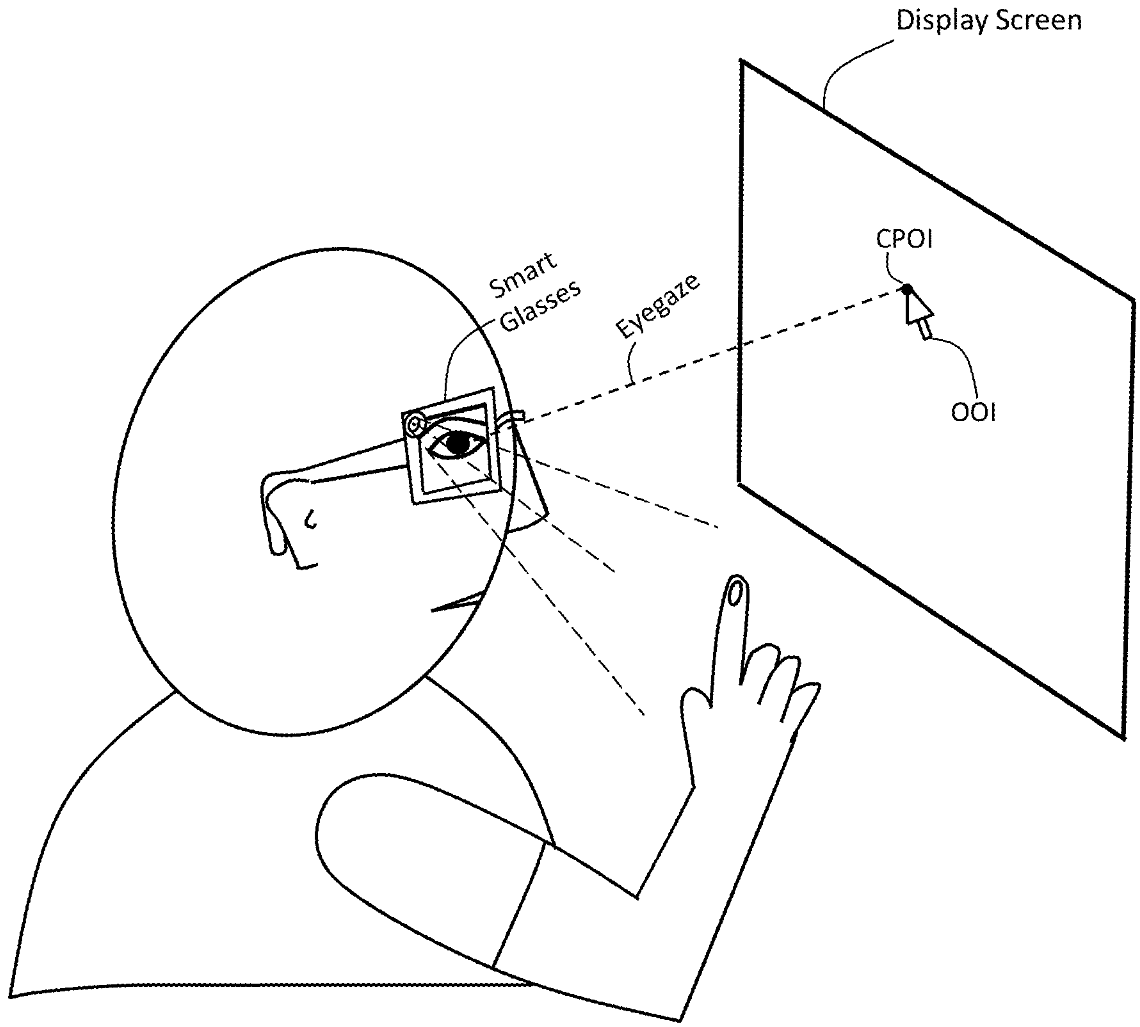
FIG. 40A illustrates an exemplary embodiment where the OOI Warp Start Trigger is based on a Hand Gesture, and wherein OOI Modification Signals during the Post Warp Period are also generated based on a Hand Gesture.

Option ii (b) —Variation 1. In variation (1) above, as an example, if the start trigger is based on head motion, the user action to continue OOI modification in the PWP can also be based on head motion. For example, if the OOI was the mouse pointer, then upon the initial detection of a valid head motion based OMST, the mouse pointer can jump in accordance to the eye gaze CPOI calculated during the iteration when performance of OMST is detected. Alternatively, the pointer could jump to the CPOI calculated at the start of the OMST (note that OMST performance could take multiple iterations if a minimum time bound is specified on performance of the OMST), or some function (e.g. average, median, or some other suitable function) of the CPOIs calculated during the performance of the OMST. During the PWP however, the OOI can start to move according to the user's head motion (instead of eye gaze/POI/CPOI) until the end trigger is detected. In another variation, the OMST can be based on detection of a part of a hand, arm or fingers, possibly in a particular configuration such as making a pointing gesture or a first or some other specified gesture. Once the finger/hand/arm based start trigger is detected, the OOI can jump to the POI/CPOI (which may not be the same point where the user's finger/hand/arm may be located in the field of view of the user or some image sensor) and then continue to be modified in accordance to the finger/hand/arm motion until the occurrence of an end trigger. The end trigger can be based on the same body part/body parts that are used to define the start trigger. So in this example, after the OOI warp, it can continue to move until the finger/arm/hand either performs a POLA and/or changes in configuration. For example, if the start trigger was to hold out a hand in a "pointing with index finger" configuration/gesture, the end trigger could be to bend the index finger so as to make a first/closed hand gesture (with all the fingers bent). See FIG. 40A for an illustration of user making the pointing gesture that can be captured via the eye glass shaped wearable device. The contents of the display show indication of user's eye gaze (CPOI) and the OOI moved to the CPOI (at the time of warp) that was triggered by the user making a pointing gesture with their hand. In this variation, for example, the mouse pointer could be made to move in (linear, square or any other suitable function) proportion to the detected motion of a part of the user finger, hand or arm (during the PWP). That is, OOI Motion after the warp could be defined to be equal to a function of measured finger/hand/arm motion/displacement ("Gain Function"). Displacement of OOI during the PWP could be defined by the following equation—

OOI Displacement during PWP=g(x), where g is a Gain Function, and x is Displacement of Finger/hand/arm during PWP.

Figure 40B:
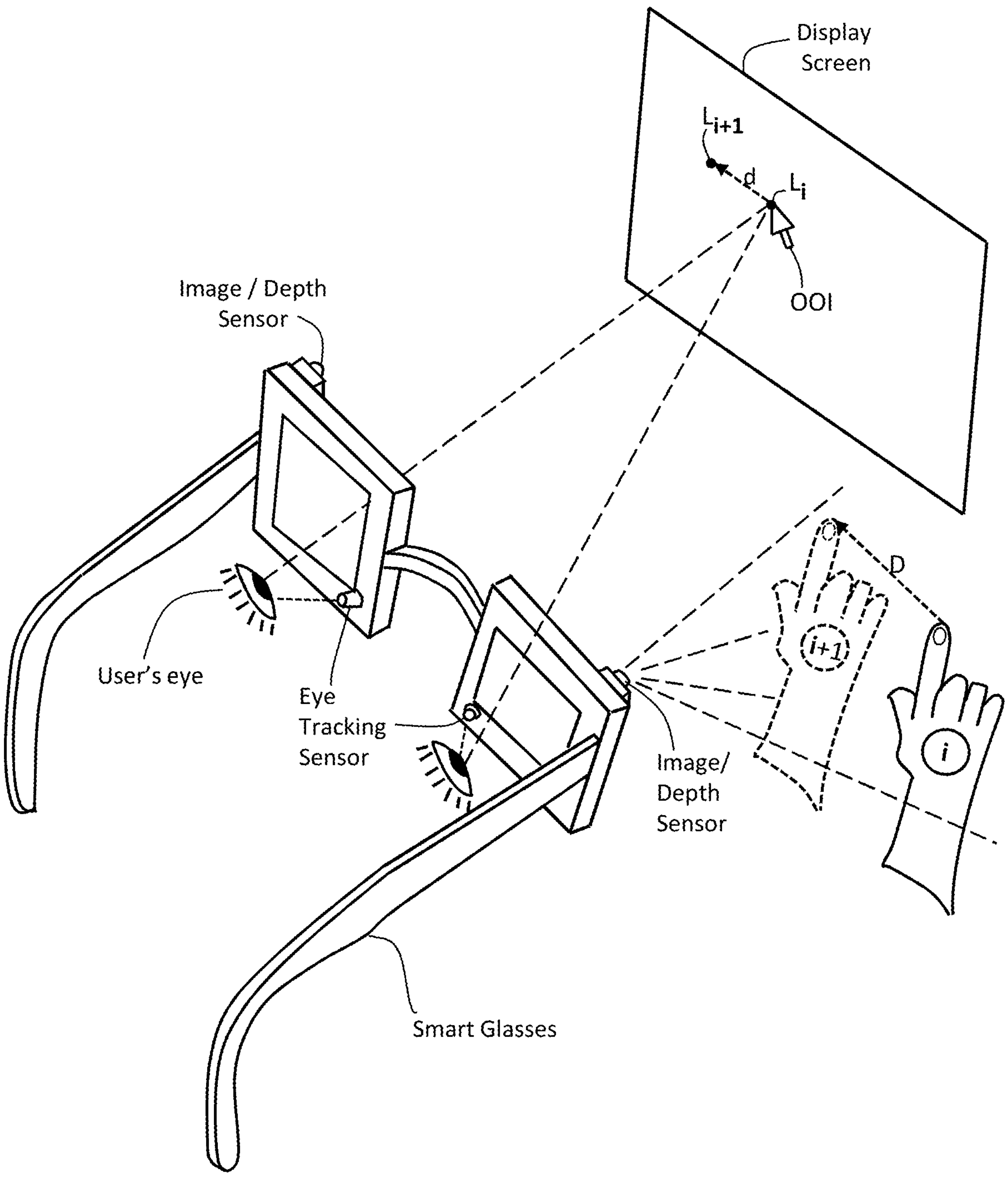
FIG. 40B illustrates an exemplary embodiment where the OOI Warp Start Trigger is based on a Hand Gesture, and wherein OOI Modification Signals during the Post Warp Period are also generated based on a Hand Gesture and shows motion of user's hand between iterations 'i' and 'i+1'.

See FIG. 40B for a more detailed view of the device worn by the user and key elements. The eye glass wearable shows inward facing eye tracking sensors tracking user's eyes to determine the eye gaze vector and/or CPOI on the display screen. Forward facing sensors that can be mounted on the same eye glass wearable are shown tracking the user's hand. The user is shown to be moving their hand by distance 'D' over a time period (such as for example between iteration 'i' and 'i+1') and that is shown to translate the OOI by 'd' over the same time period. Here, d=g(D), as per the above gain function definition.

If the Gain Function is defined such that it outputs values that are lower in magnitude than the provided input (e.g. the finger/hand/arm motion), then any displacements of the finger/hand/arm can result in smaller OOI displacements. In a simple example, the Gain Function could simply multiply the input by a positive constant whose value is less than 1.0 and return that as the output. Such embodiments can give the user ability to fine tune the location of the mouse pointer (using relatively large motions of their hand or body part). Such behavior can be useful if the OOI does not move exactly to the desired location upon the warp, and/or the user desires to move the OOI to a different location after the warp, especially if they want to move the OOI along a particular path or curve; e.g. when playing a video game, using a program such as Microsoft Paint (for creating art), etc., Furthermore, tying the post warp OOI displacements to a body part (and using a Gain Function as above) can also lead to feeling of smoothness (less shakiness) in control of the OOI in comparison to systems that solely rely on eye gaze or position of a body part such as an extended hand/finger to place or move an OOI. The above disclosed embodiments are an example of systems using multiple OMDs. These principles can be utilized to control Augmented/Mixed/Virtual Reality glasses/wearable displays as well as other computing devices.

Option ii (b) —Variation 2. In variation (2) above, as an example, if the start trigger is based on head motion, the body action to continue OOI modification (after the warp) can be based on motion of another body part, e.g. the user's hand. However, if the hand is not visible (to appropriate sensors) when the start trigger is detected by the system, the post warp OOI modification may not start and the system can start looking for a new start trigger. In a variation, the system may give a grace period (after the detection of the start trigger) to give the user the chance to adjust their body so that the designated part for post OOI warp modifications (i.e. the hand in this example) is visible and/or is detected by an appropriate sensor. Once the hand is detected within the grace period, the system can start generating OM signals in accordance to the motion/displacement of the hand until an end trigger is encountered. In another example of this variation, the start trigger can be eye gaze, wherein the eye gaze is required to be displaced by or change by at least a minimum eye gaze displacement threshold. This change in eye gaze (i.e. eye gaze displacement) can be measured between last eye gaze fixation location and current POI/CPOI, or between the current mouse pointer location and current POI/CPOI, or in some other suitable fashion. The control system can generate signals to place the OOI at the CPOI when it detects the eye gaze based start trigger (i.e. the eye gaze has changed by at least a specified minimum eye gaze displacement threshold value). Immediately after this OOI modification, the system can start generating signals to further modify the OOI based on head motion, until the point that a specified end trigger is detected. After the detection of the end trigger, generation of the post wrap OOI modifications can come to an end, and the system can go back to looking for a new start trigger.

Option ii (b) —Variation 3. In variation (3) above, for example, if the start trigger is based on action of a first body part (which is not an eye ball), the body action to continue OOI modification (after the warp) can be based on the combination of eye gaze and action of a second body part (which is not an eye ball). However, the second body part can be the same or different than the first body part, and the action of the first body part can be the same or different from the action of the second body part. For example, if the first designated body part was head and the designated action of first body part was motion, and the second body part and its action were the same as the first ones, then after the initial OOI modification upon the detection of the start trigger (based on head motion), the system can subsequently continue generating command signals until a designated end trigger is detected. These subsequently generated command signals (during the PWP) can be based on a combination of eye gaze as well as head motion (which is the designated action of the second body part in this example). In some embodiments, as described in referenced U.S. patent application Ser. Nos. 14/897,657 and 15/469,456, OM signals can be generated conditionally based on the amount of change in eye gaze between two events (such as two iterations, possibly consecutive, or any other suitable events). For example, if the change in eye gaze is greater than an eye gaze displacement threshold, the OM signals can be generated based on the eye gaze signals; however, if that is not the case, then the OM signals can be based on head motion instead. Therefore, in such embodiments, when the system is started the OOI (mouse pointer in this case) can be unchanging (or stationary) until the first start trigger is detected (in this case, head motion with magnitude over a designated threshold), wherein the mouse pointer can jump to the POI/CPOI location. However, after this initial jump/OOI warp, the system can keep moving the pointer according to head motion (by generating OM signals) when the change in eye gaze (between consecutive iterations or other specified events) is lower than a specified eye gaze displacement threshold; however, the system can move the pointer based on eye gaze signals (or POI/CPOI calculated based on the eye gaze signals) instead when the eye gaze signals indicate an eye gaze displacement greater than the specified eye gaze displacement threshold. This decision regards to which signals (head or eye gaze) to base the OM signals on, can be made on an iteration by iteration basis, and therefore can change behavior (or state or motion) of the OOI moment to moment. This process can continue until a designated end trigger is detected, at which point the pointer can stop moving (due to cessation of generation of OM signals); then the system can start looking for a new start trigger to repeat this (warp and post-warp) process.

In a variation of the above embodiment, some systems can suppress switching OOI signals to be based on eye gaze signals (even if the eye gaze displacement threshold condition is met) in the PWP if certain other conditions ("Eye gaze Disabling Condition", EDC) are met. Some examples of EDC are presence of an active facial expression (e.g. smile, eye brow raise, squint, sipping or puffing action, biting action, etc.), tensing of muscles of a designated part of the body, press and hold of a mouse button or a keyboard key or an input mechanism, touching a touch sensitive surface, performing any other suitable designated action(s). (This is akin to description of embodiment in FIG. 35) When an EDC is detected to be active, then during that time the system will continue to generate signals for OOI modification based on designated body part motion (e.g. head motion) instead of eye gaze, even if the change in eye gaze may indicate eye gaze displacement greater than the specified eye gaze displacement threshold. However, when the EDC is no longer detected, the system can go back to conditionally generating command signals based on eye gaze or head motion (i.e. the designated body action) during the post-warp period. EDCs can be greatly beneficial to provide freedom to the user to temporarily look around during the PWP when fine tuning the location of the OOI. In a further variation, even if the EDC started before the OOI warp, it can still be considered to be a valid EDC (and thereby prevent use of eye gaze signals for OOI modification) during the post-warp period, as long as the EDC is detected to be active. Other variations can require the EDC to be activated during the PWP for it to be considered a valid EDC.

Hand Warping and Variable Rate of Modification of OOI

Figure 41A:
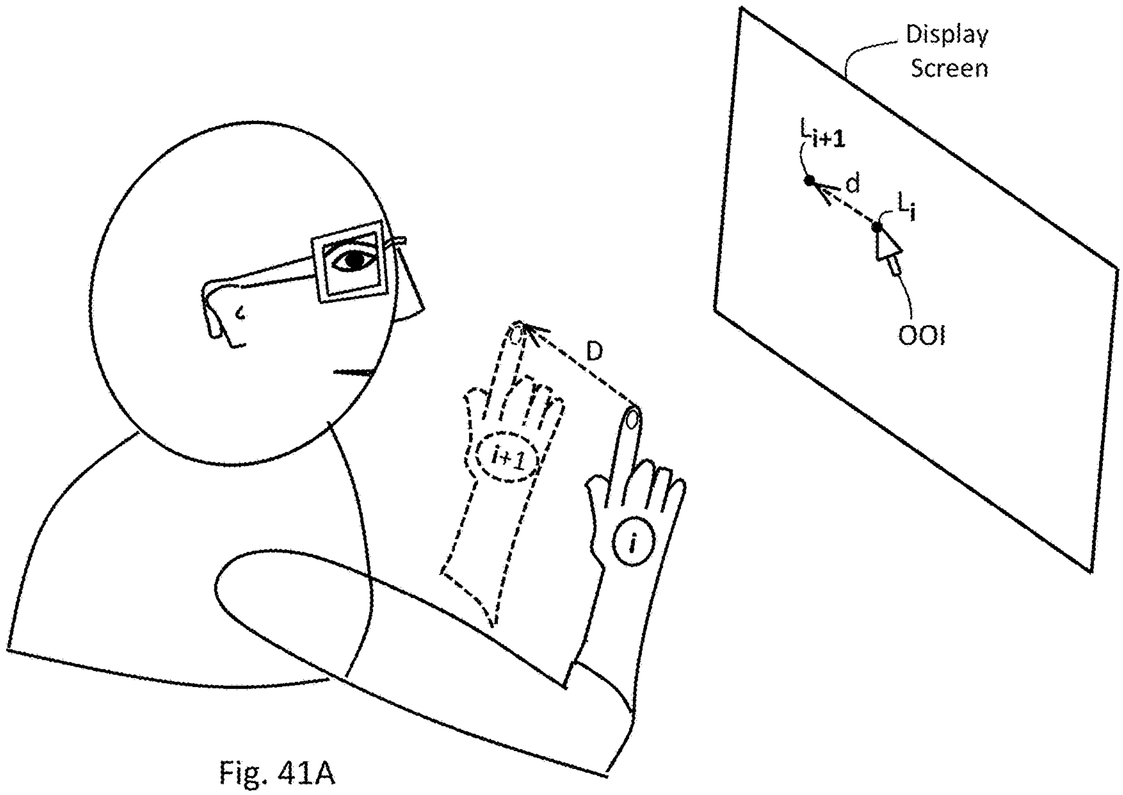
FIG. 41A illustrates an exemplary embodiment using multiple Hand Gestures as OOI Warp Start Triggers and OMD during Post Warp Period.
Figure 41B:
FIG. 41B shows an exemplary formula used to calculate OOI motion when user performs a hand gesture with only index finger raised.
Figure 41C:
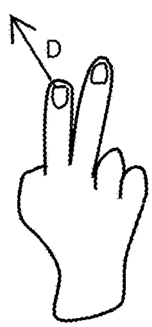
FIG. 41C shows an exemplary formula used to calculate OOI motion when user performs a hand gesture with two fingers raised.
Figure 41D:
FIG. 41D shows an exemplary formula used to calculate OOI motion when user performs a hand gesture with three fingers raised.
Figure 41E:
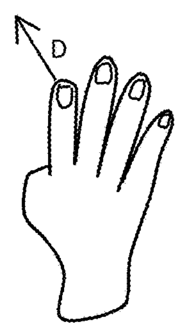
FIG. 41E shows an exemplary formula used to calculate OOI motion when user performs a hand gesture with four fingers raised.
Figure 41F:
FIG. 41F shows an exemplary formula used to calculate OOI motion when user performs a hand gesture with five fingers raised.

In some embodiments where eye gaze is the first OMD, hand motion can be the designated OMST. Further, hand motion can also be the designated second OMD. Therefore, in an illustrative embodiment where the electronic device is a Augmented Reality/Virtual Reality/Mixed Reality headset, and the OOI is some type of mouse pointer or reticle or a virtual object (possibly displayed on the display screen or projected directly onto the user's retina, etc.) then even when the user is looking around (i.e. eye gaze, the first OMD is changing substantially), the OOI will not follow it unless-(a) the user's hand position is detected by a camera (possibly mounted on the electronic device, (b) the detected hand is moving within a specified range of speed (i.e. within a range of specified min/max speed), and (c) this requisite hand motion is detected to be performed for at least a minimum time period, then the OOI can first jump to the location of the POI (i.e. warping of the OOI), however, after this jump the immediately subsequent changes in the OOI can be accordance to the hand motion (the second OMD) until an ODE is encountered. In another variation, the OMST can be specified to be a gesture performed with the hand, and the second OMD can be motion of the hand. Therefore, for example, the user can be required to perform a pointing gesture (e.g. curling up all the fingers of a hand into a first but with the exception of one finger, such as the index finger) as the OMST to cause a warp of the OOI (Gesture Warp). Once the pointing gesture (OMST) is detected (for a minimum specified time period and possibly within a certain distance away from the DEG/CPOI), the OOI can jump to POI/CPOI (i.e. be modified in accordance to the eye gaze instantaneously); however, the immediately following changes (such as displacement) of the OOI can follow the changes (displacements) of the hand (i.e. in accordance to the second OMD), until an occurrence of ODE, after which this process can repeat. These subsequent changes/displacements of the OOI in accordance to the hand motion (second OMD) can be much smaller than the displacement of the hand as observed by the user. That is, if the hand moves by 50 pixels (in the image captured by one of the designated cameras, possibly on the electronic device), the system can move the OOI by only a small fraction, say 5 pixels, possibly in the direction of the hand motion. This way the user can fine tune the placement/movement of the OOI by using large/coarse motions of the hand. This can be very beneficial for applications such as AR/VR/MR, where the user may not be able to hold their hands very steady and/or move their hands very precisely when trying to point or move the OOI steadily or precisely. Some embodiments can change the above displacement factor (i.e. displacement of OOI divided by displacement of the monitored body part such as hand) based on the gesture used for OMST or performance of a designated gesture when OOI modification is in progress using the second OMD. See FIG. 41 for an illustration of how different gestures can affect the relationship between the measured motion/displacement of a body part to displacement/motion of the OOI. FIG. 41A shows the user moving their index finger (while held in a pointing gesture) by 'D' between iterations 'i' and 'i+1'. If the OMST in this embodiment is pointing with the index finger, then the OOI jumps to the location of the CPOI upon detection of that gesture. However, as shown in FIG. 41B, subsequent displacements of the OOI could be smaller by a factor of 10 compared to the displacement of the hand, that is, the displacement factor can be 0.1. However, if the OMST was pointing with two fingers (say index and middle finger) then the displacement factor can be a different number, say 0.2, as shown in FIG. 41C. If the OMST was pointing with three fingers (say index, middle and ring finger) then the displacement factor can be a different number, say 0.3, as shown in FIG. 41D. If OMST was pointing with four fingers (i.e. index through little fingers, all stretched out but the thumb still tucked in), then the displacement factor can be 0.4 (as shown in FIG. 41E); if OMST was pointing with all five fingers stretched out (i.e. first completely opened up), then the displacement factor can be 1.0 (i.e. one to one correlation between the OOI motion and second OMD) as shown in FIG. 41F. In variation, regardless of the OMST used (i.e. number of fingers used for pointing), the displacement factor can be changed by the user by changing the number of fingers being held up while modifying the OOI in accordance to the hand motion. (So, even if the OOI motion was started by the user sticking out their hand with all fingers stretched out, the user can close down a few fingers to change the displacement factor during the rest of the user gesture, till the occurrence of an ODE). Note that some systems can designate the action closing the hand in a first as an ODE. Therefore once the user starts OOI modification by using a pointing gesture and the OOI warps/jumps to the POI/CPOI, they can continue to move the OOI as per the displacement of their hand at different rates by simply changing the number of fingers they hold up during the hand motion and bring the modifications of the OOI to an end by simply closing the hand in a first configuration or another suitable ODE such as a POLA (performed with their hand). Such user gestures can be especially beneficial to users of AR/VR/MR devices.

In embodiments such as above where the OMST is detection of a specific gesture, one of the ODEs can be termination of that OMST gesture, and possibly termination of any/all of gestures that are valid OMDs during the PWP. For example, as illustrated in the previous embodiment, holding out a hand in a pointing gesture with the index finger was the OMST, and motion of hand when holding one or more fingers outstretched was the OMD. In this embodiment, the ODE can be the user action where none of the fingers are held in an outstretched configuration. That is, the ODE is the non-detection of none of five gestures illustrated in FIGS. 41B, 41C, 41D, 41E and 41F. Therefore, in this embodiment, the user would start the warp by making a pointing gesture with the index finger and then fine tune the location of the OOI by moving the hand while making one or more of the five gestures from FIGS. 41B through 41F (as part of the PWP) and then ending the PWP by making a different gesture (than the five gestures), such as making a first or just taking the hand out of the view of the image sensor(s) tracking the hand. In a variation, the ODE could also include performing a POLA while one of the five gestures were still detected to be active. In other variation, the ODE could require the non-detection of the five gestures along with performance of a POLA.

Some embodiments that use hand gestures as OMST or as part of the OMD (as part of PWP for OM signal generation), can warp the OOI close to (or at a certain offset from) where user's hand/part of the user's hand/part of object held by the user would project on the display screen. This location can be computed as the intersection of a vector going from the user's eye (or an image sensor tracking the hand) to the hand/designated part of the hand (e.g. tip of a finger)/part of the object held by the user with the plane of the display screen or a virtual object being shown to the user. Such embodiments can have the benefit of feeling intuitive as it may feel as if the user can place the OOI by directly pointing to different areas of the display screen/virtual environment. However this can become cumbersome if the user is in a virtual environment where OOI could be at or be placed at or above eye level, as that would mean that the user would have to hold up their hands higher than what is normal position for hands/arms, and the user may have to do so for potentially long time periods. (This phenomenon is sometimes call "gorilla arm syndrome".) In those situations warping to CPOI rather that the aforementioned intersection location can be advantageous. Firstly, that would allow the user to keep their hands down while performing the hands gestures and therefore be more convenient by avoiding the gorilla arm syndrome. It would also have the additional advantage of not occluding the user's vision when looking at the POI on their screen or their virtual environment (such as in augmented/mixed/virtual reality applications). Further, in embodiments that are in the form of head worn devices or smart glasses, the approach of using CPOI for initial placement of the OOI at the start of hand/gesture warping allows image sensors that are sensing user's hands to be placed on the lower parts of the wearable devices, where they can point downwards where the user's hands naturally are. This way, these image sensors do not need a wide field of view. Further, the image sensor can could be replaced by other sensors (say wristbands or finger sensors that can sense hand/finger gestures as well as motion) allowing control of an OOI which may be at awkward location to physically point at with a hand.

Some embodiments that include detection of specific user action as part of an OMST (e.g. used for warping OOI) can impose further requirements for the user to perform as part of the OMST. For example, if the OMST included performance of a pointing gesture with the hand, then the system can also require performance of a POLA while performing that hand gesture before a warp can occur. E.g. the system can require that the user hold their hand steady while making the pointing gesture with their hand for at least 300 ms before the system will recognize that action as a valid OMST for the purpose of warping the OOI. Such additional requirement can be beneficial to the user as that can allow the user to settle down before their actions (such as making a pointing gesture) starts generating OOI modification signals. It also allows the user to abort the user gesture (if they realize that they made the pointing gesture in error) by not bringing their hand to a steady position and continuing to move it outside the view of the sensor tracking their hand and/or stop performing the gesture before steadying their hand. Such additional requirement can be applied to any triggers or sequence of actions, e.g., end triggers, STHS, ETHS, and so on, for the benefit of the user.

Today's eye gaze tracking systems have limited accuracy and precision in tracking eye gaze. (E.g. see the paper "Toward Everyday Gaze Input: Accuracy and Precision of Eye Tracking and Implications for Design" by Anna Maria Feit, et. Al from Proceedings of CHI 2017 ACM, May 6, 2017) Control system embodiments described above can make it easy for the user to move the OOI through large distances easily and placing them very accurately at the desired location. This could be performed by having the large or coarse motions of the OOI achieved by eye gaze, and the fine motions (for accuracy of placement) achieved by action of a designated body part (such as motion of head, finger, hand, etc). Furthermore, control systems using the OOI warping principles can provide significant convenience to the user by enabling the user to indicate when the OOI should be modified in accordance to the eye gaze.

Persons knowledgeable in the art can see that the above disclosed concepts/principles can be combined with other concepts/principles described in this or referenced documents.

Alleviating Impact of Eye Gaze Inaccuracies based on Helper User Actions (HUA):

Some control systems that can use eye gaze for modifying an OOI (that is affected by a controlled electronic device) can use other user actions (including facial expressions) as helper user actions along with eye gaze to alter modification of the OOI. The HUA can cause the control signal to generate "helper signals" that help with modification of the OOI. Following are a few example embodiments and explanations—

Variation 1.

- OOI=A graphical object such as a mouse pointer on the display screen of the controlled electronic device;
- OMST=Active Facial expression of smile (i.e. smile with magnitude greater than specified threshold);
- OMD during PWP=Eye gaze.
- Helper user action (HUA) for altering (or enhancing precision of) OOI modification=Active Facial expression of smile.
- Helper signals=Zoom-in of portion of display screen around CPOI.
- ODE=End of the active smile that started the warp.

In such systems, the mouse pointer (OOI) can be made to jump to the location of eye gaze on the display screen (that is the CPOI/POI) only when an active smile is detected to be performed by the user. In such embodiments, the mouse pointer (OOI) can stay put (i.e. its location, the attribute of interest, can stay unchanged) until a smile (i.e. designated HUA) is detected to be active. When the start trigger is detected, the OOI can jump to the CPOI at that time.

Figure 42:
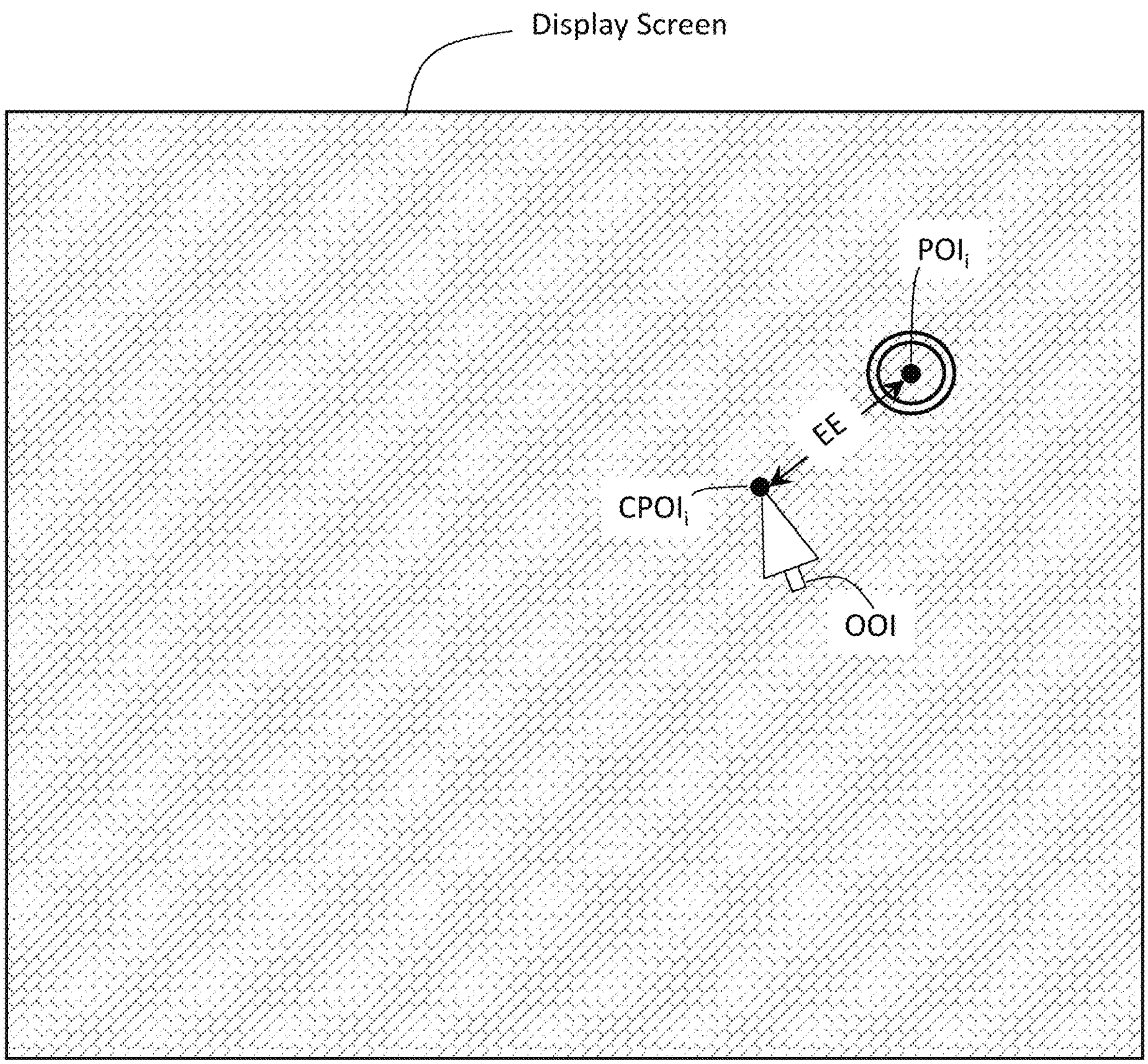
FIG. 42 illustrates Eye Gaze Calculation Error in an exemplary embodiment, at the moment of OOI Warp.
Figure 43:
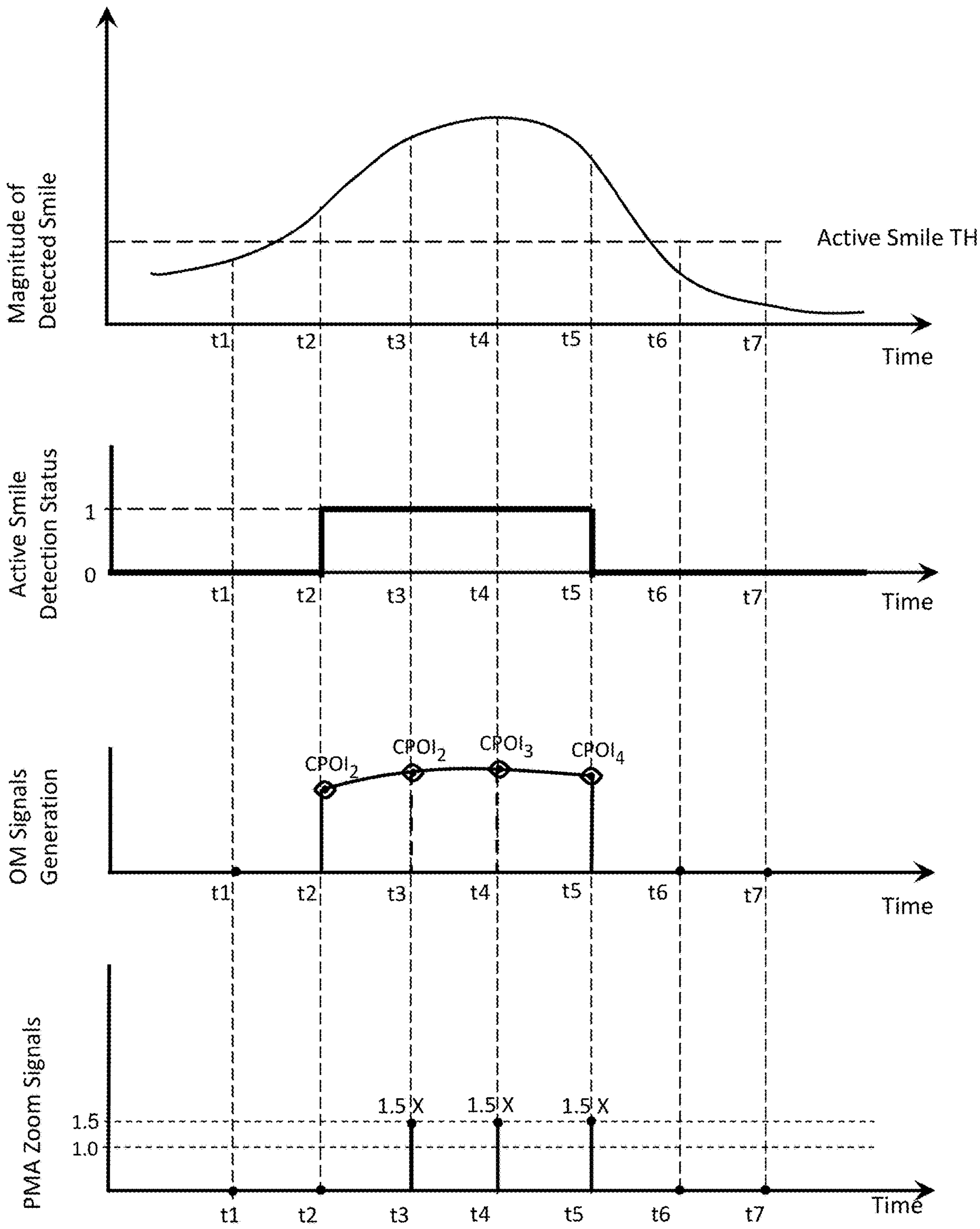
FIG. 43 illustrates an exemplary Facial Expression Signals and OOI Modification signals in an embodiment that generates Helper Signals (PMA Zoom signals) during PWP.

Given that eye gaze calculations (and determination of CPOI in particular) typically have inaccuracies, the mouse pointer (OOI) can possibly be not at the location where the user is looking at (which could be the location the user would have liked the OOI to be). See FIG. 42 for an illustration of eye gaze calculation error (EE). The figure shows a display screen and its content. The circular icon is the intended target where the user would like to place the OOI. The user is therefore looking at the center of that circle on the display screen (which is indicated by POI at the center of that circle). However, the system is shown to calculate the POI at the point shown as CPOI. The location difference between POI and CPOI is shows as EE (the eye gaze calculation error). Assuming that a warp was just performed, the OOI (mouse pointer) is shown to be at the CPOI on the display screen. Note that such eye gaze calculation errors can be inherent to eye tracking systems and are generally expected to happen. However, depending on the amount of error, this can be a hindrance to proper user interaction. To alleviate this, the control system can generate an additional type of command signals ("helper signals") to possibly enhance the precision of modification (location) of the OOI, when the active HUA is detected. (In this illustrative embodiment, we will use active smile as the start trigger for warp as well as the HUA, however, other embodiments can use different start triggers.) See FIG. 43 for an illustrative embodiment depicting generation of helper signals. The Magnitude of Detected Smile plot of the figure shows variation of readings from a smile sensor, along with Active Smile TH above which the detected smile is considered to be active. Therefore, an active smile is detected during t2:t5. The Active Smile Detection Status plot of FIG. 43 depicts the Active Smile Detection status. It shows that active smile was detected during time period t2:t5. The OM Signals Generation plot of FIG. 43 depicts (schematically) OM signals generated over time. Note that they are generated at t2 (based on CPOI2) because an active smile (OMST) is detected at t2. Given that the OMD to use over PWP is also eye gaze, OM signals are also generated during t3:t5 in accordance to the eye gaze (CPOIs) calculated during those iterations.

In this variation, the helper signals can cause the graphical objects around the CPOI to be magnified (possibly temporarily). Therefore, right after the initial jump/OOI warp (sudden modification) of the OOI on the display screen (upon detection of an active smile, the warp start trigger), an area (of a specified size and shape) around the CPOI can start getting magnified progressively over passage of time (let's call this area "progressively magnified area", PMA), as long as the user continues to keep that facial expression (smile HUA) active. The PMA Zoom Signals plot of FIG. 43 depicts generation of helper signals (zoom in this case). They are shown to be generated only during iterations t3, t4 and t5 as that is when the PWP is in progress. These zoom signals can cause only the content within the PMA to be progressively magnified with every passing iteration (by a factor of 1.5× in this example).

Figure 44A:
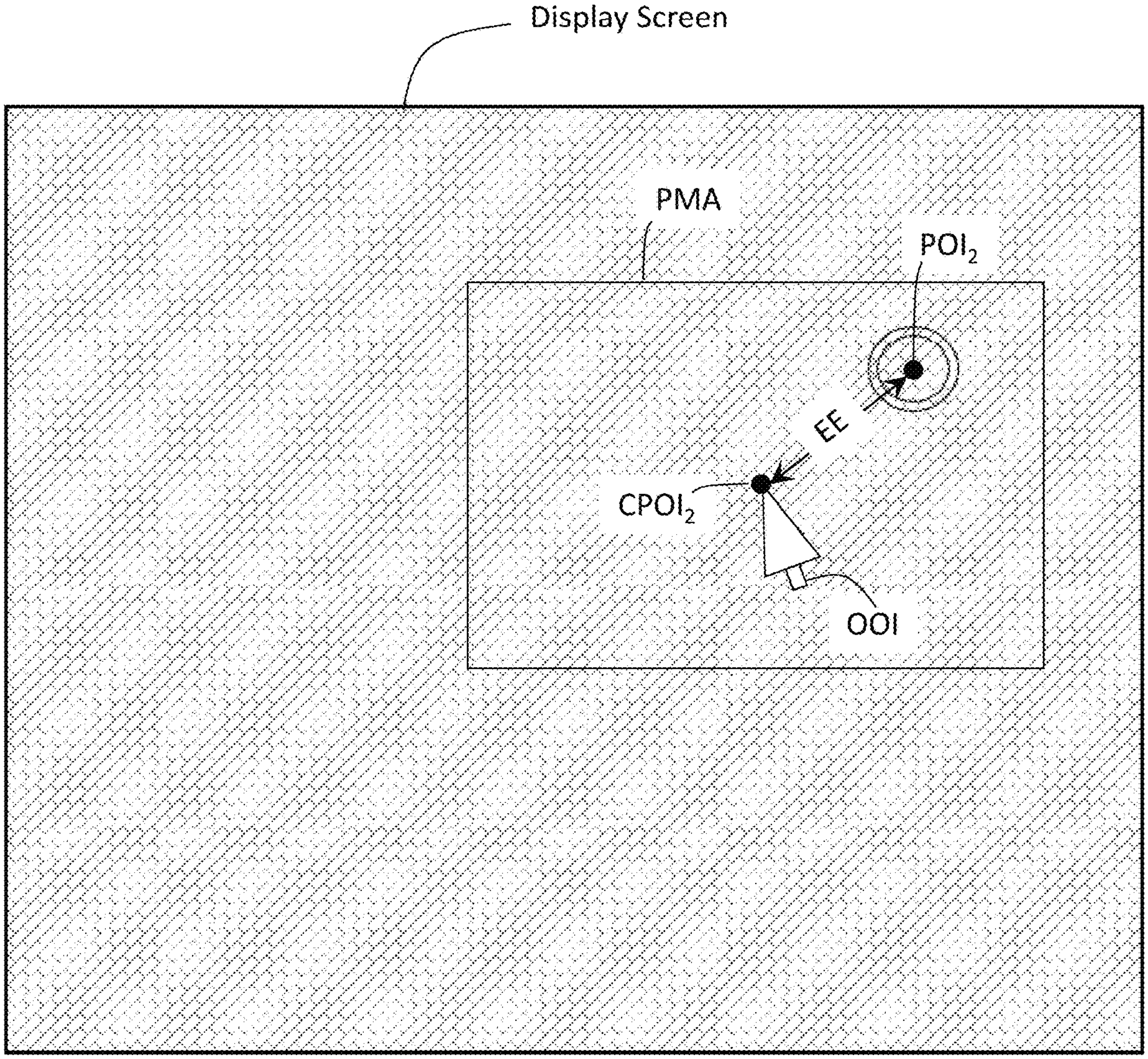
FIG. 44A illustrates an exemplary Progressive Magnification Area (PMA) on a display screen for an embodiment that generates Helper Signals (PMA Zoom signals) during PWP before the helper signals have started to be generated.
Figure 44B:
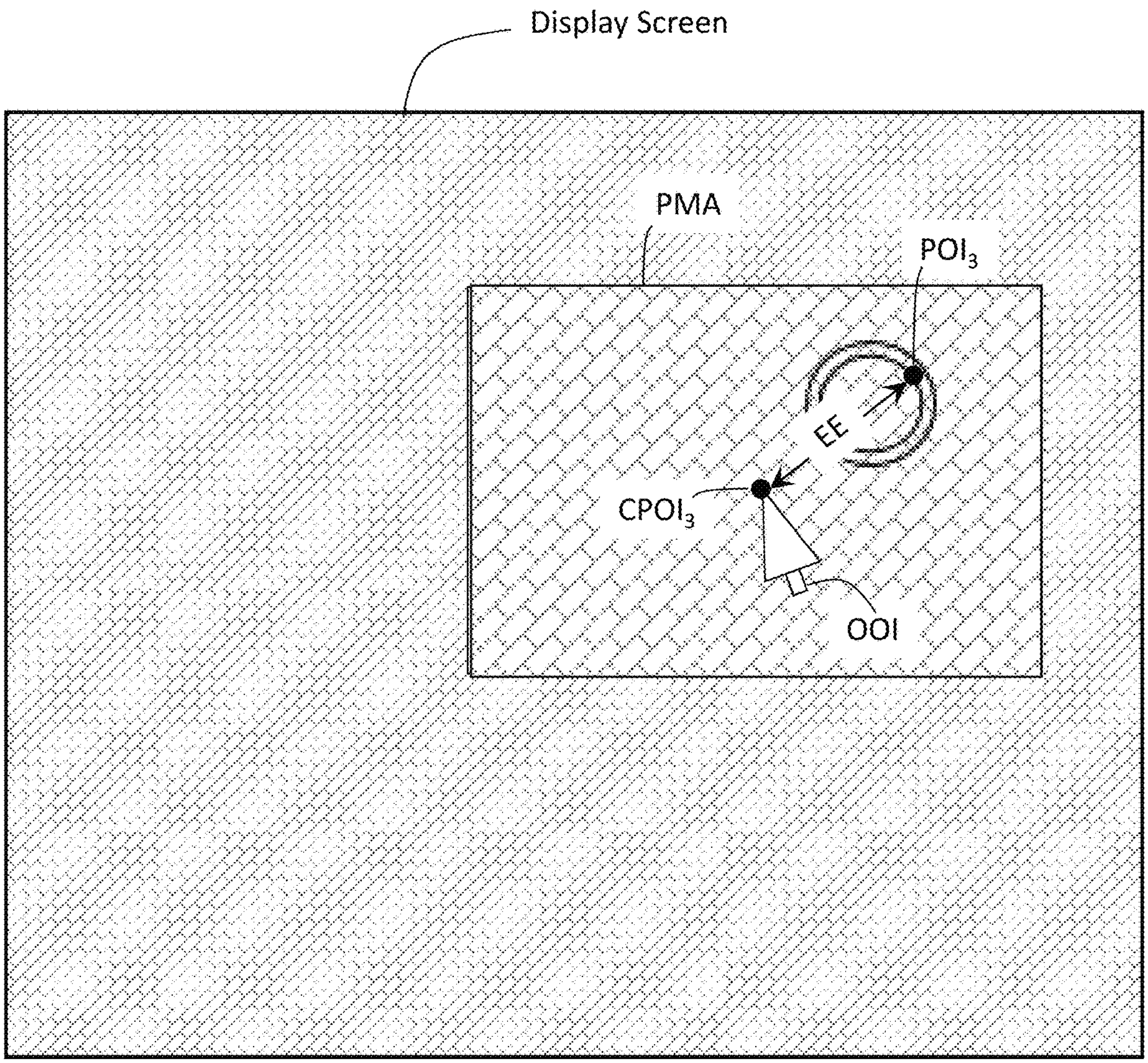
FIG. 44B illustrates the exemplary PMA of FIG. 44A wherein the generated PMA Zoom signals caused 1.5× magnification of the PMA.
Figure 44C:
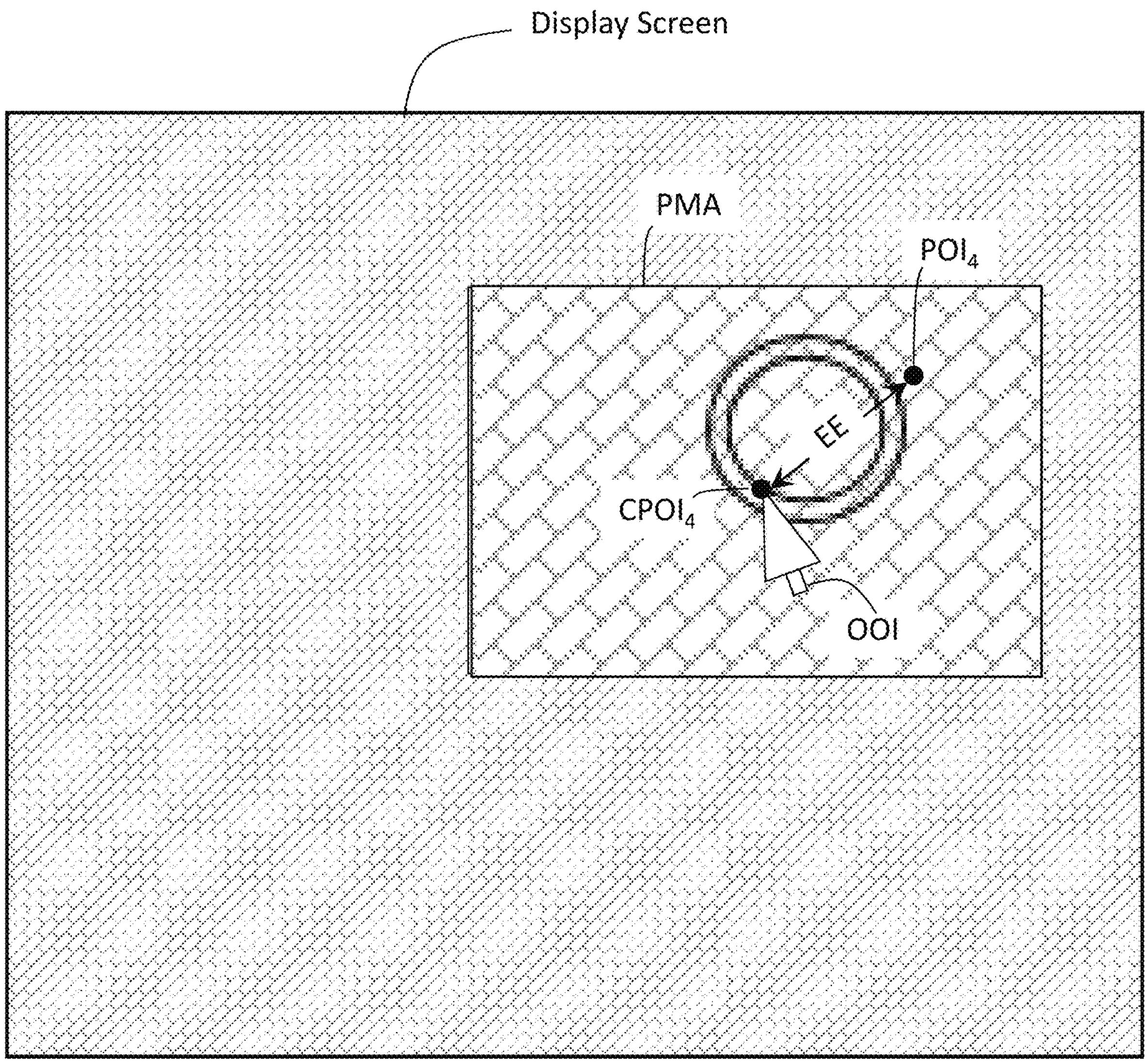
FIG. 44C illustrates the exemplary PMA of FIGS. 44A and 44B wherein the generated PMA Zoom signals caused further magnification of the PMA.
Figure 44D:
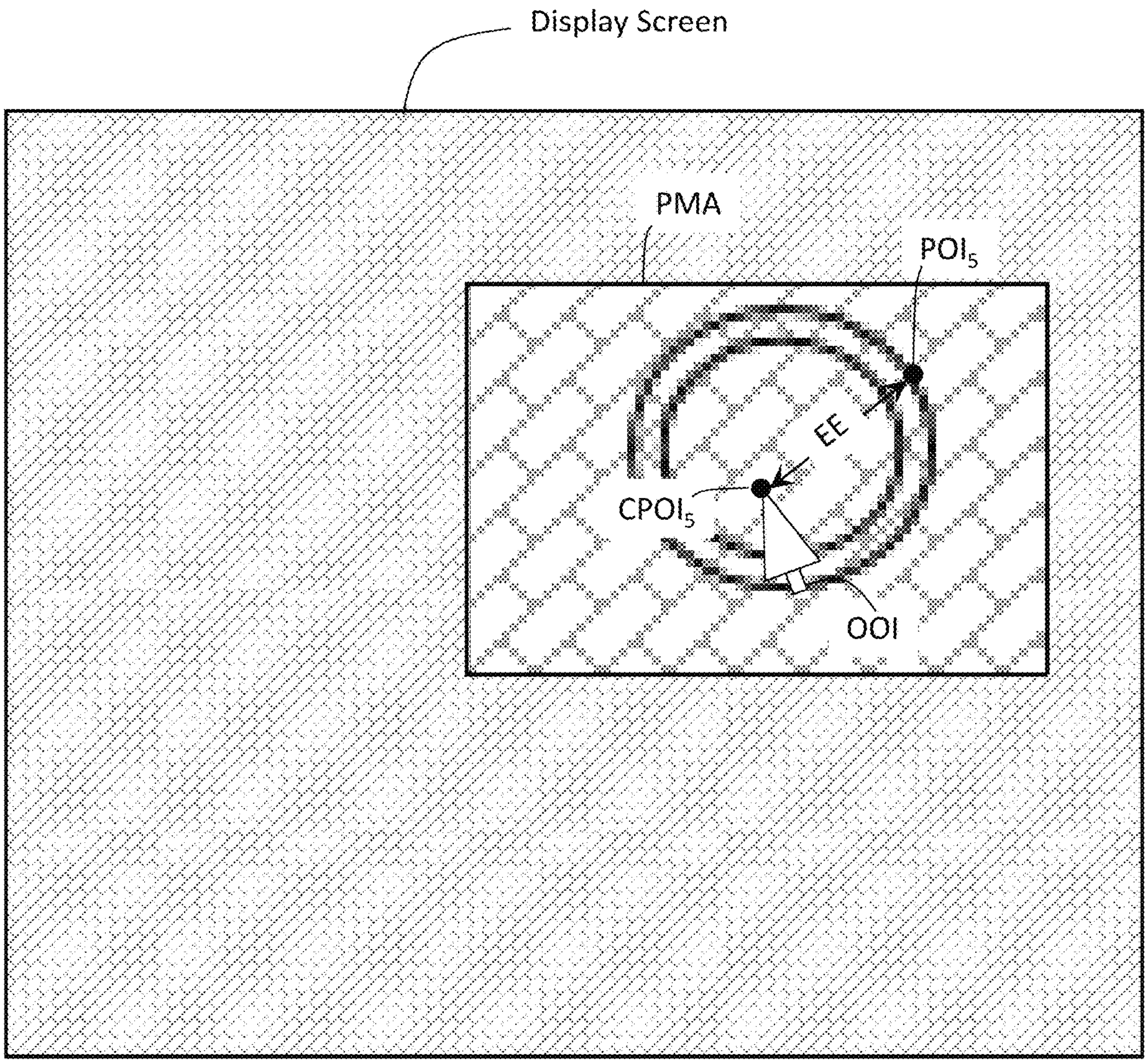
FIG. 44D illustrates the exemplary PMA of FIGS. 44A-44C wherein the generated PMA Zoom signals caused still further magnification of the PMA.

During this period of progressive magnification, the control system can continue to modify the mouse pointer (OOI) so that it continues to follow the user's (calculated) eye gaze (CPOI). If the user's eye gaze continues to be within the PMA, then OOI can keep on getting adjusted to follow the CPOI (within that PMA), until the time when the user stops the active smile (i.e. the system detects the HUA to be no longer active), at which point the mouse pointer modification can come to an end. See the illustration in FIG. 44. It depicts progressive magnification in a PMA on the display screen. FIG. 44A shows the display screen and its content at the time of the warp (time t2) (similar to FIG. 42), however along with a PMA. Note, the helper signals have not started being generated at time t2 so there is no magnification of contents inside the PMA yet. The circular icon represents the target the user intends to move the OOI to. However, the calculated POI is off by Eye gaze error (EE). FIG. 44B shows the content at time t3 wherein the content in the PMA has gone through 1.5× magnification. Given that some embodiments may keep the physical size of the PMA constant throughout generation of helper signals, not all magnified content can fit in the PMA, thereby causing clipping of some content. Further, some embodiments can center the magnified content at the latest CPOI, before clipping it. In that situation, the user may want to look a little bit beyond the original target so that the CPOI is pulled closer to the actual target with each iteration. FIG. 44C shows the PMA at time t4 (which is further magnified content from PMA of time t3 with further clipping). FIG. 44D shows PMA from t5 which further magnification of content of PMA from t4. Note that the user is shown to be looking a little beyond the target (the double circle, which is their real intended target for placing the OOI) so that the CPOI pulls up a little closer to the target with every iteration. Note that the EE is shown to be constant across iterations t3:t5. However, given that the content in the PMA is progressively zoomed in, the relative "size" of the error EE in original (unmagnified space keeps on reducing with each iteration as the progressive magnification is performed). When the OOI (which is moved to the latest CPOI) gets close enough to the target, the user can stop the helper action (that is active smile, in this case) and that can terminate the progressive magnification process, the generation of OM signals (and the PWP), thereby leaving the OOI much closer to the intended target than what would be possible without the zoom via the helper signals.

Note that, in some variations, the PMA can encompass the entire area of the display screen, thereby effectively causing a zooming-in of the entire graphical content on the display screen upon detection of an active HUA. In a variation, when the helper signals are being generated (based on detected active HUA), if the user happens to look outside the PMA (or even beyond the display screen), the system can temporarily suspend the generation of the helper signals (i.e. suspend the generation of zoom-in signals) to temporarily bring progressive magnification/zooming in to a halt. In such cases, the generation of helper signals can restart when the user looks within the PMA (or the display screen) and provided that they are still smiling (i.e. active HUA is detected). If the user stops smiling (HUA) at any time during the zoom-in process, the system can terminate the zoom-in process, stop displaying the PMA, and can restore the magnification factor of the entire display screen to the original value (i.e. the one just before the start of the zoom-in process) and refresh the display screen, and the OOI can be left at the latest location (i.e. at the last location during the zoom-in process but transformed back to match the original magnification factor).

Variation 2.

OOI=A graphical object such as a mouse pointer on the display screen of the controlled electronic device;

OMST=Blink of one or more eye, possibly with min and max time limits on the time duration of the blink;

Start Trigger for generating Helper Signals (STHS)=Blink. The performance of the start trigger for OOI warp can also be considered to be start trigger for generation of helper signals.

Helper signals=Zoom-in of portion of display screen around CPOI

End Trigger for Helper Signals (ETHS)=Blink. Once the generation of helper signals is started based on performance of STHS, the system can keep generating the helper signals until an ETHS is encountered. In this variation, a second blink (that is different from the STHS) will cause the zoom-in process to come to an end.

Based on the above parameters, in this variation, the OOI can be unaffected by the user's eye gaze, until the user blinks (the OMST). At that point in time, the mouse pointer (OOI) can jump to where the user is determined to be looking at (CPOI). However, given that the blink is also STHS, the system can start causing an area around the CPOI on the display screen to start progressively being magnified (zoom-in action) and the OOI to continue moving on the PMA in accordance to the eye gaze. This zoom-in process can continue until the user performs ETHS (also a blink in this variation). At this point, the PMA area can be redrawn so as the match the original magnification factor of the display screen, and the OOI relocated to the appropriate location on the display screen (refreshed with the original magnification factor based on the last location of the OOI on the PMA).

In a variation of the above, the blink for OMST/STHS can be required to be of a different duration (say longer) than the duration of the blink for ETHS. With the above arrangement, chances that a normal, unintentional blink of the user will not get misinterpreted as a OMST or STHS.

Variation 3.

OOI=A graphical object such as a mouse pointer on the display screen of the controlled electronic device;

OMST=Blink of one or more eye, possibly with min and max time limits on the time duration of the blink;

STHS=Blink. The performance of the start trigger for OOI warp can also be considered to be start trigger for generation of helper signals.

Helper signals=Zoom-in of portion of display screen around CPOI

End Trigger for Helper Signals (ETHS)=None. In this variation, the zoom-in process automatically comes to an end upon passage of specified amount of time after the start of generation of helper signals (which is in turn triggered by the STHS). This amount of time as well as the progressive magnification factor can be user settable parameters.

Based on the above parameters, in this variation, the OOI can be unaffected by the user's eye gaze, until the user blinks (the OMST). At that point in time, the mouse pointer (OOI) can jump to where the user is determined to be looking at (CPOI). However, given that the blink is also STHS, the system can start causing an area about the CPOI on the display screen to start progressively being magnified (zoom-in action) and the OOI to continue moving on the PMA in accordance to the eye gaze. This zoom-in process can continue for specified number of milliseconds, that is the specified "time duration for generating helper signals" (TDHS). After the elapse of THDS milliseconds after detection of the STHS, the zoom process can end, the PMA area can be redrawn so as the match the original magnification factor of the display screen, and the OOI relocated to the appropriate location on display screen (refreshed with the original magnification factor based on the last location of the OOI on the PMA).

Variation 4.

OOI=A graphical object such as a mouse pointer on the display screen of the controlled electronic device;

OMST=Start of squint of one or more eye, possibly with min and max time limits on the time duration of the squint; Note: Thresholds can be specified on the current size (or ratio) of the opening of the eye (to normal opening size) to determine if a squint is active. For example, if the current opening size is less than 50% of the "normal" eye opening size of the user for at least 50 milliseconds, then the squint action can be considered to be started.

STHS=Same as OMST action.

Helper signals=Zoom-in of portion of display screen around CPOI

End Trigger for Helper Signals (ETHS)=End of the squint. Note that the threshold used to determine end of the squint can be different from the start of the squint. For example, the squint can be considered to start if the user changes the opening of their eye to be less than 50% of the normal eye opening size, however, once the squint is started, it can be considered to be active until the time it increases to more than 70% of the normal eye opening size for that user. (Note that the threshold for ETHS can also be greater than 100%, which may mean that the user would have to open their eyes wider than the normal eye opening level to stop the generation of the helper signals.)

Based on the above parameters, in this variation, the OOI can be unaffected by the user's eye gaze, until the user starts squinting (the OMST). At that point in time, the mouse pointer can jump to the CPOI. Given that the STHS is the same as OMST, a new graphical object representing the PMA can be superimposed on the current contents of the display screen, wherein the contents of the PMA are progressively magnified over time as long as the squint is active, and the OOI can be modified so as to follow the eye gaze. Upon the end of the squint, the PMA can disappear and the OOI be retained at its last location, however, appropriately transformed to account for the reverting back to the original magnification factors of the contents of the display screen.

Note: When computing eye opening of the user in systems that use image sensors, the head pose and eye gaze direction of the user (with respect to the image sensor) can be taken into consideration. For example, if the user is sitting upright and the image sensor is directly in front of them and at the same level of their eyes, and the user is also looking in the direction of the image sensor, then that may lead to a larger measurement of the "normal" opening of their eye, in comparison to when the user may be looking in a downward direction.

Variation 5.

OOI=A graphical object such as a mouse pointer on the display screen of the controlled electronic device;

OMST=Eyebrow raise/move/wiggle.

STHS=Same as OMST action.

Helper signals=Zoom-in of portion of display screen around CPOI

ETHS=Bringing eye brow to the original position (i.e. one before OMST was performed), or, passage of specified amount of time after the OMST.

Note that in this as well as any other variations, a blackout period can be specified right after the detection of the OMST or STHS where all eye gaze signals can be ignored for the purpose of generation OM signals. This can be especially helpful when the user action (e.g. OMST or STHS) involves the eyes or surrounding area (including eyelids and eye brows). This can allow the user to settle down some before focusing on the next step after that user action.

Persons knowledgeable in the art can see that the above disclosed concepts/principles can be combined with other concepts/principles described in this or referenced documents. The above variations are illustrative in purpose, and different combinations of user actions (including facial expressions) can be used for OMST, STHS and ETHS, and different OOI types can be used in place of a mouse pointer (e.g. any graphical object), and different shapes and sizes of display screen areas can be used for PMA, and different types of Helper signals can be used as well. Some embodiments can permanently change the graphical contents in the PMA (i.e. the graphical content modified as part of the progressive magnification may not go back to the original state even after the ETHS is detected).

Some embodiments can generate an additional signal as part of the PWP. For example, after at the end of the PWP when the OOI Modification signals come to an end, the system can generate an additional signal such as a selection signal. Here are some parameters for an illustrative embodiment—

OOI=Mouse pointer

OMST=Head motion (above OMST TH).

OMD1=Head Motion during PWP

ODE=ODE POLA (performed by using head)

Additional signal(s) at end of PWP=Left click signal.

In this embodiment, when the PWP ends based on the ODE (POLA performed by user's head), the mouse pointer will stop moving and a left click would be performed at the mouse pointer location. In effect, this warp based user gesture can be used for pointing and clicking at a particular location on the screen, wherein the coarse location of the pointer is achieved with eye gaze based warp (when the user performs the OMST), followed by fine tuning of the pointer location based on head motion, followed by a left click generated when the mouse pointer finally stops moving (as part of the ODE performed to bring PWP to an end).

Note: It will be obvious that the left click signal can be substituted by any other type of signals (selection or otherwise). Further, these additional signals can be generated in any warp based user gestures that may or may not generate helper signals.

The principles, concepts, heuristics, user gesture designs and algorithms can be implemented in a wide variety and types of embodiments. For example, they can be implemented as methods executed using computers, software running on electronic devices, electronic systems (whole or part) or apparatuses. They can be implemented as controller devices or embedded inside controlled devices or systems. A variety of type of sensors can be used to sense the user actions disclosed. Following are just a few examples of physical embodiments implementing some of the disclosed principles.

Figure 45:
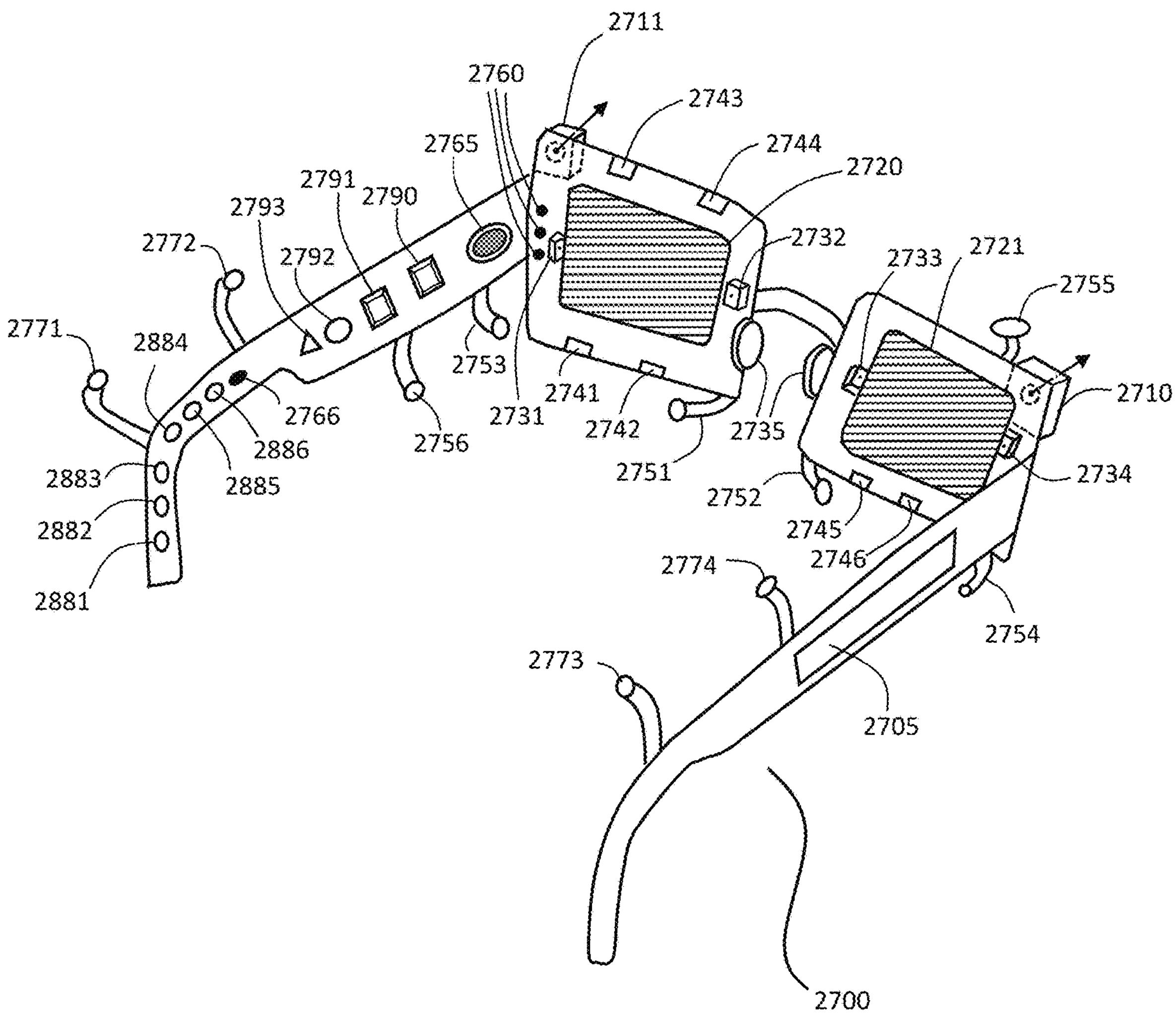
FIG. 45 illustrates an exemplary embodiment in the form of wearable Augmented/Mixed Reality Eye Glasses that uses diverse user actions including Eye gaze, Head motion and Hand gestures.

See FIG. 45 for an illustrative embodiment. in the form of Augmented Reality/Mixed Reality smart glasses. Device 2700 is a wearable Augmented Reality/Mixed Reality smart glass that can allow the user to interact with itself as well as other electronic devices by means of eye gaze, head motions, facial expressions (such as smile, eye brow motion, frown, etc.), brain waves, auricularis muscles, finger/hand/arm gestures, biometric information, physiological information, as well as touch input mechanisms. Device 2700 is in the form of eye glasses. The outside side of the right temple shows touch pad 2705 that the user can interact with by touching, swiping and pressing, with one or multiple fingers, palm, or other parts of the hand/body. The device can also differentiate a touch by a fingertip from other parts of the hand (by possibly the size and shape of the contact with the touch pad 2705) and treat them as different user actions in the user gestures. Sensors 2710 and 2711 can contain any combination of image sensors, depth sensors, time of flight sensors that can help with the detection of finger/head/arm gestures performed by the user, as well as provide understanding of the environment of the user so that the main processor of the device (not shown) can display virtual images and other augmented/mixed reality information for consumption by the user.

The front of the frame of device 2700 shows having elements 2720 and 2721, which are combination of lens with a display screen. (Optionally, device 2700 can also have a retinal projector to display images to the user.) Eye tracking sensors 2731, 2732, 2733 and 2734 are shown to be mounted on the insides of the eye glass frame; they provide readings for detection and calculation of user's eye gaze. Nose pads 2735 are shown near the bridge. (Nose pads can also be used to mount/embed various sensors). Sensors 2741, 2742, 2743, 2744, 2745 and 2746 can contain a combination of proximity, and touch sensors that can monitor the movement and/or touch by cheeks, eye brows, eye lids, as well as other muscles/facial tissue in the vicinity of those sensors. These sensors therefore can act as FE sensors. Sensors 2751, 2752, 2753 and 2754 can contain combination of proximity, touch and pressure sensors that can monitor the position, motion, touch and pressure exerted by the muscles in the vicinity of those sensors. These sensors are shown to be mounted on arms that can be adjusted to make them touch parts of the face. The output of these sensors can be used as FE readings. Sensor 2755 shown to be mounted on the top part of the frame can include EEG sensor that can help in getting brain wave readings. It may also include EMG sensor that can get readings from muscles around the eye brow. These can also be used as FE sensor readings.

Microphone 2756 is an audio mic for the user to use verbal commands. LED lights 2760 are shown on the inside of the frame; they can glow in multi colors, thereby providing feedback to the user. Speaker 2765 is shown mounted on the inner side of the temple of the eye glass. That can provide audio feedback. It could be also replaced by ear buds for audio output. Haptic feedback device 2766 can also be used for feedback to the user. Sensors 2771, 2772, 2773, and 2774 can contain combination of EEG or EMG sensors to measure brain waves or muscle activity around those regions. They are also mounted on adjustable arms that can touch or exert pressure on the user's body. Body Temperature sensor 2881, Wear sensor 2882, EEG sensor 2883, EMG sensor 2884, Heart rate sensor 2885 and GSR (Galvanic Skin Response) sensor 2886 are shown mounted on the sides of the eye glass temples. Their input can also be used for conditional activation in various heuristics. For example, certain user actions such as facial expressions can be ignored (or utilized) based on if the heart rate or GSR response readings within (or beyond) certain ranges of specified values. Head motion readings can be ignored (or only considered) based on physiological readings as well. For example, if the user is experiencing stress (as indicated by GSR readings) their head motion readings and eye brow can be ignored and only smile and eye gaze may be honored for purposes of interaction with the device.

Device 2700 also shows a Motion and orientation sensor 2790 (possibly including a MEMS based Inertial Motion Sensing Unit), Processor 2791 for computational processing and telecommunication, Battery 2792 for power source and Transceiver 2793 for connection with other devices. Other sensor types such as radar sensors can also be used for monitoring motion of facial muscles as well as hands in the vicinity of the glasses. The user gestures disclosed in this and referenced applications can not only be used to control Device 2700 itself, but some of the user gestures can be used to control other devices paired or connected with Device 2700. In effect, Device 2700 can act as a controller of any other electronic device it is configured to communicate with, for example, desktop/laptop computers, smart TVs, smart phones, home appliances, IoT devices, lighting and electrical systems, industrial machinery, car/automobile/transportation systems (including infotainment systems), health/medical/surgical systems, and more. Device 2700 can also include complete capability of a smart phone. Furthermore, Device 2700 may also communicate and receive readings from sensors mounted on other parts of the body, such as smart watches, smart rings, arm bands, heart monitors, and other wearable sensors.

Figure 46:
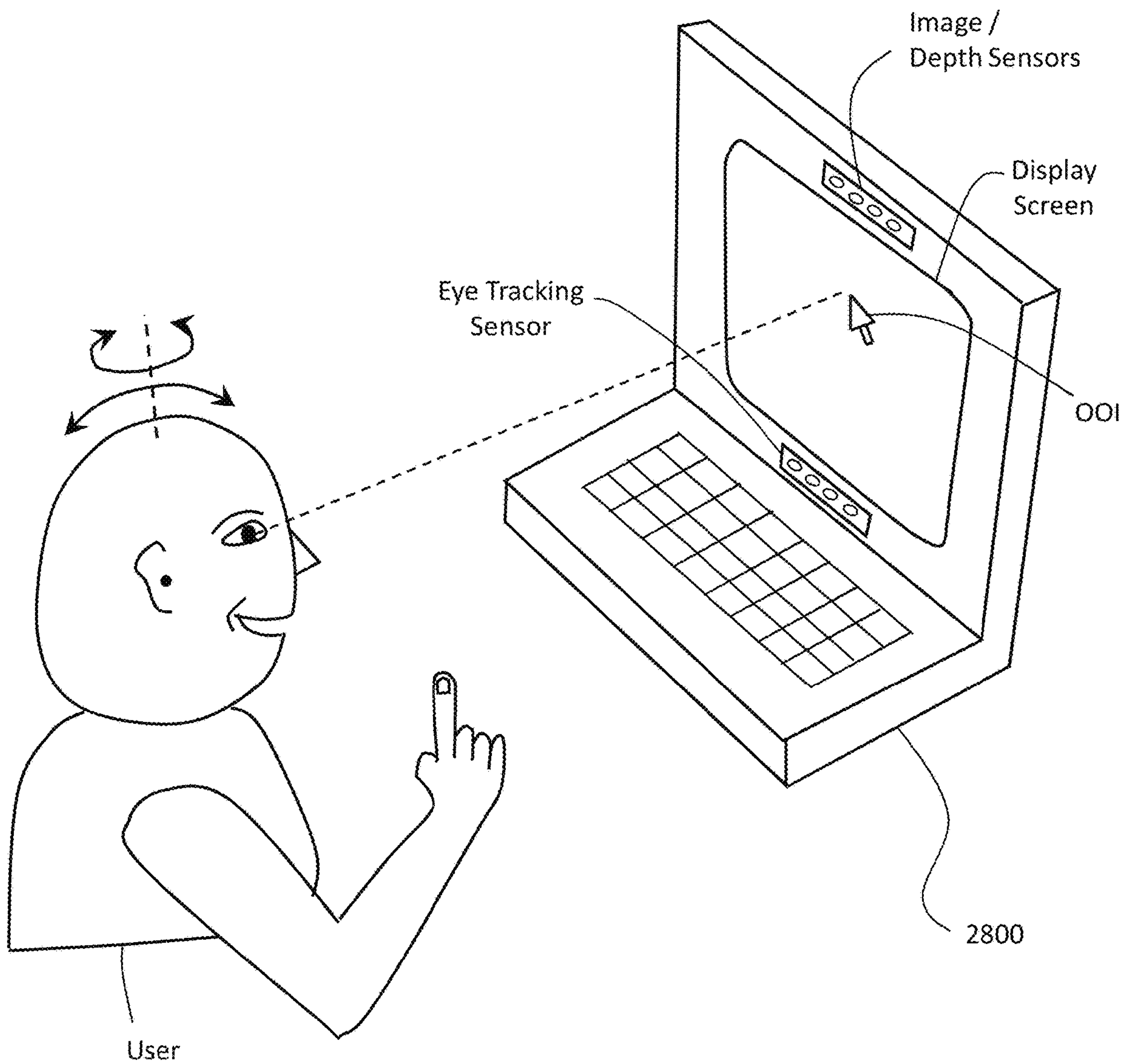
FIG. 46 illustrates an exemplary embodiment of a Control System that uses diverse user actions including Eye gaze, Head motion and Hand gestures without the need for wearables.

See FIG. 46 for another embodiment of the control system. It shows the user interacting with a computer 2800 by means of head motion, facial expressions as well as hand gestures. The computer is shown to include eye tracking sensor, as well as image and depth sensors which can include 2D as well as 3D RGB sensors, time-of-flight sensors, depth sensors, infrared sensors, infrared illuminators, etc. These sensors capture head motion, facial expressions, eye gaze, as well as hand and other body part actions. In this scenario, the user is not wearing any devices however the sensors on the computer are capturing them in a touch free fashion. While interacting with computer 2800, the user can use many of the same user gestures that can be used when interacting with device 2700. These user gestures can include user actions such as head motion, eye gaze, facial expression, hand gestures as well as vocal commands. The computer is shown with a display screen and includes a processor that runs the control software that receives the input from all the sensors, recognizes user gestures, and generates command signals to control computer 2800 (or any programs running on it), or any other devices connected to computer 2800. The computer can be considered to include the control system as well as the controlled device.

The referenced applications (including U.S. patent application Ser. No. 13/418,331, U.S. patent application Ser. No. 14/054,789 and others) disclose wearable devices in the form of head-worn wearables, with arms that include touch and/or proximity sensors that can sense the motion of facial muscles as well as touch by those facial muscles. The use of sip-and-puff sensors (which are typically mounted on projections or arms). Some embodiments can combine multiple sensors on the same physical structure, such as an arm extending from a controller embodiment (that may be worn on the head or mounted close to the user's head). For example, refer to FIG. 1 of the '331 application. It shows sensor arm 2 extending towards the user's mouth. Some embodiments can have this arm elongated enough so that the user can blow puffs of air on a portion of the arm (such as the tip of the arm). The strength and time duration of the puffs can be measured by puff sensor(s), and these sensor readings can be considered to be indicative of the puffing action or puffing facial expression performed by the user. These sensor readings can be considered to be PCE readings and thereby be used by any of the heuristics (that use a PCE) disclosed in this as well as the referenced applications. Further, the same arm that has a puff sensor can also house proximity and touch sensors so that the touch actions performed by the user (by using their lips, tongue, check or any other part of the mouth or face) can be sensed by the same arm. This can provide flexibility (and thereby case of use) to the user with regards to which PCE they would like to use to perform the gestures. For example, the user can puff into the puff sensor for a short duration to cause a click or puff into the puff sensor for a longer duration to start a drag command, or touch a touch sensitive part of the arm for a short duration for a click, or touch the arm for a longer duration to start a drag command, and keep on interchanging which action they are performing to achieve the same or similar results. By using different muscles or part of the face, the user thereby can prevent the same set of muscles from getting tired due to over use or frequent use.

Some electronic devices use facial recognition for securing access to devices. For example, Apple's iPhone X allows unlocking a locked phone by means of the facial recognition that will unlock only when the face of the user looks similar to the face of the user authorized to use that phone. However, this arrangement can get fooled by having an unauthorized user use a mask that resembles the authorized user. Further, a twin sibling or even a relative of the authorized user can gain access to the phone due to the resemblance of their face with the authorized user. Such systems can be made more fool proof by requiring the user to present additional actions to unlock the device. For example, the user can be required to perform a sequence of motions or body actions when they are in front of the device. For example, they can be required to perform a sequence of facial expressions. Some examples are—a smile, or a smile followed by a frown, or a smile and a wink, or a smile and simultaneous wink, or a smile and moving the head in a specified motion pattern (such as nod, head roll, tracing FIG. 8 with the nose tip, and so on), and so on. Further the additional actions can involve other body parts or actions. For example, squeezing the sides of the device (such as the phone) while holding the phone, or shaking/moving the device in a particular way before or after looking at the facial recognition camera on the device, or holding a victory hand gesture with the hand or doing a Vulcan salute, etc. could be required. The above principles could also be used with home and other security systems so that when a user is in front of the camera (used for facial recognition), they could be required to perform additional actions (with just their face or any other part of their body) to gain access. It will be obvious to persons knowledgeable in the art that the above principles can be used with a wide variety of combinations of other body actions along with pure face recognition to strengthen the security of the system.

Patients being taken care of at hospitals or homes frequently need to communicate with their nurse or care giver. However, a patient may not be in a condition to communicate due to either a physical limitation or restriction, lack of strength, or disorders of consciousness. Some of the situations when they need to communicate may be when they may be experiencing pain or discomfort. Occasionally, personnel need to be employed to be seated next to the patient for the purpose of monitoring a patient, expressly to get cues if the patient is coming around to consciousness, is in distress or needs some help. However, this can be an expensive proposition, especially in medical facilities.

One embodiment of a patient monitoring system can—

Monitor a facial, physical and physiological information (FPPI) of a patient for the purpose of detecting a possible situation where the patient may need help. The monitoring process can include:

1. Take a snap shot (record) of the starting FPPI of the patient. A snapshot can include facial expression information, position information on various key points or landmarks of patients face, position/location and orientation of various body parts of the patient as well as physiological data of the patient (including temperature, heart rate, blood pressure, blood oxygen level, skin conductance, perspiration level, galvanic skin response, electrodermal activity, brain waves, muscular tightness, etc.).

Note: Muscular tightness information can include tightness information on muscles from scalp, face, throat, neck, torso, limbs, abdomen, perianal area, perineum, inside the anus, inside the urethra, etc. The tightness measurements can be done based on Electromyography (EMG) sensors, pressure sensors, and the like. Facial expression and position/location and orientation of body parts can be sensed by one or more image sensors (such as 2D or 3D cameras, infrared cameras, etc), radar sensors, ultrasound sensors, EMG sensors, proximity sensors, touch sensors, etc.

FPPI can also include sound made by the patient, including breathing sounds, snoring sounds, groans, grunts, flatulence, etc. Patient's sounds can be sensed sound sensors located appropriately around the patient.

Note: Body part position/location and orientation information can be substituted by or used along with position/location and orientation information of objects associated to or affected by those body parts. Some examples are clothes or gown, wrist/arm bands, rings, ear rings, necklaces, head bands, eye wears, shoes, gloves, etc.

The recording can be made in the memory associated with or being used by a microprocessor that is part of the system.

A snapshot taken at the beginning of the monitoring process can be used as the baseline. Baseline can be also derived from multiple snapshots taken over time, possibly at the beginning of the monitoring process. Those snapshots can be averaged to derive the baseline, or one of them (such as a median valued snapshot) can be selected as the baseline, or a.

Baselines can also be reset in the middle of the monitoring process. The baselining process can be considered to be akin to the calibration process.

2. Take FPPI snapshots at various points in time, possibly at specified time intervals or specified times of the day.
3. Based on latest FPPI snapshot and an appropriately selected baseline, detect patient distress/discomfort, or patient's need to communicate, or an unusual/unexpected situation (based on the patient's situation). Accordingly, send an appropriate message (including text, email, automated phone call, photos or video feed showing the patient in his room with problem areas highlighted, etc.) to a care giver or to another system, possibly yet another monitoring system, to inform them of the situation.

Note: Multiple baselines can be used for comparing the current FPPI snapshot, for the purpose of detecting a trend or a pattern that may indicate patient distress/comfort or patient's need to communicate.

In one scenario, a pattern can be that the patient is opening and closing their eyes or mouth less or more than certain number of times over a prescribed time period. The frequency of this voluntary or involuntary action from the patient may indicate distress (such as eye or mouth dryness) or a need to seek the caregiver's attention.

In one scenario, the patient can be detected to develop grimace, frown, closing eyes tightly, furrowing or twitching eyebrows, twitching lips, stretching the mouth, winking, contorting face or any unexpected facial action or motion (possibly based on the level of consciousness). This can be an indication that they may be in distress (such as in pain or discomfort) or may be voluntarily seeking the nurses attention.

In one scenario, the patient may be detected to be moving or twitching their arm, leg, finger, face, part of the face, or a body part of interest. Or their clothes or body worn objects seem to have moved or appear to be moving. This can even include the patient having rolled off the bed. In a reverse scenario, the patient may seem to be stationary for a time period longer than the expected amount at their level of consciousness.

In one scenario, a variation in muscle tightness (in a part of patient's body) detected in comparison to selected baseline(s) or to some appropriate standards can also be a trigger for the system to send a signal to a care giver or a suitable external device or system. E.g. EMG and SMG sensors can be used to determine muscle activity that could be considered as indicator of coming around to consciousness or distress. Alert messages can be sent accordingly.

In one scenario, the facial and physical information is also considered along with the physiological information, in order to determine or ascertain the need for triggering an alert. E.g. amount of change in blood pressure of the patient, in itself may not be a cause for concern, however, when considered with detected changes in muscle tightness (in a body part) or contortion of facial muscles, or motion of body parts, the situation may indicate a need to alert or communicate with a care giver. Different combinations of various facial, physical and physiological measurements can be used to trigger signals by the system.

Upon detecting of such situations, the system can send can appropriate alerts to a care giver or a suitable external device or system. The signal can include a microprocessor to microprocessor signals or a signal than can be consumed by a human, such as a text message, email, audio/visual/olfactory/tactile alerts. The alert can be sent to another microprocessor based device or system. The alert can include details of the current and baseline FPPI and/or other information derived based on a combination of that information.

Note: The monitoring can also include appearance of new things on or around patients. For example, appearance of drool around the patient's mouth, blood on any part of patient's body or clothes. This can be done based on image sensors. Indication of urination or bowel movement can also be detected based on changes in moisture using moisture sensors or other suitable sensors.

Note: The system can be configured such that different set/combination of parameters (that are part of the monitored FPPI) can be monitored for different patients, possibly based on the level of their consciousness. E.g., an alert/signal may be generated for one patient if any motion is observed of their head or face. Whereas, for another patient, head motions by themselves may not generate any alert/signals but only specified facial expression such as a frown or a grimace. And for yet another patient, an alert signal may be generated only when a frown or grimace is accompanied by changes in blood pressure or galvanic skin response, and so on.

Note: The observed variations in FPPI of the patient can be due to involuntary actions as well as voluntary actions of the patient. The system can generate alerts/signals based on involuntary or voluntary actions of the patient. If the patient is determined by the care givers to have voluntary control over certain parameters of the FPPI, then one or more of those actions/parameters can be set to be used as an input to a AAC (Augmentative and Alternative Communication)

system. E.g. an eye brow twitch can be mapped to "I am hungry" message on the AAC system; opening of mouth action can be mapped to start of scanning on the AAC system, and closing of mouth to stopping of the scan; tightening of specified muscle can be used to signify selection, and so on.

Note: The system may capture the magnitudes of various facial expressions as well as body or related motions. Some embodiments may monitor the trend of the captured readings (e.g. magnitude of certain facial expressions that correlate to experience of distress or pain) and generate alerts based on the trend or change in magnitude of those facial expressions rather than the absolute value of those magnitudes.

Note: Some embodiments may use any bodily motion (above a specific threshold) as an indicator of coming around and generate an alert accordingly. Different body parts may have different thresholds assigned. E.g. The threshold amount for a mouth twitch motion may not be the same as the threshold amount for a head or a leg motion. Some systems may use any motion of any body part as a reason to generate an alert. Some systems can allow selection of body parts or areas the observation of motion in which to generate an alert. The body parts may not be directly visible. E.g. the patient body below their head may be under a bedsheet. However, motion in the hidden portion of their body can still be detected via detection of generation and/or motion of creases on their bed sheet.

Various types of image sensors may be used for monitoring the patient-regular RGB cameras, infra-red cameras, 3D cameras, depth sensors, etc. The temperature of patient's various body parts as well as heart rate can also be monitored via image sensors. The heat distribution over patient's body (heat map) can be monitored and its snapshots can also be stored by the system over time.

This monitoring system can be used at home or at a medical facility.

Often when a patient is in an ICU or a hospital bed, a family member may help out with monitoring the patient. However, at the end of the day when the family member has to leave, the patient may be left alone for hours when there is no information available regards to their sleep, expressions of distress, or other symptoms. The patient monitoring system can not only send alerts upon detection of various signs, but also keep a detailed log of all the readings as well as analysis of those readings, as well as generate or provide graphical reports based on the same.

The principles of user interface and user gesture definition/recognition disclosed in this document are applicable for use with information from any sensors that can provide information related to motion and/or position of body parts or any other objects that can provide an indication of motion of users body parts. For example, an indication of motion/position of user's arm can be provided by measuring motion/position of an arm band, wrist band, watch, ring, glove, etc. being worn by the user. Motion/position of user's head (body motion) can be substituted by motion or position of a hat, eye glasses or a head gear worn by the user. In effect, Body Part can be substituted by a foreign object under direct or indirect, full or partial control of the user. Further, this motion/position information can be derived using a variety of sensors including but not restricted to accelerometers, gyroscopes, image sensors, wave field sensors, radars, electric field sensors, acoustic sensors, ultrasonic sensors, EMG sensors, OCG sensors, resistive sensors, as well as others. Further, some user actions may not be detectable visibly from outside but be detectable by other sensors. For example, users can change their meditation or attention level consciously. Alternatively, they can also intentionally change the level of their Alpha, Beta, Theta or Delta brain waves. These levels and/or level changes can be measured by brainwave, EEG or other suitable sensors. Neurosky, Inc. (http://neurosky.com) is one vendor that provides hardware and software to measure brainwaves and detect changes in meditation and attention level of the user. Some embodiment then can use brainwave sensors that provide readings of either meditation level or attention level or any other biometric quantity that the user can consciously have an effect on and/or can cause a change in magnitude, frequency, direction or other measurable attributes. For example, instead of performing a facial expression, the user can increase or decrease meditation or attention level, which then can be treated as "PCE" information and used in the heuristics/principles as described in this and above reference documents. Brainwave sensors, EEG and other biometric sensors can be used as PCE sensors and used to control electronic devices. Similarly, certain conscious bodily muscular action may be hard to detect visibly, however, may be easily detectable by EMG sensors and other sensors. For example, clenching of the teeth or different parts of lower jaw, tensing throat, other parts of face or head, scalp, various auricularis muscles, parts of torso, shoulders, arms, legs, feet, fingers, toes, thighs, calves, or various sphincters of the body may not be externally visible but could be detected by EMG or other sensors. Again, these sensors can be used as PCE/PCM sensors and all the heuristics defined for PCE/PCM sensors can be used with these sensors as well.

Various parameters or quantities discussed in the disclosed concepts/principles/heuristics/techniques/algorithms, etc. can be settable by the user via a suitable user interface. For example, these parameters or quantities can include (but are not limited to) thresholds or bounds for motion or position of body parts, facial expressions, brain wave levels, sound levels, PCMs, etc.; minimum and maximum bounds on various monitored time durations (e.g. such as for POLAs, FLBPs, VLWPs, minimum time active FE durations, etc.); motion noise threshold, start trigger parameters, end trigger parameters, head motion or position bounds, eye gaze bounds and POLA durations, shapes, sizes and colors of objects used for user feedback, feedback sounds, and more.

All of the above disclosed concepts/principles/heuristics/techniques/algorithms, etc. can be used in variety of different fields and applications. Some of the examples are Augmentative and alternative communication (AAC), Assistive Technology, Speech Generation Devices, Augmented/Mixed/Virtual Reality, Desktop and Mobile Computing, Gaming, Industrial Control, Healthcare, Defense, Aviation, Transportation, Manufacturing, Product Lifecycle Management, Aerospace, and others. All the concepts/principles/heuristics/techniques/algorithms, etc. disclosed in this document can also be used with all the apparatuses/devices disclosed in the referenced documents, as well as with devices including but not limited to head worn devices such as smart glasses, smart helmets, virtual/mixed/augmented reality devices, head worn controllers, in-ear controllers, head phones, ear plugs, head bands and neck bands. Further, they are also applicable to other body worn devices such arm/wrist bands, devices utilizing wearable sensors and smart watches, devices embedded inside the user's body, as well as devices that are not physically worn in/on user's body such as smart phones, tablets, desktop computers, smart TVs, set top devices, and others that may possibly utilize image, radar, sonar, sound/voice, ultrasonic, laser and other sensors to sense any or all user actions.

Persons knowledgeable in the art can see that the above disclosed concepts/principles/heuristics/techniques/algorithms, etc. including but not limited to Combination of different types of Motion and Expressions that occur simultaneously or in tandem, Periods of "No Motion" or "No Expression", Periods of Motion or "No Motion" or Expression or "No Expression" with fixed and variable or indefinite lengths or bounded lengths, Time bounds on periods of Motion or No Motion or Expression or No Expression, Magnitude (and other attribute) bounds on Motions and Expressions, TMB Motions and Expressions, Blackout Periods, Variable Length Waiting Periods with or without bounds, Gesture Wakeup Sequence, Session Wakeup Sequence, Signal Generation Session, Concept of Modes, etc. can be used not only to define user gestures but also facilitate recognition of those user gestures, as well as to provide user convenience. Further, Motions and Expressions can be substituted by other bodily and/or mental actions performed by the user in the use/application of the disclosed concepts/principles/heuristics/techniques/algorithms, etc. Some or all of the above disclosures can be used to define/implement methods/processes, and/or to devise/create software modules/applications/programs, and/or to manufacture software storage media that contain computer executable instructions based on some or all of the teachings of the disclosures, and/or manufacture devices that implement some or all of the teachings of the disclosures.

Some or all of the above disclosures can be used to define or implement computer implementable methods or processes, to design and create part of user interfaces to electronic devices, to devise/create software modules/applications/programs, API, to manufacture non-transient storage media that can contain computer executable instructions based on some or all of the teachings of the disclosures, and/or to manufacture devices or apparatuses that implement some or all of the teachings of the disclosures.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains.

The invention claimed is:

1. A system for a user to control an electronic device, the system comprising:

one or more first sensors configured to provide eye gaze information (Eye Info) indicative of the user's eye gaze;

one or more second sensors configured to provide facial action information (FA Info) indicative of one or more facial actions of the user;

one or more third sensors configured to provide head information (Head Info) indicative of motion or position of the user's head; and one or more processors configured to:

i) receive said Eye Info, said FA Info and said Head Info;

ii) detect, based on said FA Info, a first facial action being performed by the user;

iii) upon detection of said first facial action, generate one or more first command signals to modify an object of interest (OOI) based on said Eye Info; and iv) after generating said one or more first command signals, generate one or more second command signals to further modify said OOI based on said Head Info, said Eye Info, or both said Head Info and said Eye Info;

wherein said one or more second command signals are generated based on said Eye Info when a magnitude of change in eye gaze derived from said Eye Info is greater than or equal to an eye gaze change threshold; and wherein said one or more second command signals are generated based on said Head Info when said magnitude of change in eye gaze derived from said Eye Info is less than said eye gaze change threshold.

2. The system of claim 1, wherein said one or more third sensors are configured to be worn on the user's head.

3. The system of claim 1, wherein said first facial action comprises an action involving one or more muscles of an eyelid, an eyebrow, or both.

4. The system of claim 1, wherein said first facial action comprises an action involving a nose, a mouth, a jaw, a lip, a cheek, or any combination thereof, of the user.

5. The system of claim 1, wherein said one or more first command signals are generated based on Eye Info received before detection of said first facial action.

6. The system of claim 1, wherein said one or more second sensors are configured to be worn on the user's head.

7. The system of claim 1, wherein said one or more processors are further configured to stop generation of said one or more second command signals when a head motion or position derived from said Head Info remains within a specified tolerance zone for at least a specified minimum time duration.

8. The system of claim 1, wherein said one or more processors are further configured to:

i. detect, based on said FA Info, a second facial action being performed by the user; and ii. upon detection of said second facial action, stop generation of said one or more second command signals.

9. The system of claim 1, wherein said one or more processors are further configured to stop generation of said one or more second command signals when an eye gaze derived from said Eye Info remains within a specified tolerance zone for at least a specified minimum time duration.

10. The system of claim 2, wherein said one or more second sensors are configured to be worn on the user's head.

11. The system of claim 1, the system further comprising a display mechanism, wherein said display mechanism displays said OOI.

12. The system of claim 11, wherein said display mechanism is configured to be worn on the user's head.

13. The system of claim 1, wherein said first command signals modify at least one of location or appearance of said OOI.

14. The system of claim 1, wherein said one or more second sensors comprise an emitter configured to emit electromagnetic radiation towards the facial skin of the user.

15. The system of claim 1, wherein generating said one or more second command signals comprises applying a blending function to determine an amount of influence of said Eye Info and an amount of influence of said Head Info on the modification of said OOI.

16. The system of claim 1, wherein said one or more first sensors and said one or more second sensors comprise at least one common sensor configured to provide both said Eye Info and said FA Info.

17. A non-transitory computer readable medium comprising one or more programs configured to be executed by one or more processors to enable a user to communicate with an electronic device, said one or more programs causing performance of a method comprising:

receiving eye gaze information (Eye Info) indicative of the user's eye gaze, head information (Head Info) indicative of motion or position of the user's head and facial action information (FA Info) indicative of one or more facial actions of the user;

detecting, based on said FA Info, a first facial action being performed by the user;

upon detection of said first facial action, generating one or more first command signals to modify an object of interest (OOI) based on said Eye Info; and after generating said one or more first command signals, generating one or more second command signals to further modify said OOI based on said Head Info, said Eye Info, or both said Head Info and said Eye Info;

wherein said one or more second command signals are generated based on said Eye Info when a magnitude of change in eye gaze derived from said Eye Info is greater than or equal to an eye gaze change threshold; and wherein said one or more second command signals are generated based on said Head Info when said magnitude of change in eye gaze derived from said Eye Info is less than said eye gaze change threshold.

18. The non-transitory computer readable medium of claim 17, wherein said Head Info is provided by one or more third sensors configured to be worn on the user's head.

19. The non-transitory computer readable medium of claim 17, wherein said first facial action comprises an action involving one or more muscles of an eyelid, an eyebrow, or both, of the user.

20. The non-transitory computer readable medium of claim 17, wherein said first facial action comprises an action involving a nose, a mouth, a jaw, a lip, a cheek, or any combination thereof, of the user.

21. The non-transitory computer readable medium of claim 17, wherein said one or more first command signals are generated based on Eye Info received before detection of said first facial action.

22. The non-transitory computer readable medium of claim 17, wherein said FA Info is provided by one or more second sensors configured to be worn on the user's head.

23. The non-transitory computer readable medium of claim 17, wherein said method further comprises:

stopping generation of said one or more second command signals when a head motion or position derived from said Head Info remains within a specified tolerance zone for at least a specified minimum time duration.

24. The non-transitory computer readable medium of claim 17, wherein said method further comprises: first command signals are based on Eye Info received at least one of:

i. detecting, based on said FA Info, a second facial action being performed by the user; and ii. upon detection of said second facial action, stopping generation of said one or more second command signals.

25. The non-transitory computer readable medium of claim 17, wherein said method further comprises:

stopping generation of said one or more second command signals when an eye gaze derived from said Eye Info remains within a specified tolerance zone for at least a specified minimum time duration.

26. The non-transitory computer readable medium of claim 17, wherein said Eye Info is provided by one or more first sensors configured to be worn on the user's head.

27. The non-transitory computer readable medium of claim 17, wherein generating said one or more second command signals comprises applying a blending function to determine an amount of influence of said Eye Info and an amount of influence of said Head Info on the modification of said OOI.

28. A head-worn apparatus for a user, the apparatus comprising:

one or more first sensors configured to provide eye gaze information (Eye Info) indicative of the user's eye gaze;

one or more second sensors configured to provide facial action information (FA Info) indicative of one or more facial actions of the user;

one or more third sensors configured to provide head information (Head Info) indicative of motion or position of the user's head;

one or more display mechanisms; and one or more processors configured to:

i) receive said Eye Info, said FA Info and said Head Info;

ii) detect, based on said FA Info, a first facial action being performed by the user;

iii) upon detection of said first facial action, generate one or more first command signals to modify an object of interest (OOI) based on said Eye Info, wherein said OOI is displayed using said one or more display mechanisms; and iv) after generating said one or more first command signals, generate one or more second command signals to further modify said OOI based on said Head Info, said Eye Info, or both said Head Info and said Eye Info;

wherein said one or more second command signals are generated based on said Eye Info when a magnitude of change in eye gaze derived from said Eye Info is greater than or equal to an eye gaze change threshold; and wherein said one or more second command signals are generated based on said Head Info when said magnitude of change in eye gaze derived from said Eye Info is less than said eye gaze change threshold.

29. The head-worn apparatus of claim 28, wherein said one or more processors are further configured to stop generation of said one or more second command signals when a head motion or position derived from said Head Info remains within a specified tolerance zone for at least a specified minimum time duration.

30. The head-worn apparatus of claim 28, wherein said one or more processors are further configured to:

i. detect, based on said FA Info, a second facial action being performed by the user; and ii. upon detection of said second facial action, stop generation of said one or more second command signals.

31. The head-worn apparatus of claim 28, wherein said one or more processors are further configured to stop generation of said one or more second command signals when an eye gaze derived from said Eye Info remains within a specified tolerance zone for at least a specified minimum time duration.

32. The head-worn apparatus of claim 28, wherein said one or more display mechanisms comprise a display screen or a retinal projector.

33. The head-worn apparatus of claim 28, wherein said first facial action comprises blinking one or more eyes of the user.

34. The head-worn apparatus of claim 28, wherein said first facial action comprises an action involving one or more muscles of an eyelid, an eyebrow, or both, of the user.

35. The head-worn apparatus of claim 28, wherein said first facial action comprises an action involving a nose, a mouth, a jaw, a lip, a cheek, or any combination thereof, of the user.

36. The head-worn apparatus of claim 28, wherein generating said one or more second command signals comprises applying a blending function to determine an amount of influence of said Eye Info and an amount of influence of said Head Info on the modification of said OOI.

37. The head-worn apparatus of claim 28, wherein said one or more first sensors and said one or more second sensors comprise at least one common sensor configured to provide both said Eye Info and said FA Info.

* * * * *